US012369598B2

(12) United States Patent
Tenney et al.

(10) Patent No.: US 12,369,598 B2
(45) Date of Patent: Jul. 29, 2025

(54) CHOCOLATE REPLICAS PRODUCED FROM INDIVIDUAL COMPONENTS

(71) Applicant: Voyage Foods, Inc., Oakland, CA (US)

(72) Inventors: Kelsey Tenney, Oakland, CA (US); Adam Maxwell, San Francisco, CA (US); Ethan Charles Beswick, San Francisco, CA (US); Samuel Ryo, Singapore (SG); Daniel Assad Saad, Dallas, TX (US); Alec Kremonic Lee, San Francisco, CA (US); Mardonn Carl Chua, Ann Arbor, MI (US); Brandon Head, Oakland, CA (US)

(73) Assignee: Voyage Foods, Inc., Oakland, CA (US)

( * ) Notice: Subject to any disclaimer, the term of this patent is extended or adjusted under 35 U.S.C. 154(b) by 0 days.

(21) Appl. No.: 18/383,662

(22) Filed: Oct. 25, 2023

(65) Prior Publication Data

US 2024/0049741 A1 Feb. 15, 2024

Related U.S. Application Data

(63) Continuation of application No. 17/865,729, filed on Jul. 15, 2022, now Pat. No. 11,832,632.

(60) Provisional application No. 63/222,917, filed on Jul. 16, 2021.

(51) Int. Cl.
*A23G 1/34* (2006.01)
*A23G 1/48* (2006.01)

(52) U.S. Cl.
CPC ............... *A23G 1/34* (2013.01); *A23G 1/48* (2013.01); *A23G 2200/06* (2013.01); *A23G 2200/14* (2013.01)

(58) Field of Classification Search
None
See application file for complete search history.

(56) References Cited

U.S. PATENT DOCUMENTS

| | | | |
|---|---|---|---|
| 1,117,855 | A | 11/1914 | Kenney et al. |
| 1,696,419 | A | 12/1928 | Staudinger |
| 2,380,092 | A | 7/1945 | Weisberg |
| 2,560,531 | A | 7/1951 | Kipnis et al. |
| 2,594,379 | A | 4/1952 | Barch |
| 3,474,113 | A | 10/1969 | Schleppnik |
| 3,617,310 | A | 11/1971 | Rizzi |
| 3,619,210 | A | 11/1971 | Nakel et al. |
| 3,931,246 | A | 1/1976 | Winter et al. |
| 4,045,491 | A | 8/1977 | Evers et al. |
| 4,119,740 | A * | 10/1978 | Crespo .............. A23G 9/322 426/631 |
| 4,130,562 | A | 12/1978 | Dubs et al. |
| 4,356,209 | A | 10/1982 | Bryan et al. |
| 4,520,033 | A | 5/1985 | Tuot |
| 4,564,525 | A * | 1/1986 | Mitchell .............. A23G 1/56 426/615 |
| 4,701,548 | A | 10/1987 | Pittet et al. |
| 5,322,704 | A | 6/1994 | Gaonkar |
| 5,882,716 | A | 3/1999 | Munz-Schaerer et al. |
| 6,090,431 | A | 7/2000 | Franklin et al. |
| 6,149,957 | A | 11/2000 | Mandralis et al. |
| 6,277,428 | B1 | 8/2001 | Franklin et al. |
| 6,521,273 | B1 | 2/2003 | Miller |
| 7,081,264 | B2 | 7/2006 | Akashe et al. |
| 7,794,771 | B2 | 9/2010 | Kessler |
| 8,329,242 | B2 | 12/2012 | Rumbaut et al. |
| 8,367,142 | B2 | 2/2013 | Karwowski et al. |
| 9,771,552 | B2 | 9/2017 | Marcq |
| 10,645,958 | B2 | 5/2020 | Reh et al. |
| 2001/0002269 | A1 | 5/2001 | Zhao |
| 2002/0119235 | A1 | 8/2002 | Zeller et al. |
| 2002/0127302 | A1 | 9/2002 | Zeller et al. |
| 2002/0155210 | A1 | 10/2002 | Hardesty |
| 2003/0203088 | A1 | 10/2003 | Akashe et al. |
| 2004/0202767 | A1 | 10/2004 | Kindel et al. |
| 2005/0112265 | A1 | 5/2005 | Ceriali et al. |
| 2006/0204613 | A1 | 9/2006 | Castro et al. |
| 2006/0286200 | A1 | 12/2006 | Castro et al. |
| 2009/0155446 | A1 | 6/2009 | Reiss et al. |
| 2009/0208426 | A1 | 8/2009 | Gatfield et al. |
| 2009/0258109 | A1 | 10/2009 | Ortiz De Zarate et al. |
| 2010/0323083 | A1 | 12/2010 | Rubinstenn et al. |
| 2010/0330241 | A1 | 12/2010 | Gretsch et al. |
| 2011/0027448 | A1 | 2/2011 | Miller |
| 2011/0274643 | A1 | 11/2011 | Yontz |
| 2011/0318459 | A1 | 12/2011 | George et al. |
| 2012/0107482 | A1 | 5/2012 | Hayakawa et al. |
| 2012/0178828 | A1 | 7/2012 | Reiss et al. |
| 2012/0321772 | A1 | 12/2012 | Fujiwara et al. |
| 2013/0129893 | A1 | 5/2013 | Campanile et al. |

(Continued)

FOREIGN PATENT DOCUMENTS

| | | |
|---|---|---|
| AT | 112131 B | 1/1929 |
| AU | 2016365338 A1 | 6/2018 |

(Continued)

OTHER PUBLICATIONS

Alba et al., "Dietary fibre from berry-processing waste and its impact on bread structure: A review," Journal of the Science of Food and Agriculture, Jul. 2019, 99(9):4189-4199.
Declaration re Chocolate Samples, dated Apr. 7, 2023, 3 pages.
Extended European Search Report in European Appln. No. 20766954.0, dated Oct. 7, 2022, 15 pages.
International Preliminary Report on Patentability in International Appln. No. PCT/US2020/020537, dated Sep. 16, 2021, 12 pages.
International Search Report and Written Opinion in International Appln. No. PCT/US2020/020537, dated Jun. 11, 2020, 14 pages.
International Search Report and Written Opinion in International Appln. No. PCT/US2022/037270, dated Dec. 16, 2022, 13 pages.
International Search Report and Written Opinion in International Appln. No. PCT/US2023/027719, dated Oct. 27, 2023, 13 pages.

(Continued)

*Primary Examiner* — Jyoti Chawla
(74) *Attorney, Agent, or Firm* — Fish & Richardson P.C.

(57) ABSTRACT

Materials and methods for producing chocolate replicas from individual components are provided herein.

16 Claims, No Drawings

(56) References Cited

U.S. PATENT DOCUMENTS

| | | | |
|---|---|---|---|
| 2013/0136839 A1 | 5/2013 | Putter et al. | |
| 2013/0323377 A1 | 12/2013 | Kowalczyk et al. | |
| 2015/0342214 A1 | 12/2015 | Van Ommeren et al. | |
| 2016/0376263 A1 | 12/2016 | Patron et al. | |
| 2017/0000153 A1 | 1/2017 | Borland et al. | |
| 2017/0183613 A1 | 6/2017 | Nakamura et al. | |
| 2017/0339985 A1 | 11/2017 | Fu et al. | |
| 2020/0352202 A1 | 11/2020 | Johnson et al. | |
| 2021/0015117 A1 | 1/2021 | Giunti De Oliveira et al. | |
| 2022/0240534 A1 | 8/2022 | Beswick et al. | |
| 2023/0033131 A1 | 2/2023 | Tenney et al. | |
| 2024/0041062 A1 | 2/2024 | Tenney et al. | |
| 2024/0251817 A1 | 8/2024 | Baker et al. | |
| 2024/0260600 A1 | 8/2024 | Baker et al. | |
| 2025/0008978 A1 | 1/2025 | Baker et al. | |

FOREIGN PATENT DOCUMENTS

| | | | |
|---|---|---|---|
| BR | 102013019333 | | 8/2015 |
| BR | 102013019333 A2 * | | 8/2015 |
| CA | 3132085 A1 | | 9/2020 |
| CN | 1296385 | | 5/2001 |
| CN | 1487795 | | 4/2004 |
| CN | 101005765 | | 7/2007 |
| CN | 101068476 A | | 11/2007 |
| CN | 102421300 | | 4/2012 |
| CN | 102753031 | | 10/2012 |
| CN | 105053432 | | 11/2015 |
| CN | 105828625 | | 8/2016 |
| CN | 105995111 | | 10/2016 |
| CN | 106998762 A | | 8/2017 |
| CN | 108096391 A | | 6/2018 |
| CN | 108289471 | | 7/2018 |
| CN | 109874999 A | | 6/2019 |
| DE | 489613 C | | 1/1930 |
| DE | 2110837 A1 | | 9/1971 |
| DE | 2110837 C3 | | 10/1980 |
| DE | 102006019241 B4 | | 4/2009 |
| DE | 102007057258 A1 | | 6/2009 |
| DE | 102009048534 | | 4/2011 |
| EP | 2178389 | | 4/2010 |
| EP | 2227094 B1 | | 10/2017 |
| GB | 1156480 A | | 6/1969 |
| GB | 1182572 | | 2/1970 |
| GB | 1277387 A | | 6/1972 |
| JP | S64-13978 A | | 1/1989 |
| JP | H03175932 A | | 7/1991 |
| JP | 2006-020526 | | 1/2006 |
| JP | 2006-121958 | | 5/2006 |
| JP | 2012-135215 A | | 7/2012 |
| KR | 10-2008- 0067036 A | | 7/2008 |
| KR | 10-2014- 0058304 A | | 5/2014 |
| RU | 25825 | | 10/2002 |
| RU | 2524153 | | 7/2014 |
| RU | 2760191 | | 11/2021 |
| WO | WO 1980/002636 | | 12/1980 |
| WO | WO 2007/116429 A1 | | 10/2007 |
| WO | WO 2009/068999 | | 6/2009 |
| WO | WO 2009/137838 | | 11/2009 |
| WO | WO 2010/143120 A1 | | 12/2010 |
| WO | WO 2012/084624 A1 | | 6/2012 |
| WO | WO 2018/110587 | | 6/2018 |
| WO | WO 2019/165323 | | 8/2019 |
| WO | WO 2021/069804 | | 4/2021 |
| WO | WO 2021/202989 A1 | | 10/2021 |
| WO | WO 2022/251529 A1 | | 12/2022 |
| WO | WO 2023/285547 A1 | | 1/2023 |
| WO | WO 2023/288050 A2 | | 1/2023 |

OTHER PUBLICATIONS

ISO.org [online], ISO 6564, "Sensory analysis—Methodology—Flavour Profile Methods," Oct. 15, 1985, retrieved on Aug. 13, 2023, retrieved from URL<https://www.iso.org/standard/12966.html>, 8 pages.
ISO.org [online], ISO 6658, "Sensory analysis—Methodology—General guidance," Jul. 2017, retrieved on Aug. 13, 2023, retrieved from URL<https://www.iso.org/standard/65519.html>, 34 pages.
Katz et al., "Cocoa and chocolate in human health and disease," Antioxidants & redox signaling, Nov. 15, 2011, 15(10):2779-2811.
Ma et al., "Phytochemical constituents, health benefits, and industrial applications of grape seeds: A mini-review," Antioxidants, Sep. 15, 2017, 6(3): 11 pages.
Newfoodmagazine.com [online], "Researchers combine chocolate with waste products to boost health profile," Aug. 18, 2020, retrieved on Sep. 7, 2022, retrieved from URL<https://www.newfoodmagazine.com/news/116077/combining-chocolate-with-waste-products-to-boost-health-profile/>, 6 pages.
Smeds et al., "Content, composition, and stereochemical characterisation of lignans in berries and seeds," Food chemistry, Oct. 15, 2012, 134(4): 1991-1998.
Wang et al., "Food Flavor Preparation and Application Manual," Beijing: China Light Industry Press, May 31, 2000, Edition 1, 9 pages (with English translation).
Wen et al., "Food Additives," Beijing: China Quality Inspection Press Mar. 31, 2013, Edition 2, 6 pages (with English translation).
Zaini et al., "Microanalysis of Cocoa Beans for Determination of Tannin Content Contributed to Cocoa Flavor," Malaysian Cocoa Journal, 2020, 12(1): 154-161.
Zeng, "Coffee Flavor Chemistry," Guangzhou: Jinan University Press, Oct. 31, 2014, Edition 1, 6 pages (with English translation).
Extended European Search Report in European Appln. No. 23193950.5, dated Dec. 8, 2023, 8 pages.
Barbosa-Cánovas et al., "Encapsulation processes," Food Powders: Physical Properties, Processing, and Functionality, Springer, Boston, MA, Jan. 2005, Chapter 8, 2 pages.
Extended European Search Report in European Appln. No. 22842920.5, dated Apr. 30, 2024, 11 pages.
HMDB.ca [online], "Showing metabocard for 2,5-Dimethylphenol (HMDB0030540)," Feb. 26, 2018, retrieved on May 6, 2024, retrieved from URL<https://hmdb.ca/metabolites/HMDB0030540/>, 7 pages.
International Preliminary Report on Patentability in International Appln. No. PCT/US2022/037270, dated Jan. 25, 2024, 11 pages.
Nosh.com [online], "Atomo Announces Development of Bean-less Molecular Coffee," Feb. 19, 2019, retrieved on May 6, 2024, retrieved from URL<https://www.nosh.com/food-wire/2019/atomo-announces-development-of-bean-less-molecular-coffee/>, 4 pages.
PubChem CID 10430, "Isovaleric acid," National Library of Medicine, retrieved on May 6, 2024, retrieved from URL <https://pubchem.ncbi.nlm.nih.gov/compound/Isovaleric-acid#section=Synonyms>, 1 page.
PubChem CID 18522, "2-Methyltetrahydrofuran-3-one," National Library of Medicine, retrieved on May 6, 2024, retrieved from URL <https://pubchem.ncbi.nlm.nih.gov/compound/2-Methyltetrahydrofuran-3-one>, 2 pages.
PubChem CID 26331, "2-Ethylpyrazine," National Library of Medicine, retrieved on May 6, 2024, retrieved from URL <https://pubchem.ncbi.nlm.nih.gov/compound/2-Ethylpyrazine#section=Nikkaji-Number>, 1 page.
PubChem CID 332, "2-Methoxy-4-vinylphenol," National Library of Medicine, retrieved on May 6, 2024, retrieved from URL <https://pubchem.ncbi.nlm.nih.gov/compound/2-Methoxy-4-vinylphenol#section=Synonyms>, 1 page.
PubChem CID 7144, "2-Methoxy-4-methylphenol," National Library of Medicine, retrieved on May 6, 2024, retrieved from URL <https://pubchem.ncbi.nlm.nih.gov/compound/2-Methoxy-4-methylphenol#section=Synonyms>, 1 page.
PubChem CID 7976, "2-Methylpyrazine," National Library of Medicine, retrieved on May 6, 2024, retrieved from URL <https://pubchem.ncbi.nlm.nih.gov/compound/2-Methylpyrazine>, 1 page.
Shanmugam, "Granulation techniques and technologies: recent progresses," BioImpacts: BI, 2015, 5(1):55-63.

(56) References Cited

OTHER PUBLICATIONS

PubChem CID 7041, "2,6-Dimethoxyphenol," National Library of Medicine, retrieved on Jun. 5, 2024, retrieved from URL <https://pubchem.ncbi.nlm.nih.gov/compound/7041>, 1 page.
PubChem CID 7267, "2,5-Dimethylphenol," National Library of Medicine, retrieved on Jun. 5, 2024, retrieved from URL <https://pubchem.ncbi.nlm.nih.gov/compound/2_5-Dimethylphenol>, 1 page.
Office Action in European Appln. No. 20766954.0, mailed on Apr. 29, 2024, 3 pages.
Office Action in European Appln. No. 20766954.0, mailed on Oct. 25, 2022, 1 page.
PubChem CID 11747, "2,3-Pentanedione," National Library of Medicine, retrieved on Aug. 14, 2024, retrieved from URL <https://pubchem.ncbi.nlm.nih.gov/compound/2 3-Pentanedione>, 11 pages.
PubChem CID 5810, "Hydroxyproline," National Library of Medicine, retrieved on Aug. 15, 2024, retrieved from URL <https://pubchem.ncbi.nlm.nih.gov/compound/Hydroxyproline>, 13 pages.
PubChem CID 6083, "Adenosine Phosphate," National Library of Medicine, retrieved on Aug. 16, 2024, retrieved from URL <https://pubchem.ncbi.nlm.nih.gov/compound/Adenosine-Phosphate>, 13 pages.
PubChem CID 62453, "4-Vinylphenol," National Library of Medicine, retrieved on Aug. 16, 2024, retrieved from URL <https://pubchem.ncbi.nlm.nih.gov/compound/4-Vinylphenol>, 11 pages.
International Preliminary Report on Patentability in International Appln. No. PCT/US2023/027719, mailed on Jan. 30, 2025, 9 pages.
Medium [online], "Coffee, Chicory, and Chicanery," Jan. 20, 2018, retrieved on Oct. 18, 2024, retrieved from URL<https://medium.com/@.aravindiyer/coffee-chicory-and-chicanery-625295c00c3d>, 11 pages.
Office Action in European Appln. No. 22842920.5, mailed on May 17, 2024, 1 page.
Office Action in European Appln. No. 22842920.5, mailed on Sep. 26, 2024, 8 pages.
Office Action in European Appln. No. 23193950.5, mailed on Jan. 15, 2024, 2 pages.
Office Action in European Appln. No. 23193950.5, mailed on Sep. 26, 2024, 7 pages.
Powderbulksolids.com [online], "What is Agglomeration?" Feb. 26, 2008, retrieved on Dec. 26, 2024, retrieved from URL<https://www.powderbulksolids.com/particle-enlargers-formers/what-is-agglomeration->, 4 pages.
PubChem CID 445858, "Ferulic acid," National Library of Medicine, retrieved on Oct. 30, 2024, retrieved from URL <https://pubchem.ncbi.nlm.nih.gov/compound/ferulic-acid>, 1 page.

* cited by examiner

CHOCOLATE REPLICAS PRODUCED FROM INDIVIDUAL COMPONENTS

CROSS-REFERENCE TO RELATED APPLICATIONS

This application is a continuation of U.S. application Ser. No. 17/865,729, filed on Jul. 15, 2022, which claims benefit of priority from U.S. Provisional Application Ser. No. 63/222,917, filed on Jul. 16, 2021. The disclosure of the prior application is considered part of (and is incorporated by reference in) the disclosure of this application.

TECHNICAL FIELD

This document relates to materials and methods for producing chocolate-like products containing individual components, including selected volatile and non-volatile organic compounds.

BACKGROUND

Traditional methods for producing chocolate are often lengthy and costly, involving the harvesting of fastidious crops, followed by processing, fermenting, drying, grinding, refining, tempering, and molding steps. Each component of the traditional, geographically constrained process has an inherent variability and risk, including climate, crop disease, and contamination, which can render such methods and their resulting products inconsistent from batch to batch and year to year. Traditional chocolate production methods require imprecise practices, and it can be difficult to account for all inconsistencies, often involving adulteration of the final product with ingredients to mask imperfections.

SUMMARY

This document is based, at least in part, on the identification of volatile and non-volatile organic compounds that contribute to the flavor and aroma of chocolates, and on the development of methods for combining those compounds to yield chocolate replicas (e.g., bean replicas, bar replicas, coating replicas, cocoa powder replicas, dark chocolate replicas, milk chocolate replicas) that have the taste, aroma, and other characteristics of traditionally generated chocolates. Because each compound is added individually (e.g., in pure or isolated form), the methods disclosed herein reduce many of the risks and variability associated with traditional chocolate production, which can vary by region, farm, or year. In some cases, one or more ingredients (e.g., at least 50%, 60%, 70%, 80%, 90%, 95%, 99%, or 100% of the compounds) can be highly defined (e.g., by lot analysis). In some cases, one or more ingredients (e.g., at least 50%, 60%, 70%, 80%, 90%, 95%, 99%, or 100% of the volatile or non-volatile organic compounds) can be highly pure (e.g., at least 90%, 95%, 96%, 97%, 98%, 99%, 99.5%, or 99.9% pure). The methods disclosed herein also provide infinite reproducibility of a recipe, which is not possible with traditional production methods. Further, the methods described herein allow for unique flexibility in optimization of the flavors, aromas, and textures of chocolate, and greatly reduce or even eliminate the possibility that the resulting chocolate will contain detrimental or undesired components. Moreover, the methods disclosed herein differ from currently existing methods in that they are rapid, reproducible, and cost-effective.

In a first aspect, this document features a chocolate replica that contains a plant-based solid substrate, one or more volatile organic compounds (VOCs) (e.g., one or more isolated VOCs), wherein the one or more isolated VOCs include at least one of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether, (E)-anethole, 1-heptanol, 2,3,5-trimethyl-6-ethylpyrazine, 2,3-butanedione, 2,4,5-trimethylthiazole, 2-acetylpyridine, 2-ethoxy-3-methyl pyrazine, 2-ethyl-1-hexanol, 2-ethyl-5-methylpyrazine, 2-ethyl-6-methylpyrazine, 2-ethylene-6-methylpyrazine, 2-isobutyl-3-methoxypyrazine, 2-isopropyl-5-methyl-2-hexenal, 2-methylbutyraldehyde, 2-methyl furan, 2-methyl-1-butanol, 2-octanol, 2-octanone, 2-pentanol, 2-phenyl-2-butenal, 2-phenylpropionaldehyde, 3,4-hexanedione, 3,5-diethyl-2-methylpyrazine, 3-methyl-1,2-cyclopentanedione, 3-octanone, 4,5-dimethyl-2-ethyl-3-thiazoline, 4-ethylguaiacol, 4-hydroxy-2,5-dimethy-3(2H)-furanone, 4-methyl-2-phenyl-2-pentenal, 4-methyl-5-thiazoleethanol, 4'-methylacetophenone, 4-methylguaiacol, 5-methylfurfural, 6-propyl-5,6-dihydropyran-2-one, acetic acid, amyl acetate, anethole, benzyl alcohol, beta-damascenone, damascenone, delta-so decalactone, delta-octalactone, ethyl 2-methylbutyrate, ethyl 3-phenylpropionate, ethyl acetate, ethyl butanoate, ethyl isobutyrate, ethyl isovalerate, eugenol, furfuryl acetate, furfuryl propionate, geraniol, hexyl isobutyrate, isoamyl benzoate, isoamyl butyrate, isoamyl phenylacetate, isopropenyl pyrazine, linalool oxide, methional, methyl 2-thiofuroate, methyl butyrate, methyl p-anisate, methyl phenylacetate, ocimene, octanal, p-cresol, phenol, phenylacetic acid, prenyl benzoate, propanol, propenal, propyl 2-furoate, pyridine, syringol, tetrahydrofurfuryl phenylacetate, trans-2-nonenal, and tricyclodecenyl isobutyrate; and one or more non-volatile compounds (e.g., one or more isolated non-volatile compounds).

In some cases, the plant-based solid substrate does not contain cacao (or cocoa) solids. The plant-based solid substrate can have been derived from a food stream waste product (e.g., a food stream waste product from which at least 75% of a starting amount of starch, protein, sugar, fat-soluble components, and flavor has been removed).

The plant-based solid substrate can have been derived from a fruit or vegetable seed. The fruit or vegetable seed can be from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, cranberry, raspberry, blueberry, strawberry, blackberry, pomegranate, kiwi, muskmelon, cantaloupe, honeydew, passionfruit, starfruit, tomatillo, dragonfruit, soursop, calamansi, okra, cucumber, bell pepper, eggplant, pear, cherimoya, pineapple, quince, lingonberry, thistle (nyger), green bean, and combinations thereof.

The plant-based solid substrate can include a processed fruit pomace or peel. The fruit pomace or peel can be selected from the group consisting of apple pomace, banana peel, grape pomace, tomato pomace, tomato skins, and combinations thereof.

The plant-based solid substrate can include a processed fruit or fruit product. The fruit or fruit product can be selected from the group consisting of culled apples, banana fruits, banana leaves, banana pseudostems, breadfruit, breadnut, cashew nuts, cashew by-products, citrus pulp, citrus fruits, citrus seed meal, citrus molasses, citrus pulp, colocynth, date molasses, date palm leaves, date pedicels, date palm fruits, *guava*, grape seed oil meal, jackfruit, kokum, *Luffa*, mango fruit, mango by-products, *Moringa*, melon, olive oil cake, olive by-products, *papaya* fruits, *papaya* leaves, *papaya* by-products, pineapple by-products, pineapple leaves, pineapple mill juice, pumpkin, squash, gourd, sapucaia, Spanish lime, *seje*, tomato fruits, tomato leaves, tomato crop residues, tomato seed cake, walnut, watermelon forage, watermelon fruit, watermelon oil meal, and combinations thereof.

The plant-based solid substrate can include a processed legume, legume by-product, or legume seed. The legume, legume by-product, or legume seed can be selected from the group consisting of African locust bean, African yam bean, *bambara* barnut crop residue and straw, black gram, *bambara* barnut pods, *bambara* barnut shells, *bambara* barnut offals, blue lupin seeds, *bambara* barnut seeds, butterfly pea, carob, common bean, *centro*, common vetch, chickpea, cowpea seeds, *Faba* bean, grass pea, guar forage, guar seed, guar meal, guanacaste, hairy vetch, horse gram, jack bean, *Lablab*, lima bean, lentil, mat bean, mung bean, narbon vetch, pea by-products, peanut seeds, pea protein concentrate, peanut skins, pea seeds, pigeon pea seeds, peanut forage, prickly *Sesban*, peanut hulls, purple vetch, peanut meal, rain tree, rice bean, *sesban*, soybean seeds, soybean, sword bean, soybean forage, syrian mesquite, soybean meal, tamarind, *tamarugo*, velvet bean, white lupin seeds, winged bean, yellow lupin seeds, and combinations thereof.

The plant-based solid substrate can include a processed oil plant, oil plant by-product, or oil plant seed. The oil plant, oil plant by-product, or oil plant seed can be selected from the group consisting of almond kernels, almond by-products, argan, babassu, borneo tallow nut oil meal, *Bactris, Camelina* seeds, *Camelina* oil meal, cotton, cashew nuts, cashew by-products, castor seeds, castor oil meal, castor by-products, cotton straw, cotton crop residues, ceylon ironwood, chia seed, cocoa butter, cottonseed hulls, cottonseed meal, copra meal, coconut by-products, *Crambe*, corozo seed, corozo oil meal, doum palm, dragon's head, flax straw, flax crop by-products, grape seeds, grape seed oil meal, hemp, *Jatropha* kernel meal, *Jatropha* by-products, jojoba, kapok, kenaf, karanja, kusum, linseed meal, *Luffa*, linseed, *Macadamia, Moringa*, mahua, mustard oil meal, mustard bran, maize germ meal, maize germ, neem, *niger*, oil palm fronds, oil palm crop residues, olive oil cake, olive oil by-products, oil palm kernels, palm kernel meal, peanut seeds, palm oil mill effluent, peanut skins, palm press fibre, pinto peanut, peanut forage, poppy, peanut hulls, pumpkin, squash, gourd, peanut meal, rapeseed forage, rapeseed hulls, rapeseed meal, rapeseeds, rubber, safflower seeds, safflower oil meal, sal seeds, sal oil meal, soybean meal, soybean seeds, *seje*, sunflower, sesame seeds, sesame oil meal, shea butter, shea kernel, sickle pods, sunflower forage, sunflower crop residues, sunflower hulls, sunflower screenings, sunflower meal, sunflower seeds, soybean, soybean forage, soybean hulls, tung tree, tomato seed cake, walnut, watermelon seeds, watermelon oil meal, and combinations thereof.

The plant-based solid substrate can include a processed grain or grain product. The grain or grain product can be selected from the group consisting of atella, barley distillery by-products, broken rice, polished rice, barley grain, brown rice, brewers grains, cockspur grass grain, corn gluten feed, corn distillers grain, corn gluten meal, ear maize, finger millet grain, foxtail millet grain, fonio grain, maize bran, hominy feed, maize green forage, maize cobs, maize stover, maize germ meal, maize germ, malt culms, maize grain, millet hulls, oat hulls, oat mill feed, oats, pearl millet grain, proso millet grain, *Quinoa*, red oat grain, rice protein concentrate, rice bran, rice by-products, rough rice, rice hulls, rye grain, rye by-products, sorghum by-products, starches, sorghum grain, tef grain, triticale, Venezuela grass, wheat, wheat germ, wheat bran, wheat grain, wheat distillers grain, wheat shorts, wheat middlings, feed flour, and combinations thereof.

The chocolate replica can contain about 0.5 wt % to about 30 wt % of the solid substrate, about 30 wt % to about 50 wt % of the solid substrate, or about 50 wt % to about 70 wt % of the solid substrate.

The one or more VOCs can include one or more of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether. The one or more VOCs can include at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, vanillyl ethyl ether, (E)-anethole, 2,3,5-trimethyl-6-ethylpyrazine, 2-ethyl-5-methylpyrazine, 2-ethyl-6-methylpyrazine, 2-ethylene-6-methylpyrazine, 3,4-hexanedione, 3,5-diethyl-2-methylpyrazine, 3-methyl-1,2-cyclopentanedione (cyclotene), 4-ethylguaiacol, 4-hydroxy-2,5-dimethy-3(2H)-furanone (furaneol), 4-methyl-5-thiazoleethanol, 4-methylguaiacol, 6-propyl-5,6-dihydropyran-2-one, acetic acid, anethole, beta-damascenone, ethyl butanoate, eugenol, methional, methyl 2-thiofuroate, methyl butyrate, ocimene, phenol, phenylacetic acid, propanol, propenal, and syringol. The one or more VOCs can include at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, and vanillyl ethyl ether.

The chocolate replica can include 2,3-diethylpyrazine in an amount of about 0.0000001 to about 10 ppm. The chocolate replica can include 2,3-pentadione in an amount of about 0.1 to about 14 ppm. The chocolate replica can include 2-ethyl-3,5-dimethylpyrazine in an amount of about 0.000001 to about 9 ppm. The chocolate replica can include 2-ethyl-3,6-dimethylpyrazine in an amount of about 0.000001 to about 9 ppm. The chocolate replica can include 2-methoxypyrazine in an amount of about 0.00001 to about 15 ppm. The chocolate replica can include 3-methylbutyraldehyde in an amount of 3-methylbutyraldehyde in an amount of about 0.0001 to about 20 ppm. The chocolate replica can include 5-methyl-2-hepten-4-one in an amount of about 0.0001 to about 25 ppm. The chocolate replica can include acetoin in an amount of about 0.0001 to about 55 ppm. The chocolate replica can include coffee furanone in an amount of about 0.14 to about 14 ppm. The chocolate replica can include furfuryl mercaptan in an amount of 0.000001 to about 5 ppm. The chocolate replica can include indole in an amount of about 0.001 to about 3 ppm. The chocolate replica can include propionic acid in an amount of about 0.01 to about 505 ppm. The chocolate replica can include pyrazine in an amount of about 0.0001 to about 10 ppm. The chocolate replica can include valeric acid in an amount of about 0.000001 to about 40 ppm. The chocolate replica can include vanillin propylene glycol acetal in an amount of 0.0000001 to about 550 ppm. The chocolate replica can include vanillyl ethyl ether in an amount of about 0.01 to about 510 ppm.

The chocolate replica can further include at least one VOC selected from the group consisting of 1-octanol, 1-octen-3-ol, 1-octen-3-one, 2,3-diethyl-5-methylpyrazine, 2,3-dimethylpyrazine, 2,3,5-trimethylpyrazine, 2,5-dimethylpyrazine, 2,6-dimethylpyrazine, 2-acetyl-5-methylfuran, 2-ethyl-3-methylpyrazine, 2-ethylpyrazine, 2-heptanol, 2-heptanone, 2-isopropyl-3-methoxypyrazine, 2-methylbutyl isovalerate, 2-methylbutyraldehyde, 2-methylbutyric acid, 2-methylpyrazine, 2-nonanol, 2-nonanone, 2-pentyl furan, 2-undecanone, 3-hydroxy-2-methyl-4H-pyrone-4-one (maltol), 5-methyl-2-phenyl-2-hexenal, benzaldehyde, benzyl acetate, beta-ionone, butyl acetate, butyric acid, decanal, diethyl succinate, dimethyl trisulfide, ethyl benzoate, ethyl cinnamate, ethyl decanoate, ethyl heptanoate, ethyl hexanoate, ethyl lactate, ethyl laurate, ethyl octanoate, ethyl phenylacetate, furfural, gamma-nonalactone, gamma-valerolactone, geranyl acetate, guaiacol, hexanal, hexanoic acid, hexanol, hexyl acetate, isoamyl acetate, isoamyl alcohol, isoamyl isobutyrate, isobutyl acetate, isobutyraldehyde, isobutyric acid, isovaleraldehye, isovaleric acid, limonene, massoia lactone, methyl salicylate, myrcene, nonanal, phenethyl acetate, phenethyl alcohol, phenylacetaldehyde, tetramethylpyrazine, trans,trans-2,4-decadienal, valeraldehyde, and vanillin. The one or more non-volatile compounds can include at least one compound selected from the group consisting of choline, pyridine, pyridoxine, 2(5H)-furanone, 2,3-dimethylpyrazine, caffeine, orientin, 4-hydroxybenzaldehyde, methyl 2-pyrrolyl ketone, 2,3,5-trimethylpyrazine, 2,3,5,6-tetramethylpyrazine, isoprenylpyrazine, 2-isopropyl-3-methoxypyrazine, piperine, 2-isobutyl-3-methoxypyrazine, catechin, adipic acid, methyl gallate, epicatechin, rutin, trans-ferulic acid, sinapinic acid, resveratrol, ellagic acid, propyl gallate, salicylic acid, quercetin, hesperetin, AMP, hydroxymethylfurfural, procyanidin B1, pantothenic acid, sotolon, caffeic acid, epicatechin gallate, vanillic acid, syringic acid, homofuraneol, vanillin, syringaldehyde, coumaric acid, acetovanillone, cinnamic acid, luteolin, polydatin, cytosine, CMP, adenine, cytidine, guanine, 4-guanidinobutyric acid, uracil, tyramine, tryptamine, maltol, maple furanone, acetanilide, sorbic acid, phenylalanine, leucine, glucosamine, methionine, GABA, tyrosine, lysine, histidine, glycine, serine, aspartic acid, isoleucine, tryptophan, valine, proline, carnitine, arginine, ornithine, B-alanine-2, threonine, glutamine, asparagine, cysteine, glutamic acid, betaine, pipecolinic acid, trans-4-hydroxyproline, citrulline, carnosine, homoserine, cystine, kynurenic acid, ribose, arabitol, fructose, rhamnose, mannitol, glucose, lactose, xylose, sorbitol, fucose, galactose, mannose, sucrose, myo-inositol, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, nicotinic acid, 8-hydroxyquinoline, quinoline, 5-methoxyresorcinol, chlorogenic acid, ethyl nicotinate, and eugenyl acetate. The one or more non-volatile compounds can include at least one compound selected from the group consisting of phenylalanine, leucine, glucosamine, methionine, tyrosine, lysine, histidine, glycine, serine, aspartic acid, isoleucine, tryptophan, valine, proline, carnitine, arginine, threonine, glutamine, asparagine, cysteine, glutamic acid, fructose, glucose, lactose, galactose, sucrose, xylose, lactic acid, citric acid, tartaric acid, nicotinic acid, pyridine, 2,3,5,6-tetramethylpyrazine, sotolon, vanillic acid, syringic acid, vanillin, syringaldehyde, cinnamic acid, maltol, and maple furanone.

The chocolate replica can further include a sugar, a fat, a seed meal, an amino acid, a salt, and a root powder. The chocolate replica can include a root powder selected from the group consisting of maca root powder, marshmallow root powder, beet root powder, dandelion root powder, and chicory root powder. The chocolate replica can contain about 0.5 to about 30 wt % solid substrate, about 0 to 75 wt % sugar, about 5 to 50 wt % fat, about 0 to 30 wt % seed meal, about 0 to 3 wt % amino acid, about 01.5 wt % salt, and about 0 to 5 wt % root powder.

In another aspect, this document features a method for preparing a plant-based solid substrate derived from a ground food stream waste product. The method can include mixing the ground food stream waste product with a caustic agent and water at a pressure of 0-10 bar, to generate a ground preparation having a pH of about 7.5 to about 10.5; drying the ground preparation; combining the dried ground preparation with one or more plant oils to generate a mixture; milling the mixture until to obtain particles having a size less than about 75 microns; and sieving the particles to yield the solid substrate. The food stream waste product can include fruit or vegetable seeds. The food stream waste product can consist essentially of fruit or vegetable seeds. The fruit or vegetable seeds can be from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, and combinations thereof. The fruit or vegetable seeds can be grape seeds. The caustic agent can include sodium hydroxide, potassium carbonate, sodium carbonate, calcium hydroxide, potassium bicarbonate, or potassium hydroxide. The mixing can include high shear blending at a temperature of about at 70° C. to about 80° C. for about 15 to 60 minutes, to generate a ground preparation having a pH of about 8.0 to about 8.5. The mixing can include high shear blending at a temperature of about 75° C. for about 30 minutes, to generate a ground preparation having a pH of about 8.0 to about 8.5. The drying can include tray drying, spray drying, drum drying, falling film evaporation, freeze drying, vacuum drying, or a combination thereof. The one or more plant oils can include corn oil, sunflower oil, palm oil, coconut oil, shea oil, *illipe* oil, mango kernel oil, palm kernel oil, canola oil, avocado oil, or safflower oil. The milling can include using a stone corundum mill or a colloid mill, at a temperature less than about 65° C. The sieving can include passing the particles through a 100 micron sieve. The method can further include adding at least one amino acid, at least one sugar, or at least one amino acid and at least one sugar to the ground food stream waste product.

In another aspect, this document features a method for preparing a plant-based solid substrate derived from a food stream waste product, where the method includes mixing the food stream waste product with a caustic agent and water at a pressure of 0-10 bar, to generate a preparation having a pH of about 7.5 to about 10.5; separating the preparation into a solid fraction from a liquid fraction; separately roasting the solid fraction and the liquid fraction; grinding the roasted solid fraction; combining the ground roasted solid fraction with the roasted liquid fraction and one or more plant oils to generate a mixture; milling the mixture to generate particles having a size of less than 75 microns; and sieving the particles to yield the solid substrate. The food stream waste product can include fruit or vegetable seeds. The food stream waste product can consist essentially of fruit or vegetable seeds. The fruit or vegetable seeds can be from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, and combinations thereof. The fruit or vegetable seeds can be grape seeds. The method can further include removing unwanted plant material from the food stream waste product prior to the mixing step. The mixing can include high shear blending at a temperature of about at 70° C. to about 80° C. for about 15 to 60 minutes, to generate a preparation having a pH of about 8.0 to about 8.5. The mixing can include high shear blending at a temperature of about 75° C. for about 30 minutes, to generate a preparation having a pH of about 8.0 to about 8.5. The method can include air roasting the solid fraction and dry roasting the liquid fraction. The grinding can include using a burr mill, blade mill, hammer mill, stone mill, jet mill, air classifier mill, or high impact mill. The one or more plant oils can include corn oil, sunflower oil, palm oil, or coconut oil. The milling can include using a stone corundum mill or colloid mill, at a temperature of less than 65° C. The sieving can include passing the particles through a 100 micron sieve. The method can further include adding at least one amino acid, at least one sugar, or at least one amino acid and at least one sugar to the mixture.

In still another aspect, this document features a method for preparing a plant-based solid substrate derived from a food stream waste product, where the method includes mixing the food stream waste product with a caustic solution and water at a pressure of 0-10 bar to generate a preparation having a pH of about 7.5 to about 10.5; drying the preparation; optionally combining the preparation with one or more enzymes; roasting the preparation; grinding the roasted preparation; combining the ground roasted preparation with one or more plant oils, sugars, salts, seed meals or seed flours, amino acids, or other non-volatile compounds, to generate a slurry; pumping the slurry into a particle size reduction apparatus; and refining the slurry to generate a solid substrate having particles with a size less than about 25 to 30 microns. The food stream waste product can include fruit or vegetable seeds. The food stream waste product can consist essentially of fruit or vegetable seeds. The fruit or vegetable seeds can be from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, and combinations thereof. The fruit or vegetable seeds can be grape seeds. The method can further include removing unwanted plant material from the food stream waste product prior to the mixing step. The mixing can include mixing at a temperature of about at 70° C. to about 80° C. for about 15 to 180 minutes, to generate a preparation having a pH of about 8.0 to about 9.0. The mixing can include mixing at a temperature of about 75° C. for about 30 to 120 minutes, to generate a preparation having a pH of about 8.0 to about 9.0. The drying can include tray drying, spray drying, drum drying, or vacuum drying. The method can include, prior to the drying, separating the preparation into a solid fraction and a liquid fraction, and wherein the drying includes drying the solid fraction separately from the liquid fraction. The one or more enzymes can include cellulase, tannase, pectinase, xylase, or hemicellulose. The roasting can include convection roasting, conduction roasting, infrared roasting, or a combination thereof. The grinding can include using a crushing mill, burr mill, espresso grinder, stone mill, blade mill, or jet mill. The one or more plant oils can include one or more of corn oil, sunflower oil, palm oil, or coconut oil, shea oil, *illipe* oil, mango kernel oil, palm kernel oil, canola oil, and safflower oil. The one or more sugars can include one or more of sucrose, arabitol, fructose, galactose, glucosamine, glucose, mannitol, mannose, inositol, rhamnose, ribose, sorbitol, xylose, and lactose. The one or more salts can include one or more of sodium chloride, potassium chloride, magnesium chloride, and sea salt. The one or more seed meals or seed flours can include one or more of sunflower meal or flour, coconut meal or flour, almond meal or flour, pecan meal or flour, hazelnut meal or flour, walnut meal or flour, pistachio meal or flour, cashew meal or flour, peanut meal or flour, canola meal or flour, safflower meal or flour, palm kernel meal or flour, mango kernel meal or flour, chia meal or flour, pumpkin seed meal or flour, brazil nut meal or flour, *Macadamia* nut meal or flour, chestnut meal or flour, flax meal or flour, hemp meal or flour, and tiger nut meal or flour. The one or more amino acids can include one or more of phenylalanine, leucine, glucosamine, methionine, gamma-aminobutyric acid (GABA), tyrosine, lysine, histidine, glycine, serine, aspartic acid, isoleucine, tryptophan, valine, proline, carnitine, arginine, alanine, threonine, glutamine, asparagine, glutamic acid, betaine, pipecolinic acid, citrulline, carnosine, homoserine cysteine, proline, and serine. The one or more non-volatile compounds can include at least one compound selected from the group consisting of fructose, glucose, lactose, galactose, sucrose, xylose, lactic acid, citric acid, tartaric acid, nicotinic acid, pyridine, 2,3,5,6-tetramethylpyrazine, sotolon, vanillic acid, syringic acid, vanillin, syringaldehyde, cinnamic acid, maltol, and maple furanone. The combining can include mixing at a temperature of about 35° C. The size reduction apparatus can be a continuous rotor stator particle size reduction machine.

In yet another aspect, this document features a chocolate replica containing one or more VOCs (e.g., one or more isolated VOCs) and one or more non-volatile compounds (e.g., one or more isolated non-volatile compounds), wherein the one or more VOCs include at least one VOC that is not present in a corresponding reference chocolate, wherein the chocolate replica does not contain cocoa beans or processed cocoa beans, and wherein the one or more VOCs include at least one compound selected from the group consisting of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether, (E)-anethole, 1-heptanol, 2,3,5-trimethyl-6-ethylpyrazine, 2,3-butanedione, 2,4,5-trimethylthiazole, 2-acetylpyridine, 2-ethoxy-3-methyl pyrazine, 2-ethyl-1-hexanol, 2-ethyl-5-methylpyrazine, 2-ethyl-6-methylpyrazine, 2-ethylene-6-methylpyrazine, 2-isobutyl-3-methoxypyrazine, 2-isopropyl-5-methyl-2-hexenal, 2-methylbutyraldehyde, 2-methyl furan, 2-methyl-1-butanol, 2-octanol, 2-octanone, 2-pentanol, 2-phenyl-2-butenal, 2-phenylpropionaldehyde, 3,4-hexanedione, 3,5-diethyl-2-methylpyrazine, 3-methyl-1,2-cyclopentanedione, 3-octanone, 4,5-dimethyl-2-ethyl-3-thiazoline, 4-ethylguaiacol, 4-hydroxy-2,5-dimethy-3(2H)-furanone, 4-methyl-2-phenyl-2-pentenal, 4-methyl-5-thiazoleethanol, 4'-methylacetophenone, 4-methylguaiacol, 5-methylfurfural, 6-propyl-5,6-dihydropyran-2-one, acetic acid, amyl acetate, anethole, benzyl alcohol, beta-damascenone, damascenone, delta-decalactone, delta-octalactone, ethyl 2-methylbutyrate, ethyl 3-phenylpropionate, ethyl acetate, ethyl butanoate, ethyl isobutyrate, ethyl isovalerate, eugenol, furfuryl acetate, furfuryl propionate, geraniol, hexyl isobutyrate, isoamyl benzoate, isoamyl butyrate, isoamyl phenylacetate, isopropenyl pyrazine, linalool oxide, methional, methyl 2-thiofuroate, methyl butyrate, methyl p-anisate, methyl phenylacetate, ocimene, octanal, p-cresol, phenol, phenylacetic acid, prenyl benzoate, propanol, propenal, propyl 2-furoate, pyridine, syringol, tetrahydrofurfuryl phenylacetate, trans-2-nonenal, and tricyclodecenyl isobutyrate.

The one or more VOCs can include at least one compound selected from the group consisting of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether. The one or more VOCs can include at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, vanillyl ethyl ether, (E)-anethole, 2,3,5-trimethyl-6-ethylpyrazine, 2-ethyl-5-methylpyrazine, 2-ethyl-6-methylpyrazine, 2-ethylene-6-methylpyrazine, 3,4-hexanedione, 3,5-diethyl-2-methylpyrazine, 3-methyl-1,2-cyclopentanedione (cyclotene), 4-ethylguaiacol, 4-hydroxy-2,5-dimethy-3(2H)-furanone (furaneol), 4-methyl-5-thiazoleethanol, 4-methylguaiacol, 6-propyl-5,6-dihydropyran-2-one, acetic acid, anethole, beta-damascenone, ethyl butanoate, eugenol, methional, methyl 2-thiofuroate, methyl butyrate, ocimene, phenol, phenylacetic acid, propanol, propenal, and syringol. The one or more VOCs can include at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, and vanillyl ethyl ether.

The one or more VOCs can further include at least one compound selected from the group consisting of 1-octanol, 1-octen-3-ol, 1-octen-3-one, 2,3-diethyl-5-methylpyrazine, 2,3-dimethylpyrazine, 2,3,5-trimethylpyrazine, 2,5-dimethylpyrazine, 2,6-dimethylpyrazine, 2-acetyl-5-methylfuran, 2-ethyl-3-methylpyrazine, 2-ethylpyrazine, 2-heptanol, 2-heptanone, 2-isopropyl-3-methoxypyrazine, 2-methylbutyl isovalerate, 2-methylbutyraldehyde, 2-methylbutyric acid, 2-methylpyrazine, 2-nonanol, 2-nonanone, 2-pentyl furan, 2-undecanone, 3-hydroxy-2-methyl-4H-pyrone-4-one (maltol), 5-methyl-2-phenyl-2-hexenal, benzaldehyde, benzyl acetate, beta-ionone, butyl acetate, butyric acid, decanal, diethyl succinate, dimethyl trisulfide, ethyl benzoate, ethyl cinnamate, ethyl decanoate, ethyl heptanoate, ethyl hexanoate, ethyl lactate, ethyl laurate, ethyl octanoate, ethyl phenylacetate, furfural, gamma-nonalactone, gamma-valerolactone, geranyl acetate, guaiacol, hexanal, hexanoic acid, hexanol, hexyl acetate, isoamyl acetate, isoamyl alcohol, isoamyl isobutyrate, isobutyl acetate, isobutyraldehyde, isobutyric acid, isovaleraldehye, isovaleric acid, limonene, massoia lactone, methyl salicylate, myrcene, nonanal, phenethyl acetate, phenethyl alcohol, phenylacetaldehyde, tetramethylpyrazine, trans,trans-2,4-decadienal, valeraldehyde, and vanillin.

The one or more non-volatile compounds can include at least one compound selected from the group consisting of choline, pyridine, pyridoxine, 2(5H)-furanone, 2,3-dimethylpyrazine, caffeine, orientin, 4-hydroxybenzaldehyde, methyl 2-pyrrolyl ketone, 2,3,5-trimethylpyrazine, 2,3,5,6-tetramethylpyrazine, isoprenylpyrazine, 2-isopropyl-3-methoxypyrazine, piperine, 2-isobutyl-3-methoxypyrazine, catechin, adipic acid, methyl gallate, epicatechin, rutin, trans-ferulic acid, sinapinic acid, resveratrol, ellagic acid, propyl gallate, salicylic acid, quercetin, hesperetin, AMP, hydroxymethylfurfural, procyanidin B1, pantothenic acid, sotolon, caffeic acid, epicatechin gallate, vanillic acid, syringic acid, homofuraneol, vanillin, syringaldehyde, coumaric acid, acetovanillone, cinnamic acid, luteolin, polydatin, cytosine, CMP, adenine, cytidine, guanine, 4-guanidinobutyric acid, uracil, tyramine, tryptamine, maltol, maple furanone, acetanilide, sorbic acid, phenylalanine, leucine, glucosamine, methionine, GABA, tyrosine, lysine, histidine, glycine, serine, aspartic acid, isoleucine, tryptophan, valine, proline, carnitine, arginine, ornithine, B-alanine-2, threonine, glutamine, asparagine, cysteine, glutamic acid, betaine, pipecolinic acid, trans-4-hydroxyproline, citrulline, carnosine, homoserine, cystine, kynurenic acid, ribose, arabitol, fructose, rhamnose, mannitol, glucose, lactose, xylose, sorbitol, fucose, galactose, mannose, sucrose, myo-inositol, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, nicotinic acid, 8-hydroxyquinoline, quinoline, 5-methoxyresorcinol, chlorogenic acid, ethyl nicotinate, and eugenyl acetate. The one or more non-volatile compounds can include at least one compound selected from the group consisting of phenylalanine, leucine, glucosamine, methionine, tyrosine, lysine, histidine, glycine, serine, aspartic acid, isoleucine, tryptophan, valine, proline, carnitine, arginine, threonine, glutamine, asparagine, cysteine, glutamic acid, fructose, glucose, lactose, galactose, sucrose, xylose, lactic acid, citric acid, tartaric acid, nicotinic acid, pyridine, 2,3,5,6-tetramethylpyrazine, sotolon, vanillic acid, syringic acid, vanillin, syringaldehyde, cinnamic acid, maltol, and maple furanone.

The chocolate replica can contain, per kg, one or more of:
0.0001 µg to 10 mg propenal;
0.1 µg to 6 g acetic acid;
100 µg to 50 mg 4-methyl-5-thiazoleethanol;
0.00001 µg to 25 mg 4-methylguaiacol;
0.01 µg to 20 mg 3-methylbutyraldehyde;
100 µg to 170 mg (E)-anethole;
0.0001 µg to 150 mg anethole;
1 µg to 18 mg ocimene;
0.0001 µg to 5 mg furfuryl mercaptan;
0.001 µg to 15 mg 3,4-hexanedione;
0.0001 µg to 20 mg 3-methyl-1,2-cyclopentanedione;
0.001 µg to 8 mg 6-propyl-5,6-dihydropyran-2-one;
0.0001 µg to 9 mg 2-ethyl-3,5-dimethylpyrazine;
0.0001 µg to 9 mg 2-ethyl-3,6-dimethylpyrazine;
0.0001 µg to 9 mg 2-ethyl-5-methylpyrazine;
0.0001 µg to 7 mg 2-ethylene-6-methylpyrazine;
0.00001 µg to 12 mg 4,5-dimethyl-2-ethyl-3-thiazoline;
0.000001 µg to 10 mg beta-damascenone;
1 µg to 125 mg ethyl butanoate;
1 µg to 13 mg linalool oxide;
0.0001 µg to 8 mg phenol;
1 µg to 15 mg phenylacetic acid;
1 µg to 175 mg propanol;
1 µg to 510 mg vanillyl ethyl ether;
1 µg to 505 mg propionic acid;
0.0001 µg to 40 mg valeric acid;
0.01 µg to 10 mg 1-heptanol;
0.00001 µg to 30 mg 2-ethyl-1-hexanol;
0.001 µg to 8 mg 2-methyl-1-butanol;
0.001 µg to 18 mg 2-octanol;
0.00001 µg to 5 mg 2-pentanol;
0.00001 µg to 30 mg 4-ethylguaiacol;
1 µg to 180 mg benzyl alcohol;

100 µg to 100 mg eugenol;
1 µg to 30 mg geraniol;
0.001 µg to 10 mg p-cresol;
0.001 µg to 5 mg 2-isopropyl-5-methyl-2-hexenal;
1 µg to 50 mg 2-methylbutyraldehyde;
0.001 µg to 15 mg 2-phenyl-2-butenal;
0.001 µg to 8 mg 2-phenylpropionaldehyde;
0.01 µg to 20 mg 4-methyl-2-phenyl-2-pentenal;
1 µg to 10 mg octanal;
1 µg to 3 mg trans-2-nonenal;
0.00001 µg to 550 mg vanillin propylene glycol acetal;
100 µg to 180 mg amyl acetate;
1 µg to 35 mg ethyl 2-methylbutyrate;
1 µg to 10 mg ethyl 3-phenylpropionate;
1 µg to 5050 mg ethyl acetate;
1 µg to 20 mg ethyl isobutyrate;
1 µg to 32 mg ethyl isovalerate;
1 µg to 60 mg furfuryl acetate;
0.001 µg to 4 mg furfuryl propionate;
1 µg to 32 mg hexyl isobutyrate;
1 µg to 15 mg isoamyl benzoate;
1 µg to 70 mg isoamyl butyrate;
1 µg to 22 mg isoamyl phenylacetate;
0.01 µg to 5 mg methyl 2-thiofuroate;
100 µg to 40 mg methyl butyrate;
1 µg to 12 mg methyl p-anisate;
1 µg to 53 mg methyl phenylacetate;
1 µg to 32 mg prenyl benzoate;
1 µg to 3 mg propyl 2-furoate;
1 µg to 110 mg tetrahydrofurfuryl phenylacetate;
100 µg to 500 mg tricyclodecenyl isobutyrate;
0.0001 µg to 30 mg 2-methyl furan;
100 µg to 8 mg 5-methylfurfural;
0.001 µg to 100 mg 4-hydroxy-2,5-dimethy-3(2H)-furanone;
0.00001 µg to 45 mg 2,3-butanedione;
100 µg to 14 mg 2,3-pentanedione;
0.01 µg to 20 mg 2-octanone;
0.0001 µg to 20 mg 3-octanone;
0.001 µg to 12 mg 4'-methylacetophenone;
0.01 µg to 25 mg 5-methyl-2-hepten-4-one;
0.01 µg to 55 mg acetoin;
100 µg to 14 mg coffee furanone;
0.000001 µg to 10 mg damascenone;
1 µg to 30 mg delta-decalactone;
1 µg to 25 mg delta-octalactone;
0.00001 µg to 8 mg syringol;
0.0001 µg to 10 mg 2,3,5-trimethyl-6-ethylpyrazine;
0.00001 µg to 10 mg 2,3-diethylpyrazine;
0.00001 µg to 5 mg 2-ethoxy-3-methyl pyrazine;
0.0001 µg to 9 mg 2-ethyl-6-methylpyrazine;
0.001 µg to 5 mg 2-isobutyl-3-methoxypyrazine;
0.001 µg to 15 mg 2-methoxypyrazine;
0.001 µg to 4 mg 3,5-diethyl-2-methylpyrazine;
1 µg to 12 mg isopropenyl pyrazine;
0.01 µg to 10 pyrazine;
0.00001 µg to 6 mg 2-acetylpyridine;
0.01 µg to 5 mg pyridine;
1 µg to 3 mg indole;
0.0001 µg to 8 mg methional; and
0.0001 µg to 10 mg 2,4,5-trimethylthiazole.

The chocolate replica can further include a plant-based solid substrate. The plant-based solid substrate can have been derived from a food stream waste product.

In another aspect, this document features a chocolate replica that contains one or more volatile organic compounds (VOCs); and one or more non-volatile compounds; wherein: a) the one or more VOCs include at least one VOC that is not present in a corresponding reference chocolate, b) the one or more VOCs do not include at least one VOC that is present in a corresponding reference chocolate, c) the one or more VOCs are present in the chocolate replica in a total amount of at least 100 mg/L, d) the one or more non-volatile compounds include at least one non-volatile compound that is not present in a corresponding reference chocolate, or e) the one or more non-volatile compounds do not include at least one non-volatile compound that is present in a corresponding reference chocolate.

In some cases, the one or more VOCs include at least one VOC that is not present in a corresponding reference chocolate. In some cases, the one or more VOCs do not include at least one VOC that is present in a corresponding reference chocolate.

The one or more VOCs can be present in the chocolate replica in a total amount of at least 100 mg/L, at least 200 mg/L, at least 300 mg/L, at least 400 mg/L, at least 500 mg/L, at least 600 mg/L, at least 700 mg/L, or at least 800 mg/L.

In some cases, the one or more non-volatile compounds can include at least one non-volatile compound that is not present in a corresponding reference chocolate. In some cases, the one or more non-volatile compounds do not include at least one non-volatile compound that is present in a corresponding reference chocolate.

In some cases, the one or more VOCs do not include at least one compound selected from the group consisting of isobutyraldehyde, valeraldehyde, 2,3-pentadione, myrcene, isoamyl alcohol, coffee furanone, 5-methyl-2-hepten-4-one, 2,6-dimethylpyrazine, hexanol, 2,3,5-trimethylpyrazine, 4,5-dimethyl-2-ethyl-3-thiazoline, 2-ethyl-1-hexanol, 2-isobutyl-3-methoxypyrazine, furfuryl propionate, phenylacetaldehyde, benzyl acetate, trans,tran-2,4-decadienal, benzyl alcohol, 4-methyl-2-phenyl-2-pentenal, isoamyl phenylacetate, dibutyl maleate, vanillyl ethyl ether, 2-methyl furan, 2,3-butanedione, ethyl isovalerate, amyl acetate, ethyl hexanoate, isoamyl butyrate, 3-mercapto-2-butanone, 2-ethylpyrazine, hexyl isobutyrate, 2-ethyl-3-methylpyrazine, 1-octen-3-ol, 2,3-diethyl-5-methylpyrazine, furfuryl acetate, 2-acetylpyridine, acetophenone, geranyl acetate, phenethyl acetate, ethyl laurate, maltol, gamma-nonalactone, ethyl cinnamate, tetrahydrofurfuryl phenylacetate, ethyl acetate, isobutyl acetate, butyl acetate, pyridine, 2-pentylfuran, isoamyl isobutyrate, 2-methylbutyl isovalerate, ethyl lactate, 2-isopropyl-5-methyl-2-hexenal, nonanal, ethyl octanoate, isopropenyl pyrazine, trans-2-nonenal, 2-undecanone, ethyl decanoate, methyl phenylacetate, damascenone, ethyl 3-phenylpropionate, tricyclodecenyl isobutyrate, prenyl benzoate, gamma-decalactone, vanillin, 2-methylbutyraldehyde, 1-propanol, hexanal, 2-heptanone, amyl alcohol, hexyl acetate, 1-octen-3-one, ethyl heptanoate, 2,4,5-trimethylthiazole, 2-ethoxy-3-methyl pyrazine, 1-heptanol, decanal, linalool, gamma-valerolactone, ethyl benzoate, 4'-methylacetophenone, geraniol, phenethyl alcohol, methyl 2-pyrrolyl ketone, p-cresol, delta-decalactone, vanillin propylene glycol acetal, isovaleraldehyde, ethyl butyrate, 2-pentanol, limonene, 3-octanone, 2-octanone, 2-heptanol, 2,3-dimethylpyrazine, dimethyl trisulfide, 2-octanol, linalool oxide, 2,3-diethylpyrazine, 2-nonanol, 1-octanol, 2-acetyl-5-methylfuran, diethyl succinate, methyl salicylate, methyl 2-thiofuroate, 2-phenyl-2-butenal, isoamyl benzoate, 5-methyl-2-phenyl-2-hexenal, massoia lactone, ethyl isobutyrate, ethyl 2-methylbutyrate, isoamyl acetate, 2-methyl-1-butanol, 2-methylpyrazine, octanal, 2,5-dimethylpyrazine, 2-methoxypyrazine, 2-nonanone, 2-isopropyl-3-methoxypyrazine, furfural, benzaldehyde, 5-methylfurfural, 2-phenylpropionaldehyde, propyl-2-furoate, ethyl phenylacetate, geranyl acetone, guaiacol, beta-ionone, delta-octalactone, 2,6-dimethoxyphenol, methyl p-anisate, propionic acid, isobutyric acid, butyric acid, 2-methylbutyric acid, isovaleric acid, valeric acid, hexanoic acid, and 3-phenylpropionic acid. In some cases, the one or more VOCs do not include at least one compound selected from the group consisting of 2,3-pentadione, coffee furanone, 2,6-dimethylpyrazine, benzyl acetate, 2-ethylpyrazine, 2-ethyl-3-methylpyrazine, acetophenone, hexanal, 1-octen-3-one, 1-heptanol, decanal, gamma-valerolactone, limonene, 2,3-dimethylpyrazine, dimethyl trisulfide, 2,3-diethylpyrazine, 1-octanol, diethyl succinate, octanal, furfural, isobutyric acid, 2-methylbutyric acid, isovaleric acid, and valeric acid. In some cases, the one or more VOCs do not include at least one compound selected from the group consisting of 2,5-dimethylpyrazine, isobutyraldehyde, 2-isopropyl-3-methoxypyrazine, 2,3-diethyl-5-methylpyrazine, 2,4,5-trimethylthiazole, 2-methoxypyrazine, guaiacol, furfural, ethyl benzoate, massoia lactone, gamma-nonalactone, delta-octalactone, delta-decalactone, gamma decalactone, 2-nonanone, phenethyl acetate, 2-pentylfuran, 1-octen-3-ol, phenylacetaldehyde, isoamyl phenylacetate, 2-phenylpropionaldehyde, tetrahydrofurfuryl phenylacetate, octanal, ethyl cinnamate, 2-heptanol, 1-octen-3-one, trans-2-nonenal, 2-isobutyl-3-methoxypyrazine (IBMP), ethyl decanoate, methyl salicylate, dimethyl trisulfide, methyl 2-thiofuroate, hexanoic acid, trans,trans-2,4-decadienal, and hexanal. In some cases, the one or more VOCs do not include 1-methyl-1,2,3,6-tetrahydropyridine.

In some cases, the one or more VOCs can include at least one compound selected from the group consisting of gamma-decalactone, methyl 2-pyrrolyl ketone, 2,6-dimethoxyphenol, and 3-phenylpropionic acid. In some cases, the one or more VOCs can include at least one compound selected from the group consisting of cinnamic acid, 2-methoxy-4-vinylphenol, 2,3-hexanedione, acetoin acetate, 1-decanol, vanillin erythro and threo-butan-2,3-diol, furaneol, ethyl maltol, acetoin, propanoic acid, methyl butyrate, methyl 2-methylbutyrate, 4-ethylguaiacol, 2-methoxy-4-methylphenol, alpha ionone, rum ether, 3-carene, B-caryophyllene, 3-(Z)-hexenol, butyl butyrate, 3-mercapto hexanol, hexyl alcohol (hexanol), methyl benzoate, ethyl-2-methylbutyrate, and carvacrol.

The 2,3-diethyl-5-methylpyrazine can be present in an amount of less than about 0.23 mg/L. The 2-ethylpyrazine is present in an amount of less than about 0.49 mg/L. The 2-isopropyl-3-methoxypyrazine is present in an amount of less than about 0.02 mg/L. The 2-methoxy-4-vinylphenol is present in an amount of at least 0.05 mg/L. The 2-methylpyrazine is present in an amount of at least 2.1 mg/L. The 5-methylfurfural is present in an amount of less than about 0.6 mg/L. The amyl alcohol is present in an amount of at least 2.5 mg/L. The butyric acid is present in an amount of less than about 2.0 mg/L. The difurfuryl ether can be present in an amount of less than about 0.027 mg/L. The dimethyl trisulfide can be present in an amount of less than about 0.0007 mg/L. The furfural can be present in an amount of less than about 2.5 mg/L. The guaiacol can be present in an amount of less than about 0.63 mg/L. The isobutyraldehyde can be present in an amount of at least 34 mg/L. The can isovaleraldehyde can be present in an amount of at least 41 mg/L. The pyrrole can be present in an amount of less than about 0.005 mg/L. The 2,5-dimethylphenol can be present in an amount of at least about 0.004 mg/L. The 2-acetyl-5-methylfuran can be present in an amount of at least about 0.5 mg/L. The 2-methoxy-4-methylphenol can be present in an amount of at least about 0.00012 mg/L. The chocolate furanone can be present in an amount of at least about 50 mg/L. The diethyl succinate can be present in an amount of at least about 0.0004 mg/L. The ethyl 2-methylbutyrate can be present in an amount of at least about 0.002 mg/L. The ethyl decanoate can be present in an amount of less than 3.0 mg/L. The ethyl laurate can be present in an amount of at least about 1.29 mg/L. The gamma-nonalactone can be present in an amount of less than 0.63 mg/L. The isovaleric acid can be present in an amount of at least 0.7 mg/L. The syringol can be present in an amount of less than 0.1 mg/L. The valeraldehyde can be present in an amount of at least about 0.6 mg/L.

In any of the above embodiments, the VOCs can include one or more of: an acid, an alcohol, an aldehyde, an amine, a benzene, an ester, a furan, a ketone, a lactone, a phenol, a pyrazine, a pyridine, a pyrrole, a sugar or sugar alcohol, a sulfur compound, a terpene, or a thiophene. In some cases, the VOCs can include one or more of: an acid, an alcohol, an aldehyde, an ester, a furan, a ketone, a lactone, a phenol, a pyrazine, a pyridine, a pyrrole, a sugar or sugar alcohol, a sulfur compound, or a terpene. In some cases, the VOCs can include one or more of: an acid, an alcohol, an aldehyde, an ester, a furan, a ketone, a lactone, a phenol, a pyrazine, a pyrrole, a sugar or sugar alcohol, or a sulfur compound.

The VOCs can include one or more acids. The one or more acids can include at least one acid selected from the group consisting of isovaleric acid, cinnamic acid, 2-methylbutyric acid, butyric acid, propanoic acid, 3-phenylpropionic acid, phenylacetic acid, isobutyric acid, hexanoic acid, propionic acid, valeric acid, and 3-phenylpropionic acid. In some cases, the one or more acids include at least one acid selected from the group consisting of isovaleric acid, cinnamic acid, 2-methylbutyric acid, butyric acid, propanoic acid, 3-phenylpropionic acid, isobutyric acid, hexanoic acid, propionic acid, valeric acid, and 3-phenylpropionic acid. In some cases, the one or more acids can include at least one acid selected from the group consisting of isovaleric acid, cinnamic acid, 2-methylbutyric acid, butyric acid, propanoic acid, 3-phenylpropionic acid, isobutyric acid, and hexanoic acid.

The VOCs can include one or more alcohols. The one or more alcohols can include at least one alcohol selected from the group consisting of amyl alcohol, 2-methoxy-4-vinylphenol, furaneol, guaiacol, 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 1-octen-3-ol, 2,3-butanediol, hexyl alcohol (hexanol), 1-octanol, 2-heptanol, isoamyl alcohol, 2-nonanol, 1-heptanol, para cresol, 1-decanol, 4-carvomenthenol, carvacrol, eugenol, isoeugenol, phenyl propyl alcohol, hexanol, 2-ethyl-1-hexanol, benzyl alcohol, 1-propanol, geraniol, phenethyl alcohol, p-cresol, 2-pentanol, 2-octanol, 2-methyl-1-butanol, and 2,6-dimethoxyphenol. In some cases, the one or more alcohols can include at least one alcohol selected from the group consisting of isoamyl alcohol, hexanol, 2-ethyl-1-hexanol, benzyl alcohol, 1-octen-3-ol, 1-propanol, amyl alcohol, 1-heptanol, geraniol, phenethyl alcohol, p-cresol, 2-pentanol, 2-heptanol, 2-octanol, 2-nonanol, 1-octanol, 2-methyl-1-butanol, guaiacol, 2,6-dimethoxyphenol, 2-methoxy-4-vinylphenol, furaneol, 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 2,3-butanediol, hexyl alcohol (hexanol), para cresol, 1-decanol, 4-carvomenthenol, carvacrol, eugenol, isoeugenol, and phenyl propyl alcohol. In some cases, the one or more alcohols can include at least one alcohol selected from the group consisting of amyl alcohol, 2-methoxy-4-vinylphenol, furaneol, phenyl methanol (benzyl alcohol), 3-(Z)-hexenol, 3-mercapto hexanol, hexyl alcohol (hexanol), 1-octanol, isoamyl alcohol, 2-nonanol, 1-heptanol, para cresol, 1-decanol, and carvacrol.

The VOCs can include one or more aldehydes. The one or more aldehydes can include at least one aldehyde selected from the group consisting of vanillin, isovaleraldehyde, cocoa hexenal, valeraldehyde, vanillin erythro and threo-butan-2,3-diol acetal, benzaldehyde, isobutyraldehyde, furfural, isodihydrolavandulal, decanal, phenylacetaldehyde, 2-phenylpropionaldehyde, acetaldehyde, octanal, nonanal, 2-methylbutyraldehyde, 2-phenyl-2-butenal, trans-2-nonenal, trans,trans-2,4-decadienal, hexanal, 2-methoxycinnamaldehyde, cuminaldehyde, 2-(E)-hexenal, trans,tran-2,4-decadienal, 4-methyl-2-phenyl-2-pentenal, 2-isopropyl-5-methyl-2-hexenal, vanillin propylene glycol acetal, 5-methyl-2-phenyl-2-hexenal, and 5-methylfurfural. In some cases, the one or more aldehydes can include at least one aldehyde selected from the group consisting of vanillin, isobutyraldehyde, valeraldehyde, phenylacetaldehyde, trans,tran-2,4-decadienal, 4-methyl-2-phenyl-2-pentenal, 2-isopropyl-5-methyl-2-hexenal, nonanal, trans-2-nonenal, 2-methylbutyraldehyde, hexanal, decanal, vanillin propylene glycol acetal, isovaleraldehyde, 2-phenyl-2-butenal, 5-methyl-2-phenyl-2-hexenal, octanal, furfural, benzaldehyde, 5-methylfurfural, 2-phenylpropionaldehyde, cocoa hexenal, vanillin erythro and threo-butan-2,3-diol acetal, isodihydrolavandulal, trans,trans-2,4-decadienal, 2-methoxycinnamaldehyde, cuminaldehyde, and 2-(E)-hexenal. In some cases, the one or more aldehydes can include at least one aldehyde selected from the group consisting of vanillin, isobutyraldehyde, isovaleraldehyde, p-anisaldehyde, and valeraldehyde.

The VOCs can include one or more amines. In some cases, the one or more amines can include at least one amine selected from the group consisting of 2-amino-1-naphthalenol, 2-methoxy-benzenamine, 5-amino-1-naphthol, N,N-dimethyl-ethanamine, and N,N-dimethyl-methylamine.

The VOCs can include one or more benzenes. The one or more benzenes can include at least one benzene selected from the group consisting of styrene and toluene.

The VOCs can include one or more esters. The one or more esters can include at least one ester selected from the group consisting of ethyl laurate, diethyl succinate, ethyl butyrate, ethyl 2-methylbutyrate, methyl anthranilate, methyl butyrate, 2-methylbutyl isovalerate, ethyl hexanoate, methyl 2-methylbutyrate, ethyl isobutyrate, ethyl benzoate, hexyl acetate, Ethyl phenylacetate, geranyl acetate, methyl para-anisate, ethyl lactate, isoamyl isobutyrate, ethyl heptanoate, butyl butyrate, isoamyl acetate, phenethyl acetate, ethyl octanoate, isoamyl phenylacetate, tetrahydrofurfuryl phenylacetate, neryl acetate, ethyl cinnamate, isobutyl acetate, benzyl acetate, butyl acetate, furfuryl acetate, hexyl isobutyrate, methyl benzoate, ethyl 3-hydroxybutanoate, ethyl decanoate, methyl decanoate, ethyl-2-methylbutyrate, methyl salicylate, methyl 2-thiofuroate, cinnamyl acetate, furfuryl propionate, dibutyl maleate, ethyl isovalerate, amyl acetate, isoamyl butyrate, ethyl acetate, methyl phenylacetate, ethyl 3-phenylpropionate, tricyclodecenyl isobutyrate, prenyl benzoate, isoamyl benzoate, propyl-2-furoate, and methyl p-anisate. In some cases, the one or more esters can include at least one ester selected from the group consisting of ethyl laurate, diethyl succinate, ethyl butyrate, ethyl 2-methylbutyrate, methyl butyrate, 2-methylbutyl isovalerate, ethyl hexanoate, methyl 2-methylbutyrate, ethyl isobu-tyrate, hexyl acetate, ethyl phenylacetate, geranyl acetate, methyl para-anisate, ethyl lactate, isoamyl isobutyrate, ethyl heptanoate, butyl butyrate, isoamyl acetate, isobutyl acetate, benzyl acetate, butyl acetate, furfuryl acetate, hexyl isobutyrate, methyl benzoate, ethyl 3-hydroxybutanoate, ethyl-2-methylbutyrate, furfuryl propionate, isoamyl phenylacetate, dibutyl maleate, ethyl isovalerate, amyl acetate, isoamyl butyrate, phenethyl acetate, ethyl cinnamate, tetrahydrofurfuryl phenylacetate, ethyl acetate, ethyl octanoate, ethyl decanoate, methyl phenylacetate, ethyl 3-phenylpropionate, tricyclodecenyl isobutyrate, prenyl benzoate, ethyl benzoate, methyl salicylate, methyl 2-thiofuroate, isoamyl benzoate, propyl-2-furoate, and methyl p-anisate. In some cases, the one or more esters can include at least one ester selected from the group consisting of ethyl laurate, diethyl succinate, ethyl butyrate, ethyl 2-methylbutyrate, methyl butyrate, 2-methylbutyl isovalerate, ethyl hexanoate, methyl 2-methylbutyrate, ethyl isobutyrate, hexyl acetate, ethyl phenylacetate, geranyl acetate, methyl para-anisate, ethyl lactate, isoamyl isobutyrate, ethyl heptanoate, butyl butyrate, isoamyl acetate, isobutyl acetate, benzyl acetate, butyl acetate, furfuryl acetate, hexyl isobutyrate, methyl benzoate, ethyl 3-hydroxybutanoate, and ethyl-2-methylbutyrate. In some cases, the chocolate replica can include at least about 0.01 mg/L of esters.

The VOCs can include one or more furans. The one or more furans can include at least one furan selected from the group consisting of 1-(2-furanyl)-ethanone, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-acetyl-5-methylfuran, 2-ethylfuran, 2-furfuryl acetate, 2-methyl-furan, 2-pentyl-furan, 2-vinylfuran, 3-furanmethanol, 3-methyl-furan, 5-methylfurfural, difurfuryl ether, furan, furaneol, furfural, furfuryl alcohol, and furfuryl propionate. The one or more furans can include at least one furan selected from the group consisting of 2-acetyl-5-methylfuran, 2-ethylfuran, 2-furfuryl acetate, 2-pentylfuran, 5-methylfurfural, difurfuryl ether, furaneol, furfural, furfuryl alcohol, and furfuryl propionate. The one or more furans can include at least one furan selected from the group consisting of 2-methyl furan, 2-pentylfuran, 2-acetyl-5-methylfuran, 5-methylfurfural, difurfuryl ether, furaneol, furfural, and furfuryl alcohol.

The VOCs can include one or more ketones. The one or more ketones can include at least one ketone selected from the group consisting of 2,3-pentadione, coffee furanone, 5-methyl-2-hepten-4-one, 2,3-butanedione, 3-mercapto-2-butanone, acetophenone, maltol, gamma-nonalactone, 2-undecanone, damascenone, gamma-decalactone, 2-heptanone, 1-octen-3-one, gamma-valerolactone, 4'-methylacetophenone, methyl 2-pyrrolyl ketone, delta-decalactone, 3-octanone, 2-octanone, massoia lactone, 2-nonanone, geranyl acetone, beta-ionone, delta-octalactone, 2,3-hexanedione, acetoin acetate, ethyl maltol, acetoin, filbert heptenone, alpha ionone, and gamma decalactone. The one or more ketones can include at least one ketone selected from the group consisting of beta-ionone, maltol, 2,3-pentadione, coffee furanone, 2,3-hexanedione, acetoin acetate, ethyl maltol, acetoin, alpha ionone, 2-heptanone, damascenone, 2-undecanone, Acetophenone, gamma-valerolactone, 5-methyl-2-hepten-4-one, 2,3-butanedione, 3-mercapto-2-butanone, gamma-nonalactone, gamma-decalactone, 1-octen-3-one, 4'-methylacetophenone, methyl 2-pyrrolyl ketone, delta-decalactone, 3-octanone, 2-octanone, massoia lactone, 2-nonanone, geranyl acetone, and delta-octalactone. The one or more ketones can include at least one ketone selected from the group consisting of beta-ionone, maltol, 2,3-pentadione, coffee furanone, 2,3-hexanedione, acetoin acetate, ethyl maltol, acetoin, alpha ionone, 2-heptanone, damascenone, 2-undecanone, acetophenone, and gamma-valerolactone. In some cases, the chocolate replica can include at least 0.03 mg/L of ketones.

The VOCs can include one or more lactones. The one or more lactones can include at least one lactone selected from the group consisting of 4,5-dimethyl-3-hydroxy-2,5-di-hydro-furan-2-one, gamma decalactone, massoia lactone, and sotolone. In some cases, the one or more lactones can include at least one lactone selected from the group consisting of gamma decalactone, massoia lactone, and sotolone.

The VOCs can include one or more phenols. The one or more phenols can include at least one phenol selected from the group consisting of 1-(2-hydroxy-5-methylphenyl)-ethanone, 2,5-dimethylphenol, 2-methoxy-4-methylphenol, 2-methoxy-4-vinylphenol, 2-methoxy-phenol, 2-methyl-phenol, 4-ethyl guaiacol, 4-ethyl phenol, 4-ethyl-2-methoxy-phenol, 4-ethylguaiacol, 4-vinylphenol, eugenol, guaiacol, isoeugenol, p-cresol, phenol, syringol, syringol (2,6-dimethoxyphenol), vanillin erythro and/or threo-butan-2,3-diol acetal, and vanillyl ethyl ether. In some cases, the one or more phenols can include at least one phenol selected from the group consisting of 2,5-dimethylphenol, 2-methoxy-4-methylphenol, 2-methoxy-4-vinylphenol, 4-ethyl guaiacol, 4-ethyl phenol, 4-ethylguaiacol, 4-vinylphenol, eugenol, guaiacol, isoeugenol, p-cresol, syringol, vanillin erythro and/or threo-butan-2,3-diol acetal, and vanillyl ethyl ether. In some cases, the one or more phenols can include at least one phenol selected from the group consisting of 2,5-dimethylphenol, 2-methoxy-4-methylphenol, 2-methoxy-4-vinylphenol, 4-ethylguaiacol, eugenol, guaiacol, isoeugenol, syringol, vanillin erythro and/or threo-butan-2,3-diol acetal, and vanillyl ethyl ether. In some cases, the chocolate replica can include at least 4.6 mg/L of phenols.

The VOCs can include one or more pyrazines. The one or more pyrazines can include at least one pyrazine selected from the group consisting of 2-(n-propyl)-pyrazine, 2,3-diethyl-5-methylpyrazine, 2,3-diethylpyrazine, 2,5-dimethylpyrazine, 2,5-dimethylpyrazine, 2,6-diethyl-pyrazine, 2,6-dimethylpyrazine, 2,6-dimethylpyrazine, 2-ethoxy-3-methylpyrazine, 2-ethyl-3-methylpyrazine, 2-ethyl-6-methylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, 3,5-diethyl-2-methylpyrazine, 3-ethyl-2,5-dimethylpyrazine, ethyl-pyrazine, isopropenyl pyrazine, methylpyrazine, and pyrazine. The one or more pyrazines can include at least one pyrazine selected from the group consisting of 2,6-dimethylpyrazine, isopropenyl pyrazine, 2,3,5-trimethylpyrazine, 2,3-dimethylpyrazine, 2-Ethyl-3-methylpyrazine, 2-methylpyrazine, 2-ethylpyrazine, 2-isobutyl-3-methoxypyrazine, 2,3-diethyl-5-methylpyrazine, 2-ethoxy-3-methyl pyrazine, 2,3-dimethylpyrazine, 2,3-diethylpyrazine, 2-methylpyrazine, 2,5-dimethylpyrazine, 2-methoxypyrazine, and 2-isopropyl-3-methoxypyrazine. The one or more pyrazines can include at least one pyrazine selected from the group consisting of 2,6-dimethylpyrazine, isopropenyl pyrazine, 2,3,5-trimethylpyrazine, 2,3-dimethylpyrazine, 2-Ethyl-3-methylpyrazine, 2-methylpyrazine, and 2-ethylpyrazine.

The VOCs can include one or more pyridines. The one or more pyridines can include at least one pyridine selected from the group consisting of 1-methyl-1,2,3,6-tetrahydro-pyridine, 1-methyl-piperidine, 2-acetylpyridine, 2-methyl-pyridine, 3-ethylpyridine, 3-ethyl-pyridine, 3-methyl-pyridine, 3-propyl-pyridine, 3-pyridinol, and methyl nicotinate. The one or more pyridines can include at least one pyridine selected from the group consisting of 2-acetylpyridine, 3-ethylpyridine, and methyl nicotinate.

The VOCs can include one or more pyrroles. The one or more pyrroles can include at least one pyrrole selected from the group consisting of 1-(1H-pyrrol-2-yl)-ethanone, 1-(2-furanylmethyl)-1H-pyrrole, 1-ethyl-1H-pyrrole, 1-methyl-1H-pyrrole, 1-methyl-1H-pyrrole-2-carboxaldehyde, 2-acetyl-1-methylpyrrole, 2-acetylpyrrole, indole, and pyrrole. In some cases, the one or more pyrroles can include at least one pyrrole selected from the group consisting of 2-acetyl-1-methylpyrrole, 2-acetylpyrrole, and pyrrole. In some cases, the one or more pyrroles can include pyrrole.

The VOCs can include one or more sugars or sugar alcohols. The one or more sugars or sugar alcohols can include at least one sugars or sugar alcohol selected from the group consisting of ethyl maltol and maltol.

The VOCs can include one or more sulfur compounds. The one or more sulfur compounds can include at least one sulfur compound selected from the group consisting of diethyl disulfide, dimethyl disulfide, dimethyl sulfide, dimethyl sulfoxide, dimethyl trisulfide, methanethiol, and methional. In some cases, the one or more sulfur compounds can include at least one sulfur compound selected from the group consisting of diethyl disulfide, dimethyl sulfide, dimethyl sulfoxide, dimethyl trisulfide, methanethiol, and methional. In some cases, the one or more sulfur compounds can include at least one sulfur compound selected from the group consisting of dimethyl trisulfide and methanethiol.

The VOCs can include one or more terpenes. The one or more terpenes can include at least one terpene selected from the group consisting of 3-carene, 2,4,5-trimethylthiazole, limonene, linalool, myrcene, and b-caryophyllene. In some cases, the one or more terpenes can include at least one terpene selected from the group consisting of 3-carene, limonene, linalool, myrcene, and b-caryophyllene.

The VOCs can include one or more thiophenes. In some cases, the VOCs does not include thiophene.

The VOCs can include 2,7-dimethyl-oxepine.

The VOCs can include at least 20 compounds selected from the group consisting of isovaleric acid, cinnamic acid, 2-methylbutyric acid, butyric acid, propanoic acid, phenylacetic acid, 3-phenylpropionic acid, isobutyric acid, hexanoic acid, amyl alcohol, 2-methoxy-4-vinylphenol, furaneol, guaiacol, 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 1-octen-3-ol, 2,3-butanediol, hexyl alcohol (hexanol), 1-octanol, 2-heptanol, isoamyl alcohol, 2-nonanol, 1-heptanol, para cresol, 1-decanol, 4-carvomenthenol, carvacrol, eugenol, isoeugenol, phenyl propyl alcohol, isovaleraldehyde, cocoa hexenal, valeraldehyde, vanillin erythro and threo-butan-2,3-diol acetal, benzaldehyde, isobutyraldehyde, furfural, isodihydrolavandulal, decanal, phenylacetaldehyde, 2-phenylpropionaldehyde, acetaldehyde, octanal, nonanal, 2-methylbutyraldehyde, 2-phenyl-2-butenal, trans-2-nonenal, trans,trans-2,4-decadienal, hexanal, 2-methoxycinnamaldehyde, cuminaldehyde, 2-(E)-hexenal, ethyl laurate, diethyl succinate, ethyl butyrate, ethyl 2-methylbutyrate, methyl anthranilate, methyl butyrate, 2-methylbutyl isovalerate, ethyl hexanoate, methyl 2-methylbutyrate, ethyl isobutyrate, ethyl benzoate, hexyl acetate, ethyl phenylacetate, geranyl acetate, methyl para-anisate, ethyl lactate, isoamyl isobutyrate, ethyl heptanoate, butyl butyrate, isoamyl acetate, Phenethyl Acetate, ethyl octanoate, isoamyl phenylacetate, tetrahydrofurfuryl phenylacetate, neryl acetate, ethyl cinnamate, isobutyl acetate, benzyl acetate, butyl acetate, furfuryl acetate, hexyl isobutyrate, methyl benzoate, ethyl 3-hydroxybutanoate, ethyl decanoate, methyl decanoate, ethyl-2-methylbutyrate, methyl salicylate, methyl 2-thiofuroate, cinnamyl acetate, beta-ionone, maltol, 2,3-pentadione, coffee furanone, 2,3-hexanedione, acetoin acetate, ethyl maltol, acetoin, filbert heptenone, alpha ionone, 2-heptanone, damascenone, 2-undecanone, massoia lactone, gamma-nonalactone, delta-octalactone, delta-decalactone, gamma decalactone, 2-nonanone, acetophenone, gamma-valerolactone, 1-octen-3-one, methyl 2-pyrrolyl ketone, 3-mercapto-2-butanone, vanillin, vanillyl ethyl ether, rum ether, 2-pentylfuran, 2-methyl furan, nerol oxide, dimethyl trisulfide, methyl mercapten, 2,6-dimethylpyrazine, isopropenyl pyrazine, 2,3,5-trimethylpyrazine, 2,3-dimethylpyrazine, 2-ethyl-3-methylpyrazine, 2-methylpyrazine, 2-ethylpyrazine, 2,5-dimethylpyrazine, 2-isopropyl-3-methoxypyrazine, 2-ethyl-3(5 or 6)-dimethylpyrazine, 2,3-diethyl-5-methylpyrazine, 2-methoxypyrazine, 2-ethyl-6-methylpyrazine, 2,3,5,6-tetramethylpyrazine, 2-isobutyl-3-methoxypyrazine (IBMP), 2,4,5-trimethylthiazole, 3-carene, B-caryophyllene, (R)-(+)-limonene, linalool, myrcene, 5-methyl-2-hepten-4-one, hexanol, 4,5-dimethyl-2-ethyl-3-thiazoline, 2-ethyl-1-hexanol, 2-isobutyl-3-methoxypyrazine, furfuryl propionate, trans,tran-2,4-decadienal, benzyl alcohol, 4-methyl-2-phenyl-2-pentenal, dibutyl maleate, 2,3-butanedione, ethyl isovalerate, amyl acetate, isoamyl butyrate, 2-acetylpyridine, ethyl acetate, pyridine, 2-isopropyl-5-methyl-2-hexenal, methyl phenylacetate, ethyl 3-phenylpropionate, tricyclodecenyl isobutyrate, prenyl benzoate, gamma-decalactone, 1-propanol, 2-ethoxy-3-methyl pyrazine, 4'-methylacetophenone, geraniol, phenethyl alcohol, p-cresol, vanillin propylene glycol acetal, 2-pentanol, limonene, 3-octanone, 2-octanone, 2,3-dimethylpyrazine, 2-octanol, linalool oxide, 2,3-diethylpyrazine, 2-acetyl-5-methylfuran, isoamyl benzoate, 5-methyl-2-phenyl-2-hexenal, 2-methyl-1-butanol, 2-methylpyrazine, 5-methylfurfural, propyl-2-furoate, geranyl acetate, 2,6-dimethoxyphenol, methyl p-anisate, propionic acid, valeric acid, and 3-phenylpropionic acid.

The VOCs can include at least 30 compounds selected from the group consisting of isovaleric acid, cinnamic acid, 2-methylbutyric acid, butyric acid, propanoic acid, phenylacetic acid, 3-phenylpropionic acid, isobutyric acid, hexanoic acid, amyl alcohol, 2-methoxy-4-vinylphenol, furaneol, guaiacol, 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 1-octen-3-ol, 2,3-butanediol, hexyl alcohol (hexanol), 1-octanol, 2-heptanol, isoamyl alcohol, 2-nonanol, 1-heptanol, para cresol, 1-decanol, 4-carvomenthenol, carvacrol, eugenol, isoeugenol, phenyl propyl alcohol, isovaleraldehyde, cocoa hexenal, valeraldehyde, vanillin erythro and threo-butan-2,3-diol acetal, benzaldehyde, isobutyraldehyde, furfural, isodihydrolavandulal, decanal, phenylacetaldehyde, 2-phenylpropionaldehyde, acetaldehyde, octanal, nonanal, 2-methylbutyraldehyde, 2-phenyl-2-butenal, trans-2-nonenal, trans,trans-2,4-decadienal, hexanal, 2-methoxycinnamaldehyde, cuminaldehyde, 2-(E)-hexenal, ethyl laurate, diethyl succinate, ethyl butyrate, ethyl 2-methylbutyrate, methyl anthranilate, methyl butyrate, 2-methylbutyl isovalerate, ethyl hexanoate, methyl 2-methylbutyrate, ethyl isobutyrate, ethyl benzoate, hexyl acetate, ethyl phenylacetate, geranyl acetate, methyl para-anisate, ethyl lactate, isoamyl isobutyrate, ethyl heptanoate, butyl butyrate, isoamyl acetate, phenethyl acetate, ethyl octanoate, isoamyl phenylacetate, tetrahydrofurfuryl phenylacetate, neryl acetate, ethyl cinnamate, isobutyl acetate, benzyl acetate, butyl acetate, furfuryl acetate, hexyl isobutyrate, methyl benzoate, ethyl 3-hydroxybutanoate, ethyl decanoate, methyl decanoate, ethyl-2-methylbutyrate, methyl salicylate, methyl 2-thiofuroate, cinnamyl acetate, beta-ionone, maltol, 2,3-pentadione, coffee furanone, 2,3-hexanedione, acetoin acetate, ethyl maltol, acetoin, filbert heptenone, alpha ionone, 2-heptanone, damascenone, 2-undecanone, massoia lactone, gamma-nonalactone, delta-octalactone, delta-decalactone, gamma decalactone, 2-nonanone, acetophenone, gamma-valerolactone, 1-octen-3-one, methyl 2-pyrrolyl ketone, 3-mercapto-2-butanone, vanillin, vanillyl ethyl ether, rum ether, 2-pentylfuran, 2-methyl furan, nerol oxide, dimethyl trisulfide, methyl mercapten, 2,6-dimethylpyrazine, isopropenyl pyrazine, 2,3,5-trimethylpyrazine, 2,3-dimethylpyrazine, 2-ethyl-3-methylpyrazine, 2-methylpyrazine, 2-ethylpyrazine, 2,5-dimethylpyrazine, 2-isopropyl-3-methoxypyrazine, 2-ethyl-3(5 or 6)-dimethylpyrazine, 2,3-diethyl-5-methylpyrazine, 2-methoxypyrazine, 2-ethyl-6-methylpyrazine, 2,3,5,6-tetramethylpyrazine, 2-isobutyl-3-methoxypyrazine (IBMP), 2,4,5-trimethylthiazole, 3-carene, B-caryophyllene, (R)-(+)-limonene, linalool, myrcene, 5-methyl-2-hepten-4-one, hexanol, 4,5-dimethyl-2-ethyl-3-thiazoline, 2-ethyl-1-hexanol, 2-isobutyl-3-methoxypyrazine, furfuryl propionate, trans,tran-2,4-decadienal, benzyl alcohol, 4-methyl-2-phenyl-2-pentenal, dibutyl maleate, 2,3-butanedione, ethyl isovalerate, amyl acetate, isoamyl butyrate, 2-acetylpyridine, ethyl acetate, pyridine, 2-isopropyl-5-methyl-2-hexenal, methyl phenylacetate, ethyl 3-phenylpropionate, tricyclodecenyl isobutyrate, prenyl benzoate, gamma-decalactone, 1-propanol, 2-ethoxy-3-methyl pyrazine, 4'-methylacetophenone, geraniol, phenethyl alcohol, p-cresol, vanillin propylene glycol acetal, 2-pentanol, limonene, 3-octanone, 2-octanone, 2,3-dimethylpyrazine, 2-octanol, linalool oxide, 2,3-diethylpyrazine, 2-acetyl-5-methylfuran, isoamyl benzoate, 5-methyl-2-phenyl-2-hexenal, 2-methyl-1-butanol, 2-methylpyrazine, 5-methylfurfural, propyl-2-furoate, geranyl acetate, 2,6-dimethoxyphenol, methyl p-anisate, propionic acid, valeric acid, and 3-phenylpropionic acid.

The VOCs can include at least 40 compounds selected from the group consisting of isovaleric acid, cinnamic acid, 2-methylbutyric acid, butyric acid, propanoic acid, phenylacetic acid, 3-phenylpropionic acid, isobutyric acid, hexanoic acid, amyl alcohol, 2-methoxy-4-vinylphenol, furaneol, guaiacol, 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 1-octen-3-ol, 2,3-butanediol, hexyl alcohol (hexanol), 1-octanol, 2-heptanol, isoamyl alcohol, 2-nonanol, 1-heptanol, para cresol, 1-decanol, 4-carvomenthenol, carvacrol, eugenol, isoeugenol, phenyl propyl alcohol, isovaleraldehyde, cocoa hexenal, valeraldehyde, vanillin erythro and threo-butan-2,3-diol acetal, benzaldehyde, isobutyraldehyde, furfural, isodihydrolavandulal, decanal, phenylacetaldehyde, 2-phenylpropionaldehyde, acetaldehyde, octanal, nonanal, 2-methylbutyraldehyde, 2-phenyl-2-butenal, trans-2-nonenal, trans,trans-2,4-decadienal, hexanal, 2-methoxycinnamaldehyde, cuminaldehyde, 2-(E)-hexenal, ethyl laurate, diethyl succinate, ethyl butyrate, ethyl 2-methylbutyrate, methyl anthranilate, methyl butyrate, 2-methylbutyl isovalerate, ethyl hexanoate, methyl 2-methylbutyrate, ethyl isobutyrate, ethyl benzoate, hexyl acetate, Ethyl phenylacetate, geranyl acetate, methyl para-anisate, ethyl lactate, isoamyl isobutyrate, ethyl heptanoate, butyl butyrate, isoamyl acetate, phenethyl acetate, ethyl octanoate, isoamyl phenylacetate, tetrahydrofurfuryl phenylacetate, neryl acetate, ethyl cinnamate, isobutyl acetate, benzyl acetate, butyl acetate, furfuryl acetate, hexyl isobutyrate, methyl benzoate, ethyl 3-hydroxybutanoate, ethyl decanoate, methyl decanoate, ethyl-2-methylbutyrate, methyl salicylate, methyl 2-thiofuroate, cinnamyl acetate, beta-ionone, maltol, 2,3-pentadione, coffee furanone, 2,3-Hexanedione, acetoin acetate, ethyl maltol, acetoin, filbert heptenone, alpha ionone, 2-heptanone, damascenone, 2-undecanone, massoia lactone, gamma-nonalactone, delta-octalactone, delta-decalactone, gamma decalactone, 2-nonanone, Acetophenone, gamma-valerolactone, 1-octen-3-one, methyl 2-pyrrolyl ketone, 3-mercapto-2-butanone, vanillin, vanillyl ethyl ether, rum ether, 2-pentylfuran, 2-methyl furan, nerol oxide, dimethyl trisulfide, methyl mercapten, 2,6-dimethylpyrazine, isopropenyl pyrazine, 2,3,5-trimethylpyrazine, 2,3-dimethylpyrazine, 2-ethyl-3-methylpyrazine, 2-methylpyrazine, 2-ethylpyrazine, 2,5-dimethylpyrazine, 2-isopropyl-3-methoxypyrazine, 2-ethyl-3(5 or 6)-dimethylpyrazine, 2,3-diethyl-5-methylpyrazine, 2-methoxypyrazine, 2-ethyl-6-methylpyrazine, 2,3,5,6-tetramethylpyrazine, 2-isobutyl-3-methoxypyrazine (IBMP), 2,4,5-trimethylthiazole, 3-carene, B-caryophyllene, (R)-(+)-limonene, linalool, myrcene, 5-methyl-2-hepten-4-one, hexanol, 4,5-dimethyl-2-ethyl-3-thiazoline, 2-ethyl-1-hexanol, 2-isobutyl-3-methoxypyrazine, furfuryl propionate, trans,tran-2,4-decadienal, benzyl alcohol, 4-methyl-2-phenyl-2-pentenal, dibutyl maleate, 2,3-butanedione, ethyl isovalerate, amyl acetate, isoamyl butyrate, 2-acetylpyridine, ethyl acetate, pyridine, 2-isopropyl-5-methyl-2-hexenal, methyl phenylacetate, ethyl 3-phenylpropionate, tricyclodecenyl isobutyrate, prenyl benzoate, gamma-decalactone, 1-propanol, 2-ethoxy-3-methyl pyrazine, 4'-methylacetophenone, geraniol, phenethyl alcohol, p-cresol, vanillin propylene glycol acetal, 2-pentanol, limonene, 3-octanone, 2-octanone, 2,3-dimethylpyrazine, 2-octanol, linalool oxide, 2,3-diethylpyrazine, 2-acetyl-5-methylfuran, isoamyl benzoate, 5-methyl-2-phenyl-2-hexenal, 2-methyl-1-butanol, 2-methylpyrazine, 5-methylfurfural, propyl-2-furoate, geranyl acetone, 2,6-dimethoxyphenol, methyl p-anisate, propionic acid, valeric acid, and 3-phenylpropionic acid.

The VOCs can include at least 50 compounds selected from the group consisting of isovaleric acid, cinnamic acid, 2-methylbutyric acid, butyric acid, propanoic acid, phenylacetic acid, 3-phenylpropionic acid, isobutyric acid, hexanoic acid, amyl alcohol, 2-methoxy-4-vinylphenol, furaneol, guaiacol, 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 1-octen-3-ol, 2,3-butanediol, hexyl alcohol (hexanol), 1-octanol, 2-heptanol, isoamyl alcohol, 2-nonanol, 1-heptanol, para cresol, 1-decanol, 4-carvomenthenol, carvacrol, eugenol, isoeugenol, phenyl propyl alcohol, isovaleraldehyde, cocoa hexenal, valeraldehyde, vanillin erythro and threobutan-2,3-diol acetal, benzaldehyde, isobutyraldehyde, furfural, isodihydrolavandulal, decanal, phenylacetaldehyde, 2-phenylpropionaldehyde, acetaldehyde, octanal, nonanal, 2-methylbutyraldehyde, 2-phenyl-2-butenal, trans-2-nonenal, trans,trans-2,4-decadienal, hexanal, 2-methoxycinnamaldehyde, cuminaldehyde, 2-(E)-hexenal, ethyl laurate, diethyl succinate, ethyl butyrate, ethyl 2-methylbutyrate, methyl anthranilate, methyl butyrate, 2-methylbutyl isovalerate, ethyl hexanoate, methyl 2-methylbutyrate, ethyl isobutyrate, ethyl benzoate, hexyl acetate, Ethyl phenylacetate, geranyl acetate, methyl para-anisate, ethyl lactate, isoamyl isobutyrate, ethyl heptanoate, butyl butyrate, isoamyl acetate, phenethyl acetate, ethyl octanoate, isoamyl phenylacetate, tetrahydrofurfuryl phenylacetate, neryl acetate, ethyl cinnamate, isobutyl acetate, benzyl acetate, butyl acetate, furfuryl acetate, hexyl isobutyrate, methyl benzoate, ethyl 3-hydroxybutanoate, ethyl decanoate, methyl decanoate, ethyl-2-methylbutyrate, methyl salicylate, methyl 2-thiofuroate, cinnamyl acetate, beta-ionone, maltol, 2,3-pentadione, coffee furanone, 2,3-hexanedione, acetoin acetate, ethyl maltol, acetoin, filbert heptenone, alpha ionone, 2-heptanone, damascenone, 2-undecanone, massoia lactone, gamma-nonalactone, delta-octalactone, delta-decalactone, gamma decalactone, 2-nonanone, Acetophenone, gamma-valerolactone, 1-octen-3-one, methyl 2-pyrrolyl ketone, 3-mercapto-2-butanone, vanillin, vanillyl ethyl ether, rum ether, 2-pentylfuran, 2-methyl furan, nerol oxide, dimethyl trisulfide, methyl mercapten, 2,6-dimethylpyrazine, isopropenyl pyrazine, 2,3,5-trimethylpyrazine, 2,3-dimethylpyrazine, 2-ethyl-3-methylpyrazine, 2-methylpyrazine, 2-ethylpyrazine, 2,5-dimethylpyrazine, 2-isopropyl-3-methoxypyrazine, 2-ethyl-3(5 or 6)-dimethylpyrazine, 2,3-diethyl-5-methylpyrazine, 2-methoxypyrazine, 2-ethyl-6-methylpyrazine, 2,3,5,6-Tetramethylpyrazine, 2-isobutyl-3-methoxypyrazine (IBMP), 2,4,5-trimethylthiazole, 3-carene, B-caryophyllene, (R)-(+)-limonene, linalool, myrcene, 5-methyl-2-hepten-4-one, hexanol, 4,5-dimethyl-2-ethyl-3-thiazoline, 2-ethyl-1-hexanol, 2-isobutyl-3-methoxypyrazine, furfuryl propionate, trans,tran-2,4-decadienal, benzyl alcohol, 4-methyl-2-phenyl-2-pentenal, dibutyl maleate, 2,3-butanedione, ethyl isovalerate, amyl acetate, isoamyl butyrate, 2-acetylpyridine, ethyl acetate, pyridine, 2-isopropyl-5-methyl-2-hexenal, methyl phenylacetate, ethyl 3-phenylpropionate, tricyclodecenyl isobutyrate, prenyl benzoate, gamma-decalactone, 1-propanol, 2-ethoxy-3-methyl pyrazine, 4'-methylacetophenone, geraniol, phenethyl alcohol, p-cresol, vanillin propylene glycol acetal, 2-pentanol, limonene, 3-octanone, 2-octanone, 2,3-dimethylpyrazine, 2-octanol, linalool oxide, 2,3-diethylpyrazine, 2-acetyl-5-methylfuran, isoamyl benzoate, 5-methyl-2-phenyl-2-hexenal, 2-methyl-1-butanol, 2-methylpyrazine, 5-methylfurfural, propyl-2-furoate, geranyl acetone, 2,6-dimethoxyphenol, methyl p-anisate, propionic acid, valeric acid, and 3-phenylpropionic acid.

The VOCs can include at least 10 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, chocolate furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

The VOCs can include at least 20 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, chocolate furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

The VOCs can include at least 30 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, chocolate furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

The VOCs can include at least 40 compounds selected from the group consisting of 1-heptanol, 1-octanol, 1-octen- 3-ol, 2,3-butanediol, 2,3-butanedione, 2,3-diethyl-5-methylpyrazine, 2,3-diethylpyrazine, 2,3-hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, chocolate furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

The VOCs can include at least 20 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, chocolate furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

The VOCs can include at least 30 compounds selected from the group consisting of isovaleric acid, 2-methylbutyric acid, butyric acid, cinnamic acid, propanoic acid, 3-phenylpropionic acid, amyl alcohol, phenyl methanol (benzyl alcohol), isoamyl alcohol, 1-decanol, 3-(Z)-hexenol, furaneol, 2-nonanol, 1-heptanol, 2-methoxy-4-vinylphenol, carvacrol, 3-mercapto hexanol, para cresol, hexyl alcohol (hexanol), 1-octanol, Isovaleraldehyde, vanillin, cocoa hexenal, benzaldehyde, vanillin erythro and threo-butan-2,3-diol ACETAL, nonanal, valeraldehyde, 2-phenyl-2-butenal, 2-methylbutyraldehyde, decanal, isodihydrolavandulal, 2-methylbutyl isovalerate, ethyl lactate, ethyl laurate, methyl butyrate, isoamyl acetate, methyl para-anisate, ethyl heptanoate, ethyl 2-methylbutyrate, ethyl-2-methylbutyrate, butyl butyrate, isobutyl acetate, butyl acetate, isoamyl isobutyrate, methyl 2-methylbutyrate, ethyl isobutyrate, ethyl 3-hydroxybutanoate, ethyl phenylacetate, benzyl acetate, ethyl butyrate, diethyl succinate, ethyl hexanoate, hexyl isobutyrate, hexyl acetate, methyl benzoate, furfuryl acetate, geranyl acetate, acetoin acetate, coffee furanone, maltol, gamma-valerolactone, ethyl maltol, acetoin, beta-ionone, 2,3-Hexanedione, 2-heptanone, 2-undecanone, alpha ionone, 2,3-pentadione, damascenone, acetophenone, vanillyl ethyl ether, rum ether, 2-methyl furan, 2-methylpyrazine, 2,6-dimethylpyrazine, 2-ethylpyrazine, isopropenyl pyrazine, 2-ethyl-3-methylpyrazine, 2,3-dimethylpyrazine, 2,3,5-trimethylpyrazine, (R)-(+)-limonene, linalool, B-caryophyllene, 3-carene, and myrcene.

the VOCs include at least 40 compounds selected from the group consisting of isovaleric acid, 2-methylbutyric acid, butyric acid, cinnamic acid, propanoic acid, 3-phenylpropionic acid, amyl alcohol, phenyl methanol (benzyl alcohol), isoamyl alcohol, 1-decanol, 3-(Z)-hexenol, furaneol, 2-nonanol, 1-heptanol, 2-methoxy-4-vinylphenol, carvacrol, 3-mercapto hexanol, para cresol, hexyl alcohol (hexanol), 1-octanol, isovaleraldehyde, vanillin, cocoa hexenal, benzaldehyde, vanillin erythro and threo-butan-2,3-diol acetal, nonanal, valeraldehyde, 2-phenyl-2-butenal, 2-methylbutyraldehyde, decanal, isodihydrolavandulal, 2-methylbutyl isovalerate, ethyl lactate, ethyl laurate, methyl butyrate, isoamyl acetate, methyl para-anisate, ethyl heptanoate, ethyl 2-methylbutyrate, ethyl-2-methylbutyrate, butyl butyrate, isobutyl acetate, butyl acetate, isoamyl isobutyrate, methyl 2-methylbutyrate, ethyl isobutyrate, ethyl 3-hydroxybutanoate, ethyl phenylacetate, benzyl acetate, ethyl butyrate, diethyl succinate, ethyl hexanoate, hexyl isobutyrate, hexyl acetate, methyl benzoate, furfuryl acetate, geranyl acetate, acetoin acetate, coffee furanone, maltol, gamma-valerolactone, ethyl maltol, acetoin, beta-ionone, 2,3-hexanedione, 2-heptanone, 2-undecanone, alpha ionone, 2,3-pentadione, damascenone, acetophenone, vanillyl ethyl ether, rum ether, 2-methyl furan, 2-methylpyrazine, 2,6-dimethylpyrazine, 2-ethylpyrazine, isopropenyl pyrazine, 2-Ethyl-3-methylpyrazine, 2,3-dimethylpyrazine, 2,3,5-trimethylpyrazine, (R)-(+)-limonene, linalool, B-caryophyllene, 3-carene, and myrcene.

The VOCs can include at least 40 compounds selected from the group consisting of isovaleric acid, 2-methylbutyric acid, butyric acid, cinnamic acid, propanoic acid, 3-phenylpropionic acid, amyl alcohol, phenyl methanol (benzyl alcohol), isoamyl alcohol, 1-decanol, 3-(Z)-hexenol, furaneol, 2-nonanol, 1-heptanol, 2-methoxy-4-vinylphenol, carvacrol, 3-mercapto hexanol, para cresol, hexyl alcohol (hexanol), 1-octanol, Isovaleraldehyde, vanillin, cocoa hexenal, benzaldehyde, vanillin erythro and threo-butan-2,3-diol acetal, nonanal, valeraldehyde, 2-phenyl-2-butenal, 2-methylbutyraldehyde, decanal, isodihydrolavandulal, 2-methylbutyl isovalerate, ethyl lactate, ethyl laurate, methyl butyrate, isoamyl acetate, methyl para-anisate, ethyl heptanoate, ethyl 2-methylbutyrate, ethyl-2-methylbutyrate, butyl butyrate, isobutyl acetate, butyl acetate, isoamyl isobutyrate, methyl 2-methylbutyrate, ethyl isobutyrate, ethyl 3-hydroxybutanoate, ethyl phenylacetate, benzyl acetate, ethyl butyrate, diethyl succinate, ethyl hexanoate, hexyl isobutyrate, hexyl acetate, methyl benzoate, furfuryl acetate, geranyl acetate, acetoin acetate, coffee furanone, maltol, gamma-valerolactone, ethyl maltol, acetoin, beta-ionone, 2,3-hexanedione, 2-heptanone, 2-undecanone, alpha ionone, 2,3-pentadione, damascenone, acetophenone, vanillyl ethyl ether, rum ether, 2-methyl furan, 2-methylpyrazine, 2,6-dimethylpyrazine, 2-ethylpyrazine, isopropenyl pyrazine, 2-Ethyl-3-methylpyrazine, 2,3-dimethylpyrazine, 2,3,5-trimethylpyrazine, (R)-(+)-limonene, linalool, B-caryophyllene, 3-carene, and myrcene.

The VOCs can include isovaleric acid, 2-methylbutyric acid, butyric acid, cinnamic acid, propanoic acid, 3-phenylpropionic acid, amyl alcohol, phenyl methanol (benzyl alcohol), isoamyl alcohol, 1-decanol, 3-(Z)-hexenol, furaneol, 2-nonanol, 1-heptanol, 2-methoxy-4-vinylphenol, carvacrol, 3-mercapto hexanol, para cresol, hexyl alcohol (hexanol), 1-octanol, Isovaleraldehyde, vanillin, cocoa hexenal, benzaldehyde, vanillin erythro and threo-butan-2,3-diol acetal, nonanal, valeraldehyde, 2-phenyl-2-butenal, 2-methylbutyraldehyde, decanal, isodihydrolavandulal, 2-methylbutyl isovalerate, ethyl lactate, ethyl laurate, methyl butyrate, isoamyl acetate, methyl para-anisate, ethyl heptanoate, ethyl 2-methylbutyrate, ethyl-2-methylbutyrate, butyl butyrate, isobutyl acetate, butyl acetate, isoamyl isobutyrate, methyl 2-methylbutyrate, ethyl isobutyrate, ethyl 3-hydroxybutanoate, ethyl phenylacetate, benzyl acetate, ethyl butyrate, diethyl succinate, ethyl hexanoate, hexyl isobutyrate, hexyl acetate, methyl benzoate, furfuryl acetate, geranyl acetate, acetoin acetate, coffee furanone, maltol, gamma-valerolactone, ethyl maltol, acetoin, beta-ionone, 2,3-hexanedione, 2-heptanone, 2-undecanone, alpha ionone, 2,3-pentadione, damascenone, acetophenone, vanillyl ethyl ether, rum ether, 2-methyl furan, 2-methylpyrazine, 2,6-dimethylpyrazine, 2-ethylpyrazine, isopropenyl pyrazine, 2-Ethyl-3-methylpyrazine, 2,3-dimethylpyrazine, 2,3,5-trimethylpyrazine, (R)-(+)-limonene, linalool, B-caryophyllene, 3-carene, and myrcene.

In some cases, the VOCs have less than about 95% identity to the VOCs in a single reference chocolate. In some cases, the VOCs have less than about 85% identity to the VOCs in a single reference chocolate.

In some cases, the chocolate replica can include at least 41 VOCs and wherein no more than 40 of the VOCs are found in a single reference chocolate. In some cases, the chocolate replica can include at least 51 VOCs and wherein no more than 50 of the VOCs are found in a single reference chocolate.

In some cases, the one or more non-volatile compounds do not include at least one compound selected from the group consisting of choline, caffeine, 2,3,5,6-tetramethylpyrazine, quercetin, luteolin, phenylalanine, arginine, asparagine, glutamic acid, homoserine, and cholic acid. In some cases, the one or more non-volatile compounds do not include at least one compound selected from the group consisting of choline, caffeine, quercetin, luteolin, phenylalanine, arginine, asparagine, glutamic acid, homoserine, and cholic acid.

In some cases, the one or more non-volatile compounds can include at least one compound selected from the group consisting of pyridine, pyridoxine, 2(5H)-furanone, orientin, isoprenylpyrazine, 2-isopropyl-3-methoxypyrazine, 2-isobutyl-3-methoxypyrazine, adipic acid, methyl gallate, rutin, trans-ferulic acid, sinapinic acid, resveratrol, ellagic acid, propyl gallate, salicylic acid, AMP, hydroxymethylfurfural, caffeic acid, epicatechin gallate, syringic acid, homofuraneol, syringaldehyde, coumaric acid, acetovanillone, cinnamic acid, polydatin, cytosine, CMP, guanine, 4-guanidinobutyric acid, uracil, tryptamine, maple furanone, acetanilide, sorbic acid, ornithine, trans-4-hydroxyproline, carnosine, kynurenic acid, ribose, xylose, fucose, galactose, mannose, D-Glucuronic acid, pyruvic acid, tartaric acid, ricinoleic acid, DL-hydroxystearic acid, 8-hydroxyquinoline, quinoline, 5-methoxyresorcinol, chlorogenic acid, and eugenyl acetate. The 2,3,5-trimethylpyrazine can be present in an amount less than about 0.006 mg/L. The 2,3-dimethylpyrazine can be present in an amount less than about 0.12 mg/L. The sotolon can be present in an amount of less than about 31 mg/L. The vanillin can be present in an amount of at least about 0.23 mg/L.

The one or more non-volatile compounds can include one or more of: an acid, an aldehyde, an alkaloid, an amine, an amino acid, a furan, a ketone, a lactone, a nucleotide, a nucleotide monophosphate, or nucleobase, a protein or peptide, a pyrazine, a pyridine, a sugar or sugar alcohol, a tannin, phenol, polyphenol, or anthocyanin, or a xanthine. In some cases, the one or more non-volatile compounds can include one or more of: an acid, an aldehyde, an amino acid, a lactone, a pyrazine, a tannin, phenol, polyphenol, or anthocyanin, or a xanthine.

The one or more non-volatile compounds can include one or more acids. The one or more acids can include at least one acid selected from the group consisting of adipic acid, trans-ferulic acid, sinapinic acid, salicylic acid, pantothenic acid, caffeic acid, vanillic acid, syringic acid, coumaric acid, sorbic acid, kynurenic acid, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, Nicotinic acid, chlorogenic acid, and cholic acid. In some cases, the one or more acids can include at least one acid selected from the group consisting of D-glucuronic acid, citric acid, lactic acid, tartaric acid, fumaric acid, malic acid, and succinic acid.

The one or more non-volatile compounds can include one or more aldehydes. The one or more aldehydes can include vanillin. In some cases, the aldehydes can be present in an amount of at least about 0.25 mg/L.

The one or more non-volatile compounds can include one or more alkaloids. The one or more alkaloids can include piperine.

The one or more non-volatile compounds can include one or more amines. The one or more amines can include tryptamine.

The one or more non-volatile compounds can include one or more amino acids. The one or more amino acids can include at least one amino acid selected from the group consisting of phenylalanine, leucine, glucosamine, methionine, GABA, Tyrosine, lysine, histidine, glycine, serine, aspartic acid, isoleucine, tryptophan, valine, proline, carnitine, arginine, B-alanine-2, threonine, glutamine, asparagine, glutamic acid, betaine, pipecolinic acid, citrulline, carnosine, and homoserine. In some embodiments, the one or more amino acids include at least one amino acid selected from the group consisting of phenyl alanine and leucine.

The one or more non-volatile compounds can include one or more furans. The one or more furans can include hydroxymethylfurfural.

The one or more non-volatile compounds can include one or more ketones. The one or more ketones can include at least one ketone selected from the group consisting of 2(5H)-furanone, 5-ethyl-4-hydroxy-2-methyl-3(2H)-furanone, acetovanillone, and methyl-2-pyrrolyl ketone.

The one or more non-volatile compounds can include one or more lactones. The one or more lactones can include sotolon.

The one or more non-volatile compounds can include one or more nucleotides, nucleotide monophosphates, or nucleobases. The one or more nucleotides, nucleotide monophosphates, or nucleobases can include at least one nucleotides, nucleotide monophosphates, or nucleobase selected from the group consisting of adenine, AMP, CMP, cytidine, cytosine, guanine, and uracil.

The one or more non-volatile compounds can include one or more proteins or peptides. The one or more proteins or peptides can include carnosine.

The one or more non-volatile compounds can include one or more pyrazines. The one or more pyrazines can include at least one pyrazine selected from the group consisting of 2,3,5,6-tetramethylpyrazine, 2,3,5-trimethylpyrazine, and 2,3-dimethylpyrazine. The one or more pyrazines can include at least one pyrazine selected from the group consisting of 2,3,5-trimethylpyrazine and 2,3-dimethylpyrazine.

The one or more non-volatile compounds can include one or more pyridines. The one or more pyridines can include at least one pyridine selected from the group consisting of pyridine and pyroxidine.

The one or more non-volatile compounds can include one or more sugars or sugar alcohols. The one or more sugars or sugar alcohols can include at least one sugar or sugar alcohol selected from the group consisting of sucrose, arabitol, fructose, galactose, glucosamine, glucose, mannitol, mannose, inositol, rhamnose, ribose, sorbitol, and xylose.

The one or more non-volatile compounds can include one or more tannins, phenols, polyphenols, or anthocyanins. The one or more tannins, phenols, polyphenols, or anthocyanins can include at least one tannin, phenol, polyphenol, or anthocyanin selected from the group consisting of catechin, ellagic acid, epicatechin, epicatechin gallate, gallic acid, hesperetin, methyl gallate, polydatin, propyl gallate, quercetin, resveratrol, rutin, salicylic acid, sinapinic acid, syringaldehyde, syringic acid, trans-ferulic acid, tyramine, and vanillic acid. In some cases, the one or more tannins, phenols, polyphenols, or anthocyanins can include at least one tannin, phenol, polyphenol, or anthocyanin selected from the group consisting of trans-ferulic acid and vanillic acid.

The one or more non-volatile compounds can include one or more xanthines. The one or more xanthines can include caffeine.

The one or more nonvolatile compounds can include at least 10 compounds selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-guanidinobutyric acid, 4-methoxycinnamic acid, 5-ethyl-4-hydroxy-2-methyl-3(2H)-furanone, acetovanillone, adenine, adipic acid, AMP, arabitol, arginine, asparagine, aspartic acid, beta-alanine, betaine, caffeic acid, caffeine, carnitine, carnosine, catechin, choline, cinnamic acid, citric acid, citrulline, CMP, coumaric acid, cysteine, cystine, cytidine, cytosine, D-gluconic acid, D-glucuronic acid, DL-hydroxystearic acid, ellagic acid, epicatechin, epicatechin gallate, fructose, fumaric acid, GABA, galactose, gallic acid, glucosamine, glucose, glutamic acid, glutamine, glycine, guanine, hesperetin, histidine, homoserine, hydroxymethylfurfural, isoleucine, kynurenic acid, lactic acid, leucine, lysine, malic acid, mannitol, mannose, methionine, methyl gallate, methyl-2-pyrrolyl ketone, inositol, ornithine, pantothenic acid, phenylalanine, pipecolinic acid, piperine, polydatin, proline, propyl gallate, pyridine, pyridoxine, pyruvic acid, quercetin, quinic acid, resveratrol, rhamnose, ribose, rutin, salicylic acid, serine, sinapinic acid, sorbic acid, sorbitol, sotolon, succinic acid, syringaldehyde, syringic acid, tartaric acid, threonine, trans-4-hydroxyproline, trans-ferulic acid, tryptamine, tryptophan, tyramine, tyrosine, uracil, valine, vanillic acid, vanillin, and xylose.

The one or more non-volatile compounds can include at least 5 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

The one or more non-volatile compounds can include at least 10 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

The one or more non-volatile compounds can include 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

In some cases, the one or more non-volatile compounds have less than about 95% identity to the non-volatile compounds in a single reference chocolate. In some cases, the one or more non-volatile compounds have less than about 85% identity to the non-volatile compounds in a single reference chocolate.

In some cases, the chocolate replica can include at least 11 non-volatile compounds and wherein no more than 10 of the non-volatile compounds are found in a single reference chocolate.

In some cases, the chocolate replica does not include one or more of *E. coli, Salmonella* sp., *Brettanomyces* sp., *Lactobacillales, Saccharomyces* sp., *Acremonium strictum, Chrysonilia sitophila, Cladosporium oxysporum, Fusarium oxysporum, Mortierella alpina, Mucor plumbeus, Paecilomyces viridis, Penicillium chrysogenum, Penicillium citreonigrum, Penicillium decumbens, Penicillium purpurogenum, Trichoderma longibrachiatum, Trichoderma viride, Verticillium psalliotae,* mold, mildew, rot, insects, insect eggs, insect filth, rodent filth, mammalian excreta, hydrogen sulfide, hydrogen disulfide, 2,4,6-trichloranisole, 2,4,6,-tribromoanisole, aflatoxin, aldrin, dieldrin, benzene hexachloride, chlordane, dichlorodiphenyltrichloroethane (DDT), dichlorodiphenyldichloroethylene (DDE), dichlorodiphenyldichloroethane (TDE), dimethylnitrosamine (nitrosodimethylamine), ethylene dibromide (EDB), heptachlor, heptachlor epoxide, lindane, mercury, methanol, ethylene glycol, dichloromethane, and heavy metals.

In some cases, the chocolate replica is a solution, suspension, or emulsion. The solution, suspension, or emulsion can be a ready-to-drink beverage. The solution, suspension, or emulsion can be a chocolate concentrate. In some cases, the chocolate concentrate is about 2-fold to about 2000-fold concentrated. In some cases, the chocolate concentrate is about 5-fold to about 20-fold concentrated. In some cases, the chocolate concentrate is about 500-fold to about 1500-fold concentrated. In some cases, the chocolate replica is a solid. In some cases, the chocolate replica is a chocolate bean replica. In some cases, the chocolate replica is soluble in water. In some cases, the chocolate replica is a chocolate bars replica. In some cases, the chocolate bar replicas can include a solid substrate. In some cases, the solid substrate can include processed or unprocessed grains or grain products, legumes or legume seeds, oil plants or seeds, fruits or fruit products, roots, tubers, or root or tuber products, sugar processing by-products, or other plant by-products. In some cases, the solid substrate can include grape seeds.

In another aspect, the document features a chocolate replica containing one or more volatile organic compounds (VOCs) and one or more non-volatile compounds; wherein: a) the VOCs can include at least 50 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, chocolate furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, and vanillin erythro and/or threo-butan-2,3-diol acetal, and vanillyl ethyl ether, and b) the non-volatile compounds can include at least 10 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

The VOCs can include at least 60 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, chocolate furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether. The VOCs can include 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, chocolate furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

The non-volatile compounds can include 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

In some cases, the chocolate replica can be a chocolate beverage replica.

In another aspect, the document features a method of preparing a chocolate replica, where the method includes: forming a mixture that includes water (liquid), VOCs that are water-soluble, and non-volatile compounds that are water-soluble; forming a substrate emulsion that includes an oil, VOCs that are fat-soluble, and non-volatile compounds that are fat-soluble; and mixing the aqueous solution and the emulsion to form a flavor mixture. In some embodiments, forming an emulsion can include homogenizing. The oil can include corn oil, sunflower oil, palm oil, or coconut oil. In some cases, the method can further include processing the flavor mixture to commercial sterility. In some cases, the processing the flavor mixture to commercial sterility can include: a) ultra clean processing, b) UHT aseptic processing, c) HTST inline processing with sterile filling, d) hot fill packaging, or e) cold fill tunnel pasteurization. In some cases, the processing the flavor mixture to commercial sterility can include: a) ultra clean processing, b) UHT aseptic processing, c) fill and retort processing, d) fill then Ohmic sterilization, or e) UV/PEF inline sterilization and aseptic filling. In some cases, the chocolate replica can be a chocolate concentrate replica or a chocolate beverage replica. In some cases, the chocolate replica can be a chocolate bean replica. In some cases, the method further includes agglomerating the flavor mixture. In some cases, the agglomerating the flavor mixture includes pneumatic mixing, steam-jet, fluid-bed, pan, or spray drying, drum, mixer, roller, or extrusion agglomeration. In some cases, the chocolate replica is a chocolate bean replica or a chocolate bars replica and can include a solid substrate. In some cases, the method can further include applying the flavor mixture to the solid substrate to form a coated solid substrate. In some cases, the applying the flavor mixture can include spray applying the flavor mixture. In some cases, the solid substrate can include processed or unprocessed grains or grain products, legumes or legume seeds, oil plants or seeds, fruits or fruit products, roots, tubers, or root or tuber products, sugar processing by-products, or other plant by-products. In some cases, the solid substrate can include grape seeds. In some cases, the chocolate replica can be a chocolate bean replica. In some cases, the method can further include adding a tableting aid to the coated solid substrate. In some cases, the tableting aid can include a starch, a sugar, a gum, or a combination thereof. In some cases, the method can further include forming the coated solid substrate into a chocolate bean-like shape to form a chocolate bean replica. In some cases, the forming the coated solid substrate into a chocolate bean-like shape can include using a pill press. In some cases, the method can further include coating the chocolate bean replica. In some cases, the coating the chocolate bean replica can include coating the chocolate bean replica with shellac, zein protein, or wax.

In any of the methods described above, at least one of the following is true: a) the one or more VOCs can include at least one VOC that is not present in a corresponding reference chocolate, b) the one or more VOCs do not include at least one VOC that is present in a corresponding reference chocolate, c) the one or more VOCs are present in the chocolate replica in a total amount of at least 100 mg/L, d) the one or more non-volatile compounds can include at least one non-volatile compound that is not present in a corresponding reference chocolate, or e) the one or more non-volatile compounds do not include at least one non-volatile compound that is present in a corresponding reference chocolate.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the description below. Other features, objects, and advantages of the invention will be apparent from the description and from the claims.

DETAILED DESCRIPTION

This document provides chocolate-like products (e.g., solids and liquids) as well as methods for making chocolate-like products by combining individual volatile organic compounds (VOCs) and non-volatile organic compounds, with or without other components. In general, compounds designated as "VOCs" herein can be measured using GCMS, and compounds designated as "non-volatile compounds" herein can be measured using LCMS. Although some compounds may be able to be measured using either GCMS or LCMS, for the purposes of this disclosure, a compound is either a VOC or a non-volatile compound. For a compound not specifically described herein, the compound can be considered either a VOC or a non-volatile compound, based on factors such as similarity to compounds described herein and the method (GCMS or LCMS) that the ordinary artisan would select for its analysis.

Generally, these products can be called "chocolate-like products" or "chocolate replicas." Examples of chocolate include beans, molded bars, countlines, straightlines, boxed, cocoa powder, novelties, panned chocolate, coatings, liquors, and drinks. Accordingly, this document provides replicas of these, which can be termed "cocoa-like beans," "cocoa bean replicas," or "chocolate bean replicas;" "chocolate-like bars" or "chocolate bar replicas;" or "chocolate-like coatings" or "chocolate coating replicas," respectively. The chocolate-like products described herein can have characteristics—including taste, aroma, mouthfeel, and appearance—of traditionally generated dark, white, or milk chocolates, and are meant to be consumed and enjoyed in the same manner as traditional chocolates.

As used herein, the terms "traditional" and "reference" chocolate refer to chocolate products produced through standard chocolate making processes, which include the farming, drying, grinding, and tempering of chocolate beans. "Traditionally-produced chocolate" is chocolate that was generated using standard chocolate making process.

As used herein, the term "about" when used to refer to an amount of an ingredient or compound in a chocolate replica means ±10% of the amount. As used herein, the term "about" when used to refer to measured characteristics of a chocolate replica means ±20% of the reported value. As used herein, the term "about" when used to a condition for making a chocolate replica means ±20% of the value.

Traditional chocolates are complex mixtures on a chemical level. In some aspects, this document provides chocolate replicas that are less complex than a traditional chocolate. It is surprising that the replicas disclosed herein, do not need to have the complexity of a traditional chocolate in order to be perceived as such. It is also surprising that some compounds, which by themselves have an unpleasant taste and/or smell, can enhance the taste and/or smell of the chocolate replicas disclosed herein. It is further surprising that the exclusion of some compounds found in all tested traditional chocolates was not detrimental to the chocolate replicas described herein. Similarly, it is surprising that some compounds that were not found in any tested traditional chocolate could be beneficial to the chocolate replicas described herein. It is also surprising that chocolate replicas described herein containing some compounds in amounts greater than the highest measured amount in any tested traditional chocolate or lower than the lowest measured amount in any tested traditional chocolate are superior to replicas that contained the same compounds in amounts within the measured range of traditional chocolate. Therefore, in another aspect, this document provides chocolate replicas that are not mere replicas of existing products, but instead provide a similar sensory experience with a different chemical composition.

In some embodiments, a chocolate replica can consist of the ingredients included in a particular list, or can have a VOC content (or non-volatile compound content) that consists of the VOCs or non-volatile compounds included in a particular list. Further, a chocolate replica can consist essentially of the ingredients included in a particular list, or can have a VOC content (or non-volatile compound content) that consists essentially of the VOCs or non-volatile compounds that are included in a particular list. By "consisting essentially of" is meant that a chocolate replica contains specified ingredients/VOCs/non-volatile compounds, and can contain additional ingredients/VOCs/non-volatile compounds that do not materially affect the basic and novel characteristics of the chocolate.

In general, the chocolate replicas include the following components, or classes of components:
a) one or more VOCs;
b) one or more non-volatile compounds; and
c) a solid substrate.

Chocolate beverage replicas or chocolate concentrate replicas can include the following components, or classes of components:
a) one or more VOCs;
b) one or more non-volatile compounds;
c) a solid substrate; and
d) water, either pure or with mineral content present to improve flavor.

Chocolate bean replicas or chocolate bar replicas can include the following components, or classes of components:
a) one or more VOCs;
b) one or more non-volatile compounds; and
c) a solid substrate.

In some cases, one or more of the VOCs and non-volatile compounds in the chocolate replicas provided herein can be an isolated VOC or an isolated non-volatile compound. As used herein, the terms "isolated VOC" and "isolated non-volatile compound" refer to a VOC or a non-volatile compound, respectively, that has been isolated (e.g., purified, extracted, and/or enriched) from a natural or synthetic source. In some cases, isolated VOCs and isolated non-volatile compounds described herein can be individually added when preparing a chocolate replica. In some cases, one or more isolated VOCs and isolated non-volatile compounds described herein can be added as a blend that includes one or more isolated VOCs or isolated non-volatile compounds, to generate a chocolate replica. In some cases, isolated VOCs and isolated non-volatile compounds have a purity is at least 50% (e.g., at least 55%, at least 60%, at least 65%, at least 70%, at least 75%, at least 80%, at least 85%, at least 90%, at least 95%, at least 95.5%, at least 96%, at least 96.5%, at least 97%, at least 97.5%, at least 98%, at least 98.5%, at least 99%, at least 99.1%, at least 99.2%, at least 99.3%, at least 99.4%, at least 99.5%, at least 99.6%, at least 99.7%, at least 99.8%, at least 99.9%, at least 99.99%, or at least 99.999%). In some cases, the purity is labeled on the container of the product.

The VOCs can provide both aroma and flavor, including fruity, floral, green, earthy, herbaceous, roasted/burnt, sour/fermented, creamy, spice, and/or mineral aromas and flavors. The non-volatile components (and solid substrate) can provide acidity and much of the flavor, sweetness, aftertaste, physical structure, and mouthfeel perception of the chocolate replicas.

In some embodiments, a chocolate replica can include (a) one or more VOCs, where at least one of the one or more VOCs are not present in a corresponding reference chocolate; (b) one or more VOCs, where the one or more VOCs do not include at least one VOC that is present in a corresponding reference chocolate; (c) one or more non-volatile compounds, where the at least one of the one or more non-volatile compounds are not present in a corresponding reference chocolate; (d) one or more non-volatile compounds, where the one or more non-volatile compounds do not include at least one non-volatile compound that is present in a corresponding reference chocolate; or (e) any combination of (a), (b), (c), and (d) [(a) and (b); (a) and (c); (a) and (d); (b) and (c); (b) and (d); (c) and (d); (a), (b), and (c); (a), (b), and (d); (a), (c), and (d); (b), (c), and (d); or (a), (b), (c), and (d)]. In some embodiments, a chocolate replica can be characterized by (f) one or more VOCs, where the one or more VOCs are present in the chocolate replica in a total amount of at least 100 mg/kg. Characteristic (f) can be combined with any combination of (a)-(d) as described above.

It will be appreciated that any and all stereoisomers can be used when no stereochemistry is specified.

In this document, amounts of some VOCs and non-volatile compounds are expressed in mg/kg chocolate replica, μg/kg chocolate replica, or ppm. In some cases, when a total weight of VOCs and non-volatile compounds is not specified, an estimate of about 400 g of total VOCs and non-volatile compounds can be used, plus or minus about 10%.

Volatile Organic Compounds (VOCs)

The chocolate replicas described herein can, in some cases, include at least one VOC that is not present in a corresponding reference chocolate. Non-limiting examples of VOCs that are not present in a corresponding reference chocolate include cinnamic acid, 2-methoxy-4-vinylphenol, 2,3-hexanedione, acetoin acetate, 1-decanol, vanillin erythro and threo-butan-2,3-diol, 4-hydroxy-2,5-dimethy-3(2H)-furanone (furaneol), ethyl maltol, acetoin, propanoic acid, methyl butyrate, methyl 2-methylbutyrate, 4-ethylguaiacol, 2-methoxy-4-methylphenol, alpha ionone, rum ether, 3-carene, B-caryophyllene, 3-(Z)-hexenol, butyl butyrate, 3-mercapto hexanol, hexyl alcohol (hexanol), methyl benzoate, ethyl-2-methylbutyrate, and carvacrol. Further non-limiting examples of VOCs that are not present in a corresponding reference chocolate include 2,3-pentanedione, 2-ethyl-3,5-dimethylpyrazine, 2-ethyl-3,6-dimethylpyrazine, 3-methylbutyraldehyde, furfuryl mercaptan, indole, pyrazine, vanillyl ethyl ether, (E)-anethole, 2,3,5-trimethyl-6-ethylpyrazine, 2-ethyl-5-methylpyrazine, 2-ethyl-6-methylpyrazine, 2-ethylene-6-methylpyrazine, 3,4-hexanedione, 3,5-diethyl-2-methylpyrazine, 3-methyl-1,2-cyclopentanedione (cyclotene), 4-methyl-5-thiazoleethanol, 4-methylguaiacol, 6-propyl-5,6-dihydropyran-2-one, acetic acid, anethole, beta-damascenone, ethyl butanoate, eugenol, methional, methyl 2-thiofuroate, ocimene, phenol, phenylacetic acid, propanol, propenal, syringol.

In some embodiments, therefore, a chocolate replica can include one or more (e.g., at least 2, at least 3, at least 4, at least 5, at least 10, at least 15, at least 20, at least 25, or at least 30) compounds selected from the group consisting of cinnamic acid, 2-methoxy-4-vinylphenol, 2,3-hexanedione, acetoin acetate, 1-decanol, vanillin erythro and threo-butan-2,3-diol, furaneol, ethyl maltol, acetoin, propanoic acid, methyl butyrate, methyl 2-methylbutyrate, 4-ethylguaiacol, 2-methoxy-4-methylphenol, alpha ionone, rum ether, 3-carene, B-caryophyllene, 3-(Z)-hexenol, butyl butyrate, 3-mercapto hexanol, hexyl alcohol (hexanol), methyl benzoate, ethyl-2-methylbutyrate, and carvacrol. In some embodiments, a chocolate replica can include one or both of maltol and 3-phenylpropionic acid. In some cases, a chocolate replica can include one or more (e.g., at least 2, at least 3, at least 4, at least 5, at least 10, at least 15, at least 20, at least 25, or at least 30) compounds selected from the group consisting of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, vanillyl ethyl ether, (E)-anethole, 2,3,5-trimethyl-6-ethylpyrazine, 2-ethyl-5-methylpyrazine, 2-ethyl-6-methylpyrazine, 2-ethylene-6-methylpyrazine, 3,4-hexanedione, 3,5-diethyl-2-methylpyrazine, 3-methyl-1,2-cyclopentanedione (cyclotene), 4-ethylguaiacol, 4-hydroxy-2,5-dimethy-3(2H)-furanone (furaneol), 4-methyl-5-thiazoleethanol, 4-methylguaiacol, 6-propyl-5,6-dihydropyran-2-one, acetic acid, anethole, beta-damascenone, ethyl butanoate, eugenol, methional, methyl 2-thiofuroate, methyl butyrate, ocimene, phenol, phenylacetic acid, propanol, propenal, and syringol.

In some cases, a chocolate replica can include one or more (e.g., at least 2, at least 3, at least 4, at least 5, at least 6, at least 7, at least 8, or all 9) compounds selected from the group consisting of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, and vanillyl ethyl ether.

The chocolate replicas described herein can, in some cases, include at least one VOC that is present in a corresponding reference chocolate. Examples of VOCs that are present in a corresponding reference chocolate and can be present in a chocolate replica (e.g., in combination with one or more VOCs that are not present in a corresponding reference chocolate) include, without limitation, one or more of 1-heptanol, 2,3-butanedione, 2,3-diethylpyrazine, 2,4,5-trimethylthiazole, 2-acetylpyridine, 2-ethoxy-3-methyl pyrazine, 2-ethyl-1-hexanol, 2-isobutyl-3-methoxypyrazine, 2-isopropyl-5-methyl-2-hexenal, 2-methoxypyrazine, 2-methyl furan, 2-methyl-1-butanol, 2-methylbutyraldehyde, 2-octanol, 2-octanone, 2-pentanol, 2-phenyl-2-butenal, 2-phenylpropionaldehyde, 3-octanone, 4,5-dimethyl-2-ethyl-3-thiazoline, 4-methyl-2-phenyl-2-pentenal, 4'-methylacetophenone, 5-methyl-2-hepten-4-one, 5-methylfurfural, amyl acetate, benzyl alcohol, coffee furanone, damascenone, delta-decalactone, delta-octalactone, ethyl 2-methylbutyrate, ethyl 3-phenylpropionate, ethyl acetate, ethyl isobutyrate, ethyl isovalerate, furfuryl acetate, furfuryl propionate, geraniol, hexyl isobutyrate, isoamyl benzoate, isoamyl butyrate, isoamyl phenylacetate, isopropenyl pyrazine, linalool oxide, methyl p-anisate, methyl phenylacetate, octanal, p-cresol, prenyl benzoate, propionic acid, propyl 2-furoate, pyridine, tetrahydrofurfuryl phenylacetate, trans-2-nonenal, tricyclodecenyl isobutyrate, valeric acid, and vanillin propylene glycol acetal.

In some cases, therefore, a chocolate replica can include one or more (e.g., at least 2, at least 3, at least 4, at least 5, at least 10, at least 15, at least 20, at least 25, at least 30, at least 35, at least 40, at least 45, at least 50, or at least 55) compounds selected from the group consisting of 1-heptanol, 2,3-butanedione, 2,3-diethylpyrazine, 2,4,5-trimethylthiazole, 2-acetylpyridine, 2-ethoxy-3-methyl pyrazine, 2-ethyl-1-hexanol, 2-isobutyl-3-methoxypyrazine, 2-isopropyl-5-methyl-2-hexenal, 2-methoxypyrazine, 2-methyl furan, 2-methyl-1-butanol, 2-methylbutyraldehyde, 2-octanol, 2-octanone, 2-pentanol, 2-phenyl-2-butenal, 2-phenylpropionaldehyde, 3-octanone, 4,5-dimethyl-2-ethyl-3-thiazoline, 4-methyl-2-phenyl-2-pentenal, 4'-methylacetophenone, 5-methyl-2-hepten-4-one, 5-methylfurfural, amyl acetate, benzyl alcohol, coffee furanone, damascenone, delta-decalactone, delta-octalactone, ethyl 2-methylbutyrate, ethyl 3-phenylpropionate, ethyl acetate, ethyl isobutyrate, ethyl isovalerate, furfuryl acetate, furfuryl propionate, geraniol, hexyl isobutyrate, isoamyl benzoate, isoamyl butyrate, isoamyl phenylacetate, isopropenyl pyrazine, linalool oxide, methyl p-anisate, methyl phenylacetate, octanal, p-cresol, prenyl benzoate, propionic acid, propyl 2-furoate, pyridine, tetrahydrofurfuryl phenylacetate, trans-2-nonenal, tricyclodecenyl isobutyrate, valeric acid, and vanillin propylene glycol acetal (e.g., in combination with at least one compound that is not present in a reference chocolate). In some cases, a chocolate replica can include one or more (e.g., at least 2, at least 3, at least 4, at least 5, at least 6, or all 7) compounds selected from the group consisting of 2,3-diethylpyrazine, 2-methoxypyrazine, 5-methyl-2-hepten-4-one, coffee furanone, propionic acid, valeric acid, and vanillin propylene glycol acetal (e.g., in combination with at least one compound that is not present in a reference chocolate).

The chocolate replicas described herein can, in some cases, exclude at least one VOC that is present in a corresponding reference chocolate. Non-limiting examples of VOCs that are present in reference chocolates include 2,3-pentadione, coffee furanone, 2,6-dimethylpyrazine, benzyl acetate, 2-ethylpyrazine, 2-ethyl-3-methylpyrazine, acetophenone, hexanal, 1-octen-3-one, 1-heptanol, decanal, gamma-valerolactone, limonene, 2,3-dimethylpyrazine, dimethyl trisulfide, 2,3-diethylpyrazine, 1-octanol, diethyl succinate, octanal, furfural, isobutyric acid, 2-methylbutyric acid, isovaleric acid, and valeric acid. Therefore, in some embodiments, a chocolate replica can lack one or more (e.g., at least 2, 3, 4, 5, 10, 15, 20, 30, 40, or 50) compounds selected from the group consisting of 2,3-pentadione, coffee furanone, 2,6-dimethylpyrazine, benzyl acetate, 2-ethylpyrazine, 2-ethyl-3-methylpyrazine, acetophenone, hexanal, 1-octen-3-one, 1-heptanol, decanal, gamma-valerolactone, limonene, 2,3-dimethylpyrazine, dimethyl trisulfide, 2,3-diethylpyrazine, 1-octanol, diethyl succinate, octanal, furfural, isobutyric acid, 2-methylbutyric acid, isovaleric acid, and valeric acid. In some embodiments, a chocolate replica can lack one or more compounds (e.g., at least 2, 3, 4, 5, 10, 15, 20, 30, or 40) compounds selected from the group consisting of 2,5-dimethylpyrazine, isobutyraldehyde, 2-isopropyl-3-methoxypyrazine, 2,3-diethyl-5-methylpyrazine, 2,4,5-trimethylthiazole, 2-methoxypyrazine, guaiacol, furfural, ethyl benzoate, massoia lactone, gamma-nonalactone, delta-octalactone, delta-decalactone, gamma decalactone, 2-nonanone, Phenethyl Acetate, 2-pentylfuran, 1-octen-3-ol, phenylacetaldehyde, isoamyl phenylacetate, 2-phenylpropionaldehyde, tetrahydrofurfuryl phenylacetate, octanal, ethyl cinnamate, 2-heptanol, 1-octen-3-one, trans-2-nonenal, 2-isobutyl-3-methoxypyrazine (IBMP), ethyl decanoate, methyl salicylate, dimethyl trisulfide, methyl 2-thiofuroate, hexanoic acid, trans,trans-2,4-decadienal, and hexanal.

The VOCs present in a chocolate replica can include compounds as classified by a first set of categories, including hydrocarbons (e.g., alkanes, alkenes, terpenes, isoprenoids, or aromatic hydrocarbons), alcohols, aldehydes, ketones, acids, esters, lactones, phenols, furans, thiophenes, pyrroles, oxazoles, thiazoles, pyridines, pyrazines, amines, sulfur compounds (e.g., alkyl sulfides), and other VOCs (e.g., VOCs that do not belong to any of the above categories). In some embodiments, a chocolate replica can include a hydrocarbon, an alcohol, an aldehyde, a ketone, an acid, an ester, a phenol, a furan, a thiophene, a pyrrole, a pyridine, a pyrazine, an amine, and a sulfur compound. In some embodiments, a chocolate replica can further include a VOC that does not belong to any of the preceding categories. In some embodiments, a chocolate replica can include at least one VOC that belongs to each of at least 3 (e.g., at least 4, at least 5, at least 5, at least 7, at least 8, at least 9, at least 10, 3 to 14, 3 to 10, 3 to 5, 5 to 14, 5 to 10, or 10 to 14) of the following categories: hydrocarbon, an alcohol, an aldehyde, a ketone, an acid, an ester, a phenol, a furan, a thiophene, a pyrrole, a pyridine, a pyrazine, an amine, and a sulfur compound.

The VOCs present in a chocolate replica can include compounds as classified by a second set of categories, including acids, alcohols, aldehydes, amines, benzenes, esters, furans, ketones, lactones, phenols, pyrazines, pyridines, pyrroles, sugars or sugar alcohols, sulfur compounds, terpenes, or thiophenes. In some embodiments, a chocolate replica can include one or more of: an acid, an alcohol, an aldehyde, an ester, a furan, a ketone, a lactone, a phenol, a pyrazine, a pyridine, a pyrrole, a sugar or sugar alcohol, a sulfur compound, a terpene, or a combination thereof. In some embodiments, a chocolate replica can include an acid, an alcohol, an aldehyde, an ester, a furan, a ketone, a lactone, a phenol, a pyrazine, a pyrrole, a sugar or sugar alcohol, a sulfur compound, or a combination thereof. In some embodiments, a chocolate replica can include at least one VOC that belongs to each of at least 3 (e.g., at least 4, at least 5, at least 5, at least 7, at least 8, at least 9, at least 10, at least 15, 3 to 15, 3 to 10, 3 to 5, 5 to 14, 5 to 10, 10 to 15, or 10 to 17) of the following categories: acids, alcohols, aldehydes, amines, benzenes, esters, furans, ketones, lactones, phenols, pyrazines, pyridines, pyrroles, sugars or sugar alcohols, sulfur compounds, terpenes, or thiophenes. In some embodiments, a chocolate replica can include an acid, an alcohol, an aldehyde, an ester, a furan, a ketone, a lactone, a phenol, a pyrazine, a pyrrole, a sugar or sugar alcohol, a sulfur compound.

Hydrocarbons can provide flavors and/or aromas that are important to the general character of chocolate (e.g., alkanes, alkenes, terpenes, isoprenoids, or aromatic hydrocarbons). For example, terpenes and isoprenoids can contribute floral and green characteristics to chocolate. Non-limiting examples of hydrocarbons that may be used in chocolate replicas provided herein include beta-myrcene, styrene, toluene, ocimene, and any combination thereof.

The hydrocarbon(s) can be present in any suitable amount. In some cases, for example, a chocolate replica can contain ocimene in an amount of about 0.001 ppm to about 18 ppm (e.g., about 0.001 to about 0.01 ppm, about 0.01 to about 0.1 ppm, about 0.1 to about 1 ppm, about 1 to about 10 ppm, or about 10 to about 18 ppm). In some cases, a chocolate replica can contain ocimene in an amount, per kg of chocolate replica, of about 1 µg to about 18 mg (e.g., about 1 to about 10 µg, about 10 to about 100 µg, about 100 µg to about 1 mg, about 1 to about 10 mg, or about 10 to about 18 mg). The hydrocarbon(s) can make up any suitable proportion of the overall VOC content. Any suitable number of hydrocarbons can be used. For example, 1 to 3, 1 to 2, at least 1, or at least 2 hydrocarbons can be used.

Terpenes can contribute floral and green characteristics to chocolate. Non-limiting examples of terpenes that may be used in chocolate replicas provided herein include 3-carene, limonene, linalool, myrcene, b-caryophyllene, 2,4,5-trimethylthiazole, and any combination thereof. In some embodiments, a chocolate replica can include one or more (e.g., at least 2 or 3) terpene selected from the group consisting of limonene, linalool, myrcene, and 2,4,5-trimethylthiazole.

The terpene(s) can be present in any suitable amount. In some embodiments, the terpene(s) can be present in an amount of about 0.01 to about 4.0 mg/kg (e.g., about 0.01 to about 1.0 mg/kg, about 1.0 to about 2.0 mg/kg, about 2.0 to about 3.0 mg/kg, or about 3.0 to about 4.0 mg/kg). In some cases, a chocolate replica can contain 2,4,5-trimethylthiazole in an amount of about 0.0000001 ppm to about 10 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain 2,4,5-trimethylthiazole in an amount, per kg of chocolate replica, of about 0.0001 µg to about 10 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 10 mg). The terpene(s) can make up any suitable proportion of the overall VOC content. Any suitable number of terpenes can be used. For example, 1 to 3, 1 to 2, at least 1, or at least 2 terpenes can be used. In some embodiments, a chocolate replica can include no terpenes.

Benzenes can provide flavors and/or aromas that are important to the general character of chocolates. Non-limiting examples of benzenes that may be used in chocolate replicas provided herein include styrene, toluene, and mixtures thereof. The benzene(s) can be present in any suitable amount. The benzene(s) can make up any suitable proportion of the overall VOC content. Any suitable number of benzenes can be used. For example, 1 to 3, 1 to 2, at least 1, or at least 2 benzenes can be used. In some embodiments, a chocolate replica can include no benzenes.

Alcohols can provide various flavor and/or aroma components to chocolate, including banana, spice, grassiness, and oxidized characteristics. Alcohols also can be important for adding roundness to the general aroma of chocolate, as well as some weight on the palate. Non-limiting examples of a alcohols that can be present in the chocolate replicas provided herein include isoamyl alcohol, hexanol, 2-ethyl-1-hexanol, benzyl alcohol, 1-octen-3-ol, 1-propanol, amyl alcohol, 1-heptanol, geraniol, phenethyl alcohol, p-cresol, 2-pentanol, 2-heptanol, 2-octanol, 2-nonanol, 1-octanol, 2-methyl-1-butanol, guaiacol, 2,6-dimethoxyphenol, 2-methoxy-4-vinylphenol, 4-hydroxy-2,5-dimethy-3(2H)-furanone (furaneol), 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 2,3-butanediol, hexyl alcohol (hexanol), para cresol, 1-decanol, 4-carvomenthenol, carvacrol, eugenol, isoeugenol, phenyl propyl alcohol, propanol, 4-methyl-5-thiazoleethanol, 4-methylguaiacol, and any combination thereof. In some embodiments, a chocolate replica as provided herein can include one or more (e.g., at least 2, at least 3, at least 4, at least 5, at least 10, or at least 15) alcohols selected from the group consisting of the group consisting of isoamyl alcohol, hexanol, 2-ethyl-1-hexanol, benzyl alcohol, 1-octen-3-ol, 1-propanol, amyl alcohol, 1-heptanol, geraniol, phenethyl alcohol, p-cresol, 2-pentanol, 2-heptanol, 2-octanol, 2-nonanol, 1-octanol, 2-methyl-1-butanol, guaiacol, 2,6-dimethoxyphenol, 2-methoxy-4-vinylphenol, furaneol, 4-ethylguaiacol, 2-methoxy-4-methylphenol, phenyl methanol (benzyl alcohol), 3-(Z)-hexenol, 3-mercapto hexanol, 2-phenylethanol, phenethyl alcohol, 2,3-butanediol, hexyl alcohol (hexanol), para cresol, 1-decanol, 4-carvomenthenol, carvacrol, eugenol, isoeugenol, and phenyl propyl alcohol. In some embodiments, a chocolate replica as provided herein can include one or more (e.g., at least 2 or 3) alcohols selected from the group consisting of amyl alcohol, 2-methoxy-4-vinylphenol, furaneol, phenyl methanol (benzyl alcohol), 3-(Z)-hexenol, 3-mercapto hexanol, hexyl alcohol (hexanol), 1-octanol, isoamyl alcohol, 2-nonanol, 1-heptanol, para cresol, 1-decanol, propanol, 4-methyl-5-thiazoleethanol, 4-methylguaiacol, and carvacrol. In some cases, a chocolate replica can include one or more (e.g., at least 2, at least 3, at least 4, at least 5, at least 6, at least 7, at least 8, at least 9, or at least 10) alcohols selected from the group consisting of 1-heptanol, 2-ethyl-1-hexanol, 2-methyl-1-butanol, 2-octanol, 2-pentanol, 4-ethylguaiacol, 4-hydroxy-2,5-dimethy-3(2H)-furanone (furaneol), 4-methyl-5-thiazoleethanol, 4-methylguaiacol, benzyl alcohol, eugenol, geraniol, p-cresol, and propanol. In some cases, a chocolate replica can include one or more (e.g., at least 2, at least 3, at least 4, at least 5, at least 6, at least 7, or all 8) alcohols selected from the group consisting of 1-octanol, 1-octen-3-ol, 2-heptanol, 2-nonanol, guaiacol, hexanol, isoamyl alcohol, and phenethyl alcohol (e.g., in combination with one or more of 1-heptanol, 2-ethyl-1-hexanol, 2-methyl-1-butanol, 2-octanol, 2-pentanol, 4-ethylguaiacol, 4-hydroxy-2,5-dimethy-3(2H)-furanone (furaneol), 4-methyl-5-thiazoleethanol, 4-methylguaiacol, benzyl alcohol, eugenol, geraniol, p-cresol, and propanol).

The alcohol(s) can be present in any suitable amount. In some embodiments, the alcohol(s) can be present in an amount of about 0.000005 to about 9.0 mg/kg (e.g., about 0.000005 to about 1.0 mg/kg, about 1.0 to about 2.0 mg/kg, about 2.0 to about 3.0 mg/kg, about 3.0 to about 4.0 mg/kg, about 4.0 to about 5.0 mg/kg, about 5.0 to about 6.0 mg/kg, or about 6.0 to about 9.0 mg/kg).

In some cases, a chocolate replica can contain 4-methyl-5-thiazoleethanol in an amount of about 0.1 ppm to about 50 ppm (e.g., about 0.1 to about 1 ppm, about 1 to about 10 ppm, about 10 to about 20 ppm, about 20 to about 30 ppm, about 30 to about 40 ppm, or about 40 to about 50 ppm). In some cases, a chocolate replica can contain 4-methyl-5-thiazoleethanol in an amount, per kg of chocolate replica, of about 100 µg to about 50 mg (e.g., about 100 µg to about 1 mg, about 1 to about 10 mg, about 10 to about 20 mg, about 20 to about 30 mg, about 30 to about 40 mg, or about 40 to about 50 mg).

In some cases, a chocolate replica can contain 4-methylguaiacol in an amount of about 0.00000001 ppm to about 25 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, about 10 to about 20 ppm, or about 20 to about 25 ppm). In some cases, a chocolate replica can contain 4-methylguaiacol in an amount, per kg of chocolate replica, about 0.00001 µg to about 25 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, about 10 to about 20 mg, or about 20 to about 25 mg).

In some cases, a chocolate replica can contain 1-heptanol in an amount of about 0.00001 ppm to about 10 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain 1-heptanol in an amount, per kg of chocolate replica, of about 0.01 µg to about 10 mg (e.g., about 0.01 to about 0.1 µg, about 0.1 to about 1 µg, about 1 to about 10 µg, about 10 to about 100 µg, about 100 µg to about 1 mg, or about 1 to about 10 mg).

In some cases, a chocolate replica can contain 2-ethyl-1-hexanol in an amount of about 0.00000001 ppm to about 30 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 30 ppm). In some cases, a chocolate replica can contain 2-ethyl-1-hexanol in an amount, per kg of chocolate replica, of about 0.00001 µg to about 30 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, to about 10 to about 30 mg).

In some cases, a chocolate replica can contain 2-methyl-1-butanol in an amount of about 0.000001 ppm to about 8 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 8 ppm). In some cases, a chocolate replica can contain 2-methyl-1-butanol in an amount, per kg of chocolate replica, of about 0.001 µg to about 8 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 8 mg).

In some cases, a chocolate replica can contain 2-octanol in an amount of about 0.000001 ppm to about 18 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 18 ppm). In some cases, a chocolate replica can contain 2-octanol in an amount, per kg of chocolate replica, of about 0.001 µg to about 18 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 18 mg).

In some cases, a chocolate replica can contain 2-pentanol in an amount of about 0.00000001 ppm to about 5 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 5 ppm). In some cases, a chocolate replica can contain 2-pentanol in an amount, per kg of chocolate replica, of about 0.00001 µg to about 5 mg (e.g., 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 5 mg).

In some cases, a chocolate replica can contain 4-ethylguaiacol in an amount of about 0.00000001 ppm to about 30 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 30 ppm). In some cases, a chocolate replica can contain 4-ethylguaiacol in an amount, per kg of chocolate replica, of about 0.00001 µg to about 30 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 30 mg).

In some cases, a chocolate replica can contain 4-hydroxy-2,5-dimethy-3(2H)-furanone (furaneol) in an amount of about 0.000001 ppm to about 100 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 100 ppm). In some cases, a chocolate replica can contain 4-hydroxy-2,5-dimethyl-3(2H)-furanone in an amount, per kg of chocolate replica, of about 0.001 µg to about 100 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 100 mg).

In some cases, a chocolate replica can contain benzyl alcohol in an amount of about 0.001 ppm to about 180 ppm (e.g., about 0.001 to about 0.01 ppm, about 0.01 to about 0.1 ppm, about 0.1 to about 1 ppm, about 1 to about 10 ppm, about 10 to about 100 ppm, or about 100 to about 180 ppm). In some cases, a chocolate replica can contain benzyl alcohol in an amount, per kg of chocolate replica, of about 1 µg to about 180 mg (e.g., about 1 to about 10 µg, about 10 to about 100 µg, about 100 µg to about 1 mg, about 1 to about 10 mg, about 10 to about 100 mg, or about 100 to about 180 mg).

In some cases, a chocolate replica can contain eugenol in an amount of about 0.1 ppm to about 100 ppm (e.g., about 0.1 to about 1 ppm, about 1 to about 10 ppm, about 10 to about 50 ppm, or about 50 to about 100 ppm). In some cases, a chocolate replica can contain eugenol in an amount, per kg of chocolate replica, of about 100 µg to about 100 mg (e.g., about 100 µg to about 1 mg, about 1 to about 10 mg, about 10 to about 50 mg, or about 50 to about 100 mg).

In some cases, a chocolate replica can contain geraniol in an amount of about 0.001 ppm to about 30 ppm (e.g., about 0.001 to about 0.01 ppm, about 0.01 to about 0.1 ppm, about 0.1 to about 1 ppm, about 1 to about 10 ppm, or about 10 to about 30 ppm). In some cases, a chocolate replica can contain geraniol in an amount, per kg of chocolate replica, of about 1 µg to about 30 mg (e.g., about 1 to about 10 µg, about 10 to about 100 µg, about 100 µg to about 1 mg, about 1 to about 10 mg, or about 10 to about 30 mg).

In some cases, a chocolate replica can contain p-cresol in an amount of about 0.000001 ppm to about 10 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm. In some cases, a chocolate replica can contain p-cresol in an amount, per kg of chocolate replica, of about 0.001 µg to about 10 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 10 mg).

In some cases, a chocolate replica can contain propanol in an amount of about 0.001 ppm to about 175 ppm (e.g., about 0.001 to about 0.01 ppm, about 0.01 to about 0.1 ppm, about 0.1 to about 1 ppm, about 1 to about 10 ppm, about 10 to about 100 ppm, or about 100 to about 175 ppm). In some cases, a chocolate replica can contain propanol in an amount, per kg of chocolate replica, of about 1 µg to about 175 mg (e.g., about 1 to about 10 µg, about 10 to about 100 µg, about 100 µg to about 1 mg, about 1 to about 10 mg, about 10 to about 100 mg, or about 100 to about 175 mg).

The alcohol(s) can make up any suitable proportion of the overall VOC content. Any suitable number of alcohols can be used. For example, at least one alcohol can be used. In some embodiments, a chocolate replica can include no alcohols.

Aldehydes can provide flavors and/or aromas that are important to the general character of chocolate. Non-limiting examples of aldehydes that may be used in chocolate replicas provided herein include vanillin, isobutyraldehyde, valeraldehyde, phenylacetaldehyde, trans,tran-2,4-decadienal, 4-methyl-2-phenyl-2-pentenal, 2-isopropyl-5-methyl-2-hexenal, nonanal, trans-2-nonenal, 2-methylbutyraldehyde, hexanal, decanal, vanillin propylene glycol acetal, isovaleraldehyde, 2-phenyl-2-butenal, 5-methyl-2-phenyl-2-hexenal, octanal, furfural, benzaldehyde, 5-methylfurfural, 2-phenylpropionaldehyde, cocoa hexenal, vanillin erythro and threo-butan-2,3-diol acetal, isodihydrolavandulal, trans,trans-2,4-decadienal, 2-methoxycinnamaldehyde, cuminaldehyde, 2-(E)-hexenal, propenal, 3-methylbutyraldehyde, and any combination thereof. In some embodiments, a chocolate replica as provided herein can include one or more (e.g., at least 2, at least 3, at least 4, at least 5, at least 10, or at least 15) aldehydes selected from the group consisting of vanillin, isobutyraldehyde, valeraldehyde, phenylacetaldehyde, trans,tran-2,4-decadienal, 4-methyl-2-phenyl-2-pentenal, 2-isopropyl-5-methyl-2-hexenal, nonanal, trans-2-nonenal, 2-methylbutyraldehyde, hexanal, decanal, vanillin propylene glycol acetal, isovaleraldehyde, 2-phenyl-2-butenal, 5-methyl-2-phenyl-2-hexenal, octanal, furfural, benzaldehyde, 5-methylfurfural, 2-phenylpropionaldehyde, cocoa hexenal, vanillin erythro and threo-butan-2,3-diol acetal, isodihydrolavandulal, trans,trans-2,4-decadienal, 2-methoxycinnamaldehyde, cuminaldehyde, 2-(E)-hexenal, propenal, and 3-methylbutyraldehyde. In some embodiments, a chocolate replica as provided herein can include one or more (e.g., at least 2, at least 3, or at least 4) aldehydes selected from the group consisting of vanillin, isobutyraldehyde, isovaleraldehyde, p-anisaldehyde, and valeraldehyde. In some cases, a chocolate replica can include one or more (e.g., at least 2, at least 3, at least 4, at least 5, or at least 8) aldehydes selected from the group consisting of 2-isopropyl-5-methyl-2-hexenal, 2-methylbutyraldehyde, 2-phenyl-2-butenal, 2-phenylpropionaldehyde, 3-methylbutyraldehyde, 4-methyl-2-phenyl-2-pentenal, octanal, propenal, trans-2-nonenal, and vanillin propylene glycol acetal. In some cases, a chocolate replica can include one or more (e.g., at least 2, at least 3, at least 4, at least 5, or at least 8) aldehydes selected from the group consisting of 2-methylbutyraldehyde, 5-methyl-2-phenyl-2-hexenal, benzaldehyde, decanal, furfural, hexanal, isovaleraldehye, nonanal, phenylacetaldehyde, trans,trans-2,4-decadienal, and valeraldehyde (e.g., in combination with one or more of 2-isopropyl-5-methyl-2-hexenal, 2-methylbutyraldehyde, 2-phenyl-2-butenal, 2-phenylpropionaldehyde, 3-methylbutyraldehyde, 4-methyl-2-phenyl-2-pentenal, octanal, propenal, trans-2-nonenal, and vanillin propylene glycol acetal).

The aldehyde(s) can be present in any suitable amount. In some embodiments, the aldehyde(s) can be present in an amount of about 0.05 to about 70 mg/kg (e.g., about 0.05 to about 10 mg/kg, about 10 to about 30 mg/kg, about 30 to about 40 mg/kg, or about 40 to about 70 mg/kg).

In some cases, a chocolate replica can contain 2-isopropyl-5-methyl-2-hexenal in an amount of about 0.000001 ppm to about 5 ppm (e.g., about 0.000001 to about 0.00001 ppm, about 0.0001 to about 0.0001 ppm, about 0.0001 to about 0.001 ppm, about 0.001 to about 0.01 ppm, about 0.01 to about 0.1 ppm, about 0.1 to about 1 ppm, or about 1 to about 5 ppm). In some cases, a chocolate replica can contain 2-isopropyl-5-methyl-2-hexenal in an amount, per kg of chocolate replica, of about 0.001 µg to about 5 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 5 mg).

In some cases, a chocolate replica can contain 2-methylbutyraldehyde in an amount of about 0.001 ppm to about 50 ppm (e.g., about 0.001 to about 0.01 ppm, about 0.01 to about 0.1 ppm, about 0.1 to about 1 ppm, about 1 to about 10 ppm, or about 10 to about 50 ppm). In some cases, a chocolate replica can contain 2-methylbutyraldehyde in an amount, per kg of chocolate replica, of about 1 µg to about 50 mg (e.g., about 1 to about 10 µg, about 10 to about 100 µg, about 100 µg to about 1 mg, about 1 to about 10 mg, or about 10 to about 50 mg).

In some cases, a chocolate replica can contain 2-phenyl-2-butenal in an amount of about 0.000001 ppm to about 15 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 15 ppm). In some cases, a chocolate replica can contain 2-phenyl-2-butenal in an amount, per kg of chocolate replica, of about 0.001 µg to about 15 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 15 mg).

In some cases, a chocolate replica can contain 2-phenylpropionaldehyde in an amount of about 0.000001 ppm to about 8 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 8 ppm). In some cases, a chocolate replica can contain 2-phenylpropionaldehyde in an amount, per kg of chocolate replica, of about 0.001 µg to about 8 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 8 mg).

In some cases, a chocolate replica can contain 4-methyl-2-phenyl-2-pentenal in an amount of about 0.00001 ppm to about 20 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 1 to about 20 ppm). In some cases, a chocolate replica can contain 4-methyl-2-phenyl-2-pentenal in an amount, per kg of chocolate replica, of about 0.01 µg to about 20 mg (e.g., about 0.01 to about 0.1 µg, about 0.1 to about 1 µg, about 1 to about 10 µg, about 10 to about 100 µg, about 100 µg to about 1 mg, about 1 to about 10 mg, or about 10 to about 20 mg).

In some cases, a chocolate replica can contain octanal in an amount of about 0.001 ppm to about 10 ppm (e.g., about 0.001 to about 0.01 ppm, about 0.01 to about 0.1 ppm, about 0.1 to about 1 ppm, or about 1 to about 10 ppm). In some cases, a chocolate replica can contain octanal in an amount, per kg of chocolate replica, of about 1 µg to about 10 mg (e.g., about 1 to about 10 µg, about 10 to about 100 µg, about 100 µg to about 1 mg, or about 1 to about 10 mg).

In some cases, a chocolate replica can contain trans-2-nonenal in an amount of about 0.001 ppm to about 3 ppm (e.g., about 0.001 to about 0.01 ppm, about 0.01 to about 0.1 ppm, about 0.1 to about 1 ppm, or about 1 to about 3 ppm). In some cases, a chocolate replica can contain 2-nonenal in an amount, per kg of chocolate replica, of about 1 µg to about 3 mg (e.g., about 1 to about 10 µg, about 10 to about 100 µg, about 100 µg to about 1 mg, or about 1 to about 3 mg).

In some cases, a chocolate replica can contain vanillin propylene glycol acetal in an amount of about 0.00000001 ppm to about 550 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, about 10 to about 100 ppm, or about 100 to about 550 ppm). In some cases, a chocolate replica can contain vanillin propylene glycol acetal in an amount, per kg of chocolate replica, of about 0.00001 µg to about 550 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, about 10 to about 100 mg, or about 100 to about 500 mg).

In some cases, a chocolate replica can contain 3-methylbutyraldehyde in an amount of about 0.00001 ppm to about 20 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 20 ppm). In some cases, a chocolate replica can contain 3-methylbutyraldehyde in an amount, per kg of chocolate replica, about 0.01 µg to about 20 mg (e.g., about 0.01 to about 0.1 µg, about 0.1 to about 1 µg, about 1 to about 10 µg, about 10 to about 100 µg, about 100 µg to about 1 mg, about 1 to about 10 mg, or about 10 to about 20 mg).

In some cases, a chocolate replica can contain propenal in an amount of about 0.0000001 ppm to about 10 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain propenal in an amount, per kg of chocolate replica, of about 0.0001 µg to about 10 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 10 mg).

The aldehyde(s) can make up any suitable proportion of the overall VOC content. Any suitable number of aldehydes can be used. For example, 1 to 5, 1 to 3, 3 to 5, at least 1, at least 2, at least 3, or at least 4 aldehydes can be used. In some embodiments, a chocolate replica can include no aldehydes.

Ketones can provide flavors and/or aromas that are important to the general character of chocolate. Non-limiting examples of ketones that may be used in chocolate replicas provided herein include 2,3-pentadione, coffee furanone, 5-methyl-2-hepten-4-one, 2,3-butanedione, 3-mercapto-2-butanone, acetophenone, maltol, gamma-nonalactone, 2-undecanone, damascenone, gamma-decalactone, 2-heptanone, 1-octen-3-one, gamma-valerolactone, 4'-methylacetophenone, methyl 2-pyrrolyl ketone, delta-decalactone, 3-octanone, 2-octanone, massoia lactone, 2-nonanone, geranyl acetone, beta-ionone, delta-octalactone, 2,3-hexanedione, acetoin acetate, ethyl maltol, acetoin, filbert heptenone, alpha ionone, gamma decalactone, beta-damascenone, 3,4-hexanedione, 3-methyl-1,2-cyclopentanedione (cyclotene), 6-propyl-5,6-dihydropyran-2-one, and any combination thereof. In some embodiments, a chocolate replica can include one or more (e.g., at least 2, at least 3, at least 4, at least 5, at least 10, or at least 15) one ketones selected from the group consisting of 2,3-pentadione, coffee furanone, 5-methyl-2-hepten-4-one, 2,3-butanedione, 3-mercapto-2-butanone, acetophenone, maltol, gamma-nonalactone, 2-undecanone, damascenone, gamma-decalactone, 2-heptanone, 1-octen-3-one, gamma-valerolactone, 4'-methylacetophenone, methyl 2-pyrrolyl ketone, delta-decalactone, 3-octanone, 2-octanone, massoia lactone, 2-nonanone, geranyl acetone, beta-ionone, delta-octalactone, 2,3-hexanedione, acetoin acetate, ethyl maltol, acetoin, filbert heptenone, alpha ionone, gamma decalactone, beta-damascenone, 3,4- hexanedione, 3-methyl-1,2-cyclopentanedione (cyclotene), and 6-propyl-5,6-dihydropyran-2-one. In some embodiments, a chocolate replica can include one or more (e.g., at least 2, at least 3, at least 4, at least 5, at least 6, at least 7, or at least 8) ketones selected from the group consisting of beta-ionone, maltol, 2,3-pentadione, coffee furanone, 2,3-hexanedione, acetoin acetate, ethyl maltol, acetoin, alpha ionone, 2-heptanone, damascenone, 2-undecanone, acetophenone, and gamma-valerolactone. In some cases, a chocolate replica can include one or more (e.g., at least 2, at least 3, at least 4, at least 5, at least 6, at least 7, at least 8, at least 9, or at least 10) ketones selected from the group consisting of 2,3-butanedione, 2,3-pentadione, 2-octanone, 3-methyl-1,2-cyclopentanedione (cyclotene), 3-octanone, 3,4-hexanedione, 4'-methylacetophenone, 5-methyl-2-hepten-4-one, 6-propyl-5,6-dihydropyran-2-one, acetoin, beta-damascenone, coffee furanone, damascenone, delta-decalactone, and delta-octalactone. In some cases, a chocolate replica can include one or more (e.g., at least 2, at least 3, at least 4, at least 5, at least 6, or at least 7) ketones selected from the group consisting of 1-octen-3-one, 2-heptanone, 2-nonanone, 2-undecanone, beta-ionone, gamma-nonalactone, gamma-valerolactone, and massoia lactone (e.g., in combination with one or more of 2,3-butanedione, 2,3-pentadione, 2-octanone, 3-methyl-1,2-cyclopentanedione (cyclotene), 3-octanone, 3,4-hexanedione, 4'-methylacetophenone, 5-methyl-2-hepten-4-one, 6-propyl-5,6-dihydropyran-2-one, acetoin, beta-damascenone, coffee furanone, damascenone, delta-decalactone, and delta-octalactone).

The ketone(s) can be present in any suitable amount. In some embodiments, the ketone(s) can be present in an amount of about 0.01 to about 10 mg/kg (e.g., about 0.01 to about 1.0 mg/kg, about 1.0 to about 2.0 mg/kg, about 2.0 to about 3.0 mg/kg, about 3.0 to about 4.0 mg/kg, about 4.0 to about 5.0 mg/kg, about 5.0 to about 6.0 mg/kg, about 6.0 to about 7.0 mg/kg, about 7.0 to about 8.0 mg/kg, about 8.0 to about 9.0 mg/kg, about 9.0 to about 10.0 mg/kg).

In some cases, a chocolate replica can contain 2,3-butanedione in an amount of about 0.00000001 ppm to about 45 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 45 ppm). In some cases, a chocolate replica can contain 2,3-butanedione in an amount, per kg of chocolate replica, of about 0.00001 µg to about 45 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 45 mg).

In some cases, a chocolate replica can contain 2,3-pentanedione in an amount of about 0.1 ppm to about 14 ppm (e.g., about 0.1 to about 1 ppm, about 1 to about 5 ppm, about 5 to about 10 ppm, or about 10 to about 14 ppm). In some cases, a chocolate replica can contain 2,3-pentanedione in an amount, per kg of chocolate replica, of about 100 µg to about 14 mg (e.g., about 100 µg to about 1 mg, about 1 to about 5 mg, about 5 to about 10 mg, or about 10 to about 14 mg).

In some cases, a chocolate replica can contain 2-octanone in an amount of about 0.00001 ppm to about 20 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 20 ppm). In some cases, a chocolate replica can contain 2-octanone in an amount, per kg of chocolate replica, of about 0.01 µg to about 20 mg (e.g., about 0.01 to about 0.1 µg, about 0.1 to about 1 µg, about 1 to about 10 µg, about 10 to about 100 µg, about 100 µg to about 1 mg, about 1 to about 10 mg, or about 10 to about 20 mg).

In some cases, a chocolate replica can contain 3-octanone in an amount of about 0.0000001 ppm to about 20 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 20 ppm). In some cases, a chocolate replica can contain 3-octanone in an amount, per kg of chocolate replica, of about 0.0001 µg to about 20 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 20 mg).

In some cases, a chocolate replica can contain 4'-methylacetophenone in an amount of about 0.000001 ppm to about 12 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 6 ppm, or about 6 to about 12 ppm). In some cases, a chocolate replica can contain 4'-methylacetophenone in an amount, per kg of chocolate replica, of about 0.001 µg to about 12 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 6 mg, or about 6 to about 12 mg).

In some cases, a chocolate replica can contain 5-methyl-2-hepten-4-one in an amount of about 0.00001 ppm to about 25 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 25 ppm). In some cases, a chocolate replica can contain 5-methyl-2-hepten-4-one in an amount, per kg of chocolate replica, of about 0.01 µg to about 25 mg (e.g., about 0.01 to about 0.1 µg, about 0.1 to about 1 µg, about 1 to about 10 µg, about 10 to about 100 µg, about 100 µg to about 1 mg, about 1 to about 10 mg, or about 10 to about 25 mg).

In some cases, a chocolate replica can contain acetoin in an amount of about 0.00001 ppm to about 55 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 55 ppm). In some cases, a chocolate replica can contain acetoin in an amount, per kg of chocolate replica, of about 0.01 µg to about 55 mg (e.g., about 0.01 to about 0.1 µg, about 0.1 to about 1 µg, about 1 to about 10 µg, about 10 to about 100 µg, about 100 µg to about 1 mg, about 1 to about 10 mg, or about 10 to about 55 mg).

In some cases, a chocolate replica can contain coffee furanone in an amount of about 0.1 ppm to about 14 ppm (e.g., about 0.1 to about 1 ppm, about 1 to about 5 ppm, about 5 to about 10 ppm, or about 10 to about 14 ppm). In some cases, a chocolate replica can contain coffee furanone in an amount, per kg of chocolate replica, of about 100 µg to about 14 mg (e.g., about 100 µg to about 1 mg, about 1 to about 5 mg, about 5 to about 10 mg, or about 10 to about 14 mg).

In some cases, a chocolate replica can contain damascenone in an amount of about 0.000000001 ppm to about 10 ppm (e.g., about 0.000000001 to about 0.00000001 ppm, about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain damascenone in an amount, per kg of chocolate replica, of about 0.000001 µg to about 10 mg (e.g., about 0.000001 to about 0.00001 µg, about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 10 mg).

In some cases, a chocolate replica can contain delta-decalactone in an amount of about 0.001 ppm to about 30 ppm (e.g., about 0.001 to about 0.01 ppm, about 0.01 to about 0.1 ppm, about 0.1 to about 1 ppm, about 1 to about 10 ppm, or about 10 to about 30 ppm). In some cases, a chocolate replica can contain delta-decalactone in an amount, per kg of chocolate replica, of about 1 µg to about 30 mg (e.g., about 1 to about 10 µg, about 10 to about 100 µg, about 100 µg to about 1 mg, about 1 to about 10 mg, or about 10 to about 30 mg).

In some cases, a chocolate replica can contain delta-octalactone in an amount of about 0.001 ppm to about 25 ppm (e.g., about 0.001 to about 0.01 ppm, about 0.01 to about 0.1 ppm, about 0.1 to about 1 ppm, about 1 to about 10 ppm, or about 10 to about 25 ppm). In some cases, a chocolate replica can contain delta-octalactone in an amount, per kg of chocolate replica, of about 1 µg to about 25 mg (e.g., about 1 to about 10 µg, about 10 to about 100 µg, about 100 µg to about 1 mg, about 1 to about 10 mg, or about 10 to about 25 m).

In some cases, a chocolate replica can contain beta-damascenone in an amount of about 0.000000001 ppm to about 10 ppm (e.g., about 0.000000001 to about 0.00000001 ppm, about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain beta-damascenone in an amount, per kg of chocolate replica, of about 0.000001 µg to about 10 mg (e.g., about 0.000001 to about 0.00001 µg, about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 10 mg).

In some cases, a chocolate replica can contain 3,4-hexanedione in an amount of about 0.000001 ppm to about 15 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 15 ppm). In some cases, a chocolate replica can contain 3,4-hexanedione in an amount, per kg of chocolate replica, of about 0.001 µg to about 15 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 15 mg).

In some cases, a chocolate replica can contain 3-methyl-1,2-cyclopentanedione (cyclotene) in an amount of about 0.0000001 ppm to about 20 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 20 ppm). In some cases, a chocolate replica can contain cyclotene in an amount, per kg of chocolate replica, of about 0.0001 µg to about 20 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 20 mg).

In some cases, a chocolate replica can contain 6-propyl-5,6-dihydropyran-2-one in an amount of about 0.000001 ppm to about 8 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 8 ppm). In some cases, a chocolate replica can contain 6-propyl-5,6-dihydropyran-2-one in an amount, per kg of chocolate replica, of about 0.001 µg to about 8 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 8 mg).

The ketone(s) can make up any suitable proportion of the overall VOC content. Any suitable number of ketones can be used. For example, 1 to 8, 1 to 5, 1 to 3, 3 to 8, 3 to 5, 5 to 8, at least 1 at least 2, at least 3, at least 4, or at least 5 ketones can be used. In some embodiments, a chocolate replica can include no ketones.

Acids may contribute to "sour" aromas and/or flavors, which can be important to the general character of chocolate. Acids that may be included in a chocolate replica include, without limitation, isovaleric acid, cinnamic acid, 2-methylbutyric acid, butyric acid, propanoic acid, 3-phenylpropionic acid, isobutyric acid, hexanoic acid, propionic acid, valeric acid, 3-phenylpropionic acid, acetic acid, phenylacetic acid, and any combination thereof. In some embodiments, a chocolate replica can include one or more (e.g., at least 2, at least 3, at least 4, at least 5, at least 6, or at least 7) acids selected from the group consisting of isovaleric acid, cinnamic acid, 2-methylbutyric acid, butyric acid, propanoic acid, 3-phenylpropionic acid, isobutyric acid, hexanoic acid, propionic acid, valeric acid, 3-phenylpropionic acid, acetic acid, and phenylacetic acid. In some embodiments, a chocolate replica can include at one or more (e.g., 2 or 3) acids selected from the group consisting of isovaleric acid, cinnamic acid, 2-methylbutyric acid, butyric acid, propanoic acid, 3-phenylpropionic acid, isobutyric acid, and hexanoic acid. In some cases, a chocolate replica can include one or more (e.g., 2, 3, or 4) acids selected from the group consisting of acetic acid, propionic acid, valeric acid and phenylacetic acid. In some cases, a chocolate replica can include one or more (e.g., 2 or 3) acids selected from the group consisting of hexanoic acid, isobutyric acid, and isovaleric acid (e.g., in combination with one or more of acetic acid, propionic acid, valeric acid and phenylacetic acid).

The acid(s) can be present in any suitable amount. In some embodiments, the acid(s) can be present in an amount of about 0.1 to about 70 mg/kg (e.g., about 0.1 to about 17.5 mg/kg, about 17.5 to about 35 mg/kg, about 35 to about 52.5 mg/kg, or about 52.5 to about 70 mg/kg).

In some cases, a chocolate replica can contain propionic acid in an amount of about 0.001 ppm to about 505 ppm (e.g., about 0.001 to about 0.01 ppm, about 0.01 to about 0.1 ppm, about 0.1 to about 1 ppm, about 1 to about 10 ppm, about 10 to about 100 ppm, or about 100 to about 505 ppm). In some cases, a chocolate replica can contain propionic acid in an amount, per kg of chocolate replica, of about 1 µg to about 505 mg (e.g., about 1 to about 10 µg, about 10 to about 100 µg, about 100 µg to about 1 mg, about 1 to about 10 mg, about 10 to about 100 mg, or about 100 to about 505 mg).

In some cases, a chocolate replica can contain valeric acid in an amount of about 0.0000001 ppm to about 40 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 40 ppm). In some cases, a chocolate replica can contain valeric acid in an amount, per kg of chocolate replica, of about 0.0001 µg to about 40 mg (e.g., 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 40 mg).

In some cases, a chocolate replica can contain phenylacetic acid in an amount of about 0.001 ppm to about 15 ppm (e.g., about 0.001 to about 0.01 ppm, about 0.01 to about 0.1 ppm, about 0.1 to about 1 ppm, about 1 to about 10 ppm, or about 10 to about 15 ppm). In some cases, a chocolate replica can contain phenylacetic acid in an amount, per kg of chocolate replica, of about 1 µg to about 15 mg (e.g., about 1 to about 10 µg, about 10 to about 100 µg, about 100 µg to about 1 mg, about 1 to about 10 mg, or about 10 to about 15 mg).

In some cases, a chocolate replica can contain acetic acid in an amount of about 0.0001 ppm to about 6000 ppm (e.g., about 0.0001 to about 0.001 ppm, about 0.001 to about 0.01 ppm, about 0.01 to about 0.1 ppm, about 0.1 to about 1 ppm, about 1 to about 10 ppm, about 10 to about 100 ppm, about 100 to about 1000 ppm, or about 1000 to about 6000 ppm). In some cases, a chocolate replica can contain acetic acid in an amount, per kg of chocolate replica, of about 0.1 µg to about 6 g (e.g., about 0.1 to about 10 µg, about 10 to about 100 µg, about 100 µg to about 1 mg, about 1 to about 10 mg, about 10 to about 100 mg, about 100 mg to about 1 g, or about 1 g to about 6 g).

The acid(s) can make up any suitable proportion of the overall VOC content. Any suitable number of acids can be used. For example, 1 to 2, at least 1, or at least 2 acids can be used. In some embodiments, a chocolate replica can include no acids.

Esters, including ethyl, methyl, and acetate esters, can contribute to the fruity and floral characteristics of a chocolate. Esters that may be used in a chocolate replica include, without limitation ethyl laurate, diethyl succinate, ethyl butyrate, ethyl 2-methylbutyrate, methyl butyrate, 2-methylbutyl isovalerate, ethyl hexanoate, methyl 2-methylbutyrate, ethyl isobutyrate, hexyl acetate, ethyl phenylacetate, geranyl acetate, methyl para-anisate, ethyl lactate, isoamyl isobutyrate, ethyl heptanoate, butyl butyrate, isoamyl acetate, isobutyl acetate, benzyl acetate, butyl acetate, furfuryl acetate, hexyl isobutyrate, methyl benzoate, ethyl 3-hydroxybutanoate, ethyl-2-methylbutyrate, furfuryl propionate, isoamyl phenylacetate, dibutyl maleate, ethyl isovalerate, amyl acetate, isoamyl butyrate, phenethyl acetate, ethyl cinnamate, tetrahydrofurfuryl phenylacetate, ethyl acetate, ethyl octanoate, ethyl decanoate, methyl phenylacetate, ethyl 3-phenylpropionate, tricyclodecenyl isobutyrate, prenyl benzoate, ethyl benzoate, methyl salicylate, methyl 2-thiofuroate, isoamyl benzoate, propyl-2-furoate, methyl p-anisate, ethyl butanoate, and any combination thereof. In some embodiments, a chocolate replica can include one or more (e.g., at least 2, at least 3, at least 4, at least 5, at least 10, at least 15, at least 20, at least 25, at least 30, at least 35, or at least 40) esters selected from the group consisting of ethyl laurate, diethyl succinate, ethyl butyrate, ethyl 2-methylbutyrate, methyl butyrate, 2-methylbutyl isovalerate, ethyl hexanoate, methyl 2-methylbutyrate, ethyl isobutyrate, hexyl acetate, ethyl phenylacetate, geranyl acetate, methyl para-anisate, ethyl lactate, isoamyl isobutyrate, ethyl heptanoate, butyl butyrate, isoamyl acetate, isobutyl acetate, benzyl acetate, butyl acetate, furfuryl acetate, hexyl isobutyrate, methyl benzoate, ethyl 3-hydroxybutanoate, ethyl-2-methylbutyrate, furfuryl propionate, isoamyl phenylacetate, dibutyl maleate, ethyl isovalerate, amyl acetate, isoamyl butyrate, phenethyl acetate, ethyl cinnamate, tetrahydrofurfuryl phenylacetate, ethyl acetate, ethyl octanoate, ethyl decanoate, methyl phenylacetate, ethyl 3-phenylpropionate, tricyclodecenyl isobutyrate, prenyl benzoate, ethyl benzoate, methyl salicylate, methyl 2-thiofuroate, isoamyl benzoate, propyl-2-furoate, methyl p-anisate, and ethyl butanoate. In some embodiments, a chocolate replica can include one or more (e.g., at least 2, at least 3, at least 4, at least 5, at least 7, at least 9, at least 10, at least 11, or at least 13) esters selected from the group consisting of ethyl laurate, diethyl succinate, ethyl butyrate, ethyl 2-methylbutyrate, methyl butyrate, 2-methylbutyl isovalerate, ethyl hexanoate, methyl 2-methylbutyrate, ethyl isobutyrate, hexyl acetate, ethyl phenylacetate, geranyl acetate, methyl para-anisate, ethyl lactate, isoamyl isobutyrate, ethyl heptanoate, butyl butyrate, isoamyl acetate, isobutyl acetate, benzyl acetate, butyl acetate, furfuryl acetate, hexyl isobutyrate, methyl benzoate, ethyl 3-hydroxybutanoate, and ethyl-2-methylbutyrate. In some cases, a chocolate replica can include one or more (e.g., at least 2, at least 3, at least 4, at least 5, at least 7, at least 9, at least 10, at least 15, or at least 20) esters selected from the group consisting of amyl acetate, ethyl-2-methylbutyrate, ethyl 3-phenylpropionate, ethyl acetate, ethyl butanoate, ethyl isobutyrate, ethyl isovalerate, furfuryl acetate, furfuryl propionate, hexyl isobutyrate, isoamyl benzoate, isoamyl butyrate, isoamyl phenylacetate, methyl 2-thiofuroate, methyl butyrate, methyl p-anisate, methyl phenylacetate, prenyl benzoate, propyl 2-furoate, tetrahydrofurfuryl phenylacetate, and tricyclodecenyl isobutyrate. In some embodiments, a chocolate replica can include one or more (e.g., at least 2, at least 3, at least 4, at least 5, at least 7, at least 9, at least 10, at least 15, or at least 18) esters selected from the group consisting of 2-methylbutyl isovalerate, benzyl acetate, butyl acetate, diethyl succinate, ethyl benzoate, ethyl cinnamate, ethyl decanoate, ethyl heptanoate, ethyl hexanoate, ethyl lactate, ethyl laurate, ethyl octanoate, ethyl phenylacetate, geranyl acetate, hexyl acetate, isoamyl acetate, isoamyl isobutyrate, isobutyl acetate, methyl salicylate, and phenethyl acetate (e.g., in combination with one or more of amyl acetate, ethyl-2-methylbutyrate, ethyl 3-phenylpropionate, ethyl acetate, ethyl butanoate, ethyl isobutyrate, ethyl isovalerate, furfuryl acetate, furfuryl propionate, hexyl isobutyrate, isoamyl benzoate, isoamyl butyrate, isoamyl phenylacetate, methyl 2-thiofuroate, methyl butyrate, methyl p-anisate, methyl phenylacetate, prenyl benzoate, propyl 2-furoate, tetrahydrofurfuryl phenylacetate, and tricyclodecenyl isobutyrate).

The ester(s) can be present in any suitable amount. In some embodiments, the ester(s) can be present in an amount of about 0.001 to about 50 mg/kg (e.g., about 0.001 to about 0.005 mg/kg, about 0.005 to about 0.01 mg/kg, about 0.01 to about 0.05 mg/kg, about 0.05 to about 0.1 mg/kg, about 0.1 to about 0.5 mg/kg, about 0.5 to about 1 mg/kg, about 1 to about 5 mg/kg, about 5 to about 10 mg/kg, about 10 to about 50 mg/kg).

In some cases, a chocolate replica can contain amyl acetate in an amount of about 0.1 ppm to about 180 ppm (e.g., about 0.1 to about 1 ppm, about 1 to about 10 ppm, about 10 to about 100 ppm, or about 100 to about 180 ppm). In some cases, a chocolate replica can contain amyl acetate in an amount, per kg of chocolate replica, of about 100 µg to about 180 mg (e.g., about 100 µg to about 1 mg, about 1 to about 10 mg, about 10 to about 100 mg, or about 100 to about 180 mg).

In some cases, a chocolate replica can contain ethyl 2-methylbutyrate in an amount of about 0.001 ppm to about 35 ppm (e.g., about 0.001 to about 0.01 ppm, about 0.01 to about 0.1 ppm, about 0.1 to about 1 ppm, about 1 to about 10 ppm, or about 10 to about 35 ppm). In some cases, a chocolate replica can contain ethyl 2-methylbutyrate in an amount, per kg of chocolate replica, of about 1 µg to about 35 mg (e.g., about 1 to about 10 µg, about 10 to about 100 µg, about 100 µg to about 1 mg, about 1 to about 10 mg, or about 10 to about 35 mg).

In some cases, a chocolate replica can contain ethyl 3-phenylpropionate in an amount of about 0.001 ppm to about 10 ppm (e.g., about 0.001 to about 0.01 ppm, about 0.01 to about 0.1 ppm, about 0.1 to about 1 ppm, or about 1 to about 10 ppm). In some cases, a chocolate replica can contain ethyl 3-phenylpropionate in an amount, per kg of chocolate replica, of about 1 µg to about 10 mg (e.g., about 1 to about 10 µg, about 10 to about 100 µg, about 100 µg to about 1 mg, or about 1 to about 10 mg).

In some cases, a chocolate replica can contain ethyl acetate in an amount of about 0.001 ppm to about 5050 ppm (e.g., about 0.001 to about 0.01 ppm, about 0.01 to about 0.1 ppm, about 0.1 to about 1 ppm, about 1 to about 10 ppm, about 10 to about 100 ppm, about 100 to about 1000 ppm, or about 1000 to about 5050 ppm). In some cases, a chocolate replica can contain ethyl acetate in an amount, per kg of chocolate replica, of about 1 µg to about 5050 mg (e.g., about 1 to about 10 µg, about 10 to about 100 µg, about 100 µg to about 1 mg, about 1 to about 10 mg, about 10 to about 100 mg, about 100 to about 1000 mg, or about 1000 to about 5050 mg).

In some cases, a chocolate replica can contain ethyl isobutyrate in an amount of about 0.001 ppm to about 20 ppm (e.g., about 0.001 to about 0.01 ppm, about 0.01 to about 0.1 ppm, about 0.1 to about 1 ppm, about 1 to about 10 ppm, or about 10 to about 20 ppm). In some cases, a chocolate replica can contain ethyl isobutyrate in an amount, per kg of chocolate replica, of about 1 µg to about 20 mg (e.g., about 1 to about 10 µg, about 10 to about 100 µg, about 100 µg to about 1 mg, about 1 to about 10 mg, or about 10 to about 20 mg).

In some cases, a chocolate replica can contain ethyl isovalerate in an amount of about 0.001 ppm to about 32 ppm (e.g., about 0.001 to about 0.01 ppm, about 0.01 to about 0.1 ppm, about 0.1 to about 1 ppm, about 1 to about 10 ppm, or about 10 to about 32 ppm). In some cases, a chocolate replica can contain ethyl isovalerate in an amount, per kg of chocolate replica, of about 1 µg to about 32 mg (e.g., about 1 to about 10 µg, about 10 to about 100 µg, about 100 µg to about 1 mg, about 1 to about 10 mg, or about 10 to about 32 mg).

In some cases, a chocolate replica can contain furfuryl acetate in an amount of about 0.001 ppm to about 60 ppm (e.g., about 0.001 to about 0.01 ppm, about 0.01 to about 0.1 ppm, about 0.1 to about 1 ppm, about 1 to about 10 ppm, or about 10 to about 60 ppm). In some cases, a chocolate replica can contain furfuryl acetate in an amount, per kg of chocolate replica, of about 1 µg to about 60 mg (e.g., about 1 to about 10 µg, about 10 to about 100 µg, about 100 µg, about 1 mg, about 1 to about 10 mg, or about 10 to about 60 mg).

In some cases, a chocolate replica can contain furfuryl propionate in an amount of about 0.000001 ppm to about 4 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 4 ppm). In some cases, a chocolate replica can contain furfuryl propionate in an amount, per kg of chocolate replica, of about 0.001 µg to about 4 mg (e.g., about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 4 mg).

In some cases, a chocolate replica can contain hexyl isobutyrate in an amount of about 0.001 ppm to about 32 ppm (e.g., about 0.001 to about 0.01 ppm, about 0.01 to about 0.1 ppm, about 0.1 to about 1 ppm, about 1 to about 10 ppm, or about 10 to about 32 ppm). In some cases, a chocolate replica can contain hexyl isobutyrate in an amount, per kg of chocolate replica, of about 1 µg to about 32 mg (e.g., about 1 to about 10 µg, about 10 to about 100 µg, about 100 µg to about 1 mg, about 1 to about 10 mg, or about 10 to about 32 mg).

In some cases, a chocolate replica can contain isoamyl benzoate in an amount of about 0.001 ppm to about 15 ppm (e.g., about 0.001 to about 0.01 ppm, about 0.01 to about 0.1 ppm, about 0.1 to about 1 ppm, about 1 to about 10 ppm, or about 10 to about 15 ppm). In some cases, a chocolate replica can contain isoamyl benzoate in an amount, per kg of chocolate replica, of about 1 µg to about 15 mg (e.g., about 1 to about 10 µg, about 10 to about 100 µg, about 100 µg to about 1 mg, about 1 to about 10 mg, or about 10 to about 15 mg).

In some cases, a chocolate replica can contain isoamyl butyrate in an amount of about 0.001 ppm to about 70 ppm (e.g., about 0.001 to about 0.01 ppm, about 0.01 to about 0.1 ppm, about 0.1 to about 1 ppm, about 1 to about 10 ppm, or about 10 to about 70 ppm). In some cases, a chocolate replica can contain isoamyl butyrate in an amount, per kg of chocolate replica, of about 1 µg to about 70 mg (e.g., about 1 to about 10 µg, about 10 to about 100 µg, about 100 µg to about 1 mg, about 1 to about 10 mg, or about 10 to about 70 mg).

In some cases, a chocolate replica can contain isoamyl phenylacetate in an amount of about 0.001 ppm to about 22 ppm (e.g., about 0.001 to about 0.01 ppm, about 0.01 to about 0.1 ppm, about 0.1 to about 1 ppm, about 1 to about 10 ppm, or about 10 to about 22 ppm). In some cases, a chocolate replica can contain isoamyl phenylacetate in an amount, per kg of chocolate replica, of about 1 µg to about 22 mg (e.g., about 1 to about 10 µg, about 10 to about 100 µg, about 100 µg to about 1 mg, about 1 to about 10 mg, or about 10 to about 22 mg).

In some cases, a chocolate replica can contain methyl 2-thiofuroate in an amount of about 0.00001 ppm to about 5 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 5 ppm). In some cases, a chocolate replica can contain methyl 2-thiofuroate in an amount, per kg of chocolate replica, of about 0.01 µg to about 5 mg (e.g., about 0.01 to about 0.1 µg, about 0.1 to about 1 µg, about 1 to about 10 µg, about 10 to about 100 µg, about 100 µg to about 1 mg, or about 1 to about 5 mg).

In some cases, a chocolate replica can contain methyl butyrate in an amount of about 0.1 ppm to about 40 ppm (e.g., about 0.1 to about 1 ppm, about 1 to about 10 ppm, about 10 to about 20 ppm, about 20 to about 30 ppm, or about 30 to about 40 ppm). In some cases, a chocolate replica can contain methyl butyrate in an amount, per kg of chocolate replica, of about 100 µg to about 40 mg (e.g., about 100 µg to about 1 mg, about 1 to about 10 mg, about 10 to about 20 mg, about 20 to about 30 mg, or about 30 to about 40 mg).

In some cases, a chocolate replica can contain methyl p-anisate in an amount of about 0.001 ppm to about 12 ppm (e.g., about 0.001 to about 0.01 ppm, about 0.01 to about 0.1 ppm, about 0.1 to about 1 ppm, about 1 to about 6 ppm, or about 6 to about 12 ppm). In some cases, a chocolate replica can contain methyl p-anisate in an amount, per kg of chocolate replica, of about 1 µg to about 12 mg (e.g., about 1 to about 10 µg, about 10 to about 100 µg, about 100 µg to about 1 mg, about 1 to about 6 mg, or about 6 to about 12 mg).

In some cases, a chocolate replica can contain methyl phenylacetate in an amount of about 0.001 ppm to about 53 ppm (e.g., about 0.001 to about 0.01 ppm, about 0.01 to about 0.1 ppm, about 0.1 to about 1 ppm, about 1 to about 10 ppm, or about 10 to about 53 ppm). In some cases, a chocolate replica can contain methyl phenylacetate in an amount, per kg of chocolate replica, of about 1 µg to about 53 mg (e.g., about 1 to about 10 µg, about 10 to about 100 µg, about 100 µg, to about 1 mg, about 1 to about 10 mg, or about 10 to about 53 mg).

In some cases, a chocolate replica can contain prenyl benzoate in an amount of about 0.001 ppm to about 32 ppm (e.g., about 0.001 ppm to about 0.01 ppm, about 0.01 to about 0.1 ppm, about 0.1 to about 1 ppm, about 1 to about 10 ppm, or about 10 to about 32 ppm). In some cases, a chocolate replica can contain prenyl benzoate in an amount, per kg of chocolate replica, of about 1 µg to about 32 mg (e.g., about 1 to about 10 µg, about 10 to about 100 µg, about 100 µg to about 1 mg, about 1 to about 10 mg, or about 10 to about 32 mg).

In some cases, a chocolate replica can contain propyl 2-furoate in an amount of about 0.001 ppm to about 3 ppm (e.g., about 0.001 to about 0.01 ppm, about 0.01 to about 0.1 ppm, about 0.1 to about 1 ppm, or about 1 to about 3 ppm). In some cases, a chocolate replica can contain propyl 2-furoate in an amount, per kg of chocolate replica, of about 1 µg to about 3 mg (e.g., about 1 to about 10 µg, about 10 to about 100 µg, about 100 µg to about 1 mg, or about 1 to about 3 mg).

In some cases, a chocolate replica can contain tetrahydrofurfuryl phenylacetate in an amount of about 0.001 ppm to about 110 ppm (e.g., about 0.001 to about 0.01 ppm, about 0.01 to about 0.1 ppm, about 0.1 to about 1 ppm, about 1 to about 10 ppm, or about 10 to about 110 ppm). In some cases, a chocolate replica can contain tetrahydrofurfuryl phenylacetate in an amount, per kg of chocolate replica, of about 1 µg to about 110 mg (e.g., about 1 to about 10 µg, about 10 to about 100 µg, about 100 µg to about 1 mg, about 1 to about 10 mg, or about 10 to about 110 mg).

In some cases, a chocolate replica can contain tricyclodecenyl isobutyrate in an amount of about 0.1 ppm to about 500 ppm (e.g., about 0.1 to about 1 ppm, about 1 to about 10 ppm, about 10 to about 100 ppm, or about 100 to about 500 ppm). In some cases, a chocolate replica can contain tricyclodecenyl isobutyrate in an amount, per kg of chocolate replica, of about 100 µg to about 500 mg (e.g., about 100 µg to about 1 mg, about 1 to about 10 mg, about 10 to about 100 mg, or about 100 to about 500 mg).

In some cases, a chocolate replica can contain ethyl butanoate in an amount of about 0.001 ppm to about 125 ppm (e.g., about 0.001 to about 0.01 ppm, about 0.01 to about 0.1 ppm, about 0.1 to about 1 ppm, about 1 to about 10 ppm, about 10 to about 100 ppm, or about 100 to about 125 ppm). In some cases, a chocolate replica can contain ethyl butanoate in an amount, per kg of chocolate replica, of about 1 µg to about 125 mg (e.g., about 1 to about 10 µg, about 10 to about 100 µg, about 100 µg to about 1 mg, about 1 to about 10 mg, about 10 to about 100 mg, or about 100 to about 125 mg).

The ester(s) can make up any suitable proportion of the overall VOC content. Any suitable number of esters can be used. For example, 1 to 5, 1 to 3, 3 to 5, at least 1, at least 2, at least 3, or at least 4 esters can be used. In some embodiments, a chocolate replica can include no esters.

Furans can provide flavors and/or aromas that are important to the general character of chocolate. Non-limiting examples of furans that may be used in chocolate replicas provided herein include 1-(2-furanyl)-ethanone, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-acetyl-5-methylfuran, 2-ethylfuran, 2-furfuryl acetate, 2-methyl-furan, 2-pentylfuran, 2-vinylfuran, 3-furanmethanol, 3-methyl-furan, 5-methylfurfural, difurfuryl ether, furan, furaneol, furfural, furfuryl alcohol, furfuryl propionate, linalool oxide, and any combination thereof. In some embodiments, a chocolate replica can include one or more (e.g., at least 2, at least 3, at least 4, at least 5, at least 6, at least 7, at least 8, at least 9, or at least 10) furans selected from the group consisting of 2-acetyl-5-methylfuran, 2-ethylfuran, 2-furfuryl acetate, 2-pentylfuran, 5-methylfurfural, difurfuryl ether, furaneol, furfural, furfuryl alcohol, furfuryl propionate, and linalool oxide. In some embodiments, a chocolate replica can include one or more (e.g., at least 2, at least 3, at least 4, at least 5, or at least 6) furans selected from the group consisting of 2-methyl furan, 2-pentylfuran, and 2-acetyl-5-methylfuran, 5-methylfurfural, difurfuryl ether, furaneol, furfural, and furfuryl alcohol. In some cases, a chocolate replica can include one or more (e.g., 2 or 3) of 2-methyl furan, 5-methylfurfural, and linalool oxide. In some cases, a chocolate replica can include one or both of 2-acetyl-5-methylfuran and 2-pentyl furan (e.g., in combination with one or more of 2-methyl furan, 5-methylfurfural, and linalool oxide).

The furan(s) can be present in any suitable amount. In some embodiments, the furan(s) can be present in an amount of about 0.05 to about 5 mg/kg (e.g., about 0.05 to about 1.0 mg/kg, about 1.0 to about 2.0 mg/kg, about 2.0 to about 3.0 mg/kg, about 3.0 to about 4.0 mg/kg, or about 4.0 to about 5.0 mg/kg).

In some cases, a chocolate replica can contain 2-methyl furan in an amount of about 0.0000001 ppm to about 30 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, or about 10 to about 30 ppm). In some cases, a chocolate replica can contain 2-methyl furan in an amount, per kg of chocolate replica, of about 0.0001 µg to about 30 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, or about 10 to about 30 mg).

In some cases, a chocolate replica can contain 5-methylfurfural in an amount of about 0.01 ppm to about 8 ppm (e.g., about 0.1 to about 1 ppm, about 1 to about 2 ppm, about 2 to about 4 ppm, about 4 to about 6 ppm, or about 6 to about 8 ppm). In some cases, a chocolate replica can contain 5-methylfurfural in an amount, per kg of chocolate replica, of about 100 µg to about 8 mg (e.g., about 100 µg to about 1 mg, about 1 to about 2 mg, about 2 to about 4 mg, about 4 to about 6 mg, or about 6 to about 8 mg).

In some cases, a chocolate replica can contain linalool oxide in an amount of about 0.001 ppm to about 13 ppm (e.g., about 0.001 to about 0.01 ppm, about 0.01 to about 0.1 ppm, about 0.1 to about 1 ppm, about 1 to about 7 ppm, or about 7 to about 13 ppm). In some cases, a chocolate replica can contain linalool oxide in an amount, per kg of chocolate replica, of about 1 µg to about 13 mg (e.g., about 1 to about 10 µg, about 10 to about 100 µg, about 100 µg to about 1 mg, about 1 to about 7 mg, or about 7 to about 13 mg).

The furan(s) can make up any suitable proportion of the overall VOC content. Any suitable number of furans can be used, for example, 1 to 12, 1 to 10, 1 to 5, 1 to 3, 3 to 12, 3 to 10, 3 to 5, 5 to 12, 5 to 10, 10 to 12, at least 1, at least 2, at least 3, at least 4, at least 5, at least 6, at least 7, at least 8, at least 9, or at least 10 furans can be used. In some embodiments, a chocolate replica can include no furans.

Thiophenes can provide flavors and/or aromas that are important to the general character of chocolate. A non-limiting examples of a thiophene that may be used in chocolate replicas provided herein is thiophene. The thiophene(s) can be present in any suitable amount. The thiophene(s) can make up any suitable proportion of the overall VOC content. Any suitable number of thiophenes can be used, for example, at least one thiophene can be used. In some embodiments, a chocolate replica can include no thiophenes.

Pyrroles can provide flavors and/or aromas that are important to the general character of chocolate. Non-limiting examples of pyrroles that may be used in chocolate replicas provided herein include 1-(1H-pyrrol-2-yl)-ethanone, 1-(2-furanylmethyl)-1H-pyrrole, 1-ethyl-1H-pyrrole, 1-methyl-1H-pyrrole, 1-methyl-1H-pyrrole-2-carboxaldehyde, 2-acetyl-1-methylpyrrole, 2-acetylpyrrole, indole, pyrrole, and mixtures thereof. In some embodiments, a chocolate replica can include one or more (e.g., 2 or 3) pyrroles selected from the group consisting of 2-acetyl-1-methylpyrrole, 2-acetylpyrrole, and pyrrole. In some embodiments, a chocolate replica can include pyrrole. In some cases, a chocolate replica can include indole. The pyrrole(s) can be present in any suitable amount. In some embodiments, the pyrrole(s) can be present in an amount of about 0.0001 to about 3 mg/kg (e.g., about 0.0001 to about 0.0005 mg/kg, about 0.0005 to about 0.001 mg/kg, about 0.001 to about 0.01 mg/kg, about 0.01 to about 0.05 mg/kg, about 0.05 to about 0.1 mg/kg, about 0.1 to about 0.5 mg/kg, about 0.5 to about 1 mg/kg, about 1 to about 2 mg/kg, about 2 to about 3 mg/kg, or about 1 to about 3 mg/kg). In some cases, a chocolate replica can contain indole in an amount of about 0.0001 ppm to about 3 ppm (e.g., about 0.001 to about 0.01 ppm, about 0.01 to about 0.1 ppm, about 0.1 to about 1 ppm, or about 1 to about 3 ppm). In some cases, a chocolate replica can contain indole in an amount, per kg of chocolate replica, of about 1 µg to about 3 mg (e.g., about 1 to about 10 µg, about 10 to about 100 µg, about 100 µg to about 1 mg, or about 1 to about 3 mg). The pyrrole(s) can make up any suitable proportion of the overall VOC content. Any suitable number of pyrroles can be used. For example, 1 to 6, 1 to 5, 1 to 3, 3 to 6, 3 to 5, at least 1, at least 2, at least 3, at least 4, or at least 5 pyrroles can be used. In some embodiments, a chocolate replica can include no pyrroles.

Oxazoles can provide flavors and/or aromas that are important to the general character of chocolate. The oxazole(s) can be present in any suitable amount. The oxazole(s) can make up any suitable proportion of the overall VOC content. Any suitable number of oxazoles can be used. In some embodiments, a chocolate replica can include no oxazoles.

Thiazoles can provide flavors and/or aromas that are important to the general character of chocolate. The thiazole(s) can be present in any suitable amount. The thiazole(s) can make up any suitable proportion of the overall VOC content. Any suitable number of thiazoles can be used. In some embodiments, a chocolate replica can include no thiazoles.

Pyridines can provide flavors and/or aromas that are important to the general character of chocolate. Non-limiting examples of pyridines that may be used in chocolate replicas provided herein include 1-methyl-1,2,3,6-tetrahydropyridine, 1-methyl-piperidine, 2-acetylpyridine, 2-methyl-pyridine, 3-ethylpyridine, 3-ethyl-pyridine, 3-methyl-pyridine, 3-propyl-pyridine, 3-pyridinol, methyl nicotinate, pyridine, and any combination thereof. In some embodiments, a chocolate replica can include at least one (e.g., 2, 3, or 4) pyridines selected from the group consisting of 2-acetylpyridine, 3-ethylpyridine, methyl nicotinate, and pyridine. In some cases, a chocolate replica can include one or both of 2-acetylpyridine and pyridine. In some embodiments, a chocolate replica can include no 1-methyl-1,2,3,6-tetrahydropyridine.

The pyridine(s) can be present in any suitable amount. In some embodiments, the pyridine(s) can be present in an amount of about 0.08 to about 0.2 mg/kg (e.g., about 0.08 to about 0.1 mg/kg or about 0.1 to about 0.2 mg/kg).

In some cases, a chocolate replica can contain 2-acetylpyridine in an amount of about 0.000000001 ppm to about 6 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 6 ppm). In some cases, a chocolate replica can contain 2-acetylpyridine in an amount, per kg of chocolate replica, of about 0.00001 µg to about 6 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 6 mg).

In some cases, a chocolate replica can contain pyridine in an amount of about 0.00001 ppm to about 5 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 5 ppm). In some cases, a chocolate replica can contain pyridine in an amount, per kg of chocolate replica, of about 0.01 µg to about 5 mg (e.g., about 0.01 to about 0.1 µg, about 0.1 to about 1 µg, about 1 to about 10 µg, about 10 to about 100 µg, about 100 µg to about 1 mg, or about 1 to about 5 mg).

The pyridine(s) can make up any suitable proportion of the overall VOC content. Any suitable number of pyridines can be used. For example, 1 to 8, 1 to 5, 1 to 3, 3 to 8, 3 to 5, 5 to 8, at least 1, at least 2, at least 3, at least 4, or at least 6 pyridines can be used. In some embodiments a chocolate replica can include no pyridines.

Pyrazines can provide flavors and/or aromas that are important to the general character of chocolate. Non-limiting examples of pyrazines that may be used in chocolate replicas provided herein include 2-(n-propyl)-pyrazine, 2,3-diethyl-5-methylpyrazine, 2,3-diethylpyrazine, 2,5-dimethylpyrazine, 2,5-dimethylpyrazine, 2,6-diethyl-pyrazine, 2,6-dimethylpyrazine, 2,6-dimethylpyrazine, 2-ethoxy-3-methylpyrazine, 2-ethyl-3-methylpyrazine, 2-ethyl-6-methylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, 3,5-diethyl-2-methylpyrazine, 3-ethyl-2,5-dimethylpyrazine, ethyl-pyrazine, isopropenyl pyrazine, methylpyrazine, pyrazine, 2-ethyl-3,5-dimethylpyrazine, 2-ethyl-3,6-dimethylpyrazine, 2-ethyl-5-methylpyrazine, 2-ethylene-6-methylpyrazine, and any combination thereof. In some embodiments, a chocolate replica can include one or more (e.g., at least 2, at least 3, at least 4, at least 5, at least 7, at least 9, or at least 11) pyrazines selected from the group consisting of 2,6-dimethylpyrazine, isopropenyl pyrazine, 2,3,5-trimethylpyrazine, 2,3-dimethylpyrazine, 2-ethyl-3-methylpyrazine, 2-methylpyrazine, 2-ethylpyrazine, 2-isobutyl-3-methoxypyrazine, 2,3-diethyl-5-methylpyrazine, 2-ethoxy-3-methyl pyrazine, 2,3-dimethylpyrazine, 2,3-diethylpyrazine, 2-methylpyrazine, 2,5-dimethylpyrazine, 2-methoxypyrazine, 2-isopropyl-3-methoxypyrazine, 2-ethyl-3,5-dimethylpyrazine, 2-ethyl-3,6-dimethylpyrazine, 2-ethyl-5-methylpyrazine, and 2-ethylene-6-methylpyrazine. In some embodiments, a chocolate replica can include one or more (e.g., at least 2, at least 3, at least 4, at least 5, at least 6, at least 7, at least 8, or at least 9) pyrazines selected from the group consisting of 2,6-dimethylpyrazine, isopropenyl pyrazine, 2,3,5-trimethylpyrazine, 2,3-dimethylpyrazine, 2-ethyl-3-methylpyrazine, 2-methylpyrazine, and 2-ethylpyrazine. In some cases, a chocolate replica can include one or more (e.g., at least 2, at least 3, at least 4, at least 5, at least 6, at least 7, at least 8, at least 9, or at least 10) pyrazines selected from the group consisting of 2,3,5-trimethyl-6-ethylpyrazine, 2,3-diethylpyrazine, 2-ethoxy-3-methyl pyrazine, 2-ethyl-3,5-dimethylpyrazine, 2-ethyl-3,6-dimethylpyrazine, 2-ethyl-5-methylpyrazine, 2-ethyl-6-methylpyrazine, 2-ethylene-6-methylpyrazine, 2-isobutyl-3-methoxypyrazine, 2-methoxypyrazine, 3,5-diethyl-2-methylpyrazine, isopropenyl pyrazine, and pyrazine. In some cases, a chocolate replica can include one or more (e.g., at least 2, at least 3, at least 4, at least 5, at least 6, or all 7) pyrazines selected from the group consisting of 2,3-diethyl-5-methylpyrazine, 2,3-dimethylpyrazine, 2,6-dimethylpyrazine, 2-ethyl-3-methylpyrazine, 2-ethylpyrazine, 2-isopropyl-3-methoxypyrazine, and 2-methylpyrazine (e.g., in combination with one or more of 2,3,5-trimethyl-6-ethylpyrazine, 2,3-diethylpyrazine, 2-ethoxy-3-methyl pyrazine, 2-ethyl-3,5-dimethylpyrazine, 2-ethyl-3,6-dimethylpyrazine, 2-ethyl-5-methylpyrazine, 2-ethyl-6-methylpyrazine, 2-ethylene-6-methylpyrazine, 2-isobutyl-3-methoxypyrazine, 2-methoxypyrazine, 3,5-diethyl-2-methylpyrazine, isopropenyl pyrazine, and pyrazine).

The pyrazine(s) can be present in any suitable amount. In some embodiments, the pyrazine(s) can be present in an amount of about 0.01 to about 7.0 mg/kg (e.g., about 0.01 to about 1.0 mg/kg, about 1.0 to about 2.0 mg/kg, about 2.0 to about 3.0 mg/kg, about 3.0 to about 4.0 mg/kg, about 4.0 to about 5.0 mg/kg, about 5.0 to about 6.0 mg/kg, or about 6.0 to about 7.0 mg/kg).

In some cases, a chocolate replica can contain 2,3,5-trimethyl-6-ethylpyrazine in an amount of about 0.0000001 ppm to about 10 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain 2,3,5-trimethyl-6-ethylpyrazine in an amount, per kg of chocolate replica, of about 0.0001 µg to about 10 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 10 mg).

In some cases, a chocolate replica can contain 2,3-diethylpyrazine in an amount of about 0.00000001 ppm to about 10 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain 2,3-diethylpyrazine in an amount, per kg of chocolate replica, of about 0.00001 µg to about 10 mg (e.g., about 0.00001 to about 0.0001 µg, about 0.0001 to about 0.001 µg, about 0.001 to about 0.01 µg, about 0.01 to about 0.1 µg, about 0.1 to about 1 µg about 1 to about 10 µg, about 10 to about 100 µg, about 100 µg about 1 mg, or about 1 to about 10 mg).

In some cases, a chocolate replica can contain 2-ethoxy-3-methylpyrazine in an amount of about 0.00000001 ppm to about 5 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 5 ppm). In some cases, a chocolate replica can contain 2-ethoxy-3-methylpyrazine in an amount, per kg of chocolate replica, of about 0.00001 µg to about 5 mg (e.g., about 0.00001 to about 0.0001 µg, about 0.0001 to about 0.001 µg, about 0.001 to about 0.01 µg, about 0.01 to about 0.1 µg, about 0.1 to about 1 µg about 1 to about 10 µg, about 10 to about 100 µg, about 100 µg about 1 mg, or about 1 to about 5 mg).

In some cases, a chocolate replica can contain 2-ethyl-6-methylpyrazine in an amount of about 0.0000001 ppm to about 9 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 9 ppm). In some cases, a chocolate replica can contain 2-ethyl-6-methylpyrazine in an amount, per kg of chocolate replica, of about 0.0001 µg to about 9 mg (e.g., about 0.0001 to about 0.001 µg, about 0.001 to about 0.01 µg, about 0.01 to about 0.1 µg, about 0.1 to about 1 µg about 1 to about 10 µg, about 10 to about 100 µg, about 100 µg about 1 mg, or about 1 to about 9 mg).

In some cases, a chocolate replica can contain 2-isobutyl-3-methoxypyrazine in an amount of about 0.000001 ppm to about 5 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 5 ppm). In some cases, a chocolate replica can contain 2-isobutyl-3-methoxypyrazine in an amount, per kg of chocolate replica, of about 0.001 μg to about 5 mg (e.g., about 0.001 to about 0.01 μg, about 0.01 to about 0.1 μg, about 0.1 to about 1 μg, about 1 to about 10 μg, about 10 to about 100 μg, about 100 μg to about 1 mg, or about 1 to about 5 mg).

In some cases, a chocolate replica can contain 2-methoxypyrazine in an amount of about 0.000001 ppm to about 15 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 7 ppm, or about 7 to about 15 ppm). In some cases, a chocolate replica can contain 2-methoxypyrazine in an amount, per kg of chocolate replica, of about 0.001 μg to about 15 mg (e.g., about 0.001 to about 0.01 μg, about 0.01 to about 0.1 μg, about 0.1 to about 1 μg, about 1 to about 10 μg, about 10 to about 100 μg, about 100 μg to about 1 mg, about 1 to about 7 mg, or about 7 to about 15 mg).

In some cases, a chocolate replica can contain 3,5-diethyl-2-methylpyrazine in an amount of about 0.000001 ppm to about 4 ppm (e.g., about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 4 ppm). In some cases, a chocolate replica can contain 3,5-diethyl-2-methylpyrazine in an amount, per kg of chocolate replica, of about 0.001 μg to about 4 mg (e.g., about 0.001 to about 0.01 μg, about 0.01 to about 0.1 μg, about 0.1 to about 1 μg, about 1 to about 10 μg, about 10 to about 100 μg, about 100 μg to about 1 mg, or about 1 to about 4 mg).

In some cases, a chocolate replica can contain isopropenyl pyrazine in an amount of about 0.001 ppm to about 12 ppm (e.g., about 0.001 to about 0.01 ppm, about 0.01 to about 0.1 ppm, about 0.1 to about 1 ppm, about 1 to about 6 ppm, or about 6 to about 12 ppm). In some cases, a chocolate replica can contain isopropenyl pyrazine in an amount, per kg of chocolate replica, of about 1 μg to about 12 mg (e.g., about 1 to about 10 μg, about 10 to about 100 μg, about 100 μg to about 1 mg, about 1 to about 6 mg, or about 6 to about 12 mg).

In some cases, a chocolate replica can contain pyrazine in an amount of about 0.00001 ppm to about 10 ppm (e.g., about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 10 ppm). In some cases, a chocolate replica can contain pyrazine in an amount, per kg of chocolate replica, of about 0.01 μg to about 10 mg (e.g., about 0.01 to about 0.1 μg, about 0.1 to about 1 μg, about 1 to about 10 μg, about 10 to about 100 μg, about 100 μg to about 1 mg, or about 1 to about 10 mg).

In some cases, a chocolate replica can contain 2-ethyl-3,5-dimethylpyrazine in an amount of about 0.0000001 ppm to about 9 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 9 ppm. In some cases, a chocolate replica can contain 2-ethyl-3,5-dimethylpyrazine in an amount, per kg of chocolate replica, of about 0.0001 μg to about 9 mg (e.g., about 0.0001 to about 0.001 μg, about 0.001 to about 0.01 μg, about 0.01 to about 0.1 μg, about 0.1 to about 1 μg, about 1 to about 10 μg, about 10 to about 100 μg, about 100 μg to about 1 mg, or about 1 to about 9 mg).

In some cases, a chocolate replica can contain 2-ethyl-3,6-dimethylpyrazine in an amount of about 0.0000001 ppm to about 9 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 9 ppm). In some cases, a chocolate replica can contain 2-ethyl-3,6-dimethylpyrazine in an amount, per kg of chocolate replica, of about 0.0001 μg to about 9 mg (e.g., about 0.0001 to about 0.001 μg, about 0.001 to about 0.01 μg, about 0.01 to about 0.1 μg, about 0.1 to about 1 μg, about 1 to about 10 μg, about 10 to about 100 μg, about 100 μg, to about 1 mg, or about 1 to about 9 mg).

In some cases, a chocolate replica can contain 2-ethyl-5-methylpyrazine in an amount of about 0.0000001 ppm to about 9 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 9 ppm). In some cases, a chocolate replica can contain 2-ethyl-5-methylpyrazine in an amount, per kg of chocolate replica, of about 0.0001 μg to about 9 mg (e.g., about 0.0001 to about 0.001 μg, about 0.001 to about 0.01 μg, about 0.01 to about 0.1 μg, about 0.1 to about 1 μg, about 1 to about 10 μg, about 10 to about 100 μg, about 100 μg, to about 1 mg, or about 1 to about 9 mg).

In some cases, a chocolate replica can contain 2-ethylene-6-methylpyrazine in an amount of about 0.0000001 ppm to about 7 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 7 ppm). In some cases, a chocolate replica can contain 2-ethylene-6-methylpyrazine in an amount, per kg of chocolate replica, of about 0.0001 μg to about 7 mg (e.g., about 0.0001 to about 0.001 μg, about 0.001 to about 0.01 μg, about 0.01 to about 0.1 μg, about 0.1 to about 1 μg, about 1 to about 10 μg, about 10 to about 100 μg, about 100 μg to about 1 mg, or about 1 to about 7 mg).

Any suitable number of pyrazines can be used. For example, 1 to 12, 1 to 10, 1 to 5, 1 to 3, 3 to 12, 3 to 10, 3 to 5, 5 to 12, 5 to 10, 10 to 12, at least 1, at least 2, at least 3, at least 4, at least 5, at least 6, at least 7, at least 8, at least 9, or at least 10 pyrazines can be used.

The pyrazine(s) can make up any suitable proportion of the overall VOC content. In some embodiments, chocolate replicas as described herein can have a greater amount (e.g., in a chocolate replica, in mg/kg) (e.g., at least 1.5-fold, at least 2-fold, at least 2.5-fold, at least 3-fold, at least 4-fold, at least 5-fold, at least 8-fold, at least 10-fold, at least 15-fold, or at least 20-fold) of pyrazines than a corresponding traditional chocolate product. In some embodiments, a chocolate replica can include no pyrazines.

Amines can provide flavors and/or aromas that are important to the general character of chocolate. Non-limiting examples of amines that may be used in chocolate replicas provided herein include 2-amino-1-naphthalenol, 2-methoxy-benzenamine, 5-amino-1-naphthol, N,N-dimethyl-ethanamine, and N,N-dimethyl-methylamine, and mixtures thereof. The amine(s) can be present in any suitable amount. The amine(s) can make up any suitable proportion of the overall VOC content. Any suitable number of amines can be used, for example, 1 to 2, at least 1, or at least 2 amines can be used. In some embodiments, a chocolate replica can include no amines.

Sulfur compounds (e.g., alkyl sulfides) can provide flavors and/or aromas that are important to the general character of chocolate. Non-limiting examples of sulfur compounds that may be used in chocolate replicas provided are diethyl disulfide, dimethyl disulfide, dimethyl sulfide, dimethyl sulfoxide, dimethyl trisulfide, methanethiol, and methional, 4,5-dimethyl-2-ethyl-3-thiazoline, furfuryl mercaptan, and any combination thereof. In some embodiments, a chocolate replica can include one or more (e.g., at least 2, at least 3, at least 4, at least 5, or at least 6) sulfur compounds selected from the group consisting of diethyl disulfide, dimethyl sulfide, dimethyl sulfoxide, dimethyl trisulfide, methanethiol, methional, 4,5-dimethyl-2-ethyl-3-thiazoline, and furfuryl mercaptan. In some embodiments, a chocolate replica can include one or both of dimethyl trisulfide and methanethiol. In some cases, a chocolate replica can include one or more (e.g., 2 or 3) of 4,5-dimethyl-2-ethyl-3-thiazoline, furfuryl mercaptan, and methional. In some cases, a chocolate replica can include dimethyl trisulfide (e.g., in combination with one or more of 4,5-dimethyl-2-ethyl-3-thiazoline, furfuryl mercaptan, and methional).

The sulfur compound(s) can be present in any suitable amount. In some embodiments, the sulfur compound(s) can be present in an amount of about 0.0000007 to about 0.03 mg/kg (e.g., about 0.0000007 to about 0.000001 mg/kg, about 0.000001 to about 0.000005 mg/kg, about 0.000005 to about 0.00001 mg/kg, about 0.00001 to about 0.00005 mg/kg, about 0.00005 to about 0.0001 mg/kg, about 0.0001 to about 0.0005 mg/kg, about 0.0005 to about 0.001 mg/kg, about 0.001 to about 0.005 mg/kg, about 0.005 to about 0.01 mg/kg, or about 0.01 to about 0.03 mg/kg).

In some cases, a chocolate replica can contain methional in an amount of about 0.0000001 ppm to about 8 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 8 ppm). In some cases, a chocolate replica can contain methional in an amount, per kg of chocolate replica, of about 0.0001 µg to about 8 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 8 mg).

In some cases, a chocolate replica can contain 4,5-dimethyl-2-ethyl-3-thiazoline in an amount of about 0.00000001 ppm to about 12 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 6 ppm, or about 6 to about 12 ppm). In some cases, a chocolate replica can contain 4,5-dimethyl-2-ethyl-3-thiazoline in an amount, per kg of chocolate replica, of about 0.00001 µg to about 12 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 6 mg, or about 6 to about 12 mg).

In some cases, a chocolate replica can contain furfuryl mercaptan in an amount of about 0.0000001 ppm to about 5 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 5 ppm). In some cases, a chocolate replica can contain furfuryl mercaptan in an amount, per kg of chocolate replica, of about 0.0001 µg to about 5 mg (e.g., about 0.0001 to about 0.001 µg, about 0.001 to about 0.01 µg, about 0.01 to about 0.1 µg, 0.1 to about 1 µg, about 1 to about 10 µg, about 10 to about 100 µg, about 100 µg to about 1 mg, or about 1 to about 5 mg).

The sulfur compound(s) can make up any suitable proportion of the overall VOC content. Any suitable number of sulfur compounds can be used. For example, at least 1 sulfur compound can be used. In some embodiments, a chocolate replica can include no sulfur compounds.

Sugars and sugar alcohols can provide flavors and/or aromas that are important to the general character of chocolate. Non-limiting examples of sugars or sugar alcohols that may be used in chocolate replicas provided are ethyl maltol, 3-hydroxy-2-methyl-4H-pyrone-4-one (maltol), and any combination thereof. In some embodiments, a chocolate replica can include one or both of ethyl maltol and maltol. The sugar or sugar alcohol(s) can be present in any suitable amount. In some embodiments, the sugar or sugar alcohol(s) can be present in an amount of about 1.0 to about 3.0 mg/kg (e.g., about 1.0 to about 2.0 mg/kg, or about 2.0 to about 3.0 mg/kg). The sugar or sugar alcohol(s) can make up any suitable proportion of the overall VOC content. Any suitable number of sugar or sugar alcohols can be used, for example, at least 1 sugar or sugar alcohol can be used. In some embodiments, a chocolate replica can include no sugar or sugar alcohols.

Phenols also can provide flavors and/or aromas that are important to the general character of chocolate. Non-limiting examples of phenols that may be used in chocolate replicas provided are phenol, syringol, anethole, (E)-anethole, vanillyl ethyl ether, and any combination thereof. In some embodiments, a chocolate replica can include one or more (e.g., 2, 3, 4, or 5) of phenol, syringol, anethole, (E)-anethole, and vanillyl ethyl ether. The phenol(s) can be present in any suitable amount. In some embodiments, the phenol(s) can be present in an amount of about 0.0001 to about 8000 mg/kg (e.g., about 0.0001 to about 0.001 mg/kg, about 0.001 to about 0.01 mg/kg, about 0.01 to about 0.1 mg/kg, about 0.1 to about 1 mg/kg, about 1 to about 10 mg/kg, about 10 to about 100 mg/kg, about 100 to about 1000 mg/kg, or about 1000 to about 8000 mg/kg).

In some cases, a chocolate replica can contain syringol in an amount of about 0.00000001 ppm to about 8 ppm (e.g., about 0.00000001 to about 0.0000001 ppm, about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 8 ppm). In some cases, a chocolate replica can contain syringol in an amount, per kg of chocolate replica, of about 0.00001 µg to about 8 mg (e.g., about 0.00001 to about 0.0001 µg, about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 8 mg).

In some cases, a chocolate replica can contain vanillyl ethyl ether in an amount of about 0.001 ppm to about 510 ppm (e.g., about 0.001 to about 0.01 ppm, about 0.01 to about 0.1 ppm, about 0.1 to about 1 ppm, about 1 to about 10 ppm, about 10 to about 100 ppm, or about 100 to about 510 ppm). In some cases, a chocolate replica can contain vanillyl ethyl ether in an amount, per kg of chocolate replica, of about 1 µg to about 510 mg (e.g., about 1 to about 10 µg, about 10 to about 100 µg, about 100 µg to about 1 mg, about 1 to about 10 mg, about 10 to about 100 mg, or about 100 to about 510 mg).

In some cases, a chocolate replica can contain phenol in an amount of about 0.0000001 ppm to about 8 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, or about 1 to about 8 ppm). In some cases, a chocolate replica can contain phenol in an amount, per kg of chocolate replica, of about 0.0001 µg to about 8 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, or about 1 to about 8 mg).

In some cases, a chocolate replica can contain (E)-anethole in an amount of about 0.1 ppm to about 170 ppm (e.g., about 0.1 to about 1 ppm, about 1 to about 10 ppm, about 10 to about 50 ppm, about 50 to about 100 ppm, about 100 to about 150 ppm, or about 150 to about 170 ppm). In some cases, a chocolate replica can contain E-anethole in an amount, per kg of chocolate replica, of about 100 µg to about 170 mg (e.g., about 100 µg to about 1 mg, about 1 to about 10 mg, about 10 to about 100 mg, about 100 to about 150 mg, or about 150 to about 170 mg).

In some cases, a chocolate replica can contain anethole in an amount of about 0.0000001 ppm to about 150 ppm (e.g., about 0.0000001 to about 0.000001 ppm, about 0.000001 to about 0.00001 ppm, about 0.00001 to about 0.0001 ppm, about 0.0001 to about 0.001 ppm, about 0.001 to about 0.01 ppm, about 0.01 to about 0.1 ppm, about 0.1 to about 1 ppm, about 1 to about 10 ppm, about 10 to about 100 ppm, or about 100 to about 150 ppm). In some cases, a chocolate replica can contain anethole in an amount, per kg of chocolate replica, of about 0.0001 µg to about 150 mg (e.g., about 0.0001 to about 0.001 µg, about 0.001 to about 0.01 µg, about 0.01 to about 0.1 µg, about 0.1 to about 1 µg, about 1 to about 10 µg, about 10 to about 100 µg, about 100 µg to about 1 mg, about 1 to about 10 mg, about 10 to about 100 mg, or about 100 to about 150 mg).

The phenol(s) can make up any suitable proportion of the overall VOC content. Any suitable number of phenols can be used. For example, at least 1 phenol can be used. In some embodiments, a chocolate replica can include no phenols.

Other VOCs not belonging to the classes above can provide flavors and/or aromas that are important to the general character of chocolate. A non-limiting example of another VOC that may be used in chocolate replicas provided herein is methyl mercapten. The other VOC(s) can be present in any suitable amount. The other VOC(s) can make up any suitable proportion of the overall VOC content. Any suitable number of other VOCs can be used, for example, at least 1 other VOC can be used.

In some cases, the total amount (e.g., in mg/kg of a chocolate replica) of VOCs in a chocolate replica can be greater than the total amount of VOCs in a reference chocolate.

Further, the amount of any particular VOC in a chocolate replica may be different than the amount of that VOC in a corresponding reference chocolate. In some cases, the amount of a VOC in a chocolate replica can be 75% or less (e.g., 70% or less, 60% or less, 50% or less, 40% or less, 30% or less, 20% or less, or 10% or less), by concentration or percent mass, than the amount of the same VOC in a corresponding reference chocolate. In some cases, the amount of a VOC in a chocolate replica can be 125% or more (e.g., 150% or more, 200% or more, or 300% or more), by concentration or percent mass, than the amount of the same VOC in a corresponding reference chocolate.

A chocolate replica can include any appropriate number of VOCs. For example, a chocolate replica can include 1 to 100 (e.g., at least 5, at least 10, at least 20, at least 30, at least 40, at least 50, 1 to 90, 1 to 80, 1 to 70, 1 to 60, 1 to 50, 1 to 40, 1 to 30, 1 to 20, 1 to 10, 1 to 5, 5 to 100, 5 to 90, 5 to 80, 5 to 70, 5 to 60, 5 to 40, 5 to 30, 5 to 20, 5 to 10, 10 to 100, 10 to 90, 10 to 90, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, or 50 to 60) VOCs. In some cases, the number of VOCs in chocolate replica can be less than the number of VOCs in a single reference chocolate.

In some cases, the overall population of VOCs in a chocolate can have less than 95% identity to the VOCs in a corresponding reference chocolate (e.g., from a single region, in a single variety, cultivar, species of plant, batch conditions (e.g., a degree of roast and/or roast conditions), or packaging unit (e.g., a bag)). For example, the VOCs in a chocolate replica can have less than 95%, less than 90%, less than 85%, less than 80%, less than 70%, less than 60%, less than 50%, or less than 40% identity to the population of VOCs in a corresponding reference chocolate. Some chocolate replicas may contain at least 10 (e.g., at least 15, at least 20, at least 25, at least 30, at least 35, at least 40, at least 45, or at least 50) VOCs that are not found in a single reference chocolate. Moreover, some chocolate replicas may contain no more than 55 (e.g., no more than 54, 53, 52, 51, 50, 45, 40, 35, 30, 25, 20, 15, or 10) VOCs that are present in a single reference chocolate. For example, in some embodiments, a chocolate replica can have at least n VOCs and wherein less than n (e.g., n−1, n−2, n−3, n−4, n−5, n−6, n−7, n−8, n−9, n−10, n−15, n−20, and the like, as applicable) of the VOCs are found in a single reference chocolate; in some embodiments, n can be equal to 5, 6, 7, 8, 9, 10, 11, 12, 13, 14, 15, 16, 17, 18, 19, 20, 25, 30, 35, 40, 41, 42, 43, 44, 45, 50, or 55.

In some embodiments, the amount of a particular VOC in a chocolate replica can be an amount, based on concentration or percent composition that is within a range 30% higher and lower than the amount disclosed for that VOC. For example, a VOC can be present in a chocolate replica in an amount that is 70 to 90%, 80 to 100%, 90 to 110%, 100 to 120%, 110 to 130%, 70 to 100%, 80 to 110%, 90 to 120%, or 100 to 130% of an amount for that VOC as disclosed herein.

In some embodiments, a chocolate replica can exclude one or more VOCs.

In some cases, the total amount of VOCs in a chocolate replica can be greater than the total amount of VOCs in a reference chocolate. For example, a chocolate replica can have a total VOC content that is at least 100 mg/kg or more (e.g., 150, 200, 250, 300, 350, 400, 450, 500, 550, 600, 650, 700, 750, 800, 850, 900, 950, 1000 mg/kg, or more). In some embodiments, a chocolate replica can have a total VOC content from the VOCs in Group A that is at least 100 mg/kg or more (e.g., 150, 200, 250, 300, 350, 400, 450, 500, 550, 600, 650, 700, 750, 800, 850, 900, 950, 1000 mg/kg, or more). In some embodiments, a chocolate replica can have a total VOC content from the VOCs in Group B that is at least 100 mg/kg or more (e.g., 150, 200, 250, 300, 350, 400, 450, 500, 550, 600, 650, 700, 750, 800, 850, 900, 950, 1000 mg/kg, or more). In some embodiments, a chocolate replica can have a total VOC content from the VOCs in Group C that is at least 100 mg/kg or more (e.g., 150, 200, 250, 300, 350, 400, 450, 500, 550, 600, 650, 700, 750, 800, 850, 900, 950, 1000 mg/kg, or more).

Non-Volatile Compounds

The chocolate replicas described herein can, in some cases, include at least one non-volatile compound that is not present in a corresponding reference chocolate. Non-limiting examples of non-volatile compounds that may not be present in a corresponding reference chocolate include acetovanillone, adipic acid, AMP, arginine, carnosine, cinnamic acid, citrulline, CMP, coumaric acid, cysteine, cystine, epicatechin, epicatechin gallate, GABA, glucosamine, glutamine, guanine, hesperetin, histidine, isoleucine, kynurenic acid, leucine, lysine, mannose, methionine, methyl gallate, ornithine, pantothenic acid, pipecolinic acid, piperine, polydatin, pyridoxine, quercetin, resveratrol, rutin, sinapinic acid, sorbic acid, syringaldehyde, threonine, trans-4-hydroxyproline, tryptophan, tyramine, tyrosine, and mixtures thereof. Therefore, in some embodiments, a chocolate replica can include one or more (e.g., at least 2, 3, 4, 5, 10, 15, 20, 25, 30, 35, or 40) compounds selected from the group consisting of pyridine, pyridoxine, 2(5H)-furanone, orientin, isoprenylpyrazine, 2-isopropyl-3-methoxypyrazine, 2-isobutyl-3-methoxypyrazine, adipic acid, methyl gallate, rutin, trans-ferulic acid, sinapinic acid, resveratrol, ellagic acid, propyl gallate, salicylic acid, AMP, hydroxymethylfurfural, caffeic acid, epicatechin gallate, syringic acid, homofuraneol, syringaldehyde, coumaric acid, acetovanillone, cinnamic acid, polydatin, cytosine, CMP, guanine, 4-guanidinobutyric acid, uracil, tryptamine, maple furanone, acetanilide, sorbic acid, ornithine, trans-4-hydroxyproline, carnosine, kynurenic acid, ribose, xylose, fucose, galactose, mannose, D-Glucuronic acid, pyruvic acid, tartaric acid, ricinoleic acid, DL-hydroxystearic acid, 8-Hydroxyquinoline, quinoline, 5-methoxyresorcinol, chlorogenic acid, eugenyl acetate.

Chocolate replicas herein can, in some cases, exclude one or more non-volatile compounds that are present in a corresponding reference chocolate. Non-limiting examples of compounds present in reference chocolates include 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3(2H)-furanone, adenine, arabitol, betaine, caffeic acid, caffeine, choline, citric acid, cytidine, D-gluconic acid, D-glucuronic acid, fructose, galactose, glucose, glutamic acid, hydroxymethylfurfural, lactic acid, malic acid, mannitol, methyl-2-pyrrolyl ketone, inositol, pyruvic acid, quinic acid, sorbitol, sotolon, succinic acid, syringic acid, tartaric acid, tryptamine, uracil, vanillic acid, and combinations thereof. Therefore, in some embodiments, a chocolate replica can lack one or more (e.g., at least 2, 3, 4, 5, 10, 15, 20, 25, 30, 35, or 40) compounds selected from the group consisting of choline, caffeine, 2,3,5,6-tetramethylpyrazine, quercetin, luteolin, phenylalanine, arginine, asparagine, glutamic acid, homoserine, and cholic acid. In some embodiments, a chocolate replica can lack one or more (e.g., 2, 3, 4, 5) compounds selected from the group consisting of choline, caffeine, quercetin, luteolin, phenylalanine, arginine, asparagine, glutamic acid, homoserine, and cholic acid.

The non-volatile compounds present in a chocolate replica can include compounds that fall into a first set of categories, including acids; amino acids or derivatives thereof, sugars or sugar alcohols; xanthines (e.g., caffeine, or theobromine); fats or waxes; starches, fiber, gums, or polysaccharides; tannins, polyphenols, or anthocyanins; pH modifiers; salts; bitterants; coloring agents; surfactants or emulsifiers; minerals or metals; preservatives (e.g., sodium benzoate), antioxidants; or proteins or peptides. In some embodiments, a chocolate replica can include an acid, an amino acid or derivative thereof, a sugar or sugar alcohol, a tannin, polyphenol, or anthocyanin, and a protein or peptide.

The non-volatile compounds present in a chocolate replica can include compounds that fall into a second set of categories, including acids; aldehydes; alkaloids; amines; amino acids; furans; ketones; lactones; nucleotides, nucleotide monophosphates, or nucleobases; proteins or peptides; pyrazines; pyridines; sugars or sugar alcohols; tannins; phenols, polyphenols, or anthocyanins; or xanthines. In some embodiments, a chocolate replica can include one or more of: an acid, an aldehyde, an alkaloid, an amine, an amino acid, a furan, a ketone, a lactone, a nucleotide, a nucleotide monophosphate, or nucleobase, a protein or peptide, a pyrazine, a pyridine, a sugar or sugar alcohol, a tannin, phenol, polyphenol, or anthocyanin, a xanthine, or a combination thereof. In some embodiments, a chocolate replica can include at least one non-volatile compound that belongs to each of at least 3 (e.g., at least 4, at least 5, at least 5, at least 7, at least 8, at least 9, at least 10, at least 15, 3 to 15, 3 to 10, 3 to 5, 5 to 14, 5 to 10, 10 to 15, or 10 to 16) of the following categories: an acid, an aldehyde, an alkaloid, an amine, an amino acid, a furan, a ketone, a lactone, a nucleotide, a nucleotide monophosphate, or nucleobase, a protein or peptide, a pyrazine, a pyridine, a sugar or sugar alcohol, a tannin, phenol, polyphenol, or anthocyanin, or a xanthine. In some embodiments, a chocolate replica can include an acid, an aldehyde, an amino acid, a lactone, a pyrazine, a tannin, phenol, polyphenol, or anthocyanin, and a xanthine.

It will be appreciated that any of these components can be provided in any appropriate form. For example, it will be appreciated that amino acids can be provided in the form of a salt (e.g., an HCl salt). It will also be appreciated that any and all stereoisomers can be used when no stereochemistry is specified.

In some embodiments, a chocolate replica (e.g., a chocolate beverage replica) can include no preservatives.

Amino acids (e.g., including derivatives thereof) that may be present in a chocolate replica as provided herein include, without limitation, phenylalanine, leucine, glucosamine, methionine, GABA, tyrosine, lysine, histidine, glycine, serine, aspartic acid, isoleucine, tryptophan, valine, proline, carnitine, arginine, B-alanine-2, Threonine, glutamine, asparagine, glutamic acid, betaine, pipecolinic acid, citrulline, carnosine, homoserine, and any combination thereof. In some embodiments, a chocolate replica can include one or more (e.g., 2, 3, 4, 5, 10, 15, 20, or 25) amino acids selected from the group consisting of Phenylalanine, leucine, glucosamine, methionine, GABA, tyrosine, lysine, histidine, glycine, serine, aspartic acid, isoleucine, tryptophan, valine, proline, carnitine, arginine, B-alanine-2, threonine, glutamine, asparagine, glutamic acid, betaine, pipecolinic acid, citrulline, carnosine, and homoserine. The amino acid(s) can be present in any suitable amount. In some embodiments, the amino acid(s) can be present in an amount of about 2 to about 1000 mg/kg (e.g., about 2 to about 10 mg/kg, about 10 to about 100 mg/kg, about 100 to about 200 mg/kg, about 200 to about 300 mg/kg, about 300 to about 400 mg/kg, about 400 to about 500 mg/kg, about 500 to about 600 mg/kg, or about 600 to about 1000 mg/kg). The amino acid(s) can make up any suitable proportion of the overall non-volatile compound content. In some embodiments, a chocolate replica can include no amino acids. In some embodiments, an amino acid can be provided as the L-stereoisomer.

Examples of acids that can be included in a chocolate replica include, without limitation, adipic acid, trans-ferulic acid, sinapinic acid, salicylic acid, pantothenic acid, caffeic acid, vanillic acid, syringic acid, coumaric acid, sorbic acid, kynurenic acid, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, nicotinic acid, chlorogenic acid, cholic acid, and any combination thereof. In some embodiments, a chocolate replica can include one or more (e.g., at least 2, 3, 4, 5, 10, 15, or 20) acids selected from the group consisting of adipic acid, trans-ferulic acid, sinapinic acid, salicylic acid, pantothenic acid, caffeic acid, vanillic acid, syringic acid, coumaric acid, sorbic acid, kynurenic acid, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-Gluconic acid, 4-methoxycinnamic acid, 2-ethyl-2-hydroxybutyric acid, ricinoleic acid, DL-hydroxystearic acid, nicotinic acid, chlorogenic acid, and cholic acid. In some embodiments, a chocolate replica can include one or more (e.g., 2 or 3) acids selected from the group consisting of D-glucuronic acid, citric acid, lactic acid, tartaric acid, fumaric acid, malic acid, and succinic acid. The acid(s) can be present in any suitable amount. In some embodiments, the acid(s) can be present in an amount of about 3 mg/kg to about 5.0 g/L (e.g., about 3 to about 10 mg/kg, about 10 to about 50 mg/kg, about 50 to about 100 mg/kg, about 100 to about 500 mg/kg, about 500 mg/kg to about 1 g/L, about 1 g/L to about 2.5 g/L, or about 2.5 g/L to about 5.0 g/L). The acid(s) can make up any suitable proportion of the overall non-volatile compound content. Any suitable number of acids can be used, for example, 1 to 3, at least 2, or at least 3 acids can be used. In some embodiments, a chocolate replica can include no acids.

Examples of alkaloids that can be used in a chocolate replica include, without limitation, piperine. The alkaloid(s) can be present in any suitable amount. The alkaloid(s) can make up any suitable proportion of the non-volatile compound content. Any suitable number of alkaloids can be used. In some embodiments, a chocolate replica can include no alkaloids.

Examples of amines that can be used in a chocolate replica include, without limitation, tryptamine. The amine(s) can be present in any suitable amount. In some embodiments, the amine(s) can be present in an amount of about 0.05 to about 0.2 mg/kg (e.g., about 0.05 to about 0.1 mg/kg or 0.1 to about 0.2 mg/kg). The amine(s) can make up any suitable proportion of the non-volatile compound content. Any suitable number of amines can be used. In some embodiments, a chocolate replica can include no amines.

Examples of furans that can be used in a chocolate replica include, without limitation, hydroxymethylfurfural. The furan(s) can be present in any suitable amount. In some embodiments, the furan(s) can be present in an amount of about 10 to about 20 mg/kg (e.g., about 10 to about 15 mg/kg or about 15 to about 20 mg/kg). The furan(s) can make up any suitable proportion of the non-volatile compound content. Any suitable number of furans can be used. In some embodiments, a chocolate replica can include no furans.

Examples of nucleotides, nucleotide monophosphates, or nucleobases that can be used in a chocolate replica include, without limitation, adenine, AMP, CMP, cytidine, cytosine, guanine, and uracil. In some embodiments, a chocolate replica can include one or more (e.g., 2, 3, 4, 5, 6, or 7) nucleotide, nucleotide monophosphate, or nucleobase selected from the group consisting of adenine, AMP, CMP, cytidine, cytosine, guanine, and uracil. The nucleotides, nucleotide monophosphates, or nucleobase(s) can be present in any suitable amount. In some embodiments, the nucleotides, nucleotide monophosphates, or nucleobase(s) can be present in an amount of about 0.7 to about 5 mg/kg (e.g., about 0.7 to about 1 mg/kg, about 1 to about 5 mg/kg, about 1 to about 3 mg/kg, or about 3 to about 5 mg/kg). The nucleotides, nucleotide monophosphates, or nucleobase(s) can make up any suitable proportion of the non-volatile compound content. Any suitable number of nucleotides, nucleotide monophosphates, or nucleobases can be used. In some embodiments, a chocolate replica can include no nucleotides, nucleotide monophosphates, or nucleobases.

Examples of pyridines that can be used in a chocolate replica include, without limitation, pyridine and pyroxidine. In some embodiments, a chocolate replica can include pyridine, pyroxidine, or both. The pyridine(s) can be present in any suitable amount. In some embodiments, the pyridine(s) can be present in an amount of about 0.4 to about 150 mg/kg (e.g., about 0.4 to about 1 mg/kg, about 0.5 to about 1 mg/kg, about 1 to about 5 mg/kg, about 5 to about 10 mg/kg, about 10 to about 50 mg/kg, about 10 to about 60 mg/kg, about 10 to about 30 mg/kg, about 30 to about 50 mg/kg, about 20 to about 40 mg/kg, or about 40 to about 150 mg/kg). The pyridine(s) can make up any suitable proportion of the non-volatile compound content. Any suitable number of pyridines can be used. In some embodiments, a chocolate replica can include no pyridines.

Examples of sugars or sugar alcohols that can be used in a chocolate replica include, without limitation, sucrose arabitol, fructose, galactose, glucosamine, glucose, lactose, mannitol, mannose, inositol (e.g., myo-inositol), rhamnose, ribose, sorbitol, xylose, and any combination thereof. In some embodiments, a chocolate replica can include one or more (e.g., at least 2, 3, 4, 5, 6, 8, 10, or 12) sugars or sugar alcohols selected from the group consisting of sucrose, arabitol, fructose, galactose, glucosamine, glucose, mannitol, mannose, inositol, rhamnose, ribose, sorbitol, and xylose. The sugars or sugar alcohol(s) can be present in any suitable amount. In some embodiments, the sugars or sugar alcohol(s) can be present in an amount of about 50 to about 550 mg/kg (e.g., about 50 to about 100 mg/kg, about 100 to about 500 mg/kg, about 100 to about 550 mg/kg, about 100 to about 300 mg/kg, about 300 to about 500 mg/kg, about 300 to about 550 mg/kg, or about 200 to about 400 mg/kg). The sugars or sugar alcohol(s) can make up any suitable proportion of the non-volatile compound content. Any suitable number of sugars or sugar alcohols can be used. In some embodiments, a chocolate replica can include no sugars or sugar alcohols. Sugars that can be used in a chocolate replica include, without limitation, fructose, galactose, glucosamine, glucose, mannose, rhamnose, ribose, xylose, and any combination thereof. Sugar alcohols that can be present in a chocolate replica include, without limitation, arabitol, inositol (e.g., myo-inositol), mannitol, sorbitol, xylitol, maltitol, erythritol, and any combination thereof.

Examples of tannins, phenols, polyphenols, or anthocyanins that can be used in a chocolate replica include, without limitation, catechin, ellagic acid, epicatechin, epicatechin gallate, gallic acid, hesperetin, methyl gallate, polydatin, propyl gallate, quercetin, resveratrol, rutin, salicylic acid, sinapinic acid, syringaldehyde, syringic acid, trans-ferulic acid, tyramine, and vanillic acid. In some embodiments, the chocolate replica can include one or more (e.g., 2, 3, 4, 5, 6, 8, 10, 12, 14, 16, or 18) tannins, phenols, polyphenols, or anthocyanins selected from the group consisting of catechin, ellagic acid, epicatechin, epicatechin gallate, gallic acid, hesperetin, methyl gallate, polydatin, propyl gallate, quercetin, resveratrol, rutin, salicylic acid, sinapinic acid, syringaldehyde, syringic acid, trans-ferulic acid, tyramine, and vanillic acid. In some embodiments, the chocolate replica can include trans-ferulic acid, vanillic acid, or both. The tannins, phenols, polyphenols, or anthocyanin(s) can be present in any suitable amount. In some embodiments, the tannins, phenols, polyphenols, or anthocyanin(s) can be present in an amount of about 15 to about 55 mg/kg (e.g., about 15 to about 20 mg/kg, about 15 to about 25 mg/kg, about 25 to about 50 mg/kg, about 25 to about 55 mg/kg, about 20 to about 40 mg/kg, about 30 to about 50 mg/kg, or about 30 to about 55 mg/kg). The tannins, phenols, polyphenols, or anthocyanin(s) can make up any suitable proportion of the non-volatile compound content. Any suitable number of tannins, phenols, polyphenols, or anthocyanins can be used. In some embodiments, a chocolate replica can include no tannins, phenols, polyphenols, or anthocyanins.

Examples of xanthines that can be used in a chocolate replica include, without limitation, caffeine. The xanthine(s) can be present in any suitable amount. In some embodiments, the xanthine(s) can be present in an amount of about 100 to about 300 mg/kg (e.g., about 100 to about 200 mg/kg, about 150 to about 250 mg/kg, or about 200 to about 300 mg/kg). The xanthine(s) can make up any suitable proportion of the non-volatile compound content. Any suitable number of xanthines can be used. In some embodiments, a chocolate replica can include no xanthines.

Colorants that may be used in the chocolate replicas provided herein include, without limitation, natural colorants derived from fruits and vegetables such as beet, carrot, and cabbage [e.g., annatto extract, beet extract, beta carotene, caramel, carmine (cochineal extract), elderberry extract, grape skin extract (enocianina), paprika, saffron, titanium dioxide, and turmeric], as well as synthetic dyes (e.g., FD+C/synthetic colors).

In some cases, the amount of any particular non-volatile compound in a chocolate replica may be different than the amount of that non-volatile compound in a corresponding reference chocolate. In some cases, the amount of a non-volatile compound in a chocolate replica can be 75% or less (e.g., 70% or less, 60% or less, 50% or less, 40% or less, 30% or less, 20% or less, or 10% or less), by concentration or percent mass, than the amount of the same non-volatile compound in a corresponding reference chocolate. In some cases, the amount of a non-volatile compound in a chocolate replica can be 125% or more (e.g., 150% or more, 200% or more, or 300% or more), by concentration or percent mass, than the amount of the same non-volatile compound in a corresponding reference chocolate.

In some cases, the total amount (e.g., in mg/kg of a chocolate replica) of non-volatile compounds in a chocolate replica can be less than the total amount of non-volatile compounds in a reference chocolate.

In some embodiments, non-volatile compounds can be placed in various groupings, and a chocolate replica can include certain non-volatile compounds according to their groupings.

A chocolate replica can include any appropriate number of non-volatile compounds. For example, a chocolate replica can include 1 to 100 (e.g., at least 5, at least 10, at least 20, at least 30, at least 40, at least 50, 1 to 90, 1 to 80, 1 to 70, 1 to 60, 1 to 50, 1 to 40, 1 to 30, 1 to 20, 1 to 10, 1 to 5, 5 to 100, 5 to 90, 5 to 80, 5 to 70, 5 to 60, 5 to 40, 5 to 30, 5 to 20, 5 to 10, 10 to 100, 10 to 90, 10 to 90, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, or 50 to 60) non-volatile compounds. In some cases, the number of non-volatile compounds in a chocolate can be less than the number of non-volatile compounds in a single reference chocolate.

In some cases, the overall population of non-volatile compounds in a chocolate replica can have less than 95% identity to the non-volatile compounds in a corresponding reference chocolate (e.g., from a single region, in a single variety, cultivar, or packaging unit (e.g., a bag)). For example, the non-volatile compounds in a chocolate replica can have less than 95%, less than 90%, less than 85%, less than 80%, less than 70%, less than 60%, less than 50%, or less than 40% identity to the population of non-volatile compounds in a corresponding reference chocolate. Some chocolate replicas may contain at least 10 (e.g., at least 15, at least 20, at least 25, or at least 30) non-volatile compounds that are not found in a single reference chocolate. For example, in some embodiments, a chocolate replica can have at least m non-volatile compounds and less than m (e.g., m−1, m−2, m−3, m−4, m−5, m−6, m−7, m−8, m−9, m−10, m−15, m−20, and the like, as applicable) of the non-volatile compounds are found in a single reference chocolate; in some embodiments, m can be equal to 5, 6, 7, 8, 9, 10, 11, 12, 13, 14, 15, 16, 17, 18, 19, 20, 25, 30, 35, or 40.

Example 2 sets forth amounts of non-volatile compounds that were detected in traditional chocolate samples. In some embodiments, the amount of a particular non-volatile compound in a chocolate replica can be an amount, based on concentration or percent composition that is within a range 30% higher and lower than the amount disclosed for that non-volatile compound. For example, a non-volatile compound can be present in a chocolate replica in an amount that is 70 to 90%, 80 to 100%, 90 to 110%, 100 to 120%, 110 to 130%, 70 to 100%, 80 to 110%, 90 to 120%, or 100 to 130% of a disclosed amount for that non-volatile compound in a traditional chocolate.

In some embodiments, the non-volatile compounds can include one or more (e.g., 1 to 2, 1 to 3, 1 to 5, 1 to 10, 1 to 15, 1 to 20, 1 to 25, 1 to 28, 5 to 10, 10 to 15, 10 to 20, 15 to 20, 20 to 28, 20 to 25, or 25 to 28) of 2-furoic acid, 2-isopropylmalic acid, 3,4-dihydroxybenzoic acid, arabitol, aspartic acid, betaine, citric acid, D-glucuronic acid, fructose, galactose, gallic acid, glucose, glutamic acid, lactic acid, malic acid, mannitol, inositol, phenylalanine, pyruvic acid, quinic acid, sorbitol, succinic acid, tartaric acid, valine, ribose, rhamnose, and xylose.

Some particular exemplary chocolate replicas are also provided herein. In some embodiments, a chocolate replica can include at least 50 (e.g., at least 50, 55, 60, or 64) VOCs selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4- methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, chocolate furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether. In some embodiments, a chocolate replica can include at least 10 (e.g., at least 11 or 12) non-volatile compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Exemplary amounts of each of these compounds are shown in TABLE 1, by mg/kg (e.g., for a chocolate replica), mg/g substrate (e.g., for a chocolate bars replica or a chocolate bean replica), or percent by weight of total VOCs and nonvolatile compounds (e.g., for a chocolate replica).

TABLE 1

Exemplary ingredients of chocolate formulations

| | Range (Percent by weight) |
|---|---|
| isovaleric acid | 3.51E−03-1.40E−02 |
| 2-methylbutyric acid | 1.21E−01-4.85E−01 |
| butyric acid | 1.21E−02-4.85E−02 |
| cinnamic acid | 9.58E−03-3.83E−02 |
| propanoic acid | 2.43E−03-9.70E−03 |
| 3-phenylpropionic acid | 7.78E−04-3.11E−03 |
| amyl alcohol | 4.52E−02-1.81E−01 |
| phenyl methanol (benzyl alcohol) | 4.52E−03-1.81E−02 |
| isoamyl alcohol | 2.92E−03-1.17E−02 |
| 1-decanol | 1.95E−03-7.78E−03 |
| 3-(Z)-hexenol | 1.76E−03-7.03E−03 |
| furaneol | 1.15E−03-4.59E−03 |
| 2-nonanol | 9.73E−04-3.89E−03 |
| 1-heptanol | 4.87E−04-1.95E−03 |
| 2-methoxy-4-vinylphenol | 3.48E−04-1.39E−03 |
| carvacrol | 1.73E−04-6.94E−04 |
| 3-mercapto hexanol | 1.41E−04-5.62E−04 |
| para cresol | 9.42E−05-3.77E−04 |
| hexyl alcohol (hexanol) | 2.33E−07-9.33E−07 |
| 1-octanol | 2.92E−08-1.17E−07 |
| isovaleraldehyde | 5.49E−01-2.20E+00 |
| vanillin | 3.45E−01-1.38E+00 |
| cocoa hexenal | 4.52E−02-1.81E−01 |
| benzaldehyde | 1.20E−02-4.79E−02 |
| vanillin erythro and threo-butan-2,3-diol acetal | 1.15E−02-4.59E−02 |
| nonanal | 6.21E−03-2.49E−02 |
| valeraldehyde | 3.29E−03-1.32E−02 |
| 2-phenyl-2-butenal | 5.84E−04-2.34E−03 |
| 2-methylbutyraldehyde | 4.87E−04-1.95E−03 |
| decanal | 3.51E−04-1.40E−03 |
| isodihydrolavandulal | 2.09E−04-8.36E−04 |
| 2-methylbutyl isovalerate | 9.78E−03-3.91E−02 |
| ethyl lactate | 9.52E−03-3.81E−02 |
| ethyl laurate | 6.46E−03-2.59E−02 |
| methyl butyrate | 6.07E−03-2.43E−02 |
| isoamyl acetate | 3.77E−03-1.51E−02 |
| methyl para-anisate | 3.28E−03-1.31E−02 |
| ethyl heptanoate | 2.81E−03-1.12E−02 |
| ethyl 2-methylbutyrate | 2.63E−03-1.05E−02 |
| ethyl-2-methylbutyrate | 2.60E−03-1.04E−02 |

TABLE 1-continued

Exemplary ingredients of chocolate formulations

| | Range (Percent by weight) |
|---|---|
| butyl butyrate | 2.11E−03-8.43E−03 |
| isobutyl acetate | 1.95E−03-7.78E−03 |
| butyl acetate | 1.95E−03-7.78E−03 |
| isoamyl isobutyrate | 1.75E−03-7.01E−03 |
| methyl 2-methylbutyrate | 1.47E−03-5.87E−03 |
| ethyl isobutyrate | 1.47E−03-5.87E−03 |
| ethyl 3-hydroxybutanoate | 9.73E−04-3.89E−03 |
| ethyl phenylacetate | 6.78E−04-2.71E−03 |
| benzyl acetate | 4.87E−04-1.95E−03 |
| ethyl butyrate | 4.39E−04-1.76E−03 |
| diethyl succinate | 2.96E−04-1.18E−03 |
| ethyl hexanoate | 2.93E−04-1.17E−03 |
| hexyl isobutyrate | 2.43E−04-9.73E−04 |
| hexyl acetate | 2.26E−04-9.03E−04 |
| methyl benzoate | 1.95E−04-7.78E−04 |
| furfuryl acetate | 1.17E−04-4.67E−04 |
| geranyl acetate | 8.75E−05-3.50E−04 |
| acetoin acetate | 1.43E−02-5.74E−02 |
| coffee furanone | 1.38E−02-5.51E−02 |
| maltol | 1.08E−02-4.30E−02 |
| gamma-valerolactone | 1.07E−02-4.28E−02 |
| ethyl maltol | 5.74E−03-2.29E−02 |
| acetoin | 3.64E−03-1.46E−02 |
| beta-ionone | 1.65E−03-6.58E−03 |
| 2,3-hexanedione | 1.43E−03-5.74E−03 |
| 2-heptanone | 1.23E−03-4.91E−03 |
| 2-undecanone | 7.03E−04-2.81E−03 |
| alpha ionone | 1.81E−04-7.23E−04 |
| 2,3-pentadione | 1.72E−04-6.88E−04 |
| damascenone | 1.01E−04-4.04E−04 |
| acetophenone | 9.73E−05-3.89E−04 |
| vanillyl ethyl ether | 1.07E−02-4.27E−02 |
| rum ether | 3.51E−03-1.40E−02 |
| 2-methyl furan | 4.87E−04-1.95E−03 |
| 2-methylpyrazine | 1.31E−02-5.23E−02 |
| 2,6-dimethylpyrazine | 8.88E−03-3.55E−02 |
| 2-ethylpyrazine | 6.10E−03-2.44E−02 |
| isopropenyl pyrazine | 6.90E−04-2.76E−03 |
| 2-ethyl-3-methylpyrazine | 6.10E−04-2.44E−03 |
| 2,3-dimethylpyrazine | 1.74E−04-6.97E−04 |
| 2,3,5-trimethylpyrazine | 1.31E−04-5.23E−04 |
| (R)-(+)-limonene | 1.24E−02-4.97E−02 |
| linalool | 6.21E−03-2.49E−02 |
| B-caryophyllene | 4.57E−03-1.83E−02 |
| 3-carene | 2.36E−03-9.44E−03 |
| myrcene | 8.67E−05-3.47E−04 |
| sucrose | 10.0-40.0 |
| lecithin | 0.25-1.00 |
| leucine | 3.33E−02-1.0E−01 |
| phenylalanine | 8.3E−02-2.5E−01 |
| glucose | 5.0E−02-1.5E−01 |
| malic acid | 1.61E−05-1.61E−04 |
| tartaric acid | 8.81E−06-8.81E−05 |
| lactic acid | 1.76E−05-1.76E−04 |
| citric acid | 1.00E−03-1.00E−02 |
| naringin | 5.00E−03-5.00E−02 |
| sodium chloride | 2.50E−02-1.00E−01 |
| Substrate (grape seed, sunflower seed, plant oils, plant meals) | 50.0-80.0 |
| Liquid (e.g., water, milk, plant-based milk, or a combination thereof) | 0-20 |

The chocolate replicas provided herein can include a solid substrate. The solid substrate typically is not derived from cacao/cocoa (e.g., does not contain cacao or cocoa solids). The solid substrate can be, for example, a food stream waste product.

In some embodiments, the solid substrate can include processed or unprocessed grains. Processing of grains can result in the removal or partial removal of one or more of: starch, protein, sugar, fat-soluble components, and flavors. In some embodiments, a solid substrate can be any waste product from which most (e.g., at least 75%, at least 80%, at least 85%, at least 90%, or at least 95%) of the starch, protein, sugar, fat-soluble components, and flavor have been removed, leaving behind cellulose, hemicellulose, lignin, and/or other insoluble fibers. In some embodiments, a solid substrate can include processed or unprocessed grains or grain products, legumes or legume seeds, oil plants or seeds, fruits or fruit products, roots, tubers, or root or tuber products, sugar processing by-products, or other plant by-products.

Non-limiting examples of grains or grain products that can be used in a solid substrate include atella, barley distillery by-products, broken rice or polished rice, barley grain, brown rice, brewers grains, cockspur grass (*Echinochloa crusgalli*) grain, corn gluten feed, corn distillers grain, corn gluten meal, ear maize, finger millet (*Eleusine coracana*) grain, foxtail millet (*Setaria italica*) grain, fonio (*Digitaria exilis*) grain, maize bran or hominy feed, maize green forage, maize cobs, maize stover, maize germ meal or maize germ, malt culms, maize grain, millet hulls, oat hulls or oat mill feed, oats, pearl millet (*Pennisetum glaucum*) grain, proso millet (*Panicum miliaceum*) grain, *quinoa* (*Chenopodium quinoa*), red oat (*Avena sativa*) grain, rice protein concentrate, rice bran or other rice by-products, rough rice (paddy rice), rice hulls, rye grain or by-products, sorghum by-products, starches, sorghum grain, tef (*Eragrostis tef*) grain, triticale, Venezuela grass (*Paspalum fasciculatum*), wheat (general), wheat germ, wheat bran, wheat grain, wheat distillers grain, wheat shorts, wheat middlings, feed flour, and mixtures thereof.

Non-limiting examples of legumes or legume seeds that can be used in a solid substrate include African locust bean (*Parkia biglobosa* or *Parkia filicoidea*), African yam bean (*Sphenostylis stenocarpa*), bambara barnut (*Vigna subterranea*) crop residue and straw, black gram (*Vigna mungo*), bambara barnut (*Vigna subterranea*) pods, shells and offals, blue lupin (*Lupinus angustifolius*) seeds, bambara barnut (*Vigna subterranea*) seeds, butterfly pea (*Clitoria ternatea*), carob (*Ceratonia siliqua*), common bean (*Phaseolus vulgaris*), centro (*Centrosema molle*), common vetch (*Vicia sativa*), chickpea (*Cicer arietinum*), cowpea (*Vigna unguiculata*) seeds, faba bean (*Vicia faba*), grass pea (*Lathyrus sativus*), guar (*Cyamopsis tetragonoloba*) forage, seed and meal, guanacaste (*Enterolobium cyclocarpum*), hairy vetch (*Vicia villosa*), horse gram (*Macrotyloma unflorum*), jack bean (*Canavalia ensiformis*), Lablab (*Lablab purpureus*), lima bean (*Phaseolus lunatus*), lentil (*Lens culinaris*), mat bean (*Vigna aconitifolia*), mung bean (*Vigna radiata*), narbon vetch (*Vicia narbonensis*), pea by-products, peanut seeds, pea protein concentrate, peanut skins, pea seeds, pigeon pea (*Cajanus cajan*) seeds, peanut forage, prickly *Sesban* (*Sesbania bispinosa*), peanut hulls, purple vetch (*Vicia benghalensis*), peanut meal, rain tree (*Albizia saman*), rice bean (*Vigna umbellata*), *Sesban* (*Sesbania sesban*), soybean seeds, soybean (general), sword bean (*Canavalia gladiata*), soybean forage, syrian mesquite (*Prosopis farcta*), soybean meal, tamarind (*Tamarindus indica*), tamarugo (*Prosopis tamarugo*), velvet bean (*Mucuna pruriens*), white lupin (*Lupinus albus*) seeds, winged bean (*Psophocarpus tetragonolobus*), yellow lupin (*Lupinus luteus*) seeds, and mixtures thereof.

Non-limiting examples of oil plants or seeds than can be used in a solid substrate include Almond kernels and by-products, argan (*Argania spinosa*), babassu (*Attalea speciosa*), borneo tallow nut (*Shorea stenoptera*) oil meal, *Bactris* (*Bactris gasipaes*), Camelina (*Camelina sativa*) seeds and oil meal, cotton (general), cashew (*Anacardium occidentale*) nuts and by-products, castor (*Ricinus communis*) seeds, oil meal and by-products, cotton straw and cotton crop residues, ceylon ironwood (*Mesua ferrea*), chia seed, cocoa butter, cottonseed hulls, cottonseed meal, copra meal and coconut by-products, *Crambe* (*Crambe abyssinica*), corozo (*Attalea cohune*) seed and oil meal, doum palm (*Hyphaene thebaica*), dragon's head (*Lallemantia iberica*), flax straw and flax crop by-products, grape seeds and grape seed oil meal, hemp, *Jatropha* (*Jatropha* sp.) kernel meal and other *Jatropha* products, jojoba (*Simmondsia chinensis*), kapok (*Ceiba pentandra*), kenaf (*Hibiscus cannabinus*), karanja (*Millettia pinnata*), kusum (*Schleichera oleosa*), linseed meal, *Luffa* (*Luffa aegyptiaca*), linseeds, *Macadamia* (*Macadamia integrifolia*), *Moringa* (*Moringa oleifera*), mahua (*Madhucalongifolia*), mustard oil meal and mustard bran, maize germ meal and maize germ, neem (*Azadirachta indica*), niger (*Guizotia abyssinica*), oil palm fronds and oil palm crop residues, olive oil cake and by-products, oil palm kernels, palm kernel meal, peanut seeds, palm oil mill effluent, peanut skins, palm press fibre, pinto peanut (*Arachis pintoi*), peanut forage, poppy (*Papaver somniferum*), peanut hulls, pumpkin, squash, gourd and other *Cucurbita* species, peanut meal, rapeseed forage, rapeseed hulls, rapeseed meal, rapeseeds, rubber (*Hevea brasiliensis*), safflower (*Carthamus tinctorius*) seeds and oil meal, sal (*Shorea robusta*) seeds and oil meal, soybean meal, soybean seeds, seje (*Oenocarpus bataua*), sunflower (general), sesame (*Sesamum indicum*) seeds and oil meal, shea butter, shea kernel, sickle pods, sunflower forage and crop residues, sunflower hulls and sunflower screenings, sunflower meal, sunflower seeds, soybean (general), soybean forage, soybean hulls, tung tree (*Aleurites fordii*), tomato seed cake, walnut (*Juglans regia*), watermelon (*Citrullus lanatus*) seeds and oil meal, and mixtures thereof.

Non-limiting examples of fruits or fruit products that can be used in a solid substrate include apple pomace and culled apples, banana (general), banana peels, banana fruits, banana leaves and pseudostems, breadfruit (*Artocarpus altilis*), breadnut (*Brosimum alicastrum*), cashew (*Anacardium occidentale*) nuts and by-products, citrus pulp, fresh, citrus fruits, citrus seed meal, citrus molasses, citrus pulp, dried, colocynth (*Citrullus colocynthis*), date molasses, date palm leaves and date pedicels, date palm fruits, grape pomace, guava (*Psidium guajava*), grape seeds and/or grape seed oil meal, jackfruit (*Artocarpus heterophyllus*), kokum (*Garcinia indica*), *Luffa* (*Luffa aegyptiaca*), mango (*Mangifera indica*) fruit and by-products, *Moringa* (*Moringa oleifera*), melon (*Cucumis melo*), olive oil cake and by-products, papaya (*Carica papaya*) fruits, leaves and by-products, pineapple by-products, pineapple leaves, pineapple mill juice, pumpkin, squash, gourd and other *Cucurbita* species, sapucaia (*Lecythis pisonis*), Spanish lime (*Melicoccus bijugatus*), seje (*Oenocarpus bataua*), tomato fruits, tomato pomace, tomato skins and tomato seeds, tomato leaves and crop residues, tomato seed cake, walnut (*Juglans regia*), watermelon (*Citrullus lanatus*) forage and fruit, watermelon (*Citrullus lanatus*) seeds and oil meal, and mixtures thereof. In some embodiments, the solid substrate can include, or be prepared from, grape seeds.

Non-limiting examples of roots, tubers, or root or tuber products that can be used in a solid substrate include arrowroot (*Maranta arundinacea*), beet molasses, *canna* (*Canna indica*), carrot (*Daucus carola*), cassava leaves and foliage, cassava peels, cassava pomace and other cassava by-products, cassava roots, Chinese yam (*Dioscorea esculenta*), enset (*Ensete ventricosum*) corms and pseudostems, fodder beet roots, maca, Jerusalem artichoke (*Helianthus*

*tuberosus*), malanga (*Xanthosoma sagittifolium*), potato (*Solanum tuberosum*) by-products, potato (*Solanum tuberosum*) tubers, sugar beet pulp, dehydrated, sugar beet pulp, pressed or wet, sugar beet roots, sugar beet tops, sweet potato (*Ipomoea batatas*) by-products, sweet potato (*Ipomoea batatas*) forage, sweet potato (*Ipomoea batatas*) tubers, taro (*Colocasia esculenta*), white yam (*Dioscorearotundata*), winged yam (*Dioscorea alata*), whitespot giant *arum* (*Amorphophallus campanulatus*), yacon (*Smallanthus sonchifolius*), yellow yam (*Dioscorea cayenensis*), and mixtures thereof.

Non-limiting examples of sugar processing by-products that can be used in a solid substrate include beet molasses, sugar, molasses, sugar beet pulp, pressed or wet, sugarcane bagasse, sugarcane forage, whole plant, sugarcane juice, sugarcane molasses, sugarcane press mud, sugarcane tops, and mixtures thereof.

Non-limiting examples of other plant by-products that can be used in a solid substrate include carob (*Ceratonia siliqua*), citrus molasses, date molasses, date palm leaves and date pedicels, date palm seeds, enset (*Ensete ventricosum*) corms and pseudostems, leaf protein concentrate and grass juice, Mexican marigold (*Tagetes erecta*), mushrooms and spent mushroom substrate, molasses/urea blocks, potato (*Solanum tuberosum*) tubers, pyrethrum marc, spent hops, straws, sugarcane juice, sugarcane molasses, sugarcane press mud, vinasses, wood, wood sugar or wood molasses, and mixtures thereof.

In some embodiments, a solid substrate can have a composition (e.g., ratio of fats, proteins, and fibers) that is different from a traditional chocolate bean or traditional chocolate bars.

The solid substrates included in the chocolate replicas provided herein can be prepared using any appropriate method.

In some cases, a solid substrate can be prepared using ground plant seeds as a starting material. For example, ground seeds (e.g., ground grape seeds, cranberry seeds, raspberry seeds, blackberry seeds, strawberry seeds, blueberry seeds, pomegranate seeds, kiwi seeds, watermelon seeds, muskmelon seeds, cantaloupe seeds, honeydew seeds, *papaya* seeds, passionfruit seeds, starfruit seeds, tomato seeds, tomatillo seeds, dragonfruit seeds, *guava* seeds, soursop seeds, calamansi seeds, pumpkin seeds, squash seeds, okra seeds, cucumber seeds, bell pepper seeds, eggplant seeds, pears seeds, apple seeds, cherimoya seeds, pineapple seeds, quince seeds, lingonberry seeds, thistle (nyger) seeds, currant seeds, or any other suitable seeds) having a particle size of about 5 to about 150 microns (e.g., about 5 to about 10 microns, about 10 to about 20 microns, about 20 to about 30 microns, about 25 microns, about 30 to about 50 microns, about 50 about 100 microns, or about 100 to about 150 microns) can be used as a starting material. The ground seeds can be treated with a caustic agent (e.g., sodium hydroxide, potassium hydroxide, sodium carbonate, calcium carbonate, calcium hydroxide, or potassium bicarbonate) and water at a pressure of 0-10 bar (e.g., 0-2 bar, 2-4 bar, 4-6 bar, 6-8 bar, or 8-10 bar), and at a temperature between about 45° C. and about 125° C. (e.g., about 45° C. to about 55° C., about 55° C. to about 75° C., about 65° C. to about 85° C., about 75° C. to about 95° C., about 85° C. to about 105° C., about 95° C. to about 115° C., about 105° C. to about 125° C., about 70° C., about 75° C., or about 80° C.) with blending for a suitable length of time (e.g., about 5 to about 120 minutes, about 10 to about 90 minutes, about 20 to about 60 minutes, about 30 to about 45 minutes, about 20 minutes, about 30 minutes, or about 40 minutes) to reach a pH of about 5.5 to about 10.5 (e.g., about 5.5 to about 6.0, about 6.0 to about 6.5, about 6.5 to about 7.0, about 7.0 to about 7.4, about 7.4 to about 7.8, about 7.8 to about 8.2, about 8 to about 8.5, about 8.2 to about 8.6, about 8.6 to about 9, about 9 to about 9.5, about 9.5 to about 10.0, or about 10.0 to about 10.5). The seed mixture can then be dried (e.g., by tray drying, spray drying, drum drying, falling film evaporation, freeze drying, or vacuum drying). The mixture can then be combined with one or more plant-derived oils, and then milled (e.g., using a stone corundum mill or a colloid mill) and/or refined at a temperature less than about 65° C. (e.g., about 60° C. to about 65° C., about 55° C. to about 60° C., about 50° C. to about 55° C., about 50° C. to about 60° C., less than about 60° C., or less than about 55° C.), to reach a final particle size less than about 75 microns (e.g., about 70 to about 75 microns, about 65 to about 70 microns, about 60 to about 65 microns, about 50 to about 60 microns, less than about 70 microns, less than about 65 microns, or less than about 60 microns). The milled mixture then can be passed through a sieve (e.g., 100 micron sieve) to yield a solid substrate for inclusion in a chocolate replica.

In some cases, a solid substrate can be prepared using whole plant seeds as a starting material. For example, whole seeds (e.g., grape seeds, cranberry seeds, raspberry seeds, blackberry seeds, strawberry seeds, blueberry seeds, pomegranate seeds, kiwi seeds, watermelon seeds, muskmelon seeds, cantaloupe seeds, honeydew seeds, *papaya* seeds, passionfruit seeds, starfruit seeds, tomato seeds, tomatillo seeds, dragonfruit seeds, *guava* seeds, soursop seeds, calamansi seeds, pumpkin seeds, squash seeds, okra seeds, cucumber seeds, bell pepper seeds, eggplant seeds, pears seeds, apple seeds, cherimoya seeds, pineapple seeds, lingonberry seeds, thistle (nyger) seeds, currant seeds, or any other suitable seeds) can be sifted (e.g., using a mesh) to remove stem pieces and/or other undesired plant material. The sifted seeds can be treated with a caustic agent (e.g., sodium hydroxide, potassium hydroxide, sodium carbonate, calcium carbonate, calcium hydroxide, or potassium bicarbonate) and water at a pressure of 0-10 bar (e.g., 0-2 bar, 2-4 bar, 4-6 bar, 6-8 bar, or 8-10 bar), and at a temperature between about 55° C. and about 95° C. (e.g., about 55° C. to about 75° C., about 65° C. to about 85° C., about 75° C. to about 95° C., about 70° C., about 75° C., or about 80° C.) with blending for a suitable length of time (e.g., about 5 to about 120 minutes, about 10 to about 90 minutes, about 20 to about 60 minutes, about 30 to about 45 minutes, about 20 minutes, about 30 minutes, or about 40 minutes) to reach a pH of about 5.5 to about 10 (e.g., about 5.5 to about 6.0, about 6.0 to about 6.5, about 6.5 to about 7.0, about 7.0 to about 7.4, about 7.4 to about 7.8, about 7.8 to about 8.2, about 8.2 to about 8.6, about 8.6 to about 9, about 9 to about 9.5, about 9.5 to about 10, or about 8 to about 8.5). The seeds can then be separated from the liquid by sieving to yield a wet seeds fraction and a liquid fraction that contains dissolved solids. The wet seeds fraction can be roasted (e.g., by air roasting, conductive roasting, fire roasting, or radiative heat roasting), and the liquid fraction also can be roasted (e.g., by dry roasting). Any suitable roasting temperature can be used (e.g., about 300° F. to about 450° F., about 325° F. to about 425° F., or about 350° F. to about 400° F.). The roasted wet seeds then can be ground (e.g., using a burr mill, a roller mill, a pin mill, an air classifier mill, a hammer mill, a colloid mill if fat or liquid has been added, a stone mill, blade mill, jet mill, high impact mill, or espresso grinder), to achieve a particle size between about 20 microns and about 300 microns (e.g., about 20 to about 50 microns, about 50 to about 75 microns, about 75 to about 100 microns, about 100 to about 150 microns, about 150 to about 200 microns, about 200 to about 250 microns, or about 250 microns to about 300 microns). The roasted and milled wet seeds fraction can then be recombined with the roasted liquid fraction. One or more plant oils (e.g., corn oil, sunflower oil, palm oil, coconut oil, shea oil, *illipe* oil, mango kernel oil, palm kernel oil, canola oil, avocado oil, safflower oil, or any other appropriate plant oil) can be added, and the mixture can be milled (e.g., using a stone corundum mill or a colloid mill) at a temperature less than about 65° C. (e.g., about 60° C. to about 65° C., about 55° C. to about 60° C., about 50° C. to about 55° C., about 50° C. to about 60° C., less than about 60° C., or less than about 55° C.), to reach a final particle size less than about 75 microns (e.g., about 70 to about 75 microns, about 65 to about 70 microns, about 60 to about 65 microns, about 50 to about 60 microns, less than about 70 microns, less than about 65 microns, or less than about 60 microns). The milled mixture then can be passed through a sieve (e.g., 100 micron sieve) to yield a solid substrate for inclusion in a chocolate replica.

Other methods for preparing a solid substrate from whole plant seeds can include cleaning whole seeds (e.g., using one or more of a destoner, a scalping deck, an aspiration channel, a sizing deck, an optical sorter, and a sieve) to remove unwanted chaff, broken material, and other products of agricultural origin (e.g., stones, fruit skins, stems, sticks, etc.). The whole seeds can be with a caustic solution (e.g., sodium hydroxide, potassium hydroxide, sodium carbonate, calcium carbonate, calcium hydroxide, or potassium bicarbonate) and water at a pressure of 0-10 bar (e.g., 0-2 bar, 2-4 bar, 4-6 bar, 6-8 bar, or 8-10 bar), and at an elevated temperature (e.g., about 55° C. and about 95° C., about 55° C. to about 75° C., about 65° C. to about 85° C., about 75° C. to about 95° C., about 70° C., about 75° C., or about 80° C.) with agitation for a suitable length of time (e.g., about 5 to about 120 minutes, about 10 to about 90 minutes, about 20 to about 60 minutes, about 30 to about 45 minutes, about 20 minutes, about 30 minutes, or about 40 minutes), to reach a pH of about 7.8 to about 9.2 (e.g., about 7.8 to about 8.2, about 8.2 to about 8.6, about 8.6 to about 9, about 9 to about 9.2, or about 8 to about 9). In some cases, the treated seeds can be dutched, in which case the seed mixture can be dried (e.g., by tray drying, spray drying, drum drying, or vacuum drying). The seeds can be sieved to separate the wet seeds from the liquid, and the two streams can be dried separately. Alternatively, a vacuum can be pulled to evaporate moisture from the seed slurry. In some cases, one or more enzymes (e.g., cellulase, tannase, pectinase, xylase, or hemicellulose) can be added to the seeds, optionally along with water and/or one or more additional agents (e.g., a caustic material, an acidulant, or hydrogen peroxide). The seeds and solids can be roasted using, for example, convection, conduction, infrared, or a combination thereof. The roasted seeds and other solids from the roasting step can then be ground using, for example, a crushing mill, a burr mill, an espresso grinder, a stone mill, a blade mill, a hammer mill, an air classifier mill, a high impact mill or a jet mill, and optionally sifted, to yield a solid substrate for inclusion in a chocolate replica.

Any appropriate method can be used to prepare a chocolate replica provided herein (e.g., a chocolate replica containing a solid substrate, or not containing a solid substrate). When included in a chocolate replica, a solid substrate can be present in any appropriate amount, ranging from 0.5 wt % to 99.9 wt % (e.g., about 0.5 to about 30 wt %, about 0.5 to about 3 wt %, about 3 to about 5 wt %, about 5 to about 10 wt %, about 10 to about 20 wt %, about 20 to about 30 wt %, about 30 to about 40 wt %, about 40 to about 50 wt %, about 50 wt % to about 99.9 wt %, about 50 wt % to about 60 wt %, about 60 wt % to about 70 wt %, about 70 wt % to about 80 wt %, about 80 wt % to about 90 wt %, about 90 wt % to about 95 wt %, about 95 wt % to about 99.9 wt %, about 50 wt %, about 55 wt %, about 60 wt %, about 65 wt %, about 70 wt %, about 75 wt %, about 80 wt %, about 85 wt %, about 90 wt %, about 95 wt %, or about 99 wt %).

In some cases, one or more sugars, seed meals, plant oils (e.g., corn oil, sunflower oil, palm oil, coconut oil, shea oil, *illipe* oil, mango kernel oil, palm kernel oil, canola oil, avocado oil, safflower oil, or any other appropriate plant oil), amino acids, salts, VOCs, and/or nonvolatile compounds can be combined with a solid substrate. For example, a solid substrate can be mixed with one or more sugars, seed meals, plant oils, amino acids, salts, and/or nonvolatile compounds can be mixed together (e.g., at about 30 to 40° C. for about 10 to 60 minutes), and then one or more VOCs, acids, and other nonvolatiles can be mixed with the other ingredients (e.g., at about 30 to about 40° C. for about 10 to about 60 minutes). The combination can be emulsified (e.g., using a ball mill) at suitable temperature (e.g., up to about 40° C.) until the particle size is less than about 30 microns (e.g., less than 25 microns, or less than 20 microns). The chocolate replica can then be solidified (e.g., at about 10 to about 15° C. in mold blocks). In some cases, the chocolate replica can be de-molded and optionally further processed. For example, the chocolate can be melted, tempered, and deposited into molds (e.g., bar molds) and cooled (e.g., at about 5° C. to about 20° C., or about 10° C. to about 15° C.), or deposited onto a cooling belt to produce chips or chunks.

In some cases, a chocolate replica can be produced by mixing a solid substrate with one or more plant oils (e.g., corn oil, sunflower oil, palm oil, coconut oil, shea oil, *illipe* oil, mango kernel oil, palm kernel oil, canola oil, avocado oil, safflower oil, or any other appropriate plant oil), sugars, salts, seed meals/flours, amino acids, and/or non-volatile compounds (e.g., with mixing at about 30° C. to about 40° C., or about 35° C.) to homogenize the mixture. The resulting slurry can be pumped into a particle size reduction machine (e.g., a continuous rotor stator particle size reduction machine) by any appropriate means (e.g., a medium/high tip speed with a corrugated barrel). The material can optionally be homogenized, and additional nonvolatile ingredients (if any) can be added. The mixture can then be pumped onto a refiner to reduce the particle size of the material to less than about 30 microns (e.g., less than about 25 microns, or less than about 20 microns). The material then can be conveyed to a liquefier or conch, and additional fat, lecithin, and volatile flavors can be added to develop the flavor and create the final texture. The chocolate replica optionally can be tempered. The optionally tempered chocolate replica can be solidified at a temperature of about 5° C. to about 20° C. (e.g., about 10° C. to about 15° C.) in molds or on a belt slab, for example. The chocolate replica then can be de-molded and optionally packed or wrapped (e.g., for further processing or use as an industrial ingredient). For further processing, the chocolate replica can be melted at an elevated temperature (e.g., greater than about 25° C., greater than about 30° C., or greater than about 35° C.). The melted chocolate replica can be tempered to obtain a desired fat crystal structure, and then placed into molds (e.g., bar molds) and cooled (e.g., at about 5° C. to about 20° C., or about 10° C. to about 15° C.), or deposited onto a cooling belt to produce chips or chunks.

In some cases, a chocolate replica can be produced by combining a solid substrate with one or more plant oils (e.g., corn oil, sunflower oil, palm oil, coconut oil, shea oil, *illipe* oil, mango kernel oil, palm kernel oil, canola oil, avocado oil, safflower oil, or any other appropriate plant oil), sugars, salts, seed meals/flours, amino acids, and other non-volatile compounds. The combination can be mixed (e.g., at about 30° C. to about 40° C., or about 35° C.) to homogenize the stream. The resulting slurry can be pumped into, for example, a 2-roll prefine followed by a homogenizing screw, and the material can optionally be homogenized along with any additional non-volatile ingredients. The mix can be conveyed directly onto a refiner to reduce the particle size of the material to less than about 30 microns (e.g., less than about 25 microns, or less than about 20 microns). The material can be conveyed to a liquefier or conch where additional fat, lecithin, and volatile flavors can be added to develop the flavor and create the final texture. In some cases, that material can be pumped into a ball mill (e.g., a continuous ball mill) for further particle size reduction. The chocolate replica optionally can be tempered. The optionally tempered chocolate replica can be solidified at a temperature of about 5° C. to about 20° C. (e.g., about 10° C. to about 15° C.) in molds or on a belt slab, for example. The chocolate replica then can be de-molded and optionally packed or wrapped (e.g., for further processing or use as an industrial ingredient). For further processing, the chocolate replica can be melted at an elevated temperature (e.g., greater than about 25° C., greater than about 30° C., or greater than about 35° C.). The melted chocolate replica can be tempered to obtain a desired fat crystal structure, and then placed into molds (e.g., bar molds) and cooled (e.g., at about 5° C. to about 20° C., or about 10° C. to about 15° C.), or deposited onto a cooling belt to produce chips or chunks.

In some cases, the methods provided herein can be used to produce a chocolate bean replica. For example, to generate a chocolate bean replica, water-soluble VOCs and water-soluble non-volatile compounds can be dissolved in water or another aqueous solution. Separately, an emulsion can be produced from fat-soluble VOCs and fat-soluble non-volatile compounds using a neutral oil (e.g., a fully deodorized oil such as palm oil, shea oil, mango kernel oil, *illipe* oil, cottonseed oil, corn oil, sunflower oil, or coconut oil), with a homogenizer (e.g., a rotor stator high shear homogenizer or a high pressure inline recirculating homogenizer). To assist in forming the emulsion, one or more emulsifiers, starches, gums, and/or polysaccharides also can be added. The water-soluble and emulsion fractions can be mixed together (e.g., in a tank with high shear blending capabilities). A solid substrate material with a particle size of about 20 to about 1500 µm (e.g., about 20 to about 30 µm, about 30 to about 40 µm, about 40 to about 50 µm, about 50 to about 75 µm, about 75 to about 100 µm, about 100 to about 250 µm, about 250 to about 500 µm, about 500 to about 1000 µm, or about 1000 to about 1500 µm) can be combined with the mixture containing the water-soluble ingredients and the emulsion. In some cases, the water-soluble and emulsion mixture can be sprayed onto the solid substrate while mixing. In some cases, a tableting aid (e.g., one or more grain or non-grain ingredients that can aid in tableting, such as a binding agent like a starch, a sugar, and/or a gum) can be added. The mixture can then be tableted (e.g., in a pill press or similar apparatus) to form a chocolate bean replica. Optionally, the chocolate bean replica can be coated with, for example, shellac, zein protein, or wax.

This document also provides methods for making a chocolate beverage replica. For example, water-soluble VOCs and water-soluble non-volatile compounds can be dissolved in water or another aqueous solution. Separately, an emulsion can be produced from fat-soluble VOCs and fat-soluble non-volatile compounds using a neutral oil (e.g., a fully deodorized oil such as palm oil, shea oil, mango kernel oil, *illipe* oil, cottonseed oil, corn oil, sunflower oil, or coconut oil), with a homogenizer (e.g., a rotor stator high shear homogenizer or a high pressure inline recirculating homogenizer). To assist in forming the emulsion, one or more emulsifiers, starches, gums, and/or polysaccharides also can be added. The water-soluble and emulsion fractions can be mixed together (e.g., in a tank with high shear blending capabilities). The mixed fractions can then be processed to reach commercial sterility (e.g., using one or more methods such as ultra clean processing, UHT aseptic processing, filling and retorting, filling followed by Ohmic sterilization, or UV/PEF inline sterilization and aseptic filling).

In some cases, a chocolate beverage replica can be produced by combining a solid substrate with one or more plant oils (e.g., corn oil, sunflower oil, palm oil, coconut oil, shea oil, *illipe* oil, mango kernel oil, palm kernel oil, canola oil, avocado oil, safflower oil, or any other appropriate plant oil), sugars, salts, seed meals/flours, amino acids, and other non-volatile compounds, and mixing (e.g., at a temperature between about 30° C. and about 40° C. (e.g., about 35° C.) to homogenize the combination. The resulting slurry can be pumped into, for example, a 2-roll prefine followed by a homogenizing screw. Optionally, the material can be homogenized along with the addition of further non-volatile ingredients. The mixture can then be conveyed onto a refiner to reduce the particle size to less than about 30 microns (e.g., less than about 25 microns, or less than about 20 microns). The slurry can be conveyed to a liquefier or conch, can additional fat, lecithin, and/or volatile flavors can be added to develop the flavor and create the final texture. In some cases, the material can be pumped into a mill (e.g., a continuous ball mill) for further particle size reduction. After an optional tempering step, the chocolate replica can be solidified in blocks (e.g., at about 10° C. to about 15° C.) in molds or on a belt slab. After de-molding, an emulsion of fat-soluble material can be generated from the chocolate replica using a homogenizer (e.g., a rotor stator high shear homogenizer or a high pressure inline recirculating homogenizer). In some cases, one or more emulsifiers, starches, gums, and/or polysaccharides can be added to facilitate generation of the emulsion. The emulsion fraction can be mixed with other ingredients (e.g., additional sugars, flavors, and/or stabilizers) in, for example, a mix tank with high shear blending capabilities. The mixture can then be processed to achieve commercial sterility using, for example, ultra clean processing, UHT aseptic processing, filling and retorting, filling followed by Ohmic sterilization, and/or UV/PEF inline sterilization and aseptic filling.

In some embodiments, chocolate bean replicas or chocolate bar replicas as described herein can also include an emulsifier.

In some embodiments, chocolate bean replicas can also include a shellac or a bulking agent (e.g., a grain meal).

In some embodiments, chocolate bean replicas as described herein can have a higher concentration of cellulose than a traditional chocolate bean. In some embodiments, chocolate bean replicas as described herein can have a lower concentration of cellulose than a traditional chocolate bean. In some embodiments, chocolate bean replicas as described herein can have a higher concentration of hemicellulose than a traditional chocolate bean. In some embodiments, chocolate bean replicas as described herein can have a lower concentration of hemicellulose than a traditional chocolate bean.

In some embodiments, chocolate bean replicas can have a different physical structure than a traditional chocolate bean. For example, some traditional chocolate beans have a continuous granular structure, while, in some embodiments, chocolate bean replicas as described herein can have a homogeneous structure.

In some embodiments, chocolate bean replicas can display a different fracture pattern than traditional chocolate beans when subjected to the same fracturing assay.

Because of the methods by which they are made, the chocolate replicas provided herein typically lack contaminants and other detrimental compounds that sometimes are encountered in traditional chocolates. These include, without limitation, organisms such as *Escherichia coli*, *Salmonella* sp., *Brettanomyces* sp., *Lactobacillales*, *Aspergillus* (e.g., *A. ochraceus*, *A. carbonarius*), *Penicillium* (e.g., *P. verrucosum*), *Saccharomyces* sp. (which are often used by distillers and brewers), *Acremonium strictum*, *Chrysonilia sitophila*, *Cladosporium oxysporum*, *Fusarium oxysporum*, *Mortierella alpina*, *Mucor plumbeus*, *Paecilomyces viridis*, *Penicillium chrysogenum*, *Penicillium citreonigrum*, *Penicillium decumbens*, *Penicillium purpurogenum*, *Trichoderma longibrachiatum*, *Trichoderma viride*, and *Verticillium psalliotae*, as well as mold, mildew, rot, insects, insect eggs, insect filth, rodent filth, mammalian excreta, insect lecithins, hydrogen sulfide, hydrogen disulfide, 2,4,6-trichloranisole, 2,4,6,-tribromoanisole, aflatoxin, aldrin, dieldrin, benzene hexachloride, chlordane, dichlorodiphenyltrichloroethane (DDT), dichlorodiphenyldichloroethylene (DDE), dichlorodiphenyldichloroethane (TDE), dimethylnitrosamine (nitrosodimethylamine), ethylene dibromide (EDB), heptachlor, heptachlor epoxide, lindane, mercury, methanol, ethylene glycol, dichloromethane, aluminum, antimony, arsenic, cadmium, chromium, cobalt, copper, lead, manganese, nickel, tin, acrylamide, ochratoxins, mycotoxins, and polycyclic aromatic hydrocarbons.

It is noted that while chocolate replicas can include volatile and non-volatile compounds as listed herein, the added compounds may react with one another to generate additional compounds, or to change the effective amount of one or more of the added compounds within the chocolate replica formulations.

This document also provides methods for generating concentrated versions of chocolate replicas (e.g., chocolate concentrate replicas), where the concentrated versions include all of the VOCs and non-volatile components of the final product, but without the bulk of water or other ingredients such as fats and/or sugars. Such concentrates can be manufactured and then shipped to a second location, where a diluent (e.g., water or an aqueous solution containing, for example, a sugar, a sugar alcohol, a milk such as an animal milk or a plant-based milk, and/or one or more flavorants) can be added volume to create a finished chocolate replica.

Any suitable concentration of VOCs and non-volatile compounds can be used. For example, a concentrated replica can include VOCs and non-volatile components in a concentration of at least about 1.1-fold (e.g., 1.1-fold, 1.2-fold, 1.3-fold, 1.5-fold, 1.6-fold, 1.7-fold, 1.8-fold, 1.9-fold, 2-fold, 3-fold, 5-fold, 8-fold, 10-fold, 15-fold, 20-fold, 50-fold, 100-fold, 200-fold, 500-fold, 1000-fold, 1500-fold, or 2000-fold) concentrations in the final product, such that they can be diluted by at least about 1.1-fold (e.g., 1.2-fold, 1.3-fold, 1.5-fold, 1.6-fold, 1.7-fold, 1.8-fold, 1.9-fold, 2-fold, 3-fold, 5-fold, 8-fold, 10-fold, 15-fold, or 20-fold, 50-fold, 100-fold, 200-fold, 500-fold, 1000-fold, 1500-fold, or 2000-fold), respectively, with a diluent to yield the final product. The concentrates provided herein can contain all of the formulaic flavor, acid, and other components that are present in the final product. In general, such concentrates can be prepared in much the same way as a non-concentrated beverage replica, by combining the desired amounts of VOCs and non-volatile components but omitting the bulk of the water or other components.

Any of the chocolate replicas described herein can be made as a concentrate, e.g., using the methods disclosed herein. It will be appreciated that the amount of any component (e.g., VOC or non-volatile) disclosed herein as an amount for a replica (e.g., a 1× replica) can be multiplied by the concentration factor (e.g., 1.1-fold, 1.2-fold, 1.3-fold, 1.5-fold, 1.6-fold, 1.7-fold, 1.8-fold, 1.9-fold 2-fold, 3-fold, 5-fold, 8-fold, 10-fold, 15-fold, or 20-fold, 50-fold, 100-fold, 200-fold, 500-fold, 1000-fold, 1500-fold, or 2000-fold) for the appropriate concentrated amount.

Also provided herein are methods of generating a chocolate replica. In some embodiments, the method can include
a) forming an aqueous solution that includes:
water,
VOCs that are water-soluble, and
non-volatile compounds that are water-soluble;
b) forming an emulsion that includes:
an oil,
VOCs that are fat-soluble, and
non-volatile compounds that are fat-soluble; and
c) mixing the aqueous solution and the emulsion to form a flavor mixture.

The VOCs can be any appropriate VOCs. In some embodiments, the VOCs can be any of the VOCs described herein. That is, in some cases, any of the VOCs described herein (e.g., 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether, (E)-anethole, 1-heptanol, 2,3,5-trimethyl-6-ethylpyrazine, 2,3-butanedione, 2,4,5-trimethylthiazole, 2-acetylpyridine, 2-ethoxy-3-methyl pyrazine, 2-ethyl-1-hexanol, 2-ethyl-5-methylpyrazine, 2-ethyl-6-methylpyrazine, 2-ethylene-6-methylpyrazine, 2-isobutyl-3-methoxypyrazine, 2-isopropyl-5-methyl-2-hexenal, 2-methyl butyraldehyde, 2-methyl furan, 2-methyl-1-butanol, 2-octanol, 2-octanone, 2-pentanol, 2-phenyl-2-butenal, 2-phenylpropionaldehyde, 3,4-hexanedione, 3,5-diethyl-2-methylpyrazine, 3-methyl-1,2-cyclopentanedione (cyclotene), 3-octanone, 4,5-dimethyl-2-ethyl-3-thiazoline, 4-ethylguaiacol, 4-hydroxy-2,5-dimethy-3(2H)-furanone (furaneol), 4-methyl-2-phenyl-2-pentenal, 4-methyl-5-thiazoleethanol, 4'-methylacetophenone, 4-methylguaiacol, 5-methylfurfural, 6-propyl-5,6-dihydropyran-2-one, acetic acid, amyl acetate, anethole, benzyl alcohol, beta-damascenone, damascenone, delta-decalactone, delta-octalactone, ethyl 2-methylbutyrate, ethyl 3-phenylpropionate, ethyl acetate, ethyl butanoate, ethyl isobutyrate, ethyl isovalerate, eugenol, furfuryl acetate, furfuryl propionate, geraniol, hexyl isobutyrate, isoamyl benzoate, isoamyl butyrate, isoamyl phenylacetate, isopropenyl pyrazine, linalool oxide, methional, methyl 2-thiofuroate, methyl butyrate, methyl p-anisate, methyl phenylacetate, ocimene, octanal, p-cresol, phenol, phenylacetic acid, prenyl benzoate, propanol, propenal, propyl 2-furoate, pyridine, syringol, tetrahydrofurfuryl phenylacetate, trans-2-nonenal, tricyclodecenyl isobutyrate, 1-octanol, 1-octen-3-ol, 1-octen-3-one, 2,3-diethyl-5-methylpyrazine, 2,3-dimethylpyrazine, 2,3,5-trimethylpyrazine, 2,5-dimethylpyrazine, 2,6-dimethylpyrazine, 2-acetyl-5-methylfuran, 2-ethyl-3-methylpyrazine, 2-ethylpyrazine, 2-heptanol, 2-heptanone, 2-isopropyl-3-methoxypyrazine, 2-methylbutyl isovalerate, 2-methylbutyraldehyde, 2-methylbutyric acid, 2-methylpyrazine, 2-nonanol, 2-nonanone, 2-pentyl furan, 2-undecanone, 3-hydroxy-2-methyl-4H-pyrone-4-one (maltol), 5-methyl-2-phenyl-2-hexenal, benzaldehyde, benzyl acetate, beta-ionone, butyl acetate, butyric acid, decanal, diethyl succinate, dimethyl trisulfide, ethyl benzoate, ethyl cinnamate, ethyl decanoate, ethyl heptanoate, ethyl hexanoate, ethyl lactate, ethyl laurate, ethyl octanoate, ethyl phenylacetate, furfural, gamma-nonalactone, gamma-valerolactone, geranyl acetate, guaiacol, hexanal, hexanoic acid, hexanol, hexyl acetate, isoamyl acetate, isoamyl alcohol, isoamyl isobutyrate, isobutyl acetate, isobutyraldehyde, isobutyric acid, isovaleraldehye, isovaleric acid, limonene, massoia lactone, methyl salicylate, myrcene, nonanal, phenethyl acetate, phenethyl alcohol, phenylacetaldehyde, tetramethylpyrazine, trans,trans-2,4-decadienal, valeraldehyde, and vanillin) can be water-soluble. In some cases, any of the VOCs described herein (e.g., 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether, (E)-anethole, 1-heptanol, 2,3,5-trimethyl-6-ethylpyrazine, 2,3-butanedione, 2,4,5-trimethylthiazole, 2-acetylpyridine, 2-ethoxy-3-methyl pyrazine, 2-ethyl-1-hexanol, 2-ethyl-5-methylpyrazine, 2-ethyl-6-methylpyrazine, 2-ethylene-6-methylpyrazine, 2-isobutyl-3-methoxypyrazine, 2-isopropyl-5-methyl-2-hexenal, 2-methyl butyraldehyde, 2-methyl furan, 2-methyl-1-butanol, 2-octanol, 2-octanone, 2-pentanol, 2-phenyl-2-butenal, 2-phenylpropionaldehyde, 3,4-hexanedione, 3,5-diethyl-2-methylpyrazine, 3-methyl-1,2-cyclopentanedione (cyclotene), 3-octanone, 4,5-dimethyl-2-ethyl-3-thiazoline, 4-ethylguaiacol, 4-hydroxy-2,5-dimethy-3(2H)-furanone (furaneol), 4-methyl-2-phenyl-2-pentenal, 4-methyl-5-thiazoleethanol, 4'-methylacetophenone, 4-methylguaiacol, 5-methylfurfural, 6-propyl-5,6-dihydropyran-2-one, acetic acid, amyl acetate, anethole, benzyl alcohol, beta-damascenone, damascenone, delta-decalactone, delta-octalactone, ethyl 2-methylbutyrate, ethyl 3-phenylpropionate, ethyl acetate, ethyl butanoate, ethyl isobutyrate, ethyl isovalerate, eugenol, furfuryl acetate, furfuryl propionate, geraniol, hexyl isobutyrate, isoamyl benzoate, isoamyl butyrate, isoamyl phenylacetate, isopropenyl pyrazine, linalool oxide, methional, methyl 2-thiofuroate, methyl butyrate, methyl p-anisate, methyl phenylacetate, ocimene, octanal, p-cresol, phenol, phenylacetic acid, prenyl benzoate, propanol, propenal, propyl 2-furoate, pyridine, syringol, tetrahydrofurfuryl phenylacetate, trans-2-nonenal, tricyclodecenyl isobutyrate, 1-octanol, 1-octen-3-ol, 1-octen-3-one, 2,3-diethyl-5-methylpyrazine, 2,3-dimethylpyrazine, 2,3,5-trimethylpyrazine, 2,5-dimethylpyrazine, 2,6-dimethylpyrazine, 2-acetyl-5-methylfuran, 2-ethyl-3-methylpyrazine, 2-ethylpyrazine, 2-heptanol, 2-heptanone, 2-isopropyl-3-methoxypyrazine, 2-methylbutyl isovalerate, 2-methylbutyraldehyde, 2-methylbutyric acid, 2-methylpyrazine, 2-nonanol, 2-nonanone, 2-pentyl furan, 2-undecanone, 3-hydroxy-2-methyl-4H-pyrone-4-one (maltol), 5-methyl-2-phenyl-2-hexenal, benzaldehyde, benzyl acetate, beta-ionone, butyl acetate, butyric acid, decanal, diethyl succinate, dimethyl trisulfide, ethyl benzoate, ethyl cinnamate, ethyl decanoate, ethyl heptanoate, ethyl hexanoate, ethyl lactate, ethyl laurate, ethyl octanoate, ethyl phenylacetate, furfural, gamma-nonalactone, gamma-valerolactone, geranyl acetate, guaiacol, hexanal, hexanoic acid, hexanol, hexyl acetate, isoamyl acetate, isoamyl alcohol, isoamyl isobutyrate, isobutyl acetate, isobutyraldehyde, isobutyric acid, isovaleraldehye, isovaleric acid, limonene, massoia lactone, methyl salicylate, myrcene, nonanal, phenethyl acetate, phenethyl alcohol, phenylacetaldehyde, tetramethylpyrazine, trans,trans-2,4-decadienal, valeraldehyde, and vanillin) can be fat-soluble. The VOCs can be present in any appropriate amount.

The non-volatile compounds can be any appropriate non-volatile compounds. In some embodiments, the non-volatile compounds can be any of the non-volatile compounds described herein. That is, in some cases, any of the non-volatile compounds described herein (e.g., choline, pyridine, pyridoxine, 2(5H)-furanone, 2,3-dimethylpyrazine, caffeine, orientin, 4-hydroxybenzaldehyde, methyl 2-pyrrolyl ketone, 2,3,5-trimethylpyrazine, 2,3,5,6-tetramethylpyrazine, isoprenylpyrazine, 2-isopropyl-3-methoxypyrazine, piperine, 2-isobutyl-3-methoxypyrazine, catechin, adipic acid, methyl gallate, epicatechin, rutin, trans-ferulic acid, sinapinic acid, resveratrol, ellagic acid, propyl gallate, salicylic acid, quercetin, hesperetin, AMP, hydroxymethylfurfural, procyanidin B1, pantothenic acid, sotolon, caffeic acid, epicatechin gallate, vanillic acid, syringic acid, homofuraneol, vanillin, syringaldehyde, coumaric acid, acetovanillone, cinnamic acid, luteolin, polydatin, cytosine, CMP, adenine, cytidine, guanine, 4-guanidinobutyric acid, uracil, tyramine, tryptamine, maltol, maple furanone, acetanilide, sorbic acid, phenylalanine, leucine, glucosamine, methionine, GABA, tyrosine, lysine, histidine, glycine, serine, aspartic acid, isoleucine, tryptophan, valine, proline, carnitine, arginine, ornithine, B-alanine-2, threonine, glutamine, asparagine, cysteine, glutamic acid, betaine, pipecolinic acid, trans-4-hydroxyproline, citrulline, carnosine, homoserine, cystine, kynurenic acid, ribose, arabitol, fructose, rhamnose, mannitol, glucose, lactose, xylose, sorbitol, fucose, galactose, mannose, sucrose, myo-inositol, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, nicotinic acid, 8-hydroxyquinoline, quinoline, 5-methoxyresorcinol, chlorogenic acid, ethyl nicotinate, and eugenyl acetate) can be water-soluble. In some cases, any of the non-volatile compounds described herein (e.g., choline, pyridine, pyridoxine, 2(5H)-furanone, 2,3-dimethylpyrazine, so caffeine, orientin, 4-hydroxybenzaldehyde, methyl 2-pyrrolyl ketone, 2,3,5-trimethylpyrazine, 2,3,5,6-tetramethylpyrazine, isoprenylpyrazine, 2-isopropyl-3-methoxypyrazine, piperine, 2-isobutyl-3-methoxypyrazine, catechin, adipic acid, methyl gallate, epicatechin, rutin, trans-ferulic acid, sinapinic acid, resveratrol, ellagic acid, propyl gallate, salicylic acid, quercetin, hesperetin, AMP, hydroxymethylfurfural, procyanidin B1, pantothenic acid, sotolon, caffeic acid, epicatechin gallate, vanillic acid, syringic acid, homofuraneol, vanillin, syringaldehyde, coumaric acid, acetovanillone, cinnamic acid, luteolin, polydatin, cytosine, CMP, adenine, cytidine, guanine, 4-guanidinobutyric acid, uracil, tyramine, tryptamine, maltol, maple furanone, acetanilide, sorbic acid, phenylalanine, leucine, glucosamine, methionine, GABA, tyrosine, lysine, histidine, glycine, serine, aspartic acid, isoleucine, tryptophan, valine, proline, carnitine, arginine, ornithine, B-alanine-2, threonine, glutamine, asparagine, cysteine, glutamic acid, betaine, pipecolinic acid, trans-4-hydroxyproline, citrulline, carnosine, homoserine, cystine, kynurenic acid, ribose, arabitol, fructose, rhamnose, mannitol, glucose, lactose, xylose, sorbitol, fucose, galactose, mannose, sucrose, myo-inositol, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, nicotinic acid, 8-hydroxyquinoline, quinoline, 5-methoxyresorcinol, chlorogenic acid, ethyl nicotinate, and eugenyl acetate) can be fat-soluble. The non-volatile compounds can be present in any appropriate amount.

In some embodiments, the VOCs and non-volatile compounds can include (a) one or more VOCs, where at least one of the one or more VOCs are not present in a corresponding reference chocolate; (b) one or more VOCs, where the one or more VOCs do not include one or more VOCs that are present in a corresponding reference chocolate; (c) one or more non-volatile compounds, where the at least one of the one or more non-volatile compounds are not present in a corresponding reference chocolate; (d) one or more non-volatile compounds, where the one or more non-volatile compounds do not include one or more non-volatile compounds that are present in a corresponding reference chocolate; or (e) any combination of (a), (b), (c), and (d) [(a) and (b); (a) and (c); (a) and (d); (b) and (c); (b) and (d); (c) and (d); (a), (b), and (c); (a), (b), and (d); (a), (c), and (d); (b), (c), and (d); or (a), (b), (c), and (d)]. In some embodiments, a liquid chocolate replica can be characterized by (f) one or more VOCs, where the one or more VOCs are present in the chocolate replica in a total amount of at least 100 mg/kg. Characteristic (f) can be combined with any combination of (a)-(d) as described above.

An aqueous solution can be made by any appropriate method. In some embodiments, forming an aqueous solution can include using low shear blending.

An emulsion can be made by any appropriate method. In some embodiments, forming an emulsion can include homogenizing. In some embodiments, forming an emulsion includes using a rotator stator high shear homogenizer. In some embodiments, forming an emulsion includes using a high pressure inline recirculating homogenizer. In some embodiments, forming an emulsion can include the addition of an emulsifier, a starch, a gum, a polysaccharide, or a combination thereof.

An oil can be any appropriate oil. In some embodiments, an oil is a neutral oil. In some embodiments, an oil is a fully deodorized oil. In some embodiments, an oil includes corn oil, sunflower oil, or coconut oil.

In some embodiments, a chocolate replica is a chocolate concentrate replica or a chocolate beverage replica. In some such embodiments, the method can further include processing the flavor mixture to commercial sterility. Processing the flavor mixture to commercial sterility can be achieved by any appropriate method. In some embodiments, processing the flavor mixture to commercial sterility can include packaging the chocolate replica (e.g., in a bottle).

In some embodiments, the chocolate replica is a chocolate beverage replica, and processing the flavor mixture to commercial sterility can include one or more of:
a) ultra clean processing,
b) UHT aseptic processing,
c) fill and retort processing,
d) fill then Ohmic sterilization, or
e) UV/PEF inline sterilization and aseptic filling.

In some embodiments, the method can further include agglomeration of particles. Agglomeration of particles can be achieved through any suitable method. In some embodiments, agglomeration of particles can be achieved through one or more of: pneumatic mixing, steam-jet, fluid-bed, pan, or spray drying, drum, mixer, roller, or extrusion agglomeration. In some embodiments, agglomeration of particles can be achieved through foam mat drying. In some embodiments, the method can further include packaging the chocolate replica (e.g., filling a jar, or filling single-serving pouches).

In some embodiments, the chocolate replica is a chocolate bean replica or a chocolate bars replica. In some such embodiments, a solid substrate mixed in a mixer (e.g., a blender). In some such embodiments, the method can further include applying the flavor mixture to a solid substrate to form a coated solid substrate. The flavor mixture can be applied to a solid substrate using any suitable method. In some embodiments, applying the flavor mixture includes spray applying the flavor mixture.

A solid substrate can be any suitable solid substrate. In some embodiments, a solid substrate can be any of the solid substrates described herein. In some embodiments, the solid substrate includes processed or unprocessed grains or grain products, legumes or legume seeds, oil plants or seeds, fruits or fruit products, roots, tubers, or root or tuber products, sugar processing by-products, or other plant by-products. A solid substrate can have any suitable particle size.

In some embodiments, the chocolate replica is a chocolate bars replica. In some embodiments, the method can further include filling a receptacle (e.g., a bag) with the chocolate bars replica.

In some embodiments, the chocolate replica is a chocolate bean replica. In some such embodiments, the method can further include adding a tableting aid to the coated solid substrate. A tableting aid can be any appropriate tableting aid. In some embodiments, a tableting aid can include a starch, a sugar, a gum, or a combination thereof. In some embodiments, the method can further include forming the coated solid substrate into a chocolate bean-like shape to form a chocolate bean replica. Any suitable method can be used to form the coated solid substrate into a chocolate bean-like shape. In some embodiments, forming the coated solid substrate into a chocolate bean-like shape can include using a rotary pill press. In some embodiments, a chocolate bean replica can be coated. A chocolate bean replica can be coated with any appropriate coating. In some embodiments, a chocolate bean replica can be coated with shellac, zein protein, or wax.

Exemplary Embodiments

Embodiment 1 is a chocolate replica comprising a plant-based solid substrate, one or more isolated volatile organic compounds (VOCs), wherein the one or more isolated VOCs comprise at least one of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether, (E)-anethole, 1-heptanol, 2,3,5-trimethyl-6-ethylpyrazine, 2,3-butanedione, 2,4,5-trimethylthiazole, 2-acetylpyridine, 2-ethoxy-3-methyl pyrazine, 2-ethyl-1-hexanol, 2-ethyl-5-methylpyrazine, 2-ethyl-6-methylpyrazine, 2-ethylene-6- methylpyrazine, 2-isobutyl-3-methoxypyrazine, 2-isopropyl-5-methyl-2-hexenal, 2-methylbutyraldehyde, 2-methyl furan, 2-methyl-1-butanol, 2-octanol, 2-octanone, 2-pentanol, 2-phenyl-2-butenal, 2-phenylpropionaldehyde, 3,4-hexanedione, 3,5-diethyl-2-methylpyrazine, 3-methyl-1,2-cyclopentanedione, 3-octanone, 4,5-dimethyl-2-ethyl-3-thiazoline, 4-ethylguaiacol, 4-hydroxy-2,5-dimethy-3(2H)-furanone, 4-methyl-2-phenyl-2-pentenal, 4-methyl-5-thiazoleethanol, 4'-methylacetophenone, 4-methylguaiacol, 5-methylfurfural, 6-propyl-5,6-dihydropyran-2-one, acetic acid, amyl acetate, anethole, benzyl alcohol, beta-damascenone, damascenone, delta-decalactone, delta-octalactone, ethyl 2-methylbutyrate, ethyl 3-phenylpropionate, ethyl acetate, ethyl butanoate, ethyl isobutyrate, ethyl isovalerate, eugenol, furfuryl acetate, furfuryl propionate, geraniol, hexyl isobutyrate, isoamyl benzoate, isoamyl butyrate, isoamyl phenylacetate, isopropenyl pyrazine, linalool oxide, methional, methyl 2-thiofuroate, methyl butyrate, methyl p-anisate, methyl phenylacetate, ocimene, octanal, p-cresol, phenol, phenylacetic acid, prenyl benzoate, propanol, propenal, propyl 2-furoate, pyridine, syringol, tetrahydrofurfuryl phenylacetate, trans-2-nonenal, and tricyclodecenyl isobutyrate; and one or more isolated non-volatile compounds.

Embodiment 2 is the chocolate replica of embodiment 1, wherein the plant-based solid substrate does not contain cocoa solids.

Embodiment 3 is the chocolate replica of embodiment 1 or embodiment 2, wherein the plant-based solid substrate was derived from a food stream waste product.

Embodiment 4 is the chocolate replica of embodiment 3, wherein the plant-based solid substrate was derived from a food stream waste product from which at least 75% of a starting amount of starch, protein, sugar, fat-soluble components, and flavor has been removed.

Embodiment 5 is the chocolate replica of any one of embodiments 1 to 4, wherein the plant-based solid substrate was derived from a fruit or vegetable seed.

Embodiment 6 is the chocolate replica of embodiment 5, wherein the fruit or vegetable seed is from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, cranberry, raspberry, blueberry, strawberry, blackberry, pomegranate, kiwi, muskmelon, cantaloupe, honeydew, passionfruit, starfruit, tomatillo, dragonfruit, soursop, calamansi, okra, cucumber, bell pepper, eggplant, pear, cherimoya, pineapple, quince, lingonberry, thistle (nyger), green bean, and combinations thereof.

Embodiment 7 is the chocolate replica of any one of embodiments 1 to 4, wherein the plant-based solid substrate comprises a processed fruit pomace or peel.

Embodiment 8 is the chocolate replica of embodiment 7, wherein the fruit pomace or peel is selected from the group consisting of apple pomace, banana peel, grape pomace, tomato pomace, tomato skins, and combinations thereof.

Embodiment 9 is the chocolate replica of any one of embodiments 1 to 4, wherein the plant-based solid substrate comprises a processed fruit or fruit product.

Embodiment 10 is the chocolate replica of embodiment 9, wherein the fruit or fruit product is selected from the group consisting of culled apples, banana fruits, banana leaves, banana pseudostems, breadfruit, breadnut, cashew nuts, cashew by-products, citrus pulp, citrus fruits, citrus seed meal, citrus molasses, citrus pulp, colocynth, date molasses, date palm leaves, date pedicels, date palm fruits, *guava*, grape seed oil meal, jackfruit, kokum, *Luffa*, mango fruit, mango by-products, *Moringa*, melon, olive oil cake, olive by-products, *papaya* fruits, *papaya* leaves, *papaya* by-products, pineapple by-products, pineapple leaves, pineapple mill juice, pumpkin, squash, gourd, sapucaia, Spanish lime, *seje*, tomato fruits, tomato leaves, tomato crop residues, tomato seed cake, walnut, watermelon forage, watermelon fruit, watermelon oil meal, and combinations thereof.

Embodiment 11 is the chocolate replica of any one of embodiments 1 to 4, wherein the plant-based solid substrate comprises a processed legume, legume by-product, or legume seed.

Embodiment 12 is the chocolate replica of embodiment 11, wherein the legume, legume by-product, or legume seed is selected from the group consisting of African locust bean, African yam bean, *bambara* barnut crop residue and straw, black gram, *bambara* barnut pods, *bambara* barnut shells, *bambara* barnut offals, blue lupin seeds, *bambara* barnut seeds, butterfly pea, carob, common bean, *centro*, common vetch, chickpea, cowpea seeds, *faba* bean, grass pea, guar forage, guar seed, guar meal, guanacaste, hairy vetch, horse gram, jack bean, *Lablab*, lima bean, lentil, mat bean, mung bean, narbon vetch, pea by-products, peanut seeds, pea protein concentrate, peanut skins, pea seeds, pigeon pea seeds, peanut forage, prickly *sesban*, peanut hulls, purple vetch, peanut meal, rain tree, rice bean, *sesban*, soybean seeds, soybean, sword bean, soybean forage, syrian mesquite, soybean meal, tamarind, *tamarugo*, velvet bean, white lupin seeds, winged bean, yellow lupin seeds, and combinations thereof.

Embodiment 13 is the chocolate replica of any one of embodiments 1 to 4, wherein the plant-based solid substrate comprises a processed oil plant, oil plant by-product, or oil plant seed.

Embodiment 14 is the chocolate replica of embodiment 13, wherein the oil plant, oil plant by-product, or oil plant seed is selected from the group consisting of almond kernels, almond by-products, argan, babassu, borneo tallow nut oil meal, *Bactris, Camelina* seeds, *Camelina* oil meal, cotton, cashew nuts, cashew by-products, castor seeds, castor oil meal, castor by-products, cotton straw, cotton crop residues, ceylon ironwood, chia seed, cocoa butter, cottonseed hulls, cottonseed meal, copra meal, coconut by-products, *Crambe*, corozo seed, corozo oil meal, doum palm, dragon's head, flax straw, flax crop by-products, grape seeds, grape seed oil meal, hemp, *Jatropha* kernel meal, *Jatropha* by-products, jojoba, kapok, kenaf, karanja, kusum, linseed meal, *Luffa*, linseed, *Macadamia, Moringa*, mahua, mustard oil meal, mustard bran, maize germ meal, maize germ, neem, *niger*, oil palm fronds, oil palm crop residues, olive oil cake, olive oil by-products, oil palm kernels, palm kernel meal, peanut seeds, palm oil mill effluent, peanut skins, palm press fibre, pinto peanut, peanut forage, poppy, peanut hulls, pumpkin, squash, gourd, peanut meal, rapeseed forage, rapeseed hulls, rapeseed meal, rapeseeds, rubber, safflower seeds, safflower oil meal, sal seeds, sal oil meal, soybean meal, soybean seeds, *seje*, sunflower, sesame seeds, sesame oil meal, shea butter, shea kernel, sickle pods, sunflower forage, sunflower crop residues, sunflower hulls, sunflower screenings, sunflower meal, sunflower seeds, soybean, soybean forage, soybean hulls, tung tree, tomato seed cake, walnut, watermelon seeds, watermelon oil meal, and combinations thereof.

Embodiment 15 is the chocolate replica of any one of embodiments 1 to 4, wherein the plant-based solid substrate comprises a processed grain or grain product.

Embodiment 16 is the chocolate replica of embodiment 15, wherein the grain or grain product is selected from the group consisting of atella, barley distillery by-products, broken rice, polished rice, barley grain, brown rice, brewers grains, cockspur grass grain, corn gluten feed, corn distillers grain, corn gluten meal, ear maize, finger millet grain, foxtail millet grain, fonio grain, maize bran, hominy feed, maize green forage, maize cobs, maize stover, maize germ meal, maize germ, malt culms, maize grain, millet hulls, oat hulls, oat mill feed, oats, pearl millet grain, proso millet grain, *quinoa*, red oat grain, rice protein concentrate, rice bran, rice by-products, rough rice, rice hulls, rye grain, rye by-products, sorghum by-products, starches, sorghum grain, tef grain, triticale, Venezuela grass, wheat, wheat germ, wheat bran, wheat grain, wheat distillers grain, wheat shorts, wheat middlings, feed flour, and combinations thereof.

Embodiment 17 is the chocolate replica of any one of embodiments 1 to 16, wherein the chocolate replica comprises about 0.5 wt % to about 30 wt % of the solid substrate.

Embodiment 18 is the chocolate replica of any one of embodiments 1 to 16, wherein the chocolate replica comprises about 30 wt % to about 50 wt % of the solid substrate.

Embodiment 19 is the chocolate replica of any one of embodiments 1 to 16, wherein the chocolate replica comprises about 50 wt % to about 70 wt % of the solid substrate.

Embodiment 20 is the chocolate replica of any one of embodiments 1 to 19, wherein the one or more isolated VOCs comprise one or more of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether.

Embodiment 21 is the chocolate replica of any one of embodiments 1 to 19, wherein the one or more isolated VOCs comprise at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, vanillyl ethyl ether, (E)-anethole, 2,3,5-trimethyl-6-ethylpyrazine, 2-ethyl-5-methylpyrazine, 2-ethyl-6-methylpyrazine, 2-ethylene-6-methylpyrazine, 3,4-hexanedione, 3,5-diethyl-2-methylpyrazine, 3-methyl-1,2-cyclopentanedione (cyclotene), 4-ethylguaiacol, 4-hydroxy-2,5-dimethy-3(2H)-furanone (furaneol), 4-methyl-5-thiazoleethanol, 4-methylguaiacol, 6-propyl-5,6-dihydropyran-2-one, acetic acid, anethole, beta-damascenone, ethyl butanoate, eugenol, methional, methyl 2-thiofuroate, methyl butyrate, ocimene, phenol, phenylacetic acid, propanol, propenal, and syringol.

Embodiment 22 is the chocolate replica of any one of embodiments 1 to 21, wherein the one or more isolated VOCs comprise at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, and vanillyl ethyl ether.

Embodiment 23 is the chocolate replica of embodiment 22, wherein said chocolate replica comprises 2,3-diethylpyrazine in an amount of about 0.0000001 to about 10 ppm.

Embodiment 24 is the chocolate replica of embodiment 22 or embodiment 23, wherein said chocolate replica comprises 2,3-pentadione in an amount of about 0.1 to about 14 ppm.

Embodiment 25 is the chocolate replica of any one of embodiments 22 to 24, wherein said chocolate replica comprises 2-ethyl-3,5-dimethylpyrazine in an amount of about 0.000001 to about 9 ppm.

Embodiment 26 is the chocolate replica of any one of embodiments 22 to 25, wherein said chocolate replica comprises 2-ethyl-3,6-dimethylpyrazine in an amount of about 0.000001 to about 9 ppm.

Embodiment 27 is the chocolate replica of any one of embodiments 22 to 26, wherein said chocolate replica comprises 2-methoxypyrazine in an amount of about 0.00001 to about 15 ppm.

Embodiment 28 is the chocolate replica of any one of embodiments 22 to 27, wherein said chocolate replica comprises 3-methylbutyraldehyde in an amount of 3-methylbutyraldehyde in an amount of about 0.0001 to about 20 ppm.

Embodiment 29 is the chocolate replica of any one of embodiments 22 to 28, wherein said chocolate replica comprises 5-methyl-2-hepten-4-one in an amount of about 0.0001 to about 25 ppm.

Embodiment 30 is the chocolate replica of any one of embodiments 22 to 29, wherein said chocolate replica comprises acetoin in an amount of about 0.0001 to about 55 ppm.

Embodiment 31 is the chocolate replica of any one of embodiments 22 to 30, wherein said chocolate replica comprises coffee furanone in an amount of about 0.14 to about 14 ppm.

Embodiment 32 is the chocolate replica of any one of embodiments 22 to 31, wherein said chocolate replica comprises furfuryl mercaptan in an amount of 0.000001 to about 5 ppm.

Embodiment 33 is the chocolate replica of any one of embodiments 22 to 32, wherein said chocolate replica comprises indole in an amount of about 0.001 to about 3 ppm.

Embodiment 34 is the chocolate replica of any one of embodiments 22 to 33, wherein said chocolate replica comprises propionic acid in an amount of about 0.01 to about 505 ppm.

Embodiment 35 is the chocolate replica of any one of embodiments 22 to 34, wherein said chocolate replica comprises pyrazine in an amount of about 0.0001 to about 10 ppm.

Embodiment 36 is the chocolate replica of any one of embodiments 22 to 35, wherein said chocolate replica comprises valeric acid in an amount of about 0.000001 to about 40 ppm.

Embodiment 37 is the chocolate replica of any one of embodiments 22 to 36, wherein said chocolate replica comprises vanillin propylene glycol acetal in an amount of 0.0000001 to about 550 ppm.

Embodiment 38 is the chocolate replica of any one of embodiments 22 to 37, wherein said chocolate replica comprises vanillyl ethyl ether in an amount of about 0.01 to about 510 ppm.

Embodiment 39 is the chocolate replica of any one of embodiments 1 to 35, further comprising at least one isolated VOC selected from the group consisting of 1-octanol, 1-octen-3-ol, 1-octen-3-one, 2,3-diethyl-5-methylpyrazine, 2,3-dimethylpyrazine, 2,3,5-trimethylpyrazine, 2,5-dimethylpyrazine, 2,6-dimethylpyrazine, 2-acetyl-5-methylfuran, 2-ethyl-3-methylpyrazine, 2-ethylpyrazine, 2-heptanol, 2-heptanone, 2-isopropyl-3-methoxypyrazine, 2-methylbutyl isovalerate, 2-methylbutyraldehyde, 2-methylbutyric acid, 2-methylpyrazine, 2-nonanol, 2-nonanone, 2-pentyl furan, 2-undecanone, 3-hydroxy-2-methyl-4H-pyrone-4-one (maltol), 5-methyl-2-phenyl-2-hexenal, benzaldehyde, benzyl acetate, beta-ionone, butyl acetate, butyric acid, decanal, diethyl succinate, dimethyl trisulfide, ethyl benzoate, ethyl cinnamate, ethyl decanoate, ethyl heptanoate, ethyl hexanoate, ethyl lactate, ethyl laurate, ethyl octanoate, ethyl phenylacetate, furfural, gamma-nonalactone, gamma-valerolactone, geranyl acetate, guaiacol, hexanal, hexanoic acid, hexanol, hexyl acetate, isoamyl acetate, isoamyl alcohol, isoamyl isobutyrate, isobutyl acetate, isobutyraldehyde, isobutyric acid, isovaleraldehye, isovaleric acid, limonene, massoia lactone, methyl salicylate, myrcene, nonanal, phenethyl acetate, phenethyl alcohol, phenylacetaldehyde, tetramethylpyrazine, trans,trans-2,4-decadienal, valeraldehyde, and vanillin.

Embodiment 40 is the chocolate replica of any one of embodiments 1 to 39, wherein the one or more non-volatile compounds comprise at least one compound selected from the group consisting of choline, pyridine, pyridoxine, 2(5H)-furanone, 2,3-dimethylpyrazine, caffeine, orientin, 4-hydroxybenzaldehyde, methyl 2-pyrrolyl ketone, 2,3,5-trimethylpyrazine, 2,3,5,6-tetramethylpyrazine, isoprenylpyrazine, 2-isopropyl-3-methoxypyrazine, piperine, 2-isobutyl-3-methoxypyrazine, catechin, adipic acid, methyl gallate, epicatechin, rutin, trans-ferulic acid, sinapinic acid, resveratrol, ellagic acid, propyl gallate, salicylic acid, quercetin, hesperetin, AMP, hydroxymethylfurfural, procyanidin B1, pantothenic acid, sotolon, caffeic acid, epicatechin gallate, vanillic acid, syringic acid, homofuraneol, vanillin, syringaldehyde, coumaric acid, acetovanillone, cinnamic acid, luteolin, polydatin, cytosine, CMP, adenine, cytidine, guanine, 4-guanidinobutyric acid, uracil, tyramine, tryptamine, maltol, maple furanone, acetanilide, sorbic acid, phenylalanine, leucine, glucosamine, methionine, GABA, tyrosine, lysine, histidine, glycine, serine, aspartic acid, isoleucine, tryptophan, valine, proline, carnitine, arginine, ornithine, B-alanine-2, threonine, glutamine, asparagine, cysteine, glutamic acid, betaine, pipecolinic acid, trans-4-hydroxyproline, citrulline, carnosine, homoserine, cystine, kynurenic acid, ribose, arabitol, fructose, rhamnose, mannitol, glucose, lactose, xylose, sorbitol, fucose, galactose, mannose, sucrose, myo-inositol, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, nicotinic acid, 8-hydroxyquinoline, quinoline, 5-methoxyresorcinol, chlorogenic acid, ethyl nicotinate, and eugenyl acetate.

Embodiment 41 is the chocolate replica of any one of embodiments 1 to 40, wherein the one or more non-volatile compounds comprise at least one compound selected from the group consisting of phenylalanine, leucine, glucosamine, methionine, tyrosine, lysine, histidine, glycine, serine, aspartic acid, isoleucine, tryptophan, valine, proline, carnitine, arginine, threonine, glutamine, asparagine, cysteine, glutamic acid, fructose, glucose, lactose, galactose, sucrose, xylose, lactic acid, citric acid, tartaric acid, nicotinic acid, pyridine, 2,3,5,6-tetramethylpyrazine, sotolon, vanillic acid, syringic acid, vanillin, syringaldehyde, cinnamic acid, maltol, and maple furanone.

Embodiment 42 is the chocolate replica of any one of embodiments 1 to 41, further comprising a sugar, a fat, a seed meal, an amino acid, a salt, and a root powder.

Embodiment 43 is the chocolate replica of embodiment 42, comprising a root powder selected from the group consisting of maca root powder, marshmallow root powder, beet root powder, dandelion root powder, and chicory root powder.

Embodiment 44 is the chocolate replica of embodiment 43, wherein the chocolate replica comprises about 0.5 to about 30 wt % solid substrate, about 0 to 75 wt % sugar, about 5 to 50 wt % fat, about 0 to 30 wt % seed meal, about 0 to 3 wt % amino acid, about 01.5 wt % salt, and about 0 to 5 wt % root powder.

Embodiment 45 is a method for preparing a plant-based solid substrate derived from a ground food stream waste product, wherein the method comprises mixing the ground food stream waste product with a caustic agent and water at a pressure of 0-10 bar, to generate a ground preparation having a pH of about 7.5 to about 10.5; drying the ground preparation; combining the dried ground preparation with one or more plant oils to generate a mixture; milling the mixture until to obtain particles having a size less than about 75 microns; and sieving the particles to yield the solid substrate.

Embodiment 46 is the method of embodiment 45, wherein the food stream waste product comprises fruit or vegetable seeds.

Embodiment 47 is the method of embodiment 45, wherein the food stream waste product consists essentially of fruit or vegetable seeds.

Embodiment 48 is the method of embodiment 46 or embodiment 47, wherein the fruit or vegetable seeds are from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, and combinations thereof.

Embodiment 49 is the method of embodiment 46 or embodiment 47, wherein the fruit or vegetable seeds are grape seeds.

Embodiment 50 is the method of any one of embodiments 45 to 49, wherein the caustic agent comprises sodium hydroxide, potassium carbonate, sodium carbonate, calcium hydroxide, potassium bicarbonate, or potassium hydroxide.

Embodiment 51 is the method of any one of embodiments 45 to 50, wherein the mixing comprises high shear blending at a temperature of about at 70° C. to about 80° C. for about 15 to 60 minutes, to generate a ground preparation having a pH of about 8.0 to about 8.5.

Embodiment 52 is the method of any one of embodiments 45 to 50, wherein the mixing comprises high shear blending at a temperature of about 75° C. for about 30 minutes, to generate a ground preparation having a pH of about 8.0 to about 8.5.

Embodiment 53 is the method of any one of embodiments 45 to 52, wherein the drying comprises tray drying, spray drying, drum drying, falling film evaporation, freeze drying, vacuum drying, or a combination thereof.

Embodiment 54 is the method of any one of embodiments 45 to 53, wherein the one or more plant oils comprise corn oil, sunflower oil, palm oil, coconut oil, shea oil, *illipe* oil, mango kernel oil, palm kernel oil, canola oil, avocado oil, or safflower oil.

Embodiment 55 is the method of any one of embodiments 45 to 54, wherein the milling comprises using a stone corundum mill or a colloid mill, at a temperature less than about 65° C.

Embodiment 56 is the method of any one of embodiments 45 to 55, wherein the sieving comprises passing the particles through a 100 micron sieve.

Embodiment 57 is the method of any one of embodiments 45 to 56, further comprising adding at least one amino acid, at least one sugar, or at least one amino acid and at least one sugar to the ground food stream waste product.

Embodiment 58 is a method for preparing a plant-based solid substrate derived from a food stream waste product, wherein the method comprises mixing the food stream waste product with a caustic agent and water at a pressure of 0-10 bar, to generate a preparation having a pH of about 7.5 to about 10.5; separating the preparation into a solid fraction from a liquid fraction; separately roasting the solid fraction and the liquid fraction; grinding the roasted solid fraction; combining the ground roasted solid fraction with the roasted liquid fraction and one or more plant oils to generate a mixture; milling the mixture to generate particles having a size of less than 75 microns; and sieving the particles to yield the solid substrate.

Embodiment 59 is the method of embodiment 58, wherein the food stream waste product comprises fruit or vegetable seeds.

Embodiment 60 is the method of embodiment 58, wherein the food stream waste product consists essentially of fruit or vegetable seeds.

Embodiment 61 is the method of embodiment 59 or embodiment 60, wherein the fruit or vegetable seeds are from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, and combinations thereof.

Embodiment 62 is the method of embodiment 59 or embodiment 60, wherein the fruit or vegetable seeds are grape seeds.

Embodiment 63 is the method of any one of embodiments 58 to 62, further comprising removing unwanted plant material from the food stream waste product prior to the mixing step.

Embodiment 64 is the method of any one of embodiments 58 to 63, wherein the mixing comprises high shear blending at a temperature of about at 70° C. to about 80° C. for about 15 to 60 minutes, to generate a preparation having a pH of about 8.0 to about 8.5.

Embodiment 65 is the method of any one of embodiments 58 to 64, wherein the mixing comprises high shear blending at a temperature of about 75° C. for about 30 minutes, to generate a preparation having a pH of about 8.0 to about 8.5.

Embodiment 66 is the method of any one of embodiments 58 to 65, comprising air roasting the solid fraction and dry roasting the liquid fraction.

Embodiment 67 is the method of any one of embodiments 58 to 66, wherein the grinding comprises using a burr mill, blade mill, hammer mill, stone mill, jet mill, air classifier mill, or high impact mill.

Embodiment 68 is the method of any one of embodiments 58 to 67, wherein the one or more plant oils comprise corn oil, sunflower oil, palm oil, or coconut oil.

Embodiment 69 is the method of any one of embodiments 58 to 68, wherein the milling comprises using a stone corundum mill or colloid mill, at a temperature of less than 65° C.

Embodiment 70 is the method of any one of embodiments 58 to 69, wherein the sieving comprises passing the particles through a 100 micron sieve.

Embodiment 71 is the method of any one of embodiments 58 to 70, further comprising adding at least one amino acid, at least one sugar, or at least one amino acid and at least one sugar to the mixture.

Embodiment 72 is a method for preparing a plant-based solid substrate derived from a food stream waste product, wherein the method comprises mixing the food stream waste product with a caustic solution and water at a pressure of 0-10 bar to generate a preparation having a pH of about 7.5 to about 10.5; drying the preparation; optionally, combining the preparation with one or more enzymes; roasting the preparation; grinding the roasted preparation; combining the ground roasted preparation with one or more plant oils, sugars, salts, seed meals or seed flours, amino acids, or other non-volatile compounds, to generate a slurry; pumping the slurry into a particle size reduction apparatus; and refining the slurry to generate a solid substrate having particles with a size less than about 25 to 30 microns.

Embodiment 73 is the method of embodiment 72, wherein the food stream waste product comprises fruit or vegetable seeds.

Embodiment 74 is the method of embodiment 72, wherein the food stream waste product consists essentially of fruit or vegetable seeds.

Embodiment 75 is the method of embodiment 73 or embodiment 74, wherein the fruit or vegetable seeds are from a fruit or vegetable selected from the group consisting of apple, breadfruit, breadnut, cashew, citrus fruits, colocynth, date, date palm, *guava*, grape, jackfruit, kokum, *Luffa*, mango, *Moringa*, melon, olive, *papaya*, pumpkin, squash, gourd, sapucaia, Spanish lime, *seje*, tomato, walnut, watermelon, and combinations thereof.

Embodiment 76 is the method of embodiment 73 or embodiment 74, wherein the fruit or vegetable seeds are grape seeds.

Embodiment 77 is the method of any one of embodiments 72 to 76, further comprising removing unwanted plant material from the food stream waste product prior to the mixing step.

Embodiment 78 is the method of any one of embodiments 72 to 77, wherein the mixing comprises mixing at a temperature of about at 70° C. to about 80° C. for about 15 to 180 minutes, to generate a preparation having a pH of about 8.0 to about 9.0.

Embodiment 79 is the method of any one of embodiments 72 to 78, wherein the mixing comprises mixing at a temperature of about 75° C. for about 30 to 120 minutes, to generate a preparation having a pH of about 8.0 to about 9.0.

Embodiment 80 is the method of any one of embodiments 72 to 79, wherein the drying comprises tray drying, spray drying, drum drying, or vacuum drying.

Embodiment 81 is the method of any one of embodiments 72 to 80, wherein method comprises, prior to the drying, separating the preparation into a solid fraction and a liquid fraction, and wherein the drying comprises drying the solid fraction separately from the liquid fraction.

Embodiment 82 is the method of any one of embodiments 72 to 81, wherein the one or more enzymes comprise cellulase, tannase, pectinase, xylase, or hemicellulose.

Embodiment 83 is the method of any one of embodiments 72 to 82, wherein the roasting comprises convection roasting, conduction roasting, infrared roasting, or a combination thereof.

Embodiment 84 is the method of any one of embodiments 72 to 83, wherein the grinding comprises using a crushing mill, burr mill, espresso grinder, stone mill, blade mill, or jet mill.

Embodiment 85 is the method of any one of embodiments 72 to 84, wherein the one or more plant oils comprise one or more of corn oil, sunflower oil, palm oil, or coconut oil, shea oil, *illipe* oil, mango kernel oil, palm kernel oil, canola oil, and safflower oil.

Embodiment 86 is the method of any one of embodiments 72 to 85, wherein the one or more sugars comprise one or more of sucrose, arabitol, fructose, galactose, glucosamine, glucose, mannitol, mannose, inositol, rhamnose, ribose, sorbitol, xylose, and lactose.

Embodiment 87 is the method of any one of embodiments 72 to 86, wherein the one or more salts comprise one or more of sodium chloride, potassium chloride, magnesium chloride, and sea salt.

Embodiment 88 is the method of any one of embodiments 72 to 87, wherein the one or more seed meals or seed flours comprise one or more of sunflower meal or flour, coconut meal or flour, almond meal or flour, pecan meal or flour, hazelnut meal or flour, walnut meal or flour, pistachio meal or flour, cashew meal or flour, peanut meal or flour, canola meal or flour, safflower meal or flour, palm kernel meal or flour, mango kernel meal or flour, chia meal or flour, pumpkin seed meal or flour, brazil nut meal or flour, *Macadamia* nut meal or flour, chestnut meal or flour, flax meal or flour, hemp meal or flour, and tiger nut meal or flour.

Embodiment 89 is the method of any one of embodiments 72 to 88, wherein the one or more amino acids comprise one or more of phenylalanine, leucine, glucosamine, methionine, gamma-aminobutyric acid (GABA), tyrosine, lysine, histidine, glycine, serine, aspartic acid, isoleucine, tryptophan, valine, proline, carnitine, arginine, alanine, threonine, glutamine, asparagine, glutamic acid, betaine, pipecolinic acid, citrulline, carnosine, homoserine cysteine, proline, and serine.

Embodiment 90 is the method of any one of embodiments 72 to 89, wherein the one or more other non-volatile compounds comprise at least one compound selected from the group consisting of fructose, glucose, lactose, galactose, sucrose, xylose, lactic acid, citric acid, tartaric acid, nicotinic acid, pyridine, 2,3,5,6-tetramethylpyrazine, sotolon, vanillic acid, syringic acid, vanillin, syringaldehyde, cinnamic acid, maltol, and maple furanone.

Embodiment 91 is the method of any one of embodiments 72 to 90, wherein the combining comprises mixing at a temperature of about 35° C.

Embodiment 92 is the method of any one of embodiments 72 to 91, wherein the size reduction apparatus is a continuous rotor stator particle size reduction machine.

Embodiment 93 is a chocolate replica comprising one or more isolated volatile organic compounds (VOCs) and one or more isolated non-volatile compounds, wherein the one or more isolated VOCs comprise at least one VOC that is not present in a corresponding reference chocolate, wherein the chocolate replica does not contain cocoa beans or processed cocoa beans, and wherein the one or more isolated VOCs comprise at least one compound selected from the group consisting of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether, (E)-anethole, 1-heptanol, 2,3,5-trimethyl-6-ethylpyrazine, 2,3-butanedione, 2,4,5-trimethylthiazole, 2-acetylpyridine, 2-ethoxy-3-methyl pyrazine, 2-ethyl-1-hexanol, 2-ethyl-5-methylpyrazine, 2-ethyl-6-methylpyrazine, 2-ethylene-6-methylpyrazine, 2-isobutyl-3-methoxypyrazine, 2-isopropyl-5-methyl-2-hexenal, 2-methylbutyraldehyde, 2-methyl furan, 2-methyl-1-butanol, 2-octanol, 2-octanone, 2-pentanol, 2-phenyl-2-butenal, 2-phenylpropionaldehyde, 3,4-hexanedione, 3,5-diethyl-2-methylpyrazine, 3-methyl-1,2-cyclopentanedione, 3-octanone, 4,5-dimethyl-2-ethyl-3-thiazoline, 4-ethylguaiacol, 4-hydroxy-2,5-dimethy-3(2H)-furanone, 4-methyl-2-phenyl-2-pentenal, 4-methyl-5-thiazoleethanol, 4'-methylacetophenone, 4-methylguaiacol, 5-methylfurfural, 6-propyl-5,6-dihydropyran-2-one, acetic acid, amyl acetate, anethole, benzyl alcohol, beta-damascenone, damascenone, delta-decalactone, delta-octalactone, ethyl 2-methylbutyrate, ethyl 3-phenylpropionate, ethyl acetate, ethyl butanoate, ethyl isobutyrate, ethyl isovalerate, eugenol, furfuryl acetate, furfuryl propionate, geraniol, hexyl isobutyrate, isoamyl benzoate, isoamyl butyrate, isoamyl phenylacetate, isopropenyl pyrazine, linalool oxide, methional, methyl 2-thiofuroate, methyl butyrate, methyl p-anisate, methyl phenylacetate, ocimene, octanal, p-cresol, phenol, phenylacetic acid, prenyl benzoate, propanol, propenal, propyl 2-furoate, pyridine, syringol, tetrahydrofurfuryl phenylacetate, trans-2-nonenal, and tricyclodecenyl isobutyrate.

Embodiment 94 is the chocolate replica of embodiment 93, wherein the one or more isolated VOCs comprise at least one compound selected from the group consisting of 2,3-diethylpyrazine, 2,3-pentadione, 2-ethyl-3,5-dimethylpyrazine, 2-ethyl-3,6-dimethylpyrazine, 2-methoxypyrazine, 3-methylbutyraldehyde, 5-methyl-2-hepten-4-one, acetoin, coffee furanone, furfuryl mercaptan, indole, propionic acid, pyrazine, valeric acid, vanillin propylene glycol acetal, and vanillyl ethyl ether.

Embodiment 95 is the chocolate replica of embodiment 93, wherein the one or more isolated VOCs comprise at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, vanillyl ethyl ether, (E)-anethole, 2,3,5-trimethyl-6-ethylpyrazine, 2-ethyl-5-methylpyrazine, 2-ethyl-6-methylpyrazine, 2-ethylene-6-methylpyrazine, 3,4-hexanedione, 3,5-diethyl-2-methylpyrazine, 3-methyl-1,2-cyclopentanedione (cyclotene), 4-ethylguaiacol, 4-hydroxy-2,5-dimethy-3(2H)-furanone (furaneol), 4-methyl-5-thiazoleethanol, 4-methylguaiacol, 6-propyl-5,6-dihydropyran-2-one, acetic acid, anethole, beta-damascenone, ethyl butanoate, eugenol, methional, methyl 2-thiofuroate, methyl butyrate, ocimene, phenol, phenylacetic acid, propanol, propenal, and syringol.

Embodiment 96 is the chocolate replica of embodiment 95, wherein the one or more isolated VOCs comprise at least one of 2,3-pentanedione, 2-ethyl-3,5-dimethylpyrazine, 2-ethyl-3,6-dimethylpyrazine, 3-methylbutyraldehyde, acetoin, furfuryl mercaptan, indole, pyrazine, and vanillyl ethyl ether.

Embodiment 97 is the chocolate replica of any one of embodiments 93 to 96, wherein the one or more isolated VOCs further comprise at least one compound selected from the group consisting of 1-octanol, 1-octen-3-ol, 1-octen-3-one, 2,3-diethyl-5-methylpyrazine, 2,3-dimethylpyrazine, 2,3,5-trimethylpyrazine, 2,5-dimethylpyrazine, 2,6-dimethylpyrazine, 2-acetyl-5-methylfuran, 2-ethyl-3-methylpyrazine, 2-ethylpyrazine, 2-heptanol, 2-heptanone, 2-isopropyl-3-methoxypyrazine, 2-methylbutyl isovalerate, 2-methylbutyraldehyde, 2-methylbutyric acid, 2-methylpyrazine, 2-nonanol, 2-nonanone, 2-pentyl furan, 2-undecanone, 3-hydroxy-2-methyl-4H-pyrone-4-one (maltol), 5-methyl-2-phenyl-2-hexenal, benzaldehyde, benzyl acetate, beta-ionone, butyl acetate, butyric acid, decanal, diethyl succinate, dimethyl trisulfide, ethyl benzoate, ethyl cinnamate, ethyl decanoate, ethyl heptanoate, ethyl hexanoate, ethyl lactate, ethyl laurate, ethyl octanoate, ethyl phenylacetate, furfural, gamma-nonalactone, gamma-valerolactone, geranyl acetate, guaiacol, hexanal, hexanoic acid, hexanol, hexyl acetate, isoamyl acetate, isoamyl alcohol, isoamyl isobutyrate, isobutyl acetate, isobutyraldehyde, isobutyric acid, isovaleraldehye, isovaleric acid, limonene, massoia lactone, methyl salicylate, myrcene, nonanal, phenethyl acetate, phenethyl alcohol, phenylacetaldehyde, tetramethylpyrazine, trans,trans-2,4-decadienal, valeraldehyde, and vanillin.

Embodiment 98 is the chocolate replica of any one of embodiments 93 to 97, wherein the one or more non-volatile compounds comprise at least one compound selected from the group consisting of choline, pyridine, pyridoxine, 2(5H)-furanone, 2,3-dimethylpyrazine, caffeine, orientin, 4-hydroxybenzaldehyde, methyl 2-pyrrolyl ketone, 2,3,5-trimethylpyrazine, 2,3,5,6-tetramethylpyrazine, isoprenylpyrazine, 2-isopropyl-3-methoxypyrazine, piperine, 2-isobutyl-3-methoxypyrazine, catechin, adipic acid, methyl gallate, epicatechin, rutin, trans-ferulic acid, sinapinic acid, resveratrol, ellagic acid, propyl gallate, salicylic acid, quercetin, hesperetin, AMP, hydroxymethylfurfural, procyanidin B1, pantothenic acid, sotolon, caffeic acid, epicatechin gallate, vanillic acid, syringic acid, homofuraneol, vanillin, syringaldehyde, coumaric acid, acetovanillone, cinnamic acid, luteolin, polydatin, cytosine, CMP, adenine, cytidine, guanine, 4-guanidinobutyric acid, uracil, tyramine, tryptamine, maltol, maple furanone, acetanilide, sorbic acid, phenylalanine, leucine, glucosamine, methionine, GABA, tyrosine, lysine, histidine, glycine, serine, aspartic acid, isoleucine, tryptophan, valine, proline, carnitine, arginine, ornithine, B-alanine-2, threonine, glutamine, asparagine, cysteine, glutamic acid, betaine, pipecolinic acid, trans-4-hydroxyproline, citrulline, carnosine, homoserine, cystine, kynurenic acid, ribose, arabitol, fructose, rhamnose, mannitol, glucose, lactose, xylose, sorbitol, fucose, galactose, mannose, sucrose, myo-inositol, D-glucuronic acid, quinic acid, malic acid, pyruvic acid, tartaric acid, lactic acid, citric acid, fumaric acid, succinic acid, gallic acid, 2-furoic acid, 3,4-dihydroxybenzoic acid, 2-isopropylmalic acid, D-gluconic acid, 4-methoxycinnamic acid, 2-ethyl-2-hydroxybutyric acid, ricinoleic acid, DL-hydroxystearic acid, nicotinic acid, 8-hydroxyquinoline, quinoline, 5-methoxyresorcinol, chlorogenic acid, ethyl nicotinate, and eugenyl acetate.

Embodiment 99 is the chocolate replica of any one of embodiments 93 to 98, wherein the one or more non-volatile compounds comprise at least one compound selected from the group consisting of phenylalanine, leucine, glucosamine, methionine, tyrosine, lysine, histidine, glycine, serine, aspartic acid, isoleucine, tryptophan, valine, proline, carnitine, arginine, threonine, glutamine, asparagine, cysteine, glutamic acid, fructose, glucose, lactose, galactose, sucrose, xylose, lactic acid, citric acid, tartaric acid, nicotinic acid, pyridine, 2,3,5,6-tetramethylpyrazine, sotolon, vanillic acid, syringic acid, vanillin, syringaldehyde, cinnamic acid, maltol, and maple furanone.

Embodiment 100 is the chocolate replica of any one of embodiments 93 to 99, wherein the chocolate replica comprises, per kg, one or more of:
  0.0001 µg to 10 mg propenal;
  0.1 µg to 6 g acetic acid;
  100 µg to 50 mg 4-methyl-5-thiazoleethanol;
  0.00001 µg to 25 mg 4-methylguaiacol;
  0.01 µg to 20 mg 3-methylbutyraldehyde;
  100 µg to 170 mg (E)-anethole;
  0.0001 µg to 150 mg anethole;
  1 µg to 18 mg ocimene;
  0.0001 µg to 5 mg furfuryl mercaptan;
  0.001 µg to 15 mg 3,4-hexanedione;
  0.0001 µg to 20 mg 3-methyl-1,2-cyclopentanedione;
  0.001 µg to 8 mg 6-propyl-5,6-dihydropyran-2-one;
  0.0001 µg to 9 mg 2-ethyl-3,5-dimethylpyrazine;
  0.0001 µg to 9 mg 2-ethyl-3,6-dimethylpyrazine;
  0.0001 µg to 9 mg 2-ethyl-5-methylpyrazine;
  0.0001 µg to 7 mg 2-ethylene-6-methylpyrazine;
  0.00001 µg to 12 mg 4,5-dimethyl-2-ethyl-3-thiazoline;
  0.000001 µg to 10 mg beta-damascenone;
  1 µg to 125 mg ethyl butanoate;
  1 µg to 13 mg linalool oxide;
  0.0001 µg to 8 mg phenol;
  1 µg to 15 mg phenylacetic acid;
  1 µg to 175 mg propanol;
  1 µg to 510 mg vanillyl ethyl ether;
  1 µg to 505 mg propionic acid;
  0.0001 µg to 40 mg valeric acid;
  0.01 µg to 10 mg 1-heptanol;
  0.00001 µg to 30 mg 2-ethyl-1-hexanol;
  0.001 µg to 8 mg 2-methyl-1-butanol;
  0.001 µg to 18 mg 2-octanol;
  0.00001 µg to 5 mg 2-pentanol;
  0.00001 µg to 30 mg 4-ethylguaiacol;
  1 µg to 180 mg benzyl alcohol;
  100 µg to 100 mg eugenol;
  1 µg to 30 mg geraniol;
  0.001 µg to 10 mg p-cresol;
  0.001 µg to 5 mg 2-isopropyl-5-methyl-2-hexenal;
  1 µg to 50 mg 2-methylbutyraldehyde;
  0.001 µg to 15 mg 2-phenyl-2-butenal;
  0.001 µg to 8 mg 2-phenylpropionaldehyde;
  0.01 µg to 20 mg 4-methyl-2-phenyl-2-pentenal;
  1 µg to 10 mg octanal;
  1 µg to 3 mg trans-2-nonenal;
  0.00001 µg to 550 mg vanillin propylene glycol acetal;
  100 µg to 180 mg amyl acetate;
  1 µg to 35 mg ethyl 2-methylbutyrate;
  1 µg to 10 mg ethyl 3-phenylpropionate;
  1 µg to 5050 mg ethyl acetate;
  1 µg to 20 mg ethyl isobutyrate;
  1 µg to 32 mg ethyl isovalerate;
  1 µg to 60 mg furfuryl acetate;
  0.001 µg to 4 mg furfuryl propionate;
  1 µg to 32 mg hexyl isobutyrate;
  1 µg to 15 mg isoamyl benzoate;
  1 µg to 70 mg isoamyl butyrate;
  1 µg to 22 mg isoamyl phenylacetate;
  0.01 µg to 5 mg methyl 2-thiofuroate;
  100 µg to 40 mg methyl butyrate;
  1 µg to 12 mg methyl p-anisate;
  1 µg to 53 mg methyl phenylacetate;
  1 µg to 32 mg prenyl benzoate;
  1 µg to 3 mg propyl 2-furoate;
  1 µg to 110 mg tetrahydrofurfuryl phenylacetate;
  100 µg to 500 mg tricyclodecenyl isobutyrate;
  0.0001 µg to 30 mg 2-methyl furan;
  100 µg to 8 mg 5-methylfurfural;
  0.001 µg to 100 mg 4-hydroxy-2,5-dimethy-3(2H)-furanone;
  0.00001 µg to 45 mg 2,3-butanedione;
  100 µg to 14 mg 2,3-pentanedione;
  0.01 µg to 20 mg 2-octanone;
  0.0001 µg to 20 mg 3-octanone;
  0.001 µg to 12 mg 4'-methylacetophenone;
  0.01 µg to 25 mg 5-methyl-2-hepten-4-one;
  0.01 µg to 55 mg acetoin;
  100 µg to 14 mg coffee furanone;
  0.000001 µg to 10 mg damascenone;
  1 µg to 30 mg delta-decalactone;
  1 µg to 25 mg delta-octalactone;
  0.00001 µg to 8 mg syringol;

0.0001 μg to 10 mg 2,3,5-trimethyl-6-ethylpyrazine;
0.00001 μg to 10 mg 2,3-diethylpyrazine;
0.00001 μg to 5 mg 2-ethoxy-3-methyl pyrazine;
0.0001 μg to 9 mg 2-ethyl-6-methylpyrazine;
0.001 μg to 5 mg 2-isobutyl-3-methoxypyrazine;
0.001 μg to 15 mg 2-methoxypyrazine;
0.001 μg to 4 mg 3,5-diethyl-2-methylpyrazine;
1 μg to 12 mg isopropenyl pyrazine;
0.01 μg to 10 pyrazine;
0.00001 μg to 6 mg 2-acetylpyridine;
0.01 μg to 5 mg pyridine;
1 μg to 3 mg indole;
0.0001 μg to 8 mg methional; and
0.0001 μg to 10 mg 2,4,5-trimethylthiazole.

Embodiment 101 is the chocolate replica of any one of embodiments 93 to 100, further comprising a plant-based solid substrate.

Embodiment 102 is the chocolate replica of embodiment 101, wherein the plant-based solid substrate was derived from a food stream waste product.

The invention will be further described in the following examples, which do not limit the scope of the invention described in the claims.

EXAMPLES

Example 1—LCMS of Reference Chocolates

LC-MS was used to measure the levels of various non-volatile compounds in several reference chocolate samples, according to the following method.

All analyses were performed on a Thermo Ultimate 3000 Ultra-Performance Liquid Chromatograph (UPLC) coupled with a Thermo Scientific Q-Exactive high resolution mass spectrometer (MS). XCalibur software was used for data acquisition, and the mass spectrometer instrument parameters were as follows for all methods:

Polarity: positive or negative mode, as indicated for each method

Resolution: 70,000

Scan range: 60-900 m/z for all methods with the exception of the lipid method, which is 134-2000 m/z Isolation window: 1.5 m/z MS/MS collision energy: 30

Preparation of analytical standards: Stock solutions at a concentration of 1 mg/mL were made for each compound in 50% methanol. Serial dilutions were then made of each compound to create a 15-point standard curve, ranging from 10 ng/mL to 20 μg/mL. Standard curves were run in combinations of 7-12 compounds from each category per set, so long as there were no overlaps in retention time, which would have hindered quantitation.

Retention times were pre-determined for each compound by running the analytical standard at a 20 μg/mL dilution, and identifying the compound based on its accurate mass.

In all cases, five μL of each standard mix was injected through the autosampler and LC to the MS. Separation took place on a chromatographic column that was specific to each class of compounds. The conditions for each chromatographic method are described below, including the column, mobile phase and gradient used for each method.

Several types of columns were used for the different compounds, and different limits of detection (LODs) as indicated in TABLES 2A-D.

TABLE 2A

List of compounds quantified by each method in Round 1 assays

| HILIC positive | HILIC negative | Omega negative | C18 positive |
| --- | --- | --- | --- |
| methionine | rhamnose | tartaric acid | quinic acid |
| histidine | glucose | citric acid | trans-4-hydroxy proline |
| lysine | mannitol | lactic acid | L-citrulline |
| serine | fructose | 3,4-dihydroxybenzoic acid | kynurenic acid |
| leucine | ribose | gallic acid | |
| isoleucine | arabitol | glucuronic acid | |
| phenylalanine | inositol | fumaric acid | |
| aspartic acid | mannose | malic acid | |
| tyrosine | xylose | 2-isopropylmalic acid | |
| glycine | sorbitol | 2-furoic acid | |
| γ-aminobutyric acid | galactose | pyruvic acid | |
| glucosamine | beta-alanine | succinic acid | |
| arginine | citrulline | | |
| valine | | | |
| proline | | | |
| cystine | | | |
| asparagine | | | |
| glutamic acid | | | |
| tryptophan | | | |
| ornithine | | | |
| glutamine | | | |
| threonine | | | |
| carnitine | | | |
| betaine | | | |
| carnosine | | | |
| homoserine | | | |
| pipecolinic acid | | | |

TABLE 2B

LODs for standards being quantified (in pg/mL, ng/mL, or ug/mL) in Round 1 assays

| Cassette | Compound | LOD |
|---|---|---|
| 10 | Methionine | 500 pg |
| 10 | Histidine | 10 ng |
| 10 | Lysine | 10 ng |
| 10 | Serine | 2 ng |
| 10 | Leucine | 500 pg |
| 10 | Phenylalanine | 500 pg |
| 10 | Aspartic Acid | 5 ug |
| 10 | Tyrosine | 2 ng |
| 10 | GABA | 2 ng |
| 10 | Glucosamine | 50 ng |
| 11 | Arginine | 10 ng |
| 11 | Valine | 100 ng |
| 11 | Proline | 2 ng |
| 11 | Isoleucine | 10 ng |
| 11 | Cysteine | 1 ug |
| 11 | Asparagine | 10 ng |
| 11 | Glutamic Acid | 10 ng |
| 11 | Tryptophan | 2 ng |
| 11 | Ornithine | 10 ng |
| 11 | Glutamine | 10 ng |
| 11 | Threonine | 10 ng |
| 11 | Carnitine | 500 ng |
| 12 | Tartaric Acid | 100 pg |
| 12 | Citric Acid | 10 ng |
| 12 | 2-Isopropylmalic Acid | 100 pg |
| 12 | Lactic Acid | 2 ng |
| 12 | 3,4-dihydroxybenzoic Acid | 100 pg |
| 12 | Gallic Acid | 500 pg |
| 12 | D-Glucuronic Acid | 100 pg |
| 12 | Fumaric Acid | 500 pg |
| 12 | malic Acid | 100 pg |
| 12 | 2-Furoic Acid | 10 ng |
| 12 | Pyruvic Acid | 100 pg |
| 12 | Succinic Acid | 500 pg |
| 13 | Rhamnose | 10 ng |
| 13 | Glucose | 100 ng |
| 13 | Mannitol | 2 ng |
| 13 | Fructose | 2 ng |
| 13 | Ribose | 10 ng |
| 13 | Arabitol | 2 ng |
| 15 | Inositol | 10 ng |
| 15 | Mannose | 10 ng |
| 15 | Xylose | 100 ng |
| 15 | Sorbitol | 2 ng |
| 15 | Galactose | 10 ng |
| 16 | Quinic Acid | 1 ng |
| 17 | Trans-4-hydroxy proline | 200 pg |
| 17 | L-citrulline | 200 pg |
| 17 | Kynurenic Acid | 200 pg |

TABLE 2C

Additional LODs for standards being quantified

| Compound | LOD |
|---|---|
| beta alanine | 100 ppb |
| citrulline | 100 ppb |
| betaine | <10 ppb |
| carnosine | <10 ppb |
| cystine | <100 ppb |
| D-glucuronic acid | 500 ppt |
| homoserine | <10 ppb |
| myo-inositol | 50 ppb |
| pipecolinic acid | <10 ppb |
| glycine | 50 ppb |

TABLE 2D

Methods and LODs for compounds detected

| Compound Name | Method | LOD |
|---|---|---|
| 2(5H)-furanone | C18 Positive | 50 ppb |
| 2,3,5,6-tetramethylpyrazine | C18 Positive | <1 ppb |
| 2,3,5-trimethylpyrazine | C18 Positive | <1 ppb |
| 2,3-dimethylpyrazine | C18 Positive | <1 ppb |
| 2-ethyl-2-hydroxybutyric acid | Synergi Neg | <10 ppb |
| 2-furoic acid | Synergi Neg | 10 ng |
| 2-isopropylmalic acid | Synergi Neg | 100 pg |
| 3,4-dihydroxybenzoic acid | Synergi Neg | 100 pg |
| 4-guanidinobutyric acid | C18 Positive | 100 ppt |
| 4-methoxycinnamic acid | Synergi Neg | 1.75 ppm |
| 5-ethyl-4-hydroxy-2-methyl-3(2H)-furanone | C18 Positive | |
| acetovanillone | C18 Positive | 1 ng |
| adenine | C18 Positive | 200 pg |
| adipic acid | C18 Negative | <10 ppb |
| AMP | C18 Positive | 10 ppb |
| arabitol | HILIC neg | 2 ng |
| arginine | HILIC Pos | 10 ng |
| asparagine | HILIC Pos | 10 ng |
| aspartic acid | HILIC Pos | 5 ug |
| beta-alanine | HILIC neg | 100 ppb |
| betaine | HILIC Pos | <10 ppb |
| caffeic acid | C18 Positive | 20 ng |
| caffeine | C18 Positive | <10 ppb |
| carnitine | HILIC Pos | 500 pg |
| carnosine | HILIC Pos | <10 ppb |
| catechin | C18 Negative | 1 ng |
| choline | HILIC Positive | 2 ng |
| cinnamic acid | C18 Positive | 500 ng |
| citric acid | Omega Neg | 10 ng |
| citrulline | C18 pos | 100 ppb |
| CMP | C18 Positive | <10 ppb |
| coumaric acid | C18 Positive | 4 ng |
| cysteine | HILIC Pos | 1 ug |
| cystine | HILIC Pos | <100 ppb |
| cytidine | C18 Positive | 5 ppb |
| cytosine | C18 Positive | 100 ppt |
| D-gluconic acid | Synergi Neg | <10 ppb |
| DL-hydroxystearic acid | Synergi Neg | 1.75 ppm |
| ellagic acid | C18 Negative | 1 ng |
| epicatechin | C18 Negative | 1 ng |
| epicatechin gallate | C18 Positive | <10 ppb |
| fructose | HILIC neg | 2 ng |
| fumaric acid | Synergi Neg | 500 pg |
| galactose | HILIC neg | 10 ng |
| gallic acid | Synergi Neg | 500 pg |
| glucosamine | HILIC Pos | 50 ng |
| glucose | HILIC neg | 100 ng |
| glucuronic acid | Synergi Neg | 500 ppt |
| glutamic acid | HILIC Pos | 10 ng |
| glutamine | HILIC Pos | 10 ng |
| glycine | HILIC Pos | 50 ppb |
| guanine | C18 Positive | 200 pg |
| hesperetin | C18 Negative | 200 pg |
| histidine | HILIC Pos | 10 ng |
| homoserine | HILIC Pos | <10 ppb |
| inositol | HILIC neg | 50 ppb |
| isoleucine | HILIC Pos | 10 ng |
| kynurenic acid | C18 pos | 200 pg |
| lactic acid | Synergi Neg | 2 ng |
| leucine | HILIC Pos | 500 pg |
| lysine | HILIC Pos | 10 ng |
| malic acid | Synergi Neg | 100 pg |
| mannitol | HILIC neg | 2 ng |
| mannose | HILIC neg | 10 ng |
| methionine | HILIC Pos | 500 pg |
| methyl gallate | C18 Negative | <10 ppb |
| methyl-2-pyrrolyl ketone | C18 Positive | <5 ppb |
| ornithine | HILIC Pos | 10 ng |
| pantothenic acid | C18 Positive | 0.2 ng |
| phenylalanine | HILIC Pos | 500 pg |
| pipecolinic acid | HILIC Pos | <10 ppb |
| piperine | C18 Positive | <1 ppb |
| polydatin | C18 Positive | 4 ng |
| proline | HILIC Pos | 2 ng |
| propyl gallate | C18 Negative | <10 ppb |

TABLE 2D-continued

Methods and LODs for compounds detected

| Compound Name | Method | LOD |
|---|---|---|
| pyridine | C18 Positive | <1 ppb |
| pyridoxine | HILIC Positive | 100 pg |
| pyruvic acid | Synergi Neg | 100 pg |
| quercetin | C18 Negative | 1 ng |
| quinic acid | C18 pos | 1 ng |
| resveratrol | C18 Negative | 4 ng |
| rhamnose | HILIC neg | 10 ng |
| ribose | HILIC neg | 10 ng |
| rutin | C18 Negative | 1 ng |
| salicylic acid | C18 Negative | 200 pg |
| serine | HILIC Pos | 2 ng |
| sinapinic acid | C18 Negative | 200 pg |
| sorbic acid | C18 Positive | 100 ng |
| sorbitol | HILIC neg | 2 ng |
| sotolon | C18 Positive | 25 ppb |
| succinic acid | Synergi Neg | 500 pg |
| syringaldehyde | C18 Positive | 1 ng |
| syringic acid | C18 Positive | 50 pg |
| tartaric acid | Synergi Neg | 100 pg |
| threonine | HILIC Pos | 10 ng |
| trans-4-hydroxy proline | C18 pos | 200 pg |
| trans-4-hydroxyproline | HILIC Positive | <10 ppb |
| trans-ferulic acid | C18 Negative | 1 ng |
| tryptamine | C18 Positive | 200 pg |
| tryptophan | HILIC Pos | 2 ng |
| tyramine | C18 Positive | 1 ng |
| tyrosine | HILIC Pos | 2 ng |
| uracil | C18 Positive | 5 ppb |
| valine | HILIC Pos | 100 ng |
| vanillic acid | C18 Positive | 10 ng |
| vanillin | C18 Positive | 200 pg |
| xylose | HILIC neg | 100 ng |
| γ-aminobutyric acid | HILIC Pos | 2 ng |

Quantitation of Amino Acids and Similar Polar Compounds: A HILIC (hydrophilic interaction liquid chromatography) column was used to assess polar compounds that can retain a positive charge (TABLE 3). The mobile phase used with this column included A: $H_2O$+5 mM Ammonium Acetate+0.1% TFA (trifluoroacetic acid), and B: 90/10 ACN (Acetonitrile)/$H_2O$+5 mM Ammonium Acetate+0.1% TFA. Each chromatographic run was 27.5 minutes long, and the column temperature was maintained at 40° C. The column used was a Phenomenex Luna, 3 µm NH2, 100 Å, 150×2 mm (Product #00F-4377-B0), and the guard column was a Phenomenex Security Guard Cartridges, NH2, 4×2 mm (#PRD-196870).

TABLE 3

HILIC positive mode gradient conditions

| Time | Flow Rate (mL/min) | % A | % B |
|---|---|---|---|
| 0 | 0.5 | 5 | 95 |
| 6 | 0.5 | 5 | 95 |
| 18 | 0.5 | 60 | 40 |
| 20 | 0.5 | 80 | 20 |
| 22 | 0.5 | 5 | 95 |
| 27 | 0.5 | 5 | 95 |

Quantitation of Sugars and Sugar Alcohols: The same HILIC column used for quantitation of the amino acids was used for quantitation of sugars, but the polarity of the MS was run in negative mode (TABLE 4). While the same mobile phases were used, the gradient was slightly modified to help with retention. The temperature of the column also was held at 50° C. for better peak shape and separation of the isobaric sugars.

TABLE 4

HILIC negative mode gradient conditions

| Time | Flow Rate (mL/min) | % A | % B |
|---|---|---|---|
| 0 | 0.5 | 0 | 100 |
| 3 | 0.5 | 0 | 100 |
| 18 | 0.5 | 18 | 82 |
| 19 | 0.5 | 26 | 74 |
| 20 | 0.5 | 60 | 40 |
| 21 | 0.4 | 80 | 20 |
| 23 | 0.4 | 0 | 100 |
| 28 | 0.4 | 0 | 100 |

Quantitation of Non-Polar Compounds: A C18 column was used to assess non-polar compounds, as they are retained in the long carbon chains under polar conditions. This method was run in both positive and negative modes, depending on each compound and whether it ionizes better with a positive or negative charge, respectively. The mobile phases used for this method were A: H2O+0.1% FA, and B: Methanol, and the temperature of the column was held at 50° C. The column used was an Agilent Poroshell 120, EC-C18 2.7 µm, 3.0×100 mm (Product #695975-302).

TABLE 5

C18 positive/negative mode gradient conditions

| Time | Flow Rate (mL/min) | % A | % B |
|---|---|---|---|
| 0 | 0.6 | 100 | 0 |
| 1.5 | 0.6 | 100 | 0 |
| 4 | 0.6 | 0 | 100 |
| 6 | 0.6 | 0 | 100 |
| 6.1 | 0.6 | 100 | 0 |
| 9 | 0.6 | 100 | 0 |

Quantitation of Organic Acids and Similarly Charged Polar Compounds: To look at organic acids, a charged C18 column was used. The gradient used for the organic method was the same as for the C18 non-polar methods, as shown in TABLE 5. There was a modification to mobile phase B for this method, in that B: ACN+0.1% FA. The column used was a Phenomenex Luna Omega, 1.6 µm, PS C18 100 Å, 100×2.1 mm (Product #00D-4752-AN).

Data analysis: Data analysis methods were developed with the XCalibur Processing Setup program, where methods were made for each standard cassette for each LC method. The compound mass and retention time was added for each standard, and calibration levels were applied for each standard. To calculate concentrations in samples, the samples and standards for each run were processed together using XCalibur Quan software, and concentrations calculated based on the respective compound calibration curve. Limits of detection were determined for each standard by running each standard curve at low levels until nothing was detected.

Quantitation of Organic Acids: A Synergi Hydro reversed phase column was used to assess organic acids (TABLE 6), as they are retained in charged stationary phase under polar conditions. This method was run in negative ionization mode. The mobile phases used for this method were A: H2O+0.1% FA, and B: Acetonitrile+0.1% FA, and the temperature of the column was held at 50° C. The column used was a Phenomenex Synergi 2.5 µm Hydro RP, 100 Å, 100×2 mm (Product #00D-4387-B0).

TABLE 6

Synergi Hydro negative mode gradient conditions

| Time | Flow Rate (mL/min) | % A | % B |
|---|---|---|---|
| 0 | 0.2 | 100 | 0 |
| 1.3 | 0.2 | 100 | 0 |
| 4 | 0.2 | 0 | 100 |
| 6 | 0.4 | 0 | 100 |
| 6.1 | 0.4 | 100 | 0 |
| 8.5 | 0.4 | 100 | 0 |

The levels of the non-volatile compounds measured in the reference chocolate samples are shown in TABLE 7.

TABLE 7

| | LCMS of reference chocolates | | | | | | | |
|---|---|---|---|---|---|---|---|---|
| | 1 | 2 | 3 | 4 | 5 | 6 | 7 | 8 |
| choline | 9.54E+04 | 1.80E+05 | 2.11E+05 | 8.56E+04 | 1.32E+05 | 2.27E+05 | 2.26E+05 | NF |
| pyridine | NF | NF | NF | NF | NF | NF | NF | NF |
| pyridoxine | NF | NF | NF | NF | NF | NF | 1.36E+02 | NF |
| 2(5H)-furanone | NF | NF | NF | NF | NF | NF | NF | NF |
| 2,3-dimethylpyrazine | NF | 4.58E+02 | 2.61E+02 | 4.39E+01 | 3.67E+02 | 4.35E+02 | 2.06E+02 | 1.32E+02 |
| caffeine | 7.90E+04 | 1.63E+05 | 1.16E+05 | 1.23E+05 | 1.16E+05 | 1.63E+05 | 1.80E+05 | NF |
| orientin | NF | NF | NF | NF | NF | NF | NF | NF |
| 4-hydroxybenzaldehyde | 1.36E+02 | 3.11E+02 | 2.47E+02 | 1.78E+02 | 2.92E+02 | 2.66E+02 | 3.14E+02 | 1.42E+02 |
| methyl 2-pyrrolyl ketone | NF | 3.50E+02 | 7.84E+01 | NF | NF | 9.19E+02 | 2.96E+03 | NF |
| 2,3,5-trimethylpyrazine | NF | 4.46E+02 | 2.98E+02 | 1.70E+02 | 1.45E+05 | 3.95E+02 | 2.16E+02 | 6.27E+04 |
| 2,3,5,6-tetramethylpyrazine | 1.51E+02 | 7.28E+02 | 6.47E+02 | 4.43E+02 | 2.49E+02 | 4.50E+02 | 8.70E+02 | 6.14E+01 |
| isoprenylpyrazine | NF | NF | NF | NF | NF | NF | NF | NF |
| 2-isopropyl-3-methoxypyrazine | NF | NF | NF | NF | NF | NF | NF | NF |
| piperine | NF | 1.22E+02 | 1.21E+02 | NF | 6.38E+02 | 1.39E+02 | 2.08E+02 | NF |
| 2-isobutyl-3-methoxypyrazine | NF | NF | NF | NF | NF | NF | NF | NF |
| catechin | 5.68E+00 | 2.01E+01 | 1.55E+01 | 8.41E+00 | NF | 1.47E+01 | 4.31E+00 | NF |
| adipic acid | NF | NF | NF | NF | NF | NF | NF | NF |
| methyl gallate | NF | NF | NF | NF | NF | NF | NF | NF |
| epicatechin | 5.17E+01 | 8.06E+01 | 1.01E+02 | 4.23E+01 | NF | 4.51E+01 | 3.34E+01 | NF |
| rutin | NF | NF | NF | NF | NF | NF | NF | NF |
| trans-ferulic acid | NF | NF | NF | NF | NF | NF | NF | NF |
| sinapinic acid | NF | NF | NF | NF | NF | NF | NF | NF |
| resveratrol | NF | NF | NF | NF | NF | NF | NF | NF |
| ellagic acid | NF | NF | NF | NF | NF | NF | NF | NF |
| propyl gallate | NF | NF | NF | NF | NF | NF | NF | NF |
| salicylic acid | NF | NF | NF | NF | NF | NF | NF | NF |
| quercetin | 9.95E+00 | 2.83E+01 | 2.90E+01 | 1.23E+01 | 7.35E+00 | 2.40E+01 | 1.65E+01 | 6.18E+00 |
| hesperetin | NF | NF | NF | NF | NF | NF | 1.73E+01 | 1.71E+01 |
| AMP | NF | NF | NF | NF | NF | NF | NF | NF |
| hydroxymethylfurfural | NF | NF | NF | NF | NF | NF | NF | NF |
| procyanidin B1 | 3.76E+01 | 9.23E+01 | 8.45E+01 | 5.18E+01 | NF | 5.58E+01 | 3.00E+01 | NF |
| pantothenic acid | 2.22E+00 | 3.40E−01 | 3.23E−01 | 2.75E+00 | NF | 2.49E−01 | 2.69E−01 | NF |
| sotolon | 7.00E+00 | 2.21E+01 | 9.80E+00 | 6.59E+00 | NF | 2.96E+01 | 2.76E+01 | NF |
| caffeic acid | NF | NF | NF | NF | NF | NF | NF | NF |
| epicatechin gallate | NF | NF | NF | NF | NF | NF | NF | NF |
| vanillic acid | NF | NF | NF | NF | 2.53E+01 | NF | NF | NF |
| syringic acid | NF | NF | NF | NF | NF | NF | NF | NF |
| homofuraneol | NF | NF | NF | NF | NF | NF | NF | NF |
| vanillin | NF | NF | NF | NF | 2.55E+03 | NF | NF | NF |
| syringaldehyde | NF | NF | NF | NF | NF | NF | NF | NF |
| coumaric acid | NF | NF | NF | NF | NF | NF | NF | NF |
| acetovanillone | NF | NF | NF | NF | NF | NF | NF | NF |
| cinnamic acid | NF | NF | NF | NF | NF | NF | NF | NF |
| luteolin | 2.16E−01 | 9.26E−01 | 1.00E+00 | 2.80E−01 | 1.34E+00 | 1.25E+00 | 9.39E−01 | NF |
| polydatin | NF | NF | NF | NF | NF | NF | NF | NF |
| cytosine | NF | NF | NF | NF | NF | NF | NF | NF |
| CMP | NF | NF | NF | NF | NF | NF | NF | NF |
| adenine | NF | 8.71E+00 | 1.42E+01 | NF | 4.46E+00 | 1.56E+01 | 5.71E+00 | NF |
| cytidine | NF | 1.10E+01 | 1.70E+01 | NF | 8.03E+00 | 1.72E+01 | 1.30E+01 | NF |
| guanine | NF | NF | NF | NF | NF | NF | NF | NF |
| 4-guanidinobutyric acid | NF | NF | NF | NF | NF | NF | NF | NF |
| uracil | NF | NF | NF | NF | NF | NF | NF | NF |
| tyramine | NF | NF | 2.69E+01 | NF | NF | NF | NF | NF |
| tryptamine | NF | NF | NF | NF | NF | NF | NF | NF |
| maltol | 2.04E+01 | NF | NF | NF | NF | NF | NF | NF |
| maple furanone | NF | NF | NF | NF | NF | NF | NF | NF |
| acetanilide | NF | NF | NF | NF | NF | NF | NF | NF |
| sorbic acid | NF | NF | NF | NF | NF | NF | NF | NF |
| phenylalanine | 5.28E+00 | 2.11E+02 | 3.98E+02 | 4.81E+01 | 6.82E−01 | 2.58E+02 | 1.70E+02 | NF |
| leucine | NF | 4.00E+02 | 5.73E+02 | NF | NF | 5.42E+02 | 3.34E+02 | NF |
| glucosamine | NF | 1.46E+01 | 3.62E+01 | 7.44E+00 | 2.00E+00 | 1.37E+01 | 7.01E+01 | NF |

TABLE 7-continued

| LCMS of reference chocolates | | | | | | | | |
|---|---|---|---|---|---|---|---|---|
| methionine | NF | NF | 3.85E+00 | NF | NF | 5.13E+00 | NF | NF |
| GABA | 4.02E+01 | 4.36E+02 | 7.14E+02 | 1.30E+02 | 2.05E+01 | 5.45E+02 | 3.30E+02 | NF |
| tyrosine | 1.23E+01 | 1.24E+02 | 1.90E+02 | 3.09E+01 | 2.54E+00 | 1.68E+02 | 1.29E+02 | NF |
| lysine | NF | 9.67E+01 | 2.04E+02 | 3.11E+01 | NF | 1.24E+02 | 5.33E+01 | NF |
| histidine | NF | 2.77E+01 | 5.84E+01 | 1.17E+01 | NF | 4.03E+01 | 1.36E+01 | NF |
| glycine | 4.98E+00 | 2.25E+01 | 6.52E+01 | 9.37E+00 | NF | 3.34E+01 | 1.70E+01 | NF |
| serine | 5.28E+00 | 7.72E+01 | 1.37E+02 | 1.84E+01 | 3.77E+00 | 1.05E+02 | 6.50E+01 | NF |
| aspartic acid | NF | 4.19E+02 | 7.34E+02 | NF | NF | NF | NF | 2.89E+01 |
| isoleucine | 8.75E+00 | 1.35E+02 | 2.18E+02 | 3.88E+01 | 1.69E+01 | 1.44E+02 | 1.26E+02 | NF |
| tryptophan | NF | 2.54E+01 | 5.19E+01 | 4.56E+00 | NF | 2.68E+01 | 1.40E+01 | NF |
| valine | NF | 1.50E+02 | 2.37E+02 | 3.92E+01 | NF | 1.80E+02 | 1.49E+02 | NF |
| proline | 3.14E+01 | 1.40E+02 | 1.70E+02 | 3.59E+01 | 9.37E−01 | 1.41E+02 | 1.29E+02 | NF |
| carnitine | 3.88E+01 | NF | NF | 3.93E+01 | NF | NF | NF | NF |
| arginine | 1.51E+01 | 1.26E+02 | 2.47E+02 | 4.81E+01 | 1.34E+00 | 1.92E+02 | 8.51E+01 | 1.50E+00 |
| ornithine | NF | NF | NF | NF | NF | NF | NF | NF |
| B-alanine-2 | 6.04E+01 | 2.36E+02 | 5.00E+02 | 8.56E+01 | 1.87E+01 | 3.03E+02 | 2.09E+02 | NF |
| threonine | 7.20E+00 | 7.17E+01 | 1.51E+02 | 1.73E+01 | 3.16E+00 | 9.01E+01 | 5.59E+01 | NF |
| glutamine | NF | NF | 4.20E+02 | 2.01E+00 | NF | 1.06E+01 | 7.22E+00 | NF |
| asparagine | 2.28E+01 | 2.10E+02 | 2.79E+02 | 6.41E+01 | 3.05E+00 | 2.35E+02 | 1.63E+02 | NF |
| cysteine | 0.00E+00 | 0.00E+00 | 0.00E+00 | 0.00E+00 | 0.00E+00 | 0.00E+00 | 0.00E+00 | 0.00E+00 |
| glutamic acid | 5.93E+01 | 1.07E+02 | 3.18E+02 | 8.36E+01 | NF | 1.21E+02 | 8.67E+01 | 6.33E−01 |
| betaine | 2.80E+01 | 2.51E+01 | 2.23E+01 | 2.67E+01 | 7.69E+00 | 4.95E+00 | 1.92E+01 | NF |
| pipecolinic acid | NF | 3.02E+00 | 3.61E+00 | NF | 1.25E+00 | 3.60E+00 | 4.10E+00 | NF |
| trans-4-hydroxyproline | NF | NF | NF | NF | NF | NF | NF | NF |
| citrulline | NF | NF | 5.12E+00 | NF | NF | NF | NF | NF |
| carnosine | NF | NF | NF | NF | NF | NF | NF | NF |
| homoserine | 7.57E+00 | 9.00E+01 | 1.90E+02 | 1.97E+01 | 3.53E+00 | 1.11E+02 | 6.97E+01 | NF |
| cystine | 0.00E+00 | 0.00E+00 | 0.00E+00 | 0.00E+00 | 0.00E+00 | 0.00E+00 | 0.00E+00 | 0.00E+00 |
| kynurenic acid | NF | NF | NF | NF | NF | NF | NF | NF |
| ribose | NF | NF | NF | NF | NF | NF | NF | NF |
| arabitol | 2.18E+01 | 4.75E+01 | 3.20E+01 | 1.04E+01 | NF | 2.61E+01 | 5.79E+01 | NF |
| fructose | 2.91E+02 | 1.83E+01 | 1.02E+02 | 5.15E+01 | NF | 1.99E+02 | 5.73E+02 | NF |
| rhamnose | NF | 6.00E+02 | 8.38E+02 | NF | NF | 8.38E+02 | 7.66E+02 | NF |
| mannitol | NF | 4.50E+02 | 5.84E+02 | NF | NF | 5.23E+02 | 6.56E+02 | NF |
| glucose | 5.95E+02 | NF | NF | 5.09E+01 | NF | NF | 1.03E+02 | NF |
| lactose | 5.42E+03 | NF | NF | 5.12E+03 | NF | NF | NF | NF |
| xylose | NF | NF | NF | NF | NF | NF | NF | NF |
| sorbitol | 2.50E+02 | 9.24E+02 | 1.14E+03 | 2.58E+02 | NF | 1.05E+03 | 1.24E+03 | NF |
| fucose | NF | NF | NF | NF | NF | NF | NF | NF |
| galactose | NF | NF | NF | NF | NF | NF | NF | NF |
| mannose | NF | NF | NF | NF | NF | NF | NF | NF |
| sucrose | 5.07E+04 | 5.11E+04 | 3.83E+04 | 5.21E+04 | NF | 3.96E+04 | 1.67E+04 | NF |
| myo-inositol | 1.61E+03 | 2.23E+02 | 1.91E+02 | 1.64E+03 | NF | 2.71E+02 | 3.39E+02 | NF |
| D-glucuronic acid | NF | NF | NF | NF | NF | NF | NF | NF |
| quinic acid | NF | NF | NF | NF | NF | NF | NF | NF |
| malic acid | NF | NF | NF | NF | NF | NF | NF | NF |
| pyruvic acid | NF | NF | NF | NF | NF | NF | NF | NF |
| tartaric acid | NF | NF | NF | NF | NF | NF | NF | NF |
| lactic acid | 3.95E+02 | 6.53E+02 | 2.37E+03 | 3.73E+02 | NF | 7.76E+02 | 8.66E+02 | NF |
| citric acid | NF | 3.07E+02 | 2.88E+02 | NF | NF | 2.60E+02 | 7.68E+02 | NF |
| fumaric acid | NF | 5.18E+02 | 5.02E+02 | NF | NF | 5.46E+02 | 5.36E+02 | NF |
| succinic acid | 1.25E+02 | 2.52E+02 | 5.72E+02 | 1.25E+02 | NF | 3.55E+02 | 2.85E+02 | NF |
| gallic acid | NF | 3.70E+00 | NF | NF | NF | NF | NF | NF |
| 2-furoic acid | 4.53E+02 | 4.65E+02 | 4.31E+02 | 3.98E+02 | NF | 5.19E+02 | 4.62E+02 | NF |
| 3,4-dihydroxybenzoic acid | NF | NF | NF | NF | NF | NF | 5.86E+00 | NF |
| 2-isopropylmalic acid | 4.03E+00 | 9.09E+00 | 9.78E+00 | 3.92E+00 | NF | 6.11E+00 | 9.47E+00 | NF |
| D-gluconic acid | 2.02E+02 | 3.82E+02 | 4.44E+02 | 8.54E+01 | NF | 7.67E+02 | 7.76E+02 | NF |
| 4-methoxycinnamic acid | NF | 9.92E+02 | 9.54E+02 | NF | NF | 1.48E+03 | 1.30E+03 | NF |
| 2-ethyl-2-hydroxybutyric acid | 4.49E+00 | 1.82E+01 | 5.60E+01 | 3.90E+00 | NF | 1.19E+01 | 2.26E+01 | NF |
| ricinoleic acid | NF | NF | NF | NF | NF | NF | NF | NF |
| DL-hydroxystearic acid | NF | NF | NF | NF | NF | NF | NF | NF |
| nicotinic acid | NF | 4.21E+00 | 3.53E+00 | 1.55E+00 | NF | 4.76E+00 | 4.18E+00 | NF |
| 8-hydroxyquinoline | NF | NF | NF | NF | NF | NF | NF | NF |
| quinoline | NF | NF | NF | NF | NF | NF | NF | NF |
| 5-methoxyresorcinol | NF | NF | NF | NF | NF | NF | NF | NF |
| chlorogenic acid | NF | NF | NF | NF | NF | NF | NF | NF |
| ethyl nicotinate | NF | 1.77E−01 | 1.69E−01 | 1.63E−01 | 1.76E−01 | 2.30E−01 | 2.12E−01 | NF |
| eugenyl acetate | NF | NF | NF | NF | NF | NF | NF | NF |

| | 9 | 10 | 11 | 12 | 13 | 14 | 15 |
|---|---|---|---|---|---|---|---|
| Choline | 1.58E+05 | 8.71E+04 | 1.96E+05 | 2.40E+05 | 2.11E+05 | 1.91E+05 | 2.13E+05 |
| pyridine | NF | NF | NF | NF | NF | NF | NF |
| pyridoxine | NF | NF | NF | NF | NF | 1.43E+02 | NF |
| 2(5H)-furanone | NF | NF | NF | NF | NF | NF | NF |
| 2,3-dimethylpyrazine | 4.53E+02 | 1.47E+02 | 7.53E+02 | 2.19E+02 | 3.38E+02 | 8.21E+01 | 3.70E+02 |
| caffeine | 1.42E+05 | 9.56E+04 | 3.27E+05 | 1.87E+05 | 1.91E+05 | 1.50E+05 | 2.09E+05 |
| orientin | NF | NF | NF | NF | NF | NF | NF |

TABLE 7-continued

| LCMS of reference chocolates | | | | | | | |
|---|---|---|---|---|---|---|---|
| 4-hydroxybenzaldehyde | 2.54E+02 | 1.71E+02 | 3.34E+02 | 2.12E+02 | 3.79E+02 | 2.58E+02 | 2.59E+02 |
| methyl 2-pyrrolyl ketone | 2.10E+02 | NF | 5.79E+02 | 9.54E+02 | NF | 5.21E+02 | 3.80E+02 |
| 2,3,5-trimethylpyrazine | 3.29E+02 | 2.20E+02 | 5.42E+02 | 3.78E+02 | 2.28E+02 | 2.50E+02 | 3.34E+02 |
| 2,3,5,6-tetramethylpyrazine | 4.83E+02 | 3.34E+02 | 4.95E+02 | NF | 3.46E+02 | 1.79E+03 | 4.60E+02 |
| isoprenylpyrazine | NF | NF | NF | NF | NF | NF | NF |
| 2-isopropyl-3-methoxypyrazine | NF | NF | NF | NF | NF | NF | NF |
| piperine | 1.33E+02 | 1.25E+02 | 1.18E+02 | 1.21E+02 | 1.35E+02 | 1.26E+02 | NF |
| 2-isobutyl-3-methoxypyrazine | NF | NF | NF | NF | NF | NF | NF |
| catechin | 2.04E+01 | 1.07E+01 | 2.91E+01 | 7.94E+00 | 4.29E+00 | NF | 1.99E+01 |
| adipic acid | NF | NF | NF | NF | NF | NF | NF |
| methyl gallate | NF | NF | NF | NF | NF | NF | NF |
| epicatechin | 8.74E+01 | 4.38E+01 | 8.03E+01 | 5.55E+01 | 3.99E+01 | 3.31E+01 | 2.09E+02 |
| rutin | NF | NF | NF | NF | NF | NF | NF |
| trans-ferulic acid | NF | NF | NF | NF | NF | NF | NF |
| sinapinic acid | NF | NF | NF | NF | NF | NF | NF |
| resveratrol | NF | NF | NF | NF | NF | NF | NF |
| ellagic acid | NF | NF | NF | NF | NF | NF | NF |
| propyl gallate | NF | NF | NF | NF | NF | NF | NF |
| salicylic acid | NF | NF | NF | NF | NF | NF | NF |
| quercetin | 2.24E+01 | 1.51E+01 | 3.33E+01 | 2.05E+01 | 1.79E+01 | 1.54E+01 | 2.51E+01 |
| hesperetin | NF | NF | NF | NF | NF | NF | NF |
| AMP | NF | NF | NF | NF | NF | NF | NF |
| hydroxymethylfurfural | NF | NF | NF | NF | NF | NF | NF |
| procyanidin B1 | 8.27E+01 | 3.58E+01 | 7.20E+01 | 5.71E+01 | 3.31E+01 | 2.53E+01 | 1.40E+02 |
| pantothenic acid | 2.99E−01 | 2.38E+00 | 1.33E−01 | 1.98E−01 | 3.36E−01 | 8.32E−01 | 6.63E−01 |
| sotolon | 1.91E+01 | 7.42E+00 | 1.97E+01 | 1.20E+01 | 9.39E+00 | 7.01E+00 | 2.05E+01 |
| caffeic acid | NF | NF | NF | NF | NF | NF | NF |
| epicatechin gallate | NF | NF | NF | NF | NF | NF | NF |
| vanillic acid | NF | NF | NF | NF | NF | NF | NF |
| syringic acid | NF | NF | NF | NF | NF | NF | NF |
| homofuraneol | NF | NF | NF | NF | NF | NF | NF |
| vanillin | 7.80E+00 | 4.56E+01 | NF | NF | NF | NF | NF |
| syringaldehyde | NF | NF | NF | NF | NF | NF | NF |
| coumaric acid | NF | NF | NF | NF | NF | NF | NF |
| acetovanillone | NF | NF | NF | NF | NF | NF | NF |
| cinnamic acid | NF | NF | NF | NF | NF | NF | NF |
| luteolin | 6.14E−01 | 2.97E−01 | 8.36E−01 | 8.57E−01 | 9.60E−01 | 4.53E−01 | 2.48E+00 |
| polydatin | NF | NF | NF | NF | NF | NF | NF |
| cytosine | NF | NF | NF | NF | NF | NF | NF |
| CMP | NF | NF | NF | NF | NF | NF | NF |
| adenine | 3.35E+00 | NF | 1.08E+01 | 1.68E+01 | 1.24E+01 | 6.25E+00 | 2.89E+01 |
| cytidine | 5.51E+00 | NF | 8.34E+00 | 1.91E+01 | 2.27E+01 | 1.21E+01 | 2.96E+01 |
| guanine | NF | NF | NF | NF | NF | NF | NF |
| 4-guanidinobutyric acid | NF | NF | NF | NF | NF | NF | NF |
| uracil | NF | NF | NF | NF | NF | NF | NF |
| tyramine | NF | NF | NF | 8.51E+00 | 1.13E+01 | NF | NF |
| tryptamine | NF | NF | NF | NF | NF | NF | NF |
| maltol | NF | 1.28E+00 | NF | NF | NF | NF | NF |
| maple furanone | NF | NF | NF | NF | NF | NF | NF |
| acetanilide | NF | NF | NF | NF | NF | NF | NF |
| sorbic acid | NF | NF | NF | NF | NF | NF | NF |
| phenylalanine | 9.68E+01 | 1.89E+01 | 1.54E+02 | 5.61E+02 | 4.25E+02 | 2.71E+02 | 3.31E+02 |
| leucine | 1.73E+02 | NF | 3.20E+02 | 9.96E+02 | 6.41E+02 | 5.11E+02 | 6.09E+02 |
| glucosamine | 1.08E+01 | 1.50E+00 | 2.03E+01 | 5.24E+01 | 4.48E+01 | 7.91E+01 | 4.45E+01 |
| methionine | NF | NF | NF | 1.51E+01 | NF | 7.79E−01 | 8.68E+00 |
| GABA | 2.72E+02 | 6.48E+01 | 2.08E+02 | 9.50E+02 | 9.23E+02 | 3.94E+02 | 6.42E+02 |
| tyrosine | 7.43E+01 | 2.10E+01 | 1.20E+02 | 3.13E+02 | 2.40E+02 | 1.63E+02 | 1.77E+02 |
| lysine | 4.20E+01 | 1.63E+01 | 9.37E+01 | 2.84E+02 | 2.30E+02 | 1.21E+02 | 1.62E+02 |
| histidine | 1.28E+01 | 3.54E+00 | 2.18E+01 | 7.10E+01 | 3.76E+01 | 5.22E+01 | 4.40E+01 |
| glycine | 1.13E+01 | 7.67E+00 | 1.78E+01 | 8.61E+01 | 3.76E+01 | 3.26E+01 | 3.24E+01 |
| serine | 3.46E+01 | 1.09E+01 | 6.14E+01 | 2.04E+02 | 1.56E+02 | 7.96E+01 | 1.02E+02 |
| aspartic acid | 3.21E+02 | 2.07E+02 | 3.67E+02 | 5.35E+02 | 6.48E+02 | 1.92E+02 | NF |
| isoleucine | 7.50E+01 | 2.45E+01 | 8.50E+01 | 3.35E+02 | 2.73E+02 | 1.42E+02 | 1.73E+02 |
| tryptophan | 1.10E+01 | NF | 1.98E+01 | 6.04E+01 | 4.06E+01 | 2.59E+01 | 3.30E+01 |
| valine | 7.50E+01 | NF | 9.90E+01 | 3.44E+02 | 3.18E+02 | 1.59E+02 | 1.88E+02 |
| proline | 8.32E+01 | 3.35E+01 | 9.19E+01 | 2.44E+02 | 2.58E+02 | 1.30E+02 | 1.69E+02 |
| carnitine | NF | 2.56E+01 | NF | NF | NF | 1.03E+01 | NF |
| arginine | 6.16E+01 | 2.80E+01 | 1.36E+02 | 2.81E+02 | 2.38E+02 | 1.53E+02 | 1.84E+02 |
| ornithine | NF | NF | NF | NF | NF | NF | NF |
| B-alanine-2 | 1.40E+02 | 6.74E+01 | 2.14E+02 | 6.49E+02 | 5.43E+02 | 3.03E+02 | 3.13E+02 |
| threonine | 3.50E+01 | 9.84E+00 | 5.07E+01 | 1.97E+02 | 1.65E+02 | 7.92E+01 | 9.54E+01 |
| glutamine | NF | NF | NF | 2.08E+00 | 4.75E+00 | 8.22E+00 | 1.76E+01 |
| asparagine | 1.22E+02 | 2.59E+01 | 1.20E+02 | 4.25E+02 | 3.58E+02 | 2.62E+02 | 2.89E+02 |
| cysteine | 0.00E+00 | 0.00E+00 | 0.00E+00 | 0.00E+00 | 0.00E+00 | 0.00E+00 | 0.00E+00 |
| glutamic acid | 5.02E+01 | 6.36E+01 | 5.92E+01 | 3.44E+02 | 3.91E+02 | 2.42E+02 | 3.21E+02 |
| betaine | 1.15E+01 | 1.09E+01 | 9.25E+00 | 1.00E+01 | 4.49E+00 | 1.70E+01 | 8.94E+00 |
| pipecolinic acid | NF | NF | 3.07E+00 | 4.79E+00 | 2.87E+00 | NF | 3.68E+00 |
| trans-4-hydroxyproline | NF | NF | NF | NF | NF | NF | NF |

TABLE 7-continued

| LCMS of reference chocolates | | | | | | | |
|---|---|---|---|---|---|---|---|
| citrulline | NF | NF | NF | NF | NF | NF | NF |
| carnosine | NF | NF | NF | NF | NF | NF | NF |
| homoserine | 4.03E+01 | 1.25E+01 | 6.29E+01 | 2.53E+02 | 2.06E+02 | 9.94E+01 | 1.21E+02 |
| cystine | 0.00E+00 | 0.00E+00 | 0.00E+00 | 0.00E+00 | 0.00E+00 | 0.00E+00 | 0.00E+00 |
| kynurenic acid | NF | NF | NF | NF | NF | NF | NF |
| ribose | NF | NF | NF | NF | NF | NF | NF |
| arabitol | 4.76E+01 | 2.08E+01 | 2.29E+01 | 2.55E+01 | 1.23E+01 | 1.19E+01 | 4.64E+01 |
| fructose | 3.73E+01 | 5.54E+01 | 4.46E+01 | 1.25E+02 | 1.16E+02 | 8.47E+02 | 3.99E+02 |
| rhamnose | 5.82E+02 | NF | NF | 1.55E+03 | NF | 1.06E+03 | NF |
| mannitol | 5.15E+02 | 1.80E+02 | 1.37E+02 | 1.53E+03 | 2.50E+02 | 1.00E+03 | 1.58E+02 |
| glucose | 7.56E+01 | 4.60E+01 | 2.24E+01 | 6.89E+00 | 2.37E+01 | 5.80E+01 | 5.34E+01 |
| lactose | NF | 3.77E+03 | NF | NF | NF | 2.74E+03 | NF |
| xylose | NF | NF | NF | NF | NF | NF | NF |
| sorbitol | 1.02E+03 | 3.08E+02 | 2.63E+02 | 2.25E+03 | 5.74E+02 | 1.48E+03 | 3.70E+02 |
| fucose | NF | NF | NF | NF | NF | NF | NF |
| galactose | NF | NF | NF | NF | NF | NF | NF |
| mannose | NF | NF | NF | NF | NF | NF | NF |
| sucrose | 5.18E+04 | 4.95E+04 | 3.72E+04 | 2.31E+04 | 3.67E+04 | 3.56E+04 | 4.05E+04 |
| myo-inositol | 1.77E+02 | 1.27E+03 | 1.90E+02 | 3.35E+02 | 2.10E+02 | 1.94E+03 | 2.55E+02 |
| D-glucuronic acid | NF | NF | NF | NF | NF | NF | NF |
| quinic acid | NF | NF | NF | NF | NF | NF | NF |
| malic acid | NF | NF | NF | NF | NF | NF | NF |
| pyruvic acid | NF | NF | NF | NF | NF | NF | NF |
| tartaric acid | NF | NF | NF | NF | NF | NF | NF |
| lactic acid | 5.03E+02 | 2.75E+02 | 6.17E+02 | NF | NF | 2.06E+03 | 6.91E+02 |
| citric acid | 2.84E+02 | NF | NF | 3.25E+02 | NF | NF | NF |
| fumaric acid | NF | NF | 4.84E+02 | 6.31E+02 | 5.70E+02 | 5.99E+02 | 6.16E+02 |
| succinic acid | 1.83E+02 | 9.47E+01 | 2.26E+02 | 5.52E+02 | 5.30E+02 | 3.18E+02 | 3.80E+02 |
| gallic acid | NF | NF | NF | 3.78E+00 | NF | NF | NF |
| 2-furoic acid | 3.94E+02 | 3.86E+02 | 4.41E+02 | 5.48E+02 | 4.99E+02 | 4.63E+02 | 5.15E+02 |
| 3,4-dihydroxybenzoic acid | NF | NF | NF | NF | NF | NF | NF |
| 2-isopropylmalic acid | 6.62E+00 | 4.48E+00 | 4.52E+00 | 1.25E+01 | 7.55E+00 | 5.15E+00 | 9.42E+00 |
| D-gluconic acid | 5.86E+02 | 1.24E+02 | 2.75E+02 | 4.92E+02 | 1.69E+02 | 6.16E+02 | 5.02E+02 |
| 4-methoxycinnamic acid | 1.15E+03 | NF | 1.29E+03 | 1.09E+03 | NF | NF | 9.52E+02 |
| 2-ethyl-2-hydroxybutyric acid | 1.10E+01 | 4.87E+00 | 1.25E+01 | 7.13E+01 | 1.17E+02 | 2.15E+01 | 1.18E+01 |
| ricinoleic acid | NF | NF | NF | NF | NF | NF | NF |
| DL-hydroxystearic acid | NF | NF | NF | NF | NF | NF | NF |
| nicotinic acid | 2.94E+00 | 7.75E−01 | 3.64E+00 | 3.91E+00 | 4.00E+00 | 3.35E+00 | 4.56E+00 |
| 8-hydroxyquinoline | NF | NF | NF | NF | NF | NF | NF |
| quinoline | NF | NF | NF | NF | NF | NF | NF |
| 5-methoxyresorcinol | NF | NF | NF | NF | NF | NF | NF |
| chlorogenic acid | NF | NF | NF | NF | NF | NF | NF |
| ethyl nicotinate | 1.70E−01 | 1.65E−01 | 1.96E−01 | 1.78E−01 | 1.72E−01 | 1.98E−01 | 1.78E−01 |
| eugenyl acetate | NF | NF | NF | NF | NF | NF | NF |

NF = not found

Example 2—GCMS of Reference Chocolates

GC-MS/MS was used to assess the amounts of various VOCs in traditional chocolates.

GC-MS/MS Conditions: All analyses were performed using an Agilent 7890B GC interfaced with a 7000D Triple Quadrupole mass spectrometer, and equipped with a PAL RSI 85 autosampler with HS-SPME attachment. For Headspace (HS) Solid Phase Microextraction (SPME) experiments, the SPME fiber was a 1 cm, 50/30 μm DVB/CAR/PDMS fiber (Supelco; Bellefonte, PA). HS-SPME autosampler conditions were as follows: pre-incubation time of 5 minutes, incubation temperature of 60° C., extraction time of 15 minutes, and desorption time of 10 minutes. Post-desorption fiber conditioning time was 30 minutes. For liquid injection experiments, the injection volume was 0.5 μL. SPME injections were run in splitless mode, while liquid injections were run with a split ratio of 1:20 or 1:10, with a desorption temperature of 250° C. The column was a 30 m×0.25 mm×0.25 Agilent DBHeavyWax (ultra inert). Helium was used as the carrier gas at a constant flow rate of 1 mL/min. The MS ion source temperature and interface temperature were 250° C. The temperature program was as follows: initial temperature of 40° C., held for 0.5 minutes, then increased to 240° C. at a rate of 10° C./min, and held for 10 minutes, for a total run time of 30 minutes.

Selection of target compounds and MRM method development: An outline of the general workflow for GC-MS analyses is as follows. Real samples were first analyzed by HS-SPME-GC/MS in full scan mode (m/z 30-300) to identify potential target compounds. Collected data were analyzed manually using Agilent MassHunter Qualitative Analysis Version B.07.00, or using Agilent MassHunter Unknowns Analysis Version B.08.00. Additional compounds may have been targeted based on literature research. Multiple Reaction Monitoring (MRM) optimization was performed using commercially available standards. First, full scan experiments were repeated with liquid injection (5 mg/kg in pure EtOH) to verify retention time and potential precursor ions. Product ion scans were performed using liquid injection and varying collision energies across a range of 5-25 V. Optimized MRM transitions and collision energies were selected, and are displayed in TABLE 8. A dynamic MRM (dMRM) method was developed for the generation of calibration curves, as described below. Compounds were divided into multiple methods to minimize simultaneous transitions (no greater than 6).

Quantification. Calibration for all compounds was performed using the method of standard additions. Solutions were prepared for SPME as 10 mL sample, or as 1 mL sample diluted with 9 mL milliQ water, or as 0.1 mL sample diluted with 9.9 mL milliQ water, in 20-mL amber vials. Concentration range of spiked standards was varied by compound based on the expected range in real samples. Spiking solutions were prepared in EtOH for standard addition of analytes, except in the case of acids, which were prepared in milliQ water. Spiking solutions were spiked into samples at 10, 20, 30, and 40 μL.

Data were analyzed using Agilent Quantitative Analysis (for QQQ). Values reported as not detected (nd, zero) may be considered to be below the limits of detection (LODs) listed in TABLE 8. LODs were approximated based on S/N ratios as generated by the MassHunter software.

Various reference chocolate samples were assayed by GC-MS; the levels of VOCs therein are shown in TABLE 9.

TABLE 8

GCMS Transitions and Figures of Merit

| Compound | Transition 1 | Collision Energy 1 | Transition 2 | Collision Energy 2 | LOD (ug/L) | LOD (mg/L) |
|---|---|---|---|---|---|---|
| 1-heptanol | 70->55 | 5 | 69->41 | 10 | 0.1 | 0.0001 |
| 1-octanol | 56.0 -> 41.0 | 15 | 70.0 -> 55.0 | 15 | 0.01 | 0.00001 |
| 1-octen-3-ol | 57.0 -> 31.0 | 25 | 72.0 -> 43.0 | 15 | 0.01 | 0.00001 |
| 2,3,5,6-tetramethylpyrazine | 136->54 | 15 | 136->95 | 5 | 0.01 | 0.00001 |
| 2,3,5-trimethylpyrazine | 122->81 | 5 | 122->42 | 20 | 1 | 0.001 |
| 2,3-butanediol | 45->29 | 15 | 45->27 | 15 | 10 | 0.01 |
| 2,3-butanedione | 86->43 | 5 | 43->42 | 15 | | |
| 2,3-diethyl-5-methylpyrazine | 150->135 | 10 | 149->133 | 20 | 1 | 0.001 |
| 2,3-diethylpyrazine | 136->121 | 10 | 121->120 | 15 | 0.1 | 0.0001 |
| 2,3-dimethylpyrazine | 108->67 | 15 | 67->26 | 20 | 1 | 0.001 |
| 2,3-hexanedione | 71->43 | 5 | 114->71 | 5 | | |
| 2,3-pentadione | 100.0 -> 57.0 | 5 | 57.0 -> 42.0 | 30 | 100 | 0.1 |
| 2,5-dimethylphenol | 122->107 | 15 | 108->78 | 10 | 0.1 | 0.0001 |
| 2,5-dimethylpyrazine | 108->42 | 15 | 108->81 | 10 | 10 | 0.01 |
| 2,6-dimethylpyrazine | 108->42 | 20 | 108->107 | 15 | 1 | 0.001 |
| 2-acetyl-1-methylpyrrole | 123->108 | 10 | 108->53 | 20 | 0.001 | 0.000001 |
| 2-acetyl-5-methylfuran | 124->109 | 5 | 109->53 | 15 | 0.1 | 0.0001 |
| 2-acetylpyridine | 121->93 | 5 | 79->52 | 10 | 1 | 0.001 |
| 2-acetylpyrrole | 109->94 | 10 | 94->66 | 5 | 100 | 0.1 |
| 2-ethyl-1-hexanol | 83->55 | 5 | 70->55 | 10 | 0.1 | 0.0001 |
| 2-ethyl-3-methylpyrazine | 122->121 | 10 | 121->93 | 15 | | |
| 2-ethylfuran | 96->81 | 10 | 81->53 | 10 | 0.1 | 0.0001 |
| 2-ethylpyrazine | 108->107 | 10 | 107->79 | 15 | 1 | 0.001 |
| 2-furfuryl acetate | 140->98 | 5 | 98->70 | 5 | 1 | 0.001 |
| 2-heptanol | 83->55 | 5 | 70->55 | 10 | 1 | 0.001 |
| 2-heptanone | 58.0 -> 43.0 | 15 | 71.0 -> 43.0 | 15 | 0.01 | 0.00001 |
| 2-isopropyl-3-methoxypyrazine | 152->137 | 5 | 137->109 | 10 | 0.01 | 0.00001 |
| 2-methoxy-4-methylphenol | 123->95 | 5 | 138->123 | 5 | 0.001 | 0.000001 |
| 2-methoxy-4-vinylphenol | 135->107 | 5 | 150->135 | 10 | 0 | 0 |
| 2-methylbutyl isovalerate | 85.0 -> 57.0 | 10 | 70.0 -> 55.0 | 10 | 0.1 | 0.0001 |
| 2-methylbutyraldehyde | 58->31 | 25 | 57->39 | 25 | 1 | 0.001 |
| 2-methylbutyric acid | 74->73 | 10 | 87->59 | 10 | 1 | 0.001 |
| 2-methylpyrazine | 94->67 | 15 | 67->26 | 15 | 100 | 0.1 |
| 2-nonanol | 83.0 -> 55.0 | 10 | 98.0 -> 56.0 | 10 | 0.1 | 0.0001 |
| 2-nonanone | 71.0 -> 43.0 | 15 | 58.0 -> 43.0 | 15 | 0.01 | 0.00001 |
| 2-octanol | 97->55 | 5 | 45->27 | 20 | 0.001 | 0.000001 |
| 2-octanone | 71->43 | 20 | 58->43 | 10 | 0.01 | 0.00001 |
| 2-pentanol | 73->55 | 5 | 55->29 | 5 | 1 | 0.001 |
| 2-pentylfuran | 138->81 | 10 | 81->53 | 10 | 0.01 | 0.00001 |
| 2-phenyl-2-butenal | 146->117 | 10 | 117->115 | 10 | 0.01 | 0.00001 |
| 2-phenylethanol | 122.0 -> 91.0 | 15 | 92.0 -> 65.0 | 25 | 1 | 0.001 |
| 2-phenylpropionaldehyde | 105->77 | 20 | 105->78 | 15 | 0.1 | 0.0001 |
| 2-tridecanone | 71->43 | 5 | 58->43 | 10 | 0.1 | 0.0001 |
| 2-undecanone | 58.0 -> 43.0 | 25 | 71.0 -> 43.0 | 25 | 0.1 | 0.0001 |
| 3-ethylpyridine | 107->106 | 10 | 96->65 | 10 | 1 | 0.001 |
| 3-hexanone | 100->43 | 10 | 71->43 | 10 | 1 | 0.001 |
| 3-octanol | 83->55 | 5 | 59->31 | 5 | 0.01 | 0.00001 |
| 3-octanone | 99->43 | 5 | 72->43 | 5 | 0.001 | 0.000001 |
| 4-carvomenthenol | 111.0 -> 77.0 | 25 | 71.0 -> 43.0 | 25 | 0.1 | 0.0001 |
| 4-ethyl guaiacol | 137.0 -> 66.0 | 35 | 152.0 -> 94.0 | 35 | 1 | 0.001 |
| 4-ethylphenol | 108.0 -> 78.0 | 25 | 121.0 -> 77.0 | 25 | | |
| 4-methyl-2-phenyl-2-pentenal | 174->103 | 15 | 103->77 | 15 | 0.01 | 0.00001 |
| 4'-methylacetophenone | 119->91 | 10 | 134->119 | 10 | 0.1 | 0.0001 |
| 4-vinylphenol | 120->91 | 15 | 91->65 | 15 | 1 | 0.001 |
| 5-methyl-2-phenyl-2-hexenal | 117->115 | 15 | 104->78 | 10 | 0.01 | 0.00001 |
| 5-methylfurfural | 110->109 | 10 | 109->53 | 10 | 10 | 0.01 |
| amyl acetate | 70->29 | 15 | 70->55 | 5 | 0.001 | 0.000001 |
| amyl alcohol | 70.0 -> 55.0 | 5 | 55.0 -> 53.0 | 35 | 1 | 0.001 |
| benzaldehyde | 105->51 | 35 | 106->77 | 35 | 0.1 | 0.0001 |
| benzyl acetate | 108.0 -> 79.0 | 15 | 91.0 -> 56.0 | 35 | 0.1 | 0.0001 |
| benzyl alcohol | 108->79 | 15 | 79->51 | 25 | 0 | 0 |
| benzyl isovalerate | 108->107 | 10 | 108->79 | 15 | 0.01 | 0.00001 |
| beta-damascenone | 121 -> 77 | 20 | 69 -> 41 | 20 | | |
| beta-ionone | 177.0 -> 147.0 | 35 | 135.0 -> 43.0 | 35 | 0 | 0 |

TABLE 8-continued

GCMS Transitions and Figures of Merit

| Compound | Transition 1 | Collision Energy 1 | Transition 2 | Collision Energy 2 | LOD (ug/L) | LOD (mg/L) |
|---|---|---|---|---|---|---|
| butyl acetate | 56.0 –> 41.0 | 15 | 73.0 –> 43.0 | 5 | 0.01 | 0.00001 |
| butyl alcohol | 56.0 –> 41.0 | 10 | 56.0 –> 39.0 | 15 | 0 | 0 |
| butyric acid | 73–>55 | 10 | 60–>42 | 10 | 1 | 0.001 |
| coffee furanone | 100–>73 | 5 | 72–>43 | 5 | 100 | 0.1 |
| damascenone | 121 –> 77 | 20 | 69 –> 41 | 20 | 0.01 | 0.00001 |
| decanal | 82–>67 | 15 | 57–>41 | 25 | 0.1 | 0.0001 |
| delta-decalactone | 99–>43 | 10 | 71–>41 | 25 | | |
| diethyl disulfide | 122–>94 | 5 | 94–>66 | 5 | 0.1 | 0.0001 |
| diethyl succinate | 129–>101 | 5 | 101–>73 | 5 | 0.01 | 0.00001 |
| difurfuryl ether | 82–>54 | 10 | 81–>53 | 10 | 1 | 0.001 |
| dimethyl sulfide | 62–>47 | 15 | 61–>35 | 5 | 1 | 0.001 |
| dimethyl sulfoxide | 78–>63 | 10 | 63–>45 | 10 | 0.1 | 0.0001 |
| dimethyl trisulfide | 126–>79 | 15 | 126–>61 | 5 | 0.01 | 0.00001 |
| ethyl 2-methylbutyrate | 102.0 –> 74.0 | 10 | 85.0 –> 57.0 | 5 | 0.1 | 0.0001 |
| ethyl 3-phenylpropionate | 178–>104 | 5 | 107–>79 | 10 | 0.001 | 0.000001 |
| ethyl acetate | 61.0 –> 43.0 | 15 | 45.0 –> 43.0 | 35 | 1 | 0.001 |
| ethyl benzoate | 105.0 –> 77.0 | 10 | 150.0 –> 77.0 | 10 | 0.01 | 0.00001 |
| ethyl butanoate | 71.0 –> 43.0 | 10 | 88.0 –> 61.0 | 10 | 0.1 | 0.0001 |
| ethyl cinnamate | 131.0 –> 103.0 | 10 | 131.0 –> 77.0 | 25 | 0.1 | 0.0001 |
| ethyl decanoate | 88.0 –> 43.0 | 20 | 61.0 –> 43.0 | 20 | 0.01 | 0.00001 |
| ethyl heptanoate | 88.0 –> 61.0 | 15 | 113.0 –> 57.0 | 10 | 0.1 | 0.0001 |
| ethyl hexanoate | 88.0 –> 61.0 | 5 | 99.0 –> 43.0 | 5 | 0.01 | 0.00001 |
| ethyl isobutyrate | 71.0 –> 43.0 | 10 | 43.0 –> 27.0 | 20 | 0.1 | 0.0001 |
| ethyl isovalerate | 88.0 –> 61.0 | 5 | 70.0 –> 55.0 | 5 | 0.001 | 0.000001 |
| ethyl lactate | 45.0 –> 27.0 | 15 | 45.0 –> 29.0 | 15 | 10 | 0.01 |
| ethyl laurate | 88.0 –> 61.0 | 15 | 101.0 –> 55.0 | 25 | 0.01 | 0.00001 |
| ethyl myristate | 101.0 –> 73.0 | 5 | 88.0 –> 61.0 | 5 | 5 | 0.005 |
| ethyl octanoate | 88.0 –> 43.0 | 25 | 101.0 –> 55.0 | 25 | 0.1 | 0.0001 |
| ethyl oleate | 97–>55 | 10 | 101–>73 | 10 | 15 | 0.015 |
| ethyl phenylacetate | 164.0 –> 91.0 | 10 | 91.0 –> 65.0 | 35 | 0.0001 | 0.0000001 |
| ethyl salicylate | 120.0 –> 92.0 | 10 | 166.0 –> 120.0 | 10 | 0.001 | 0.000001 |
| ethyl tiglate | 83–>55 | 5 | 100–>82 | 5 | 0.1 | 0.0001 |
| ethyl valerate | 88.0 –> 61.0 | 10 | 57.0 –> 41.0 | 10 | 0.001 | 0.000001 |
| eugenol | 164.0 –> 149.0 | 10 | 164.0 –> 104.0 | 15 | | |
| furfural | 96–>95 | 25 | 95–>53 | 35 | 1 | 0.001 |
| furfuryl propionate | 154–>98 | 5 | 81–>53 | 10 | 0.1 | 0.0001 |
| gamma-decalactone | 99.0 –> 43.0 | 25 | 71.0 –> 41.0 | 25 | 5 | 0.005 |
| gamma-nonalactone | 85.0 –> 57.0 | 25 | 114.0 –> 70.0 | 25 | 0 | 0 |
| gamma-valerolactone | 85–>57 | 5 | 56–>41 | 5 | 5 | 0.005 |
| geraniol | 69.0 –> 41.0 | 30 | 93.0 –> 51.0 | 15 | 0.1 | 0.0001 |
| geranyl acetate | 136–>121 | 5 | 121–>93 | 5 | 0.001 | 0.000001 |
| guaiacol | 109.0 –> 81.0 | 15 | 124.0 –> 109.0 | 15 | 0.01 | 0.00001 |
| hexanal | 56–>39 | 15 | 57–>31 | 25 | 1 | 0.001 |
| hexanol | 56.0 –> 41.0 | 15 | 69.0 –> 41.0 | 15 | 1 | 0.001 |
| hexyl acetate | 69.0 –> 41.0 | 15 | 84.0 –> 69.0 | 5 | 0.01 | 0.00001 |
| indole | 117–>90 | 10 | 90–>89 | 10 | | |
| isoamyl acetate | 70.0 –> 55.0 | 10 | 55.0 –> 29.0 | 10 | 0 | 0 |
| isoamyl alcohol | 70.0 –> 55.0 | 15 | 55.0 –> 39.0 | 15 | 0 | 0 |
| isoamyl benzoate | 105–>77 | 10 | 123–>79 | 10 | 0 | 0 |
| isoamyl butyrate | 70–>55 | 10 | 71–>43 | 5 | 0.001 | 0.000001 |
| isoamyl isobutyrate | 70.0 –> 55.0 | 10 | 115.0 –> 71.0 | 5 | 5 | 0.005 |
| isobutyl acetate | 73.0 –> 43.0 | 5 | 56.0 –> 41.0 | 15 | 0 | 0 |
| isobutyl alcohol | 43.0 –> 39.0 | 35 | 74.0 –> 41.0 | 25 | 100 | 0.1 |
| isobutyraldehyde | 72.0 –> 43.0 | 5 | 72.0 –> 57.0 | 5 | 5 | 0.005 |
| isobutyric acid | 88–>73 | 5 | 73–>55 | 20 | 1 | 0.001 |
| isoeugenol | 164–>104 | 15 | 164–>149 | 10 | | |
| isovaleraldehyde | 58–>31 | 25 | 71–>41 | 25 | 0.01 | 0.00001 |
| isovaleric acid | 87–>41 | 15 | 60–>42 | 25 | 1 | 0.001 |
| limonene | 93.0 –> 77.0 | 15 | 68.0 –> 53.0 | 15 | 0 | 0 |
| linalool | 71.0 –> 43.0 | 15 | 55.0 –> 39.0 | 25 | 0.001 | 0.000001 |
| maltol | 126 –> 71 | 20 | 71 –> 43 | 10 | 1 | 0.001 |
| massoia lactone | 97–>69 | 5 | 68–>41 | 10 | 0.1 | 0.0001 |
| methional | 76–>61 | 5 | 104–>48 | 10 | 1 | 0.001 |
| methyl 2-methylbutyrate | 101–>69 | 5 | 88–>57 | 5 | 5 | 0.005 |
| methyl anthranilate | 151–>119 | 10 | 119–>92 | 5 | 1 | 0.001 |
| methyl benzoate | 105–>77 | 5 | 136–>105 | 5 | 0.01 | 0.00001 |
| methyl cinnamate | 103–>77 | 10 | 131–>103 | 10 | 0 | 0 |
| methyl hexanoate | 74.0 –> 43.0 | 15 | 87.0 –> 55.0 | 15 | 0.01 | 0.00001 |
| methyl nicotinate | 137–>106 | 10 | 106–>78 | 10 | 0.1 | 0.0001 |
| methyl phenylacetate | 150–>91 | 5 | 91–>65 | 20 | 0.001 | 0.000001 |
| methyl salicylate | 92.0 –> 63.0 | 25 | 120.0 –> 64.0 | 15 | 0 | 0 |
| myrcene | 69.0 –> 41.0 | 10 | 93.0 –> 77.0 | 25 | 0 | 0 |
| nonanal | 98 –> 56 | 5 | 57 –> 39 | 15 | 0.01 | 0.00001 |
| octanal | 84–>55 | 10 | 84–>69 | 5 | 0 | 0 |
| p-anisaldehyde | 135–>77 | 25 | 77–>51 | 25 | 1 | 0.001 |

TABLE 8-continued

| GCMS Transitions and Figures of Merit | | | | | | |
|---|---|---|---|---|---|---|
| Compound | Transition 1 | Collision Energy 1 | Transition 2 | Collision Energy 2 | LOD (ug/L) | LOD (mg/L) |
| p-cresol | 107->77 | 20 | 108->107 | 15 | 0 | 0 |
| phenethyl acetate | 104.0 -> 78.0 | 25 | 91.0 -> 65.0 | 35 | 0.01 | 0.00001 |
| phenylacetaldehyde | 120->91 | 10 | 91->65 | 15 | 1 | 0.001 |
| propanol | 59.0 -> 31.0 | 10 | 42.0 -> 39.0 | 35 | 5 | 0.005 |
| propionaldehyde | 58->57 | 5 | 57->29 | 10 | 100 | 0.1 |
| propionic acid | 73->55 | 10 | 74->45 | 35 | 1 | 0.001 |
| propyl propionate | 87->57 | 5 | 75->57 | 5 | 0.1 | 0.0001 |
| pyridine | 52->51 | 10 | 52->50 | 10 | 10 | 0.01 |
| pyrrole | 67->41 | 20 | 67->28 | 20 | 0.1 | 0.0001 |
| sotolon | 128->83 | 5 | 83->55 | 5 | 10 | 0.01 |
| syringol | 154->139 | 15 | 139->93 | 5 | 1 | 0.001 |
| trans,trans-2,4-decadienal | 152->81 | 5 | 81->53 | 15 | 0.01 | 0.00001 |
| trans-2-nonenal | 83->55 | 5 | 70->69 | 5 | 0.1 | 0.0001 |
| valeraldehyde | 58->57 | 10 | 57->29 | 5 | 10 | 0.01 |
| valeric acid | 73->55 | 15 | 60->42 | 15 | 1 | 0.001 |
| vanillin | 152->151 | 10 | 151->123 | 5 | 1 | 0.001 |
| vanillyl ethyl ether | 137.0 -> 94.0 | 20 | 182.0 -> 138.0 | 5 | | |

TABLE 9

| GCMS of reference chocolates | | | | | | | |
|---|---|---|---|---|---|---|---|
| | 1 | 2 | 3 | 4 | 5 | 6 | 7 |
| isobutyraldehyde | | 4.55E+00 | 2.40E+00 | 2.17E+00 | | 1.87E+00 | 4.84E+00 |
| valeraldehyde | 8.74E-02 | 1.52E-01 | 2.98E-02 | 1.72E-01 | | 4.97E-02 | 2.19E-01 |
| 2,3-pentadione | 9.02E-03 | 8.41E-02 | 2.82E-02 | 1.70E-01 | 2.16E-01 | 3.96E-02 | 1.63E-01 |
| myrcene | 6.35E-02 | 1.04E-01 | 2.85E-02 | 0.00E+00 | 0.00E+00 | 5.68E-02 | 0.00E+00 |
| isoamyl alcohol | 3.79E-02 | 5.43E-02 | 1.31E-02 | 0.00E+00 | | 2.40E-01 | 1.68E-01 |
| coffee furanone | 6.69E-02 | 1.24E-01 | 8.34E-03 | 3.64E-01 | 8.30E-02 | 6.51E-02 | 6.94E-02 |
| 5-methyl-2-hepten-4-one | 0.00E+00 | 0.00E+00 | 0.00E+00 | 1.74E-02 | 0.00E+00 | 0.00E+00 | 0.00E+00 |
| 2,6-dimethylpyrazine | 2.38E-02 | 4.90E-02 | 5.20E-02 | 9.86E-02 | 5.53E-02 | 1.20E-01 | 7.98E-02 |
| hexanol | 8.79E-03 | 5.08E-03 | 4.81E-03 | 0.00E+00 | 2.85E-02 | 6.66E-03 | 0.00E+00 |
| 2,3,5-trimethylpyrazine | 4.31E-01 | 7.60E-01 | 2.04E-01 | 3.72E-01 | | 1.24E+00 | 5.87E-01 |
| 4,5-dimethyl-2-ethyl-3-thiazoline | 0.00E+00 | 0.00E+00 | 0.00E+00 | 0.00E+00 | 0.00E+00 | 3.11E-03 | 0.00E+00 |
| 2-ethyl-1-hexanol | 2.23E-02 | 2.26E-02 | 1.35E-01 | 6.05E-02 | | 1.46E-02 | 3.88E-02 |
| 2-isobutyl-3-methoxypyrazine | 2.10E-03 | 2.55E-03 | 0.00E+00 | 1.81E-02 | 7.32E-04 | 3.75E-03 | 2.83E-03 |
| furfuryl propionate | 0.00E+00 | 0.00E+00 | 0.00E+00 | 0.00E+00 | 0.00E+00 | 2.64E-03 | 0.00E+00 |
| phenylacetaldehyde | | 7.61E+00 | | 1.13E+00 | | 1.20E+00 | 2.45E+01 |
| benzyl acetate | 5.63E-02 | 5.65E-02 | 2.10E-02 | 4.01E-02 | 1.17E-01 | 3.23E-02 | 1.56E-02 |
| trans,tran-2,4-decadienal | 2.57E-02 | 2.06E-02 | 0.00E+00 | 3.88E-02 | 3.22E-02 | 0.00E+00 | 1.44E-02 |
| benzyl alcohol | 2.72E-01 | 2.12E-01 | | 1.94E-01 | 1.65E-01 | 2.51E-01 | 9.95E-02 |
| 4-methyl-2-phenyl-2-pentenal | 3.28E-02 | 6.84E-02 | | 2.58E-01 | 8.86E-02 | | 3.63E-02 |
| isoamyl phenylacetate | 1.16E-02 | 8.71E-03 | | 2.56E-02 | 1.71E-02 | | 1.47E-03 |
| dibutyl maleate | 0.00E+00 | 0.00E+00 | | 0.00E+00 | 0.00E+00 | 0.00E+00 | 0.00E+00 |
| vanillyl ethyl ether | 0.00E+00 | 0.00E+00 | 0.00E+00 | | | 0.00E+00 | 0.00E+00 |
| 2-methyl furan | | 1.49E-02 | 4.97E-02 | 8.60E-02 | 2.99E-02 | 3.26E-02 | 4.65E-02 |
| 2,3-butanedione | 2.01E-01 | 6.12E-01 | | 3.63E-01 | | 5.13E-01 | 1.57E+00 |
| ethyl isovalerate | 0.00E+00 | 0.00E+00 | 0.00E+00 | 7.07E-03 | 1.36E-02 | 0.00E+00 | 0.00E+00 |
| amyl acetate | 0.00E+00 | 0.00E+00 | 0.00E+00 | 3.51E-03 | 1.00E-02 | 0.00E+00 | 0.00E+00 |
| ethyl hexanoate | 1.25E-02 | 2.80E-02 | 0.00E+00 | 1.11E-01 | 4.18E-02 | 1.28E-02 | 3.19E-03 |
| isoamyl butyrate | 5.00E-03 | 1.85E-02 | 0.00E+00 | 2.06E-02 | 3.25E-02 | 8.01E-03 | 3.71E-04 |
| 3-mercapto-2-butanone | 0.00E+00 | 0.00E+00 | 0.00E+00 | 0.00E+00 | 0.00E+00 | 0.00E+00 | 0.00E+00 |
| 2-ethylpyrazine | 4.40E-03 | 2.77E-02 | 5.47E-02 | 2.85E-02 | 2.60E-02 | 4.22E-02 | 3.48E-02 |
| hexyl isobutyrate | | 4.10E-03 | 0.00E+00 | 0.00E+00 | 2.87E-03 | 0.00E+00 | 0.00E+00 |
| 2-ethyl-3-methylpyrazine | 8.00E-02 | 1.02E-01 | 7.03E-02 | 4.16E-02 | 1.56E-01 | 1.53E-01 | 7.05E-02 |
| 1-octen-3-ol | 1.16E-02 | 1.85E-02 | | 1.27E-02 | 2.03E-02 | 1.23E-02 | 7.63E-03 |
| 2,3-diethyl-5-methylpyrazine | 7.31E-03 | 2.04E-02 | 3.11E-02 | 6.24E-03 | 1.63E-02 | 3.95E-02 | 1.27E-02 |
| furfuryl acetate | 2.82E-03 | 2.75E-02 | 4.25E-02 | 1.91E-02 | 2.66E-02 | 2.45E-02 | 5.67E-03 |
| 2-acetylpyridine | 1.04E-02 | 1.73E-02 | 2.39E-02 | 2.67E-02 | 2.15E-02 | 1.51E-02 | 1.18E-02 |
| acetophenone | 8.78E-02 | 1.32E-01 | 6.38E-02 | 2.30E-01 | 2.17E-01 | 1.61E-01 | 7.82E-02 |
| geranyl acetate | 2.19E-02 | 4.00E-02 | 4.95E-02 | 2.12E-02 | 1.12E-01 | 1.68E-02 | 2.34E-02 |
| phenethyl acetate | | 3.32E+00 | 2.23E-01 | 7.94E-01 | 9.95E+00 | 1.75E+00 | 9.15E-01 |
| ethyl laurate | | 6.65E-01 | | 6.46E-01 | | 6.99E-01 | 5.56E-01 |
| maltol | 0.00E+00 | 0.00E+00 | 0.00E+00 | 0.00E+00 | 0.00E+00 | 0.00E+00 | 0.00E+00 |
| gamma-nonalactone | 5.11E-02 | 3.10E-02 | 4.46E-03 | 6.71E-02 | 8.66E-02 | 3.06E-02 | 3.19E-02 |

TABLE 9-continued

| GCMS of reference chocolates | | | | | | |
|---|---|---|---|---|---|---|
| ethyl cinnamate | 1.55E-01 | 1.16E-01 |  | 5.41E-02 | 4.38E-01 | 4.68E-02 | 7.67E-02 |
| tetrahydrofurfuryl phenylacetate | 0.00E+00 | 0.00E+00 | 2.72E-02 | 0.00E+00 | 0.00E+00 | 0.00E+00 | 0.00E+00 |
| ethyl acetate | 2.38E-01 |  | 2.73E-02 | 1.76E-01 |  | 4.75E-02 | 3.41E-02 |
| isobutyl acetate | 6.22E-03 | 1.89E-02 | 0.00E+00 | 6.81E-03 | 1.45E-02 | 2.69E-03 | 0.00E+00 |
| butyl acetate |  | 2.40E-02 | 0.00E+00 | 0.00E+00 | 0.00E+00 | 0.00E+00 | 0.00E+00 |
| pyridine | 9.17E-03 | 1.55E-02 | 1.43E-02 | 1.45E-02 | 9.47E-02 | 3.36E-02 | 1.51E-02 |
| 2-pentylfuran | 0.00E+00 | 0.00E+00 | 0.00E+00 | 3.36E+00 | 1.87E-02 | 0.00E+00 | 0.00E+00 |
| isoamyl isobutyrate | 0.00E+00 | 0.00E+00 | 0.00E+00 | 7.05E-02 | 7.07E-02 | 0.00E+00 | 0.00E+00 |
| 2-methylbutyl isovalerate | 1.01E-02 | 5.00E-03 | 0.00E+00 | 2.26E-02 | 9.46E-02 | 1.56E-02 | 0.00E+00 |
| ethyl lactate | 1.05E-01 | 1.57E-01 |  |  | 7.40E-02 | 6.49E-03 | 4.46E-03 |
| 2-isopropyl-5-methyl-2-hexenal | 2.85E-02 | 3.66E-02 | 3.49E-02 |  | 3.97E-01 | 6.40E-02 | 1.04E-01 |
| nonanal |  |  | 4.31E-01 | 1.26E+00 | 1.29E-01 | 4.85E-01 | 3.33E-01 |
| ethyl octanoate | 2.06E-01 | 2.25E-01 | 1.95E-02 | 1.57E-01 | 2.12E-01 | 1.50E-01 | 1.85E-01 |
| isopropenyl pyrazine | 1.60E-02 | 1.52E-02 | 3.74E-03 | 1.76E-02 | 0.00E+00 | 7.17E-02 | 7.00E-03 |
| trans-2-nonenal | 2.35E-01 | 3.10E-01 | 1.53E-01 | 5.78E-02 | 0.00E+00 | 5.07E-02 | 7.51E-02 |
| 2-undecanone | 4.64E-02 |  | 1.05E-01 | 6.20E-02 | 5.73E-02 | 1.82E-01 | 2.26E-02 |
| ethyl decanoate |  | 1.67E-02 | 5.67E-01 | 1.48E-01 | 1.90E-02 | 1.91E-01 | 2.55E-01 |
| methyl phenylacetate | 2.01E-02 | 1.71E-02 | 7.38E-03 | 4.88E-02 | 8.14E-02 | 6.42E-02 | 8.80E-03 |
| damascenone | 0.00E+00 | 0.00E+00 | 0.00E+00 | 2.30E-02 | 1.30E-01 | 1.67E-02 | 1.11E-03 |
| ethyl 3-phenylpropionate | 3.37E-02 | 2.16E-02 | 4.19E-02 | 2.22E-02 | 1.57E-02 | 1.42E-02 | 1.72E-02 |
| tricyclodecenyl isobutyrate | 0.00E+00 | 0.00E+00 | 0.00E+00 | 0.00E+00 | 1.17E-02 | 0.00E+00 | 0.00E+00 |
| prenyl benzoate | 0.00E+00 | 0.00E+00 | 0.00E+00 | 0.00E+00 | 1.79E-01 | 2.66E-02 | 0.00E+00 |
| gamma-decalactone |  | 0.00E+00 | 0.00E+00 | 0.00E+00 | 0.00E+00 | 0.00E+00 | 0.00E+00 |
| vanillin |  |  |  |  | 1.46E-01 |  |  |
| 2-methylbutyraldehyde |  |  | 8.12E-01 | 1.24E+00 | 1.09E+00 | 3.04E-01 | 8.52E-01 |
| 1-propanol | 6.09E-02 |  | 0.00E+00 | 2.12E-02 | 4.02E-02 | 0.00E+00 | 0.00E+00 |
| hexanal | 1.75E-01 |  | 6.20E-02 | 1.81E-01 | 1.03E-01 | 4.23E-02 | 2.08E-01 |
| 2-heptanone | 1.32E-02 |  | 0.00E+00 | 1.43E-01 | 1.73E-01 | 3.92E-02 | 8.70E-03 |
| amyl alcohol | 1.67E-02 |  | 2.06E-03 | 1.20E-01 | 1.18E-01 | 0.00E+00 | 1.93E-02 |
| hexyl acetate | 1.27E-02 |  | 0.00E+00 | 3.55E-02 | 3.05E-02 | 1.00E-02 | 9.58E-03 |
| 1-octen-3-one | 8.72E-02 |  | 2.63E-02 | 7.46E-01 | 1.21E-01 | 1.18E-01 | 1.80E-01 |
| ethyl heptanoate | 1.36E-02 |  | 0.00E+00 | 3.51E-02 | 3.92E-02 | 2.05E-02 | 1.54E-02 |
| 2,4,5-trimethylthiazole | 9.22E-03 |  | 0.00E+00 | 0.00E+00 | 0.00E+00 | 2.37E-03 | 3.90E-03 |
| 2-ethoxy-3-methyl pyrazine | 7.88E-03 |  | 0.00E+00 | 0.00E+00 | 0.00E+00 | 0.00E+00 | 0.00E+00 |
| 1-heptanol | 2.44E-02 |  | 4.90E-03 | 2.96E-02 | 4.66E-02 | 2.56E-02 | 1.49E-02 |
| decanal | 6.87E-02 |  | 8.62E-02 | 1.49E-01 | 1.82E-01 | 4.66E-02 | 7.87E-02 |
| linalool | 9.97E-02 |  | 1.52E-02 |  | 1.63E-01 | 8.38E-02 | 6.61E-02 |
| gamma-valerolactone | 4.57E-02 |  | 4.36E-02 | 2.25E-01 | 1.06E-01 | 1.23E-01 | 5.17E-02 |
| ethyl benzoate | 4.50E-02 |  |  | 6.37E-02 | 1.49E-01 | 3.79E-02 | 4.89E-02 |
| 4'-methylacetophenone | 1.35E-02 |  | 2.46E-03 | 1.28E-02 | 7.31E-03 |  | 1.20E-02 |
| geraniol | 2.35E-02 |  |  | 1.09E-01 | 7.27E-02 | 1.42E-02 | 0.00E+00 |
| phenethyl alcohol |  |  |  | 4.12E+00 | 1.67E+01 | 0.00E+00 | 0.00E+00 |
| methyl 2-pyrrolyl ketone | 0.00E+00 |  | 0.00E+00 | 0.00E+00 | 0.00E+00 | 0.00E+00 | 0.00E+00 |
| p-cresol | 4.33E-02 |  |  | 4.44E-02 | 2.66E-02 | 1.95E-02 | 9.23E-03 |
| delta-decalactone | 4.59E-02 |  |  |  | 1.37E-01 |  |  |
| vanillin propylene glycol acetal |  |  |  |  | 8.70E-02 |  | 1.19E-02 |
| isovaleraldehyde | 3.03E+00 |  | 8.90E+00 | 8.90E+00 |  | 1.20E+00 |  |
| ethyl butyrate | 0.00E+00 |  | 0.00E+00 | 0.00E+00 | 2.02E-02 | 0.00E+00 | 0.00E+00 |
| 2-pentanol | 8.30E-02 |  | 5.76E-02 | 7.34E-02 |  | 4.02E-02 | 4.34E-02 |
| limonene | 4.16E-02 |  | 4.83E-01 | 4.83E-01 | 1.92E-01 | 1.62E-01 | 5.83E-02 |
| 3-octanone | 0.00E+00 |  | 2.56E-03 | 0.00E+00 | 1.39E-02 | 8.64E-03 | 5.08E-03 |
| 2-octanone | 6.40E-03 |  | 4.77E-03 | 4.77E-03 | 2.08E-02 | 1.25E-02 | 8.10E-03 |
| 2-heptanol | 1.51E-01 |  | 5.06E-02 | 5.06E-02 |  | 3.76E-01 | 3.83E-02 |
| 2,3-dimethylpyrazine | 9.40E-02 |  | 1.77E-01 | 1.77E-01 | 6.38E-01 | 1.48E-01 | 1.07E-01 |
| dimethyl trisulfide | 3.12E-02 |  | 9.97E-03 | 9.97E-03 | 7.12E-02 | 2.57E-02 | 2.00E-02 |
| 2-octanol |  |  | 0.00E+00 | 0.00E+00 | 2.22E-02 | 1.53E-02 | 0.00E+00 |
| linalool oxide | 4.49E-02 |  | 1.22E-02 | 1.22E-02 | 1.18E-01 | 1.00E-01 | 0.00E+00 |
| 2,3-diethylpyrazine |  |  | 4.86E-03 | 4.85E-03 | 1.04E-02 | 8.31E-03 | 1.03E-01 |
| 2-nonanol | 1.40E-01 |  | 3.62E-02 | 3.62E-02 |  |  | 7.00E-02 |
| 1-octanol | 4.69E-02 |  | 3.82E-02 | 1.83E-02 | 9.20E-02 | 5.93E-02 | 3.07E-02 |
| 2-acetyl-5-methylfuran | 4.56E-02 |  | 7.83E-03 | 7.83E-03 | 1.01E-02 | 4.60E-03 | 6.61E-03 |
| diethyl succinate | 2.41E-02 |  | 7.89E-03 | 7.89E-03 | 1.39E-01 | 1.60E-02 | 1.61E-02 |
| methyl salicylate |  |  | 8.62E-03 | 8.62E-03 | 7.33E-03 |  | 1.47E-02 |
| methyl 2-thiofuroate | 0.00E+00 |  | 0.00E+00 | 0.00E+00 | 0.00E+00 | 1.12E-03 | 0.00E+00 |
| 2-phenyl-2-butenal |  |  | 2.81E-01 | 2.81E-01 | 6.46E-01 |  | 3.10E-01 |
| isoamyl benzoate |  |  |  | 0.00E+00 | 0.00E+00 | 2.50E-02 | 2.26E-02 |
| 5-methyl-2-phenyl-2-hexenal |  |  | 2.05E-01 | 2.05E-01 | 5.86E-01 | 1.34E+00 |  |
| massoia lactone | 3.47E+00 |  | 8.23E-02 | 8.23E-02 | 2.84E-02 | 1.42E-01 |  |
| ethyl isobutyrate | 0.00E+00 |  | 0.00E+00 | 8.69E-03 | 2.39E-02 | 0.00E+00 | 0.00E+00 |
| ethyl 2-methylbutyrate | 0.00E+00 |  | 0.00E+00 | 9.19E-03 | 2.86E-02 | 7.88E-03 | 0.00E+00 |
| isoamyl acetate | 4.58E-02 |  | 0.00E+00 | 1.64E-01 |  | 4.76E-02 | 6.64E-03 |
| 2-methyl-1-butanol | 1.73E-01 |  | 3.87E-02 |  |  | 0.00E+00 | 0.00E+00 |
| 2-methylpyrazine | 4.32E-02 |  | 5.54E-02 | 5.35E-02 | 6.86E-02 | 1.00E-01 | 6.70E-02 |

TABLE 9-continued

GCMS of reference chocolates

| | | | | | | |
|---|---|---|---|---|---|---|
| octanal | 2.75E−02 | | 7.19E−03 | 6.93E−02 | 1.19E−01 | 2.68E−02 | 4.31E−02 |
| 2,5-dimethylpyrazine | 1.12E−01 | | 5.07E−02 | 5.79E−02 | 1.45E−01 | 1.96E−01 | 1.13E−01 |
| 2-methoxypyrazine | 0.00E+00 | | 0.00E+00 | 2.37E−03 | 6.07E−03 | 8.37E−03 | 0.00E+00 |
| 2-nonanone | 7.80E−02 | | | 2.58E−01 | | 2.41E−01 | 3.44E−02 |
| 2-isopropyl-3-methoxypyrazine | 0.00E+00 | | 0.00E+00 | 9.11E−03 | 0.00E+00 | 0.00E+00 | 0.00E+00 |
| furfural | 1.08E−01 | | 1.00E−02 | 1.43E−01 | 2.21E−01 | 1.24E−01 | 1.30E−01 |
| benzaldehyde | 5.23E−01 | | 4.96E−01 | 3.64E−01 | | 4.51E−01 | 4.36E−01 |
| 5-methylfurfural | 8.72E−02 | | | 5.65E−02 | 4.22E−02 | 5.26E−02 | 2.00E−02 |
| 2-phenylpropionaldehyde | | | 9.70E−02 | 9.68E−01 | | 6.22E−01 | 2.91E−01 |
| propyl-2-furoate | 0.00E+00 | | 0.00E+00 | 4.21E−03 | 0.00E+00 | 0.00E+00 | 0.00E+00 |
| ethyl phenylacetate | 2.41E−01 | | 2.11E−03 | 1.11E−01 | | 2.77E−01 | 2.87E−01 |
| geranyl acetone | 0.00E+00 | | 0.00E+00 | 0.00E+00 | 0.00E+00 | 0.00E+00 | 0.00E+00 |
| guaiacol | 1.08E−01 | | 1.08E−03 | 3.63E−02 | 5.05E−02 | 1.06E−01 | 6.55E−02 |
| beta-ionone | 0.00E+00 | | 1.66E−03 | 1.18E−02 | 1.46E−02 | 1.03E−02 | 0.00E+00 |
| delta-octalactone | | | 1.83E−02 | 3.15E−02 | 1.68E−01 | 4.06E−02 | 2.41E−02 |
| 2,6-dimethoxyphenol | 0.00E+00 | | 0.00E+00 | 0.00E+00 | 0.00E+00 | 0.00E+00 | 0.00E+00 |
| methyl p-anisate | 0.00E+00 | | | 8.03E−03 | 3.85E−03 | 7.63E−03 | 1.76E−02 |
| propionic acid | 1.87E+00 | | 4.51E+00 | 3.59E−01 | | 1.12E+00 | 6.42E−01 |
| isobutyric acid | 1.84E+00 | | 7.88E−01 | 6.65E−01 | 3.09E+00 | 1.32E+00 | 3.45E−01 |
| butyric acid | 2.23E−01 | | 7.09E−01 | 4.19E−01 | 6.19E−01 | 1.30E−01 | 1.82E−01 |
| 2-methylbutyric acid | 2.51E+00 | | 1.75E+00 | 1.54E+00 | 4.34E+00 | 2.34E+00 | 5.50E−01 |
| isovaleric acid | 2.70E+00 | | 4.10E+00 | 2.84E+00 | 1.62E+01 | 7.48E+00 | 1.16E+00 |
| valeric acid | 1.07E−01 | | 1.76E−01 | 2.72E−01 | 2.47E−01 | 6.49E−02 | 4.18E−02 |
| hexanoic acid | 3.56E−01 | | 4.68E−01 | 4.84E−01 | 9.60E−01 | 4.64E−01 | 9.30E−03 |
| 3-phenylpropionic acid | 0.00E+00 | | 0.00E+00 | 0.00E+00 | 0.00E+00 | 0.00E+00 | 0.00E+00 |

| | 8 | 9 | 10 | 11 | 12 | 13 |
|---|---|---|---|---|---|---|
| isobutyraldehyde | 2.43E+00 | 5.15E−01 | 3.85E+00 | 5.74E−01 | 3.82E+00 | 1.78E+00 |
| valeraldehyde | 2.32E−01 | 2.38E−01 | 1.52E−01 | 1.18E−01 | 3.74E−01 | 3.38E−01 |
| 2,3-pentadione | 7.51E−02 | 4.16E−02 | 1.19E−01 | 6.90E−02 | 2.12E−01 | 1.46E−01 |
| myrcene | 0.00E+00 | 0.00E+00 | 0.00E+00 | 0.00E+00 | 0.00E+00 | 0.00E+00 |
| isoamyl alcohol | 3.53E−01 | 2.12E−01 | | 2.54E−01 | | |
| coffee furanone | 3.60E−02 | 2.17E−02 | 1.02E−01 | 8.49E−02 | 9.43E−02 | 7.90E−02 |
| 5-methyl-2-hepten-4-one | 0.00E+00 | 0.00E+00 | 0.00E+00 | 0.00E+00 | 0.00E+00 | 0.00E+00 |
| 2,6-dimethylpyrazine | 1.88E−02 | 9.01E−03 | 7.13E−02 | 9.93E−02 | 9.02E−02 | 4.31E−02 |
| hexanol | 3.47E−03 | 8.29E−03 | 8.72E−03 | 0.00E+00 | 5.57E−03 | 1.86E−02 |
| 2,3,5-trimethylpyrazine | 2.61E−01 | 1.04E−01 | 3.14E−01 | 5.77E−01 | | 3.75E−01 |
| 4,5-dimethyl-2-ethyl-3-thiazoline | 0.00E+00 | 0.00E+00 | 0.00E+00 | 0.00E+00 | 0.00E+00 | 0.00E+00 |
| 2-ethyl-1-hexanol | 2.29E−01 | 7.78E−02 | 2.60E−02 | 4.17E−02 | 1.17E−02 | 3.86E−02 |
| 2-isobutyl-3-methoxypyrazine | 0.00E+00 | 0.00E+00 | 4.53E−03 | 1.61E−02 | | |
| furfuryl propionate | 0.00E+00 | 0.00E+00 | 0.00E+00 | 0.00E+00 | 0.00E+00 | 0.00E+00 |
| phenylacetaldehyde | 2.83E+00 | 5.14E−01 | 2.64E+00 | | | 4.89E+00 |
| benzyl acetate | 1.12E−02 | 1.43E−03 | 1.90E−02 | 3.96E−02 | 9.52E−03 | 5.06E−03 |
| trans,tran-2,4-decadienal | 5.94E−03 | 1.54E−02 | 1.47E−02 | 0.00E+00 | 3.49E−02 | 6.52E−03 |
| benzyl alcohol | 1.08E−01 | 4.71E−02 | 1.37E−01 | 2.59E−01 | 1.10E−01 | 1.26E−01 |
| 4-methyl-2-phenyl-2-pentenal | 3.03E−02 | 9.68E−03 | 6.55E−02 | | 1.80E−02 | 2.78E−02 |
| isoamyl phenylacetate | 5.45E−03 | 8.35E−03 | 2.69E−02 | 1.97E−01 | | 2.29E−02 |
| dibutyl maleate | 0.00E+00 | 0.00E+00 | 0.00E+00 | 0.00E+00 | 0.00E+00 | 0.00E+00 |
| vanillyl ethyl ether | 0.00E+00 | 0.00E+00 | 0.00E+00 | 0.00E+00 | 0.00E+00 | 0.00E+00 |
| 2-methyl furan | 2.65E−02 | 4.65E−02 | 8.78E−02 | 5.08E−02 | 8.25E−02 | 6.78E−02 |
| 2,3-butanedione | | 1.57E+00 | | 5.44E−01 | | 2.53E+00 |
| ethyl isovalerate | 0.00E+00 | 0.00E+00 | 0.00E+00 | 5.90E−03 | 9.48E−06 | 0.00E+00 |
| amyl acetate | 0.00E+00 | 0.00E+00 | 0.00E+00 | 0.00E+00 | 1.58E−03 | 0.00E+00 |
| ethyl hexanoate | 3.25E−03 | 3.19E−03 | 1.79E−02 | 2.64E−02 | 5.05E−03 | 1.57E−03 |
| isoamyl butyrate | 3.46E−03 | 0.00E+00 | 4.09E−02 | 3.01E−02 | 1.72E−02 | 0.00E+00 |
| 3-mercapto-2-butanone | 0.00E+00 | 0.00E+00 | 0.00E+00 | 0.00E+00 | 0.00E+00 | 0.00E+00 |
| 2-ethylpyrazine | 9.46E−03 | 3.48E−02 | 2.02E−02 | 3.34E−02 | 3.49E−02 | 2.08E−02 |
| hexyl isobutyrate | 0.00E+00 | 0.00E+00 | 0.00E+00 | 0.00E+00 | 0.00E+00 | 0.00E+00 |
| 2-ethyl-3-methylpyrazine | 4.46E−02 | 7.05E−02 | 7.86E−03 | 2.78E−02 | 2.78E−02 | 5.71E−02 |
| 1-octen-3-ol | 1.84E−02 | 7.63E−03 | 1.37E−02 | 1.98E−02 | 1.79E−02 | 8.20E−03 |
| 2,3-diethyl-5-methylpyrazine | 1.02E−02 | 1.27E−02 | 2.23E−03 | 5.88E−03 | 1.49E−02 | 2.48E−03 |
| furfuryl acetate | 4.11E−03 | 5.67E−03 | 5.39E−03 | 1.22E−02 | 6.60E−03 | 1.20E−03 |
| 2-acetylpyridine | 1.37E−02 | 1.18E−02 | | 1.88E−02 | 6.45E−03 | 1.90E−03 |
| acetophenone | 1.51E−01 | 7.82E−02 | 3.89E−02 | 2.52E−01 | 1.47E−01 | 7.82E−02 |
| geranyl acetate | 3.65E−02 | 2.34E−02 | 3.27E−03 | 1.03E−02 | 7.71E−03 | 1.36E−02 |
| phenethyl acetate | 1.07E+00 | 9.15E−01 | 7.78E−01 | 1.07E+00 | 5.38E−01 | 1.06E+00 |
| ethyl laurate | | 5.56E−01 | 4.61E−02 | 4.44E−01 | 5.50E−02 | 8.32E−01 |
| maltol | 0.00E+00 | 0.00E+00 | 0.00E+00 | 0.00E+00 | 0.00E+00 | 0.00E+00 |
| gamma-nonalactone | 0.00E+00 | 3.19E−02 | 0.00E+00 | 6.48E−02 | 3.51E−02 | 1.03E−01 |
| ethyl cinnamate | | 7.67E−02 | 3.37E−03 | 4.12E−02 | 1.86E−02 | 1.06E−01 |
| tetrahydrofurfuryl phenylacetate | 0.00E+00 | 0.00E+00 | 0.00E+00 | 0.00E+00 | 0.00E+00 | 0.00E+00 |

TABLE 9-continued

| GCMS of reference chocolates | | | | | | |
|---|---|---|---|---|---|---|
| ethyl acetate | 3.40E-01 | 7.26E-02 | | 8.60E-02 | 9.91E-02 | |
| isobutyl acetate | 1.70E-03 | 0.00E+00 | 1.66E-02 | 7.94E-03 | 1.10E-02 | 2.64E-02 |
| butyl acetate | 0.00E+00 | 0.00E+00 | 0.00E+00 | 0.00E+00 | 0.00E+00 | 0.00E+00 |
| pyridine | 8.51E-04 | 1.32E-03 | 2.97E-02 | 3.44E-03 | 2.95E-02 | 1.65E-02 |
| 2-pentylfuran | 0.00E+00 | 0.00E+00 | 0.00E+00 | 0.00E+00 | 0.00E+00 | 0.00E+00 |
| isoamyl isobutyrate | 0.00E+00 | 0.00E+00 | 0.00E+00 | 5.42E-02 | 3.55E-02 | 3.00E-02 |
| 2-methylbutyl isovalerate | 0.00E+00 | 0.00E+00 | 0.00E+00 | 1.21E-02 | 3.65E-03 | 9.90E-03 |
| ethyl lactate | 4.12E-02 | 8.26E-03 | 3.68E-02 | 1.24E-02 | 6.01E-03 | 7.54E-02 |
| 2-isopropyl-5-methyl-2-hexenal | 3.24E-03 | 9.77E-03 | 1.15E-02 | 5.61E-02 | 6.21E-02 | 1.13E-02 |
| nonanal | 9.56E-01 | 4.90E-01 | | | 3.66E-01 | |
| ethyl octanoate | 6.51E-02 | 2.55E-02 | 1.24E-01 | 1.40E-01 | 4.82E-02 | 2.03E-01 |
| isopropenyl pyrazine | 0.00E+00 | 0.00E+00 | 2.67E-02 | 7.32E-03 | 3.61E-02 | 2.31E-02 |
| trans-2-nonenal | 4.89E-02 | 4.16E-02 | 1.38E-01 | 3.66E-02 | 7.98E-02 | 2.54E-01 |
| 2-undecanone | 4.57E-02 | 1.54E-01 | 4.71E-02 | 0.00E+00 | 6.84E-02 | 0.00E+00 |
| ethyl decanoate | 2.63E-01 | 0.00E+00 | 5.29E-01 | 1.67E-01 | 2.30E-01 | 8.41E-01 |
| methyl phenylacetate | 5.43E-03 | 9.23E-04 | 7.44E-02 | 1.25E-02 | 5.49E-02 | 3.87E-02 |
| damascenone | 0.00E+00 | 0.00E+00 | 0.00E+00 | 0.00E+00 | 0.00E+00 | 0.00E+00 |
| ethyl 3-phenylpropionate | 2.81E-02 | 1.55E-02 | 0.00E+00 | | 3.14E-02 | 5.40E-02 |
| tricyclodecenyl isobutyrate | 0.00E+00 | 0.00E+00 | 0.00E+00 | 0.00E+00 | 0.00E+00 | 0.00E+00 |
| prenyl benzoate | 0.00E+00 | 0.00E+00 | 0.00E+00 | 0.00E+00 | 0.00E+00 | 0.00E+00 |
| gamma-decalactone | 0.00E+00 | 0.00E+00 | 0.00E+00 | 0.00E+00 | 0.00E+00 | 0.00E+00 |
| vanillin | | | | | | |
| 2-methylbutyraldehyde | 5.90E-01 | 8.11E-02 | 1.98E+00 | 6.06E-01 | 4.97E-01 | 1.31E+00 |
| 1-propanol | 3.35E-03 | 0.00E+00 | 3.86E-02 | 1.50E-02 | 0.00E+00 | 4.82E-02 |
| hexanal | 1.18E-01 | 2.75E-01 | 1.83E-01 | 8.60E-02 | 1.55E-01 | 1.64E-01 |
| 2-heptanone | 4.25E-03 | 8.10E-02 | 3.20E-02 | 9.22E-02 | 5.26E-02 | 6.06E-02 |
| amyl alcohol | 0.00E+00 | 9.23E-02 | 4.86E-01 | 4.07E-01 | 1.65E-01 | |
| hexyl acetate | 0.00E+00 | 0.00E+00 | 0.00E+00 | 2.25E-02 | 7.15E-04 | 9.72E-03 |
| 1-octen-3-one | 2.68E-01 | 1.41E-01 | 1.94E-01 | 1.12E-01 | 8.46E-02 | 1.45E-01 |
| ethyl heptanoate | | 1.75E-03 | 2.34E-02 | 1.23E-02 | 3.03E-03 | 0.00E+00 |
| 2,4,5-trimethylthiazole | 0.00E+00 | 0.00E+00 | 0.00E+00 | 0.00E+00 | 0.00E+00 | 0.00E+00 |
| 2-ethoxy-3-methyl pyrazine | 0.00E+00 | 0.00E+00 | 0.00E+00 | 0.00E+00 | 0.00E+00 | 0.00E+00 |
| 1-heptanol | 5.71E-03 | 1.72E-02 | 0.00E+00 | 2.65E-02 | 2.76E-02 | 1.19E-02 |
| decanal | 1.14E-01 | 5.66E-02 | 1.06E-01 | 8.87E-02 | 6.21E-02 | 1.18E-01 |
| linalool | 4.20E-02 | 2.82E-02 | 1.30E-01 | | 1.56E-01 | 2.76E-01 |
| gamma-valerolactone | 1.68E-02 | 1.57E-02 | 1.39E-01 | 2.45E-01 | 9.73E-02 | 7.62E-02 |
| ethyl benzoate | 3.70E-02 | 4.18E-03 | 3.63E-02 | 3.68E-02 | 2.12E-02 | 1.86E-02 |
| 4'-methylacetophenone | 2.30E-03 | 1.11E-04 | 2.35E-02 | | 1.80E-02 | |
| geraniol | 0.00E+00 | 0.00E+00 | 3.87E-02 | 9.76E-04 | 0.00E+00 | 0.00E+00 |
| phenethyl alcohol | | 3.83E-01 | 2.95E+00 | 0.00E+00 | 2.54E+00 | 0.00E+00 |
| methyl 2-pyrrolyl ketone | 0.00E+00 | 0.00E+00 | 0.00E+00 | 0.00E+00 | 0.00E+00 | 0.00E+00 |
| p-cresol | | 9.29E-03 | 2.99E-02 | 2.11E-03 | 6.99E-02 | |
| delta-decalactone | | | 2.14E-02 | 3.88E-02 | | |
| vanillin propylene glycol acetal | | | | | | |
| isovaleraldehyde | 5.99E+00 | 5.14E-01 | | 3.21E+00 | 2.29E+00 | |
| ethyl butyrate | 7.83E-03 | 1.04E-02 | 0.00E+00 | 2.83E-03 | 0.00E+00 | 1.39E-02 |
| 2-pentanol | 1.41E-01 | 2.93E-02 | 2.55E-01 | 5.03E-01 | 1.11E-01 | |
| limonene | 1.50E-01 | 1.37E-01 | 2.28E-01 | 1.15E-01 | 5.32E-02 | 9.49E-02 |
| 3-octanone | 8.17E-03 | 0.00E+00 | 0.00E+00 | 4.92E-03 | 1.51E-02 | 0.00E+00 |
| 2-octanone | 0.00E+00 | 3.02E-02 | 9.15E-03 | 7.64E-03 | 2.03E-02 | 2.07E-02 |
| 2-heptanol | 5.45E-02 | 4.77E-02 | 5.36E-02 | | 8.73E-02 | 1.19E-01 |
| 2,3-dimethylpyrazine | 9.10E-02 | 3.40E-02 | 1.81E-01 | 1.84E-01 | 1.40E-01 | 1.64E-01 |
| dimethyl trisulfide | 5.18E-02 | 1.61E-02 | 3.91E-02 | 3.02E-02 | 1.82E-02 | 1.85E-02 |
| 2-octanol | 1.36E-02 | 0.00E+00 | 0.00E+00 | 7.45E-03 | 1.42E-02 | 0.00E+00 |
| linalool oxide | 0.00E+00 | 0.00E+00 | 1.42E-02 | 3.78E-03 | 1.17E-02 | 2.04E-02 |
| 2,3-diethylpyrazine | 7.56E-02 | 3.87E-02 | 1.51E-01 | 6.63E-01 | 2.86E-01 | 8.93E-02 |
| 2-nonanol | 1.29E-01 | 0.00E+00 | 2.00E-01 | 2.22E-01 | 1.36E-01 | 1.60E-01 |
| 1-octanol | 6.50E-02 | 2.95E-02 | 3.66E-02 | 4.37E-02 | 4.50E-02 | 8.27E-02 |
| 2-acetyl-5-methylfuran | 1.61E-02 | 0.00E+00 | 1.81E-02 | 1.03E-02 | 8.32E-03 | 1.74E-02 |
| diethyl succinate | 2.53E-02 | 7.62E-03 | 2.13E-02 | 1.49E-02 | 8.53E-03 | 2.83E-02 |
| methyl salicylate | 2.44E-02 | 1.36E-02 | 1.39E-02 | 1.18E-02 | 6.25E-03 | 1.72E-02 |
| methyl 2-thiofuroate | 0.00E+00 | 0.00E+00 | 0.00E+00 | 0.00E+00 | 0.00E+00 | 0.00E+00 |
| 2-phenyl-2-butenal | 8.45E-01 | 8.76E-02 | | | 1.34E-01 | 4.95E-01 |
| isoamyl benzoate | 0.00E+00 | 1.57E-02 | 2.67E-02 | 0.00E+00 | | 7.42E-03 |
| 5-methyl-2-phenyl-2-hexenal | 5.76E-01 | 1.49E-01 | | | 1.70E-02 | 1.67E-01 |
| massoia lactone | 6.05E-02 | 1.85E-01 | 5.42E-02 | | 2.64E-01 | |
| ethyl isobutyrate | 0.00E+00 | 0.00E+00 | 0.00E+00 | 0.00E+00 | 0.00E+00 | 0.00E+00 |
| ethyl 2-methylbutyrate | 6.68E-03 | 0.00E+00 | 0.00E+00 | 7.47E-03 | 0.00E+00 | 9.19E-03 |
| isoamyl acetate | 2.83E-02 | 5.25E-03 | 5.63E-02 | 3.14E-01 | 4.34E-02 | |
| 2-methyl-1-butanol | 4.63E-01 | 2.16E-01 | | | | |
| 2-methylpyrazine | 3.74E-02 | 1.41E-02 | 9.01E-02 | 1.09E-01 | 9.94E-02 | 5.69E-02 |
| octanal | 5.68E-02 | 5.34E-02 | 4.27E-02 | 4.90E-02 | 5.01E-02 | 5.73E-02 |
| 2,5-dimethylpyrazine | 5.44E-02 | 3.16E-02 | 1.77E-01 | 1.75E-01 | 1.79E-01 | 9.50E-02 |
| 2-methoxypyrazine | 1.33E-02 | 0.00E+00 | 1.09E-02 | 1.11E-02 | 8.22E-04 | 0.00E+00 |

TABLE 9-continued

GCMS of reference chocolates

| | | | | | | |
|---|---|---|---|---|---|---|
| 2-nonanone | 8.04E−02 | 7.10E−02 | 6.15E−02 | 3.86E−01 | 1.15E−01 | 1.32E−01 |
| 2-isopropyl-3-methoxypyrazine | 7.93E−03 | 0.00E+00 | 0.00E+00 | 0.00E+00 | 3.87E−03 | 0.00E+00 |
| furfural | 1.39E−01 | 4.61E−02 | 3.16E−01 | 1.72E−01 | 9.31E−02 | 1.32E−01 |
| benzaldehyde | 4.28E−01 | 1.61E−01 | 6.72E−01 | 5.93E−01 | 4.55E−01 | |
| 5-methylfurfural | 2.67E−01 | 1.21E−02 | 8.93E−02 | 3.07E−02 | 2.22E−01 | 5.54E−02 |
| 2-phenylpropionaldehyde | 5.50E−01 | 0.00E+00 | 4.36E−01 | 1.20E+00 | 6.50E−01 | 1.44E+00 |
| propyl-2-furoate | 0.00E+00 | 0.00E+00 | 0.00E+00 | 0.00E+00 | 0.00E+00 | 0.00E+00 |
| ethyl phenylacetate | 3.06E−01 | 3.27E−02 | 2.22E−01 | 1.70E−01 | 4.68E−02 | |
| geranyl acetone | 0.00E+00 | 0.00E+00 | 0.00E+00 | 0.00E+00 | 0.00E+00 | 0.00E+00 |
| guaiacol | 2.32E−02 | 1.44E−02 | 5.10E−02 | 4.34E−02 | 2.79E−02 | |
| beta-ionone | 2.69E−02 | 1.87E−02 | 2.64E−02 | | 6.83E−03 | |
| delta-octalactone | 6.24E−02 | 6.97E−02 | 7.46E−02 | 2.32E−02 | 7.52E−02 | 3.48E−01 |
| 2,6-dimethoxyphenol | 0.00E+00 | 0.00E+00 | 0.00E+00 | 0.00E+00 | 0.00E+00 | 0.00E+00 |
| methyl p-anisate | 1.16E−02 | 0.00E+00 | 1.67E−02 | 0.00E+00 | 4.10E−03 | |
| propionic acid | 4.98E−01 | 3.97E−01 | 3.05E+00 | 1.38E+00 | 1.36E+00 | 1.93E+00 |
| isobutyric acid | 7.64E−01 | 2.02E−01 | 2.40E+00 | 1.17E+00 | 1.66E+00 | 1.46E+00 |
| butyric acid | 4.95E+00 | 2.04E+00 | 3.10E−01 | 4.44E−01 | 2.84E−01 | 3.19E−01 |
| 2-methylbutyric acid | 9.87E−01 | 2.59E−01 | 1.98E+00 | 2.57E+00 | 1.59E+00 | 2.86E+00 |
| isovaleric acid | 4.14E+00 | 1.63E−01 | 3.86E+00 | 4.36E+00 | 3.29E+00 | 4.28E+00 |
| valeric acid | 1.33E−01 | 9.98E−02 | 2.91E−01 | 2.09E−01 | 2.43E−02 | 4.31E−02 |
| hexanoic acid | 3.10E+00 | 1.44E+00 | 6.66E−01 | 5.17E−01 | 3.60E−01 | 4.09E−01 |
| 3-phenylpropionic acid | 0.00E+00 | 0.00E+00 | 0.00E+00 | 0.00E+00 | 0.00E+00 | 0.00E+00 |

Blank = Not found

Example 3—Generating a Chocolate Replica from Ground Plant Seeds

To generate a chocolate replica from ground plant seeds, the following procedure was used:

1. Ground seeds were treated with sodium hydroxide (or another caustic agent) and water at 75° C. and 0-10 bar, with high shear blending, for 30 minutes to reach a pH of 8-8.5.

2. The seed mixture was dried by tray dry, spray dry, drum dry, falling film evaporation, freeze dry, or vacuum dry methods.

3. Plant oils (fat) were added and the mixture was milled using a stone corundum mill or colloid mill, at less than 65° C., to reach a final particle size reduction of <75 micron.

4. The mixture was sieved through a 100 micron sieve.

5. If included, sugars, seed meals, plant oils, amino acids, salts, and nonvolatiles (e.g., 0-75 wt % sugars, 5-50 wt % fats, 0.5-30 wt % plant seed, 0-30 wt % seed meal, 0-3% amino acids, 0-1.5 wt % salt and/or other nonvolatiles, and 0-5 wt % root powders) were added to the mixture and mixed at 35° C. for 30 minutes.

6. VOCs, acids, and other nonvolatiles were added to the mixture and mixed at 35° C. with or without vacuum for 10 minutes.

7. The mixture was emulsified using a continuous ball mill, not exceeding 40° C., to reduce the particle size to <30 microns.

8. The resulting chocolate replica was solidified at 10-15° C. in mold blocks.

9. The chocolate replica was de-molded and packed in bulk for further processing.

10. The mixture was melted in a large mixing tank at 28° C. to 42° C.

11. The chocolate replica was tempered to obtain the correct fat crystal structure.

12. The mixture was deposited into bar molds and cooled at 10-15° C., or was deposited onto a cooling belt at 10-15° C. for chips and chunks.

13. The chocolate replica was packaged.

Example 4—Generating a Chocolate Replica from Whole Plant Seeds

To generate a chocolate replica from whole plant seeds, the following procedure was used:

1. Whole seeds were sifted using a mesh to remove stem pieces and other undesired plant material.

2. Whole seeds were treated with sodium hydroxide (or another caustic agent) and water at 75° C. and 0-10 bar, with high shear blending, for 30 minutes to reach a pH of 8-8.5.

3. Seeds were sieved from the liquid, creating a wet seeds fraction and a liquid plus dissolved solids fraction.

4. The wet seeds fraction was air roasted and the liquid fraction was dry roasted.

5. The wet seeds were ground using a burr mill.

6. Both fractions were recombined, plant oils (fat) were added, and the mixture was milled using a stone corundum mill or colloid mill, at less than 65° C., to reduce the particle size to <75 microns.

7. The mixture was sieved through a 100 micron sieve.

8. Any sugars, seed meals, plant oils, amino acids, salts, and/or nonvolatiles were added to the mixture and mixed at 35° C. for 30 minutes.

9. VOCs, acids, and other nonvolatiles were added to the mixture and mixed at 35° C. under vacuum for 10 minutes.

10. The mixture was emulsified using a continuous ball mill, not exceeding 40° C., to reduce the particle size to <30 microns.

10. The resulting chocolate replica was solidified at 10-15° C. in mold blocks.

11. The chocolate replica was de-molded and packed in bulk for further processing.

12. The mixture was melted in a large mixing tank at 28° C. to 42° C.

13. The chocolate replica was tempered to obtain the desired fat crystal structure.

14. The mixture was deposited into bar molds and cooled at 10-15° C., or was deposited onto a cooling belt at 10-15° C. for chips and chunks.

15. The chocolate replica was packaged.

Example 5—Generating a Chocolate Replica from Whole Plant Seeds

To generate a chocolate replica from whole plant seeds, the following procedure was used:

1. Whole seeds were cleaned with cleaning house equipment such as a destoner, scalping deck, aspiration channel, sizing deck, optical sorter, and/or sieve to remove unwanted chaff and broken material, as well as other products of agricultural origin (stones, skins, stems, sticks, etc.).

2. Whole seeds were treated with caustic solution (e.g., sodium hydroxide or potassium hydroxide) in water at an elevated temperature (e.g., 75° C.) at a pressure of 0-10 bar with agitation for 30 minutes to 2 hours, to reach a pH of 8-9. The seed mixture was then dried by tray drying, spray drying, drum drying, or vacuum drying. The seeds were either sieved and the two resulting streams were dried separately, or a vacuum was pulled to evaporate the moisture from the slurry. Optionally, under agitation in the base of a reaction chamber, reacting components such as enzymes (e.g., cellulase, tannase, pectinase, xylase, and/or hemicellulase) were applied to the seeds with water and/or any other chemicals (e.g., caustic materials, acidulants, and/or hydrogen peroxide) as needed.

3. The seeds and solids from step 2 were roasted using convection, conduction, infrared, or a combination of the three.

4. The seeds and other solids from the roasting step were ground using a mill such as a crushing mill, burr mill, espresso grinder, stone mill, or jet milling, followed by sifting if necessary.

5. The ground material was combined with plant oils (fat), sugars, salts, seed meals/flours, amino acids, and other non-volatiles as desired, and mixed at 35° C. to homogenize the stream.

6. The slurry was pumped into a continuous rotor stator particle size reduction machine using medium/high tip speed with a corrugated barrel. If needed, the material was homogenized while adding any additional nonvolatile ingredients.

7. The material was pumped directly onto a refiner to refine the material to <25-30 microns.

8. The material was conveyed to a liquefier or conch where additional fat, lecithin, and/or volatile flavors were added to develop flavor and create the final texture.

9. The chocolate replica was optionally tempered, and was then solidified in large blocks at 10-15° C. in molds or on a belt slab.

10. The chocolate replica was de-molded and packed in bulk for further processing or wrapped for use as an industrial ingredient.

11. For further processing, the chocolate was melted in a large mixing tank at elevated temperature (>30° C.).

12. The chocolate replica was tempered to obtain the desired fat crystal structure.

13. The mixture was deposited into bar molds and cooled at 10-15° C., or was deposited onto a cooling belt at 10-15° C. for chips and chunks.

14. The chocolate replica was packaged.

Example 6—Generating a Chocolate Replica from Whole Plant Seeds

To generate a chocolate replica from whole plant seeds, the following procedure was used:

1. Whole seeds were cleaned with equipment such as, without limitation, a destoner, a scalping deck, an aspiration channel, a sizing deck, an optical sorter, and a sieve, to remove unwanted chaff and broken material as well as other products of agricultural origin (e.g., stones, skins, stems, sticks, etc.).

2. Whole seeds were treated with a caustic solution (e.g., sodium hydroxide, potassium hydroxide, etc.) in water at an elevated temperature (e.g., about 75° C.) at a pressure of 0-10 bar with agitation for 30 minutes to 2 hours to reach a pH of 8-9. The seed mixture was then dried by tray drying, spray drying, drum drying, and/or vacuum drying. The seeds were either sieved and the two streams were dried separately, or a vacuum was pulled and the moisture was evaporated from the slurry. Optionally, under agitation in the base of a reaction chamber, one or more reacting components such as an enzyme (e.g., cellulase, tannase, pectinase, xylase, or hemicellulase) were applied to the seeds with water and/or any other chemicals, such as caustic materials, acidulants, and/or hydrogen peroxide.

3. The seeds and solids from step 2 were roasted using convection, conduction, or infrared roasting, or any combination of the three.

4. The seeds and other solids from the roasting step were ground using a mill (e.g., a crushing mill, burr mill, espresso grinder, stone mill, or jet mill), and optionally sifted.

5. The ground material was combined with plant oils (fat), sugars, salts, seed meals/flours, amino acids, and other non-volatiles, and mixed at 35° C. to homogenize the stream.

6. The resulting slurry was pumped into a 2-roll prefine followed by a homogenizing screw. In some cases, the material was homogenized while adding additional nonvolatile ingredients (e.g., carbohydrate such as starch and/or an emulsifier such as lecithin).

7. The homogenized material was conveyed directly onto a refiner to refine the material to <25-30 microns.

8. The refined material was conveyed to a liquefier or conch where additional fat, lecithin, and volatile flavors were added at 28° C. to 42° C. with agitation or mixing to develop flavor and create the final texture. If necessary, the material was pumped into a continuous ball mill for further particle size reduction.

9. The resulting chocolate replica was optionally tempered, and was then solidified in large blocks at 10-15° C. in molds or on a belt slab.

10. The chocolate replica was de-molded and packed in bulk for further processing, or wrapped for use as an industrial ingredient.

11. For further processing, the chocolate was melted in a large mixing tank at elevated temperature (>30° C.).

12. The melted chocolate replica was tempered to obtain the desired fat crystal structure 13. The mixture was deposited into bar molds and cooled at 10-15° C., or was deposited onto a cooling belt at 10-15° C. for chips and chunks.

14. The chocolate replica was then packaged.

Example 7—Generating a Chocolate Bean Replica

To generate a chocolate bean replica, the following procedure was used:

1. Water-soluble VOCs and non-volatile compounds were dissolved in water with low shear blending.

2. An emulsion of fat-soluble VOCs and non-volatile compounds in a neutral oil (e.g., a fully deodorized oil, such as palm oil, shea oil, mango kernel oil, *illipe* oil, cottonseed oil, corn oil, sunflower oil, or coconut oil) was formed using a rotor stator high shear homogenizer or a high pressure inline recirculating homogenizer. Optionally, one or more emulsifiers, starches, gums, and/or polysaccharides were added to the emulsion.

3. The water-soluble and emulsion fractions were blended (e.g., in a mix tank with high shear blending capabilities).

4. Large particle solid substrate material was separately blended (e.g., to a particle size of about 250-1500 µm) in a mixer 5. The liquid mixture from step 3 was added to the blended solid substrate from step 4, with mixing.

6. Optionally, a tableting aid (e.g., a grain or non-grain ingredient to aid in tableting, for example, a binding agent such as a starch, sugar, and/or gum) was added.

7. The mixture was tableted in a pill press or similar machine to form chocolate bean replicas.

8. The chocolate bean replicas were optionally placed into a coating pan and coated (e.g., with shellac, zein protein, or wax).

9. The chocolate bean replicas were placed into a receptacle (e.g., a bag).

Example 8—Generating a Chocolate Beverage Replica

To generate a chocolate beverage replica, the following procedure was used:

1. Water-soluble VOCs and non-volatile compounds were dissolved in water with low shear blending.

2. An emulsion of fat-soluble VOCs and non-volatile compounds in a neutral oil (e.g., a fully deodorized oil, such as palm oil, shea oil, mango kernel oil, *illipe* oil, cottonseed oil, corn oil, sunflower oil, or coconut oil) was formed using a rotor stator high shear homogenizer or a high pressure inline recirculating homogenizer. Optionally, one or more emulsifiers, starches, gums, and/or polysaccharides were added to the emulsion.

3. The water-soluble and emulsion fractions were blended (e.g., in a mix tank with high shear blending capabilities).

4. The blend was processed to reach commercial sterility using ultra clean processing, UHT aseptic processing, fill and retort, fill and then Ohmic sterilization, UV/PEF inline sterilization and aseptic filling, or any other appropriate method.

Example 9—Generating a Chocolate Beverage Replica

To generate a chocolate beverage replica, the following procedure was used:

1. Whole seeds were cleaned with equipment such as, without limitation, a destoner, a scalping deck, an aspiration channel, a sizing deck, an optical sorter, and/or a sieve, to remove unwanted chaff and broken material as well as other products of agricultural origin (e.g., stones, skins, stems, sticks, etc.).

2. The whole seeds were treated with a caustic solution (e.g., sodium hydroxide, or potassium hydroxide) in water at an elevated temperature (e.g., about 75° C.) with agitation for 30 minutes to 2 hours, to reach a pH of 8-9. If dutched, the seed mixture was dried by tray drying, spray drying, drum drying, or vacuum drying. The seeds were either sieved and the two streams were dried separately, or a vacuum was pulled and moisture was evaporated from the slurry. Optionally, under agitation in the base of a reaction chamber, one or more reacting components (e.g., an enzyme such as cellulase, tannase, pectinase, xylase, or hemicellulase) was applied to the seeds with water and/or chemicals such as caustic materials, acidulants, hydrogen peroxide, etc.

3. The seeds and solids from step 3 were roasted using convection, conduction, or infrared roasting, or any combination thereof.

4. The seeds and other solids from the roasting step were ground using a mill such as a crushing mill, burr mill, espresso grinder, stone mill, or jet mill, and then optionally sifted.

5. The ground material was combined with the plant oils (fat), sugars, salts, seed meals/flours, amino acids, and other nonvolatile compounds and mixed at 35° C. to homogenize the stream.

6. The slurry was pumped into a 2-roll prefine followed by a homogenizing screw. The material was then optionally homogenized while adding any additional nonvolatile ingredients (e.g., carbohydrate such as starch and/or an emulsifier such as lecithin).

7. The homogenized slurry was pumped directly onto a refiner to refine the material to <25-30 microns.

8. The refined material was conveyed to a liquefier or conch where additional fat, lecithin, and volatile flavors were added at 28° C. to 42° C. with mixing/agitation to develop flavor and create the final texture. In some cases, the material was pumped into a continuous ball mill for further particle size reduction.

9. The chocolate replica was optionally tempered, and was then solidified in large blocks at 10-15° C. in molds or on a belt slab.

10. The chocolate replica was de-molded and packed in bulk for further processing, or wrapped for use as an industrial ingredient 11. An emulsion of fat-soluble material was formed from the chocolate replica, using a rotor stator high shear homogenizer or a high pressure inline recirculating homogenizer. In some cases, one or more emulsifiers, starches, gums, and/or polysaccharides were added.

12. The emulsion fractions and other optional ingredients (e.g., additional sugars, flavors, and/or stabilizers) were blended (e.g., in a mix tank with high shear blending capabilities). One or more of the following methods were used to reach commercial sterility: ultra clean processing, UHT aseptic processing, fill and retort, fill and then Ohmic sterilization, UV/PEF inline sterilization and aseptic filling, or any other appropriate method.

Example 10—Exemplary Chocolate Formulations

Chocolate formulations are prepared, containing VOCs as shown in TABLE 10.

TABLE 10

Exemplary Chocolate formulations

| | Range (Percent by weight) |
|---|---|
| isovaleric acid | 3.51E−03-1.40E−02 |
| 2-methylbutyric acid | 1.21E−01-4.85E−01 |
| butyric acid | 1.21E−02-4.85E−02 |
| cinnamic acid | 9.58E−03-3.83E−02 |
| propanoic acid | 2.43E−03-9.70E−03 |
| 3-phenylpropionic acid | 7.78E−04-3.11E−03 |
| amyl alcohol | 4.52E−02-1.81E−01 |
| phenyl methanol (benzyl alcohol) | 4.52E−03-1.81E−02 |
| isoamyl alcohol | 2.92E−03-1.17E−02 |
| 1-decanol | 1.95E−03-7.78E−03 |

TABLE 10-continued

Exemplary Chocolate formulations

| | Range (Percent by weight) |
|---|---|
| 3-(Z)-hexenol | 1.76E-03-7.03E-03 |
| furaneol | 1.15E-03-4.59E-03 |
| 2-nonanol | 9.73E-04-3.89E-03 |
| 1-heptanol | 4.87E-04-1.95E-03 |
| 2-methoxy-4-vinylphenol | 3.48E-04-1.39E-03 |
| carvacrol | 1.73E-04-6.94E-04 |
| 3-mercapto hexanol | 1.41E-04-5.62E-04 |
| para cresol | 9.42E-05-3.77E-04 |
| hexyl alcohol (hexanol) | 2.33E-07-9.33E-07 |
| 1-octanol | 2.92E-08-1.17E-07 |
| isovaleraldehyde | 5.49E-01-2.20E+00 |
| vanillin | 3.45E-01-1.38E+00 |
| cocoa hexenal | 4.52E-02-1.81E-01 |
| benzaldehyde | 1.20E-02-4.79E-02 |
| vanillin erythro and threo-butan-2,3-diol acetal | 1.15E-02-4.59E-02 |
| nonanal | 6.21E-03-2.49E-02 |
| valeraldehyde | 3.29E-03-1.32E-02 |
| 2-phenyl-2-butenal | 5.84E-04-2.34E-03 |
| 2-methylbutyraldehyde | 4.87E-04-1.95E-03 |
| decanal | 3.51E-04-1.40E-03 |
| isodihydrolavandulal | 2.09E-04-8.36E-04 |
| 2-methylbutyl isovalerate | 9.78E-03-3.91E-02 |
| ethyl lactate | 9.52E-03-3.81E-02 |
| ethyl laurate | 6.46E-03-2.59E-02 |
| methyl butyrate | 6.07E-03-2.43E-02 |
| isoamyl acetate | 3.77E-03-1.51E-02 |
| methyl para-anisate | 3.28E-03-1.31E-02 |
| ethyl heptanoate | 2.81E-03-1.12E-02 |
| ethyl 2-methylbutyrate | 2.63E-03-1.05E-02 |
| ethyl-2-methylbutyrate | 2.60E-03-1.04E-02 |
| butyl butyrate | 2.11E-03-8.43E-03 |
| isobutyl acetate | 1.95E-03-7.78E-03 |
| butyl acetate | 1.95E-03-7.78E-03 |
| isoamyl isobutyrate | 1.75E-03-7.01E-03 |
| methyl 2-methylbutyrate | 1.47E-03-5.87E-03 |
| ethyl isobutyrate | 1.47E-03-5.87E-03 |
| ethyl 3-hydroxybutanoate | 9.73E-04-3.89E-03 |
| ethyl phenylacetate | 6.78E-04-2.71E-03 |
| benzyl acetate | 4.87E-04-1.95E-03 |
| ethyl butyrate | 4.39E-04-1.76E-03 |
| diethyl succinate | 2.96E-04-1.18E-03 |
| ethyl hexanoate | 2.93E-04-1.17E-03 |
| hexyl isobutyrate | 2.43E-04-9.73E-04 |
| hexyl acetate | 2.26E-04-9.03E-04 |
| methyl benzoate | 1.95E-04-7.78E-04 |
| furfuryl acetate | 1.17E-04-4.67E-04 |
| geranyl acetate | 8.75E-05-3.50E-04 |
| acetoin acetate | 1.43E-02-5.74E-02 |
| coffee furanone | 1.38E-02-5.51E-02 |
| maltol | 1.08E-02-4.30E-02 |
| gamma-valerolactone | 1.07E-02-4.28E-02 |
| ethyl maltol | 5.74E-03-2.29E-02 |
| acetoin | 3.64E-03-1.46E-02 |
| beta-ionone | 1.65E-03-6.58E-03 |
| 2,3-hexanedione | 1.43E-03-5.74E-03 |
| 2-heptanone | 1.23E-03-4.91E-03 |
| 2-undecanone | 7.03E-04-2.81E-03 |
| alpha ionone | 1.81E-04-7.23E-04 |
| 2,3-pentadione | 1.72E-04-6.88E-04 |
| damascenone | 1.01E-04-4.04E-04 |
| acetophenone | 9.73E-05-3.89E-04 |
| vanillyl ethyl ether | 1.07E-02-4.27E-02 |
| rum ether | 3.51E-03-1.40E-02 |
| 2-methyl furan | 4.87E-04-1.95E-03 |
| 2-methylpyrazine | 1.31E-02-5.23E-02 |
| 2,6-dimethylpyrazine | 8.88E-03-3.55E-02 |
| 2-ethylpyrazine | 6.10E-03-2.44E-02 |
| isopropenyl pyrazine | 6.90E-04-2.76E-03 |
| 2-Ethyl-3-methylpyrazine | 6.10E-04-2.44E-03 |
| 2,3-dimethylpyrazine | 1.74E-04-6.97E-04 |
| 2,3,5-trimethylpyrazine | 1.31E-04-5.23E-04 |
| (R)-(+)-limonene | 1.24E-02-4.97E-02 |
| linalool | 6.21E-03-2.49E-02 |
| B-caryophyllene | 4.57E-03-1.83E-02 |
| 3-carene | 2.36E-03-9.44E-03 |
| myrcene | 8.67E-05-3.47E-04 |
| sucrose and other sugars | 10.0-40.0 |
| lecithin | 0.25-2.00 |
| leucine | 3.33E-02-1.0E-01 |
| phenylalanine | 8.3E-02-2.5E-01 |
| glucose | 5.0E-02-1.5E-01 |
| malic acid | 1.61E-05-1.61E-04 |
| tartaric acid | 8.81E-06-8.81E-05 |
| lactic acid | 1.76E-05-1.76E-04 |
| citric acid | 1.00E-03-1.00E-02 |
| naringin | 5.00E-03-5.00E-02 |
| sodium chloride | 2.50E-02-1.00E-01 |
| Substrate (grape seed, sunflower seed, plant oils, seed meals, sugars) | 50.0-99.9 |
| Liquid (e.g., water, milk, plant-based milk, or a combination thereof) | 0-20 |

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for preparing a chocolate replica from plant seeds, wherein the method comprises:
   treating the plant seeds with a caustic agent and water at a pressure of 0-10 bar, to generate a preparation having a pH of about 7.0 to about 10.5;
   drying the preparation;
   combining the dried preparation with one or more plant oils to generate a mixture;
   milling the mixture until the particles have a size less than about 75 microns; and
   adding at least one amino acid, at least one sugar, or at least one amino acid and at least one sugar to the milled mixture to yield a chocolate replica;
   wherein the plant seeds are selected from apple seeds, breadfruit seeds, breadnut seeds, cashew seeds, citrus fruits seeds, colocynth seeds, date seeds, date palm seeds, quava seeds, grape seeds, kokum seeds, luffa seeds, mango seeds, moringa seeds, melon seeds, olive seeds, papaya seeds, pumpkin seeds, squash seeds, gourd seeds, sapucaia seeds, Spanish lime seeds, seje seeds, tomato seeds, walnut seeds, watermelon seeds, almond kernels, camelina seeds, cashew nuts, castor seeds, chia seeds, cottonseed hulls, corozo seeds, macadamia, maize germ, oil palm kernels, rapeseed hulls, rapeseeds, safflower seeds, sal seeds, soybean seeds, sesame seeds, shea kernels, sickle pods, sunflower hulls, sunflower seeds, soybean hulls, and combinations thereof.

2. The method of claim 1, wherein the one or more plant oils comprise corn oil, cottonseed oil, sunflower oil, palm oil, coconut oil, shea oil, *illipe* oil, mango kernel oil, palm kernel oil, canola oil, avocado oil, or safflower oil.

3. The method of claim 1, wherein the caustic agent comprises sodium hydroxide, potassium carbonate, sodium carbonate, calcium hydroxide, potassium bicarbonate, or potassium hydroxide.

4. The method of claim 1, wherein the ground plant seeds do not contain cocoa solids.

5. The method of claim 1, further comprising adding at least one isolated volatile organic compound (VOC), at least one acid, at least one isolated nonvolatile compound, or a combination thereof, to the milled mixture.

6. A chocolate replica produced according to the method of claim 1.

7. A method for preparing a solid chocolate replica from a plant-based substrate, wherein the method comprises:
- treating a plant-based substrate with a caustic agent and water at a pressure of 0-10 bar to generate a preparation having a pH of about 7.0 to about 10.5;
- drying the preparation, wherein the drying comprises tray drying, spray drying, drum drying, falling film evaporation, freeze drying, vacuum drying, or a combination thereof;
- roasting the dried preparation;
- grinding the roasted preparation to generate particles;
- combining the ground roasted preparation with one or more plant oils, sugars, salts, seed meals or seed flours, amino acids, isolated VOCs, or isolated non-volatile compounds, to generate a slurry; and
- solidifying the slurry to yield a solid chocolate replica;
- wherein the plant-based substrate is derived from oil plant seeds, fruit or vegetable seeds, or a combination thereof, and
- wherein the oil plant seeds, fruit or vegetable seeds, or combination thereof are selected from apple seeds, breadfruit seeds, breadnut seeds, cashew seeds, citrus fruits seeds, colocynth seeds, date seeds, date palm seeds, quava seeds, grape seeds, kokum seeds, luffa seeds, mango seeds, moringa seeds, melon seeds, olive seeds, papaya seeds, pumpkin seeds, squash seeds, gourd seeds, sapucaia seeds, Spanish lime seeds, seje seeds, tomato seeds, walnut seeds, watermelon seeds, almond kernels, camelina seeds, cashew nuts, castor seeds, chia seeds, cottonseed hulls, corozo seeds, macadamia, maize germ, oil palm kernels, rapeseed hulls, rapeseeds, safflower seeds, sal seeds, soybean seeds, sesame seeds, shea kernels, sickle pods, sunflower hulls, sunflower seeds, soybean hulls, and combinations thereof.

8. The method of claim 7, wherein the one or more plant oils comprise corn oil, cottonseed oil, sunflower oil, palm oil, coconut oil, shea oil, *illipe* oil, mango kernel oil, palm kernel oil, canola oil, avocado oil, or safflower oil.

9. The method of claim 7, wherein the caustic agent comprises sodium hydroxide, potassium carbonate, sodium carbonate, calcium hydroxide, potassium bicarbonate, or potassium hydroxide.

10. The method of claim 7, wherein the plant-based substrate does not contain cocoa solids.

11. The method of claim 7, wherein the particles have a size of less than about 30 microns.

12. A solid chocolate replica produced according to the method of claim 7.

13. A method for preparing a plant-based solid substrate derived from grape seeds, wherein the method comprises:
- mixing the grape seeds with a caustic agent and water at a pressure of 0-10 bar, to generate a preparation having a pH of about 7.0 to about 10.5;
- separating the preparation into a solid fraction from a liquid fraction;
- separately roasting the solid fraction and the liquid fraction;
- grinding the roasted solid fraction;
- combining the ground roasted solid fraction with the roasted liquid fraction and one or more plant oils to generate a mixture;
- milling the mixture to generate particles having a size of less than about 75 microns; and
- sieving the particles to yield the solid substrate.

14. The method of claim 13, further comprising adding at least one isolated VOC, at least one acid, at least one isolated nonvolatile compound, or a combination thereof, to the milled mixture.

15. The method of claim 13, wherein the one or more plant oils comprise corn oil, cottonseed oil, sunflower oil, palm oil, coconut oil, shea oil, *illipe* oil, mango kernel oil, palm kernel oil, canola oil, avocado oil, or safflower oil.

16. A plant-based solid substrate produced according to the method of claim 13.

* * * * *